United States Patent
Takenaka et al.

(10) Patent No.: US 7,541,764 B2
(45) Date of Patent: Jun. 2, 2009

(54) CONTROL SYSTEM FOR MOBILE BODY

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 10/596,051

(22) PCT Filed: Nov. 29, 2004

(86) PCT No.: PCT/JP2004/018096

§ 371 (c)(1),
(2), (4) Date: May 26, 2006

(87) PCT Pub. No.: WO2005/051612

PCT Pub. Date: Jun. 9, 2005

(65) Prior Publication Data

US 2007/0126387 A1 Jun. 7, 2007

(30) Foreign Application Priority Data

Nov. 27, 2003 (JP) ............................. 2003-398171

(51) Int. Cl.
*B25J 5/00* (2006.01)
(52) U.S. Cl. .............................. 318/568.12; 318/568.2; 318/568.11
(58) Field of Classification Search .............. 318/568.2, 318/568.11, 568.12
See application file for complete search history.

(56) References Cited

U.S. PATENT DOCUMENTS 4,967,127 A * 10/1990 Ishiguro et al. ............. 318/571
5,337,235 A * 8/1994 Takahashi et al. ............. 701/23
5,432,417 A * 7/1995 Takenaka et al. ....... 318/568.12
2005/0240307 A1* 10/2005 Kuroki et al. ............... 700/245

FOREIGN PATENT DOCUMENTS

EP 1721710 A1 * 11/2006
JP 05-200682 8/1993

(Continued)

*Primary Examiner*—Bentsu Ro
*Assistant Examiner*—Antony M Paul
(74) *Attorney, Agent, or Firm*—Rankin, Hill & Clark LLP

(57) ABSTRACT

A control system for a mobile robot is provided with a base body 53 and a plurality of link mechanisms 52 and 54 connected thereto. A sensor 90 for detecting external forces is provided on a predetermined portion (knee) between the base body 53 and a distal portion (foot) 58 of the link mechanism (leg) 52. In a motion posture in which a robot 61 has a predetermined portion (knee) in contact with the ground, the displacement of at least a joint 55 between the base body 53 and the predetermined portion (knee) is controlled so as to bring an external force (floor reaction force) detected by the sensor 90 close to a desired external force. In a state wherein a portion other than a distal portion of a leg or arm of the robot 61 is in contact with a floor or the like and subject to an external force, the external force acting on the portion other than the distal portion of the leg or arm is properly controlled, thereby maintaining a stable posture of the robot 61.

7 Claims, 55 Drawing Sheets

FOREIGN PATENT DOCUMENTS

| | | |
|---|---|---|
| JP | 05-305585 | 11/1993 |
| JP | 05-324115 | 12/1993 |
| JP | 06031668 A * | 2/1994 |
| JP | 10-277969 | 10/1998 |
| JP | 2001-062760 | 3/2001 |
| JP | 2001-150370 | 6/2001 |
| JP | 2001-322076 | 11/2001 |
| JP | 2002-361575 | 12/2002 |
| WO | 03/090980 | 11/2003 |

* cited by examiner

FIG.6

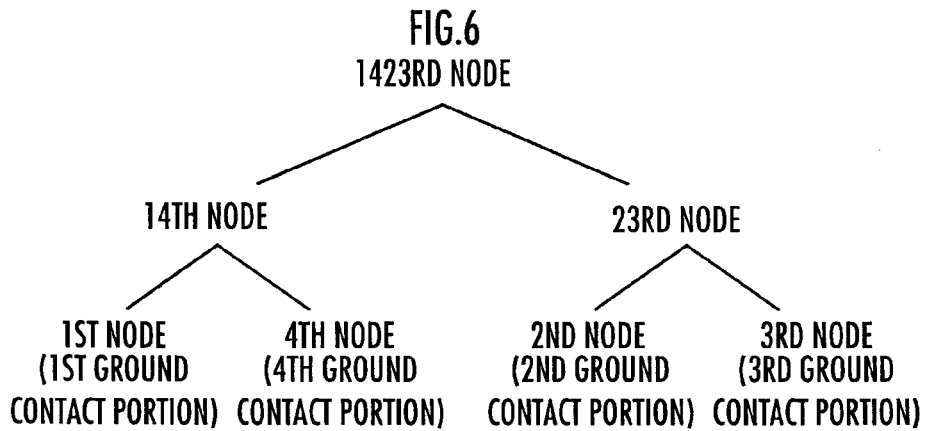

1423RD NODE
- 14TH NODE
  - 1ST NODE (1ST GROUND CONTACT PORTION)
  - 4TH NODE (4TH GROUND CONTACT PORTION)
- 23RD NODE
  - 2ND NODE (2ND GROUND CONTACT PORTION)
  - 3RD NODE (3RD GROUND CONTACT PORTION)

FIG.7

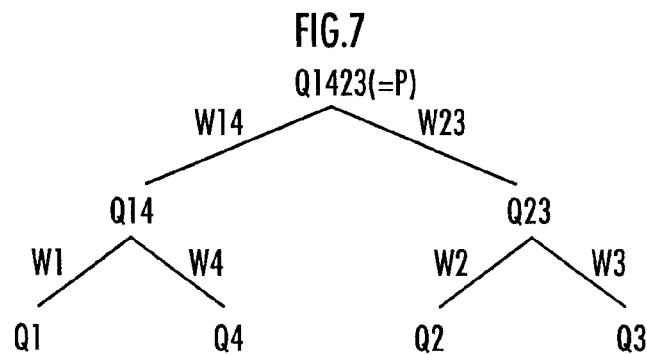

$Q14 = W1 \cdot Q1 + W4 \cdot Q4$
$Q23 = W2 \cdot Q2 + W3 \cdot Q3$
$Q1423 = W14 \cdot Q14 + W23 \cdot Q23$

FIG.8

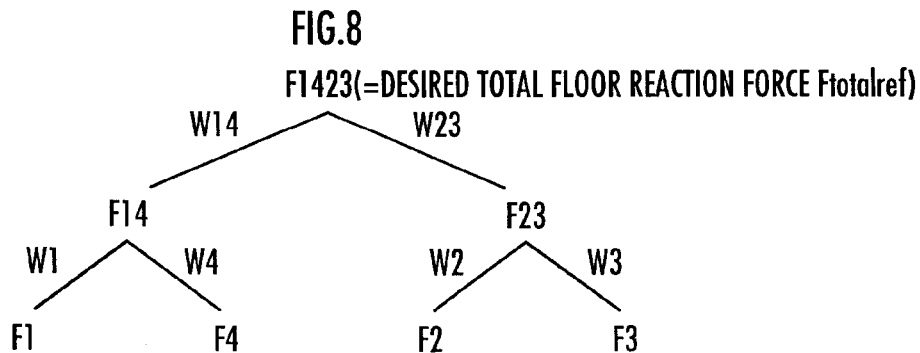

F1423(=DESIRED TOTAL FLOOR REACTION FORCE Ftotalref)

$F1 = W1 \cdot W14 \cdot Ftotalref$
$F4 = W4 \cdot W14 \cdot Ftotalref$
$F2 = W2 \cdot W23 \cdot Ftotalref$
$F3 = W3 \cdot W23 \cdot Ftotalref$
$F14 = F1 + F4$
$F23 = F2 + F3$
$F1423 = F14 + F23$

FIG.42

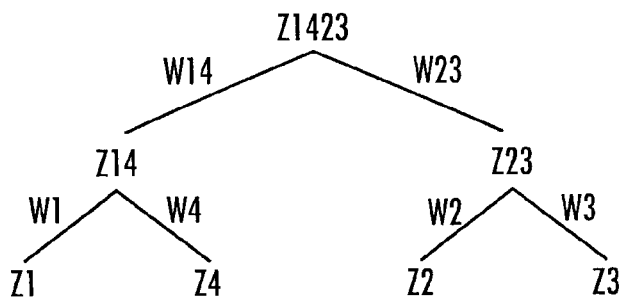

Z14_with_bias = W1 · Z1_with_bias + W4 · Z4_with_bias
Z23_with_bias = W2 · Z2_with_bias + W3 · Z3_with_bias
Z1423_with_bias = W14 · Z14_with_bias + W23 · Z23_with_bias Z1_rel = Z1_with_bias − Z14_with_bias
Z4_rel = Z4_with_bias − Z14_with_bias
Z2_rel = Z2_with_bias − Z23_with_bias
Z3_rel = Z3_with_bias − Z23_with_bias
Z14_rel = Z14_with_bias − Z1423_with_bias
Z23_rel = Z23_with_bias − Z1423_with_bias

FIG.43

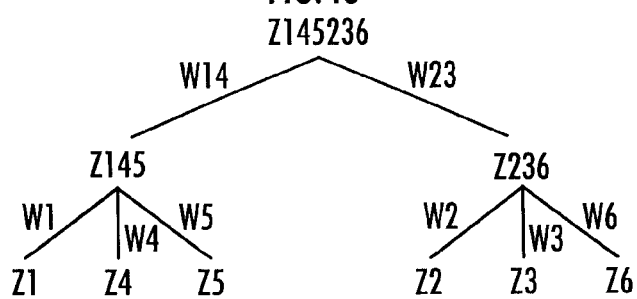

Z145_with_bias = W1 · Z1_with_bias + W4 · Z4_with_bias + W5 · Z5_with_bias
Z236_with_bias = W2 · Z2_with_bias + W3 · Z3_with_bias + W6 · Z6_with_bias
Z145236_with_bias = W145 · Z145_with_bias + W236 · Z236_with_bias Z1_rel = Z1_with_bias − Z145_with_bias
Z4_rel = Z4_with_bias − Z145_with_bias
Z5_rel = Z5_with_bias − Z145_with_bias
Z2_rel = Z2_with_bias − Z236_with_bias
Z3_rel = Z3_with_bias − Z236_with_bias
Z6_rel = Z6_with_bias − Z236_with_bias
Z145_rel = Z145_with_bias − Z145236_with_bias
Z236_rel = Z236_with_bias − Z145236_with_bias FIG.44
GROUND CONTACT STATES OF 1ST, 4TH, AND 5TH GROUND CONTACT PORTIONS
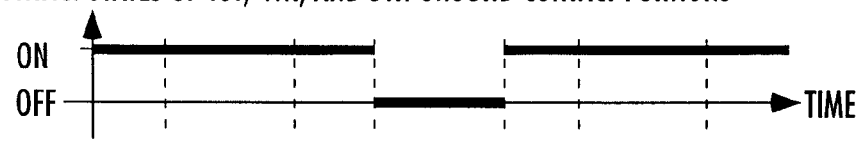
GROUND CONTACT STATES OF 2ND, 3RD, AND 6TH GROUND CONTACT PORTIONS
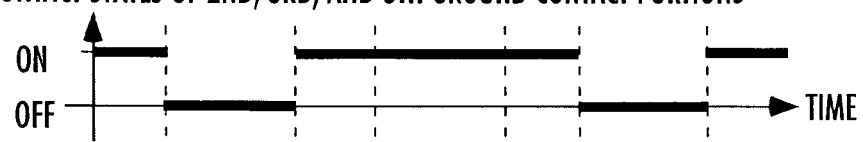
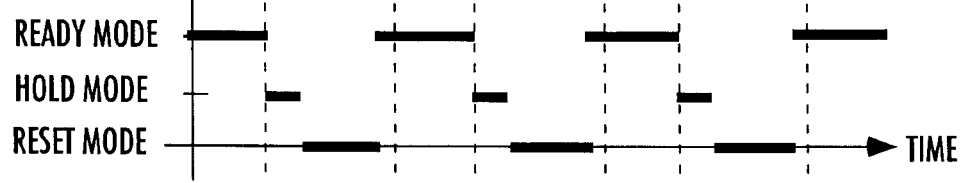
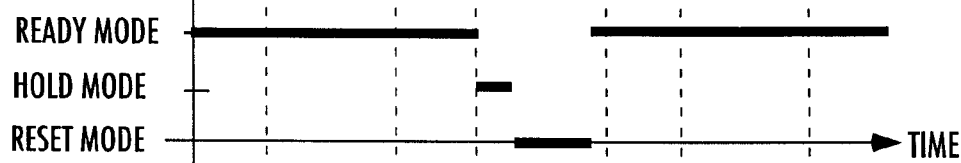
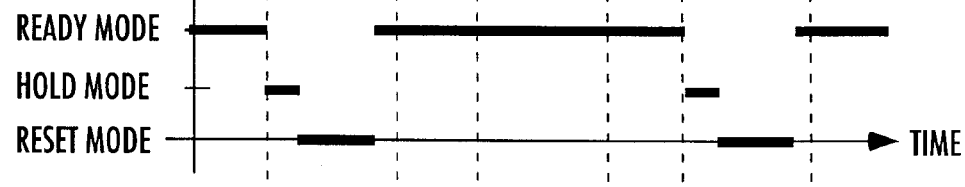

FIG.61
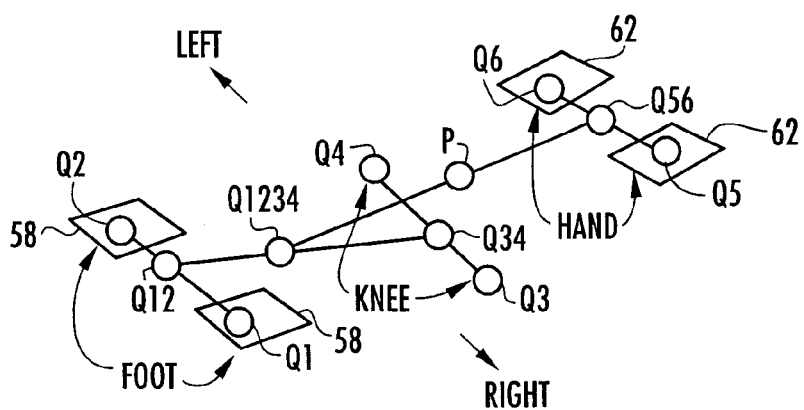
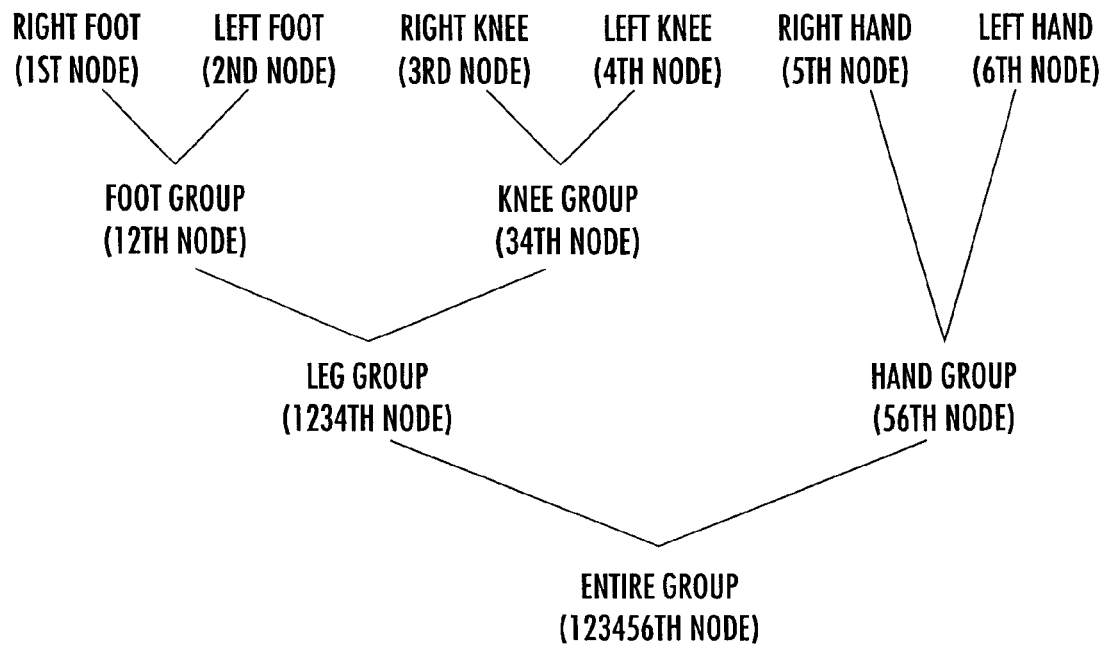

CONTROL SYSTEM FOR MOBILE BODY

TECHNICAL FIELD

The present invention relates to a control system for a mobile robot, such as a bipedal mobile robot and, more specifically, to a system for controlling a floor reaction force (external force) acting on the mobile robot in a case where a portion of the robot, such as a knee, an elbow, or a trunk, other than a distal portion of a leg or an arm of the robot is brought into contact with the ground or in a similar case.

BACKGROUND ART

As the technologies for controlling the floor reaction force acting on the distal portions of the legs of a legged mobile robot, such as a bipedal mobile robot, when making the robot travel by causing the distal portions of its legs to come in contact with or leave a floor, there have been known the technologies disclosed in Japanese Unexamined Patent Application Publication No. H5-305585 (Patent Document 1), Japanese Unexamined Patent Application Publication No. H10-277969 (Patent Document 2) and Japanese Unexamined Patent Application Publication No. 2001-322076 (Patent Document 3) by the present applicant.

However, these technologies are originally based on an assumption that the distal portions of the legs are brought into contact with a floor to make the robot travel, and therefore, sensors for detecting floor reaction forces are provided in the distal portions of the legs. Further, there has been also known a technology in which power sensors are provided in the distal end portions of arms to control forces acting on the distal portions of the arms when making a robot having arms perform a certain job.

In these conventional robots, it is basically assumed that external forces, such as floor reaction forces, act on the distal portions of their legs or arms, and places, such as knees, other than the distal portions of the legs or arms are not provided with sensors for detecting external forces. Hence, it has been impossible to control external forces (e.g., floor reaction forces) acting on the knees.

For example, in a state wherein a conventional human-like robot is kneeling, the floor reaction force acting on the right and left knees are dependent upon (governed by) the projections and depressions of a floor, and no adjustment of the joint angles of the legs has been made on the basis of the projections and depressions of the floor. For this reason, there have been cases where a projection or a depression causes a portion of the robot that comes into contact with a floor shakes, resulting in unstable contact condition of the portion coming into contact. Under this condition, an attempt to make the robot operate or work has sometimes led to an unstable posture of the robot.

Furthermore, when, for example, a robot stands up from a kneeling posture, if the actual inclination of a floor is different from the inclination assumed in a desired gait, then there has been a danger in that the robot falls, because the position of the center-of-gravity of the robot is not properly controlled and the robot undesirably tries to stand up with its body posture inclined.

Moreover, in a case where a robot operates or works while sitting in a chair, maintaining its stable postures, it is desired that the reaction forces applied from the chair to the buttocks of the robot as well as the floor reaction forces acting on the feet of the legs of the robot can be properly controlled in order to make it possible to restore the posture of the robot to a proper posture when the robot rises from the chair or sits onto the chair.

The present invention has been made with a view of the background described above, and it is an object thereof to provide a control system for a mobile robot that properly controls not only external forces acting on the distal portions of legs and arms of the robot but also external forces acting on portions other than the distal portions of the legs and arms in a state wherein the portions of a mobile robot, such as knees, elbows, the trunk, and buttocks, other than the legs and arms are subjected to external forces when they come in contact with a floor or an object considered as an extension of the floor, thus making it possible to maintain stable postures of the mobile robot.

DISCLOSURE OF INVENTION

According to a first invention of a control system for a mobile robot in accordance with the present invention, there is provided a control system for a legged mobile robot comprising a base body, a plurality of link mechanisms that are connected to the base body and that come in contact with externals to move the base body, and a plurality of joints provided between the base body and the distal portions of the link mechanisms to make the distal portions of the link mechanisms movable with respect to the base body, the legged mobile robot being able to be operated to a specific motion posture in which the robot is in contact with an external at a predetermined portion or portions between the distal portion or portions of one or more specific link mechanisms among the plurality of link mechanisms and the base body, the control system comprising:

an external force detecting means for detecting or estimating an external force acting on the predetermined portion in the specific motion posture;

a desired external force determining means for determining a desired external force, which is a desired value of the external force on the predetermined portion in the specific motion posture; and a joint displacement controlling means for controlling the displacement of at least a joint existing between the predetermined portion and the base body such that the detected or estimated external force approximates the desired external force.

According to the first invention, the predetermined portion comes in contact with an external in the specific motion posture. This predetermined portion is the portion provided on the specific link mechanism at between the base body and the distal portion of the specific link mechanism, an external force acting on the predetermined portion being detected or estimated by the external force detecting means. Then, the displacement of the joint existing at least between the predetermined portion and the base body is controlled such that the detected or estimated external force approximates a desired external force determined by the desired external force determining means, making it possible to properly control the external force acting on the predetermined portion. As a result, the stability of a posture of the robot can be maintained.

In the first invention, the specific link mechanism is, for example, a leg body (a second invention). In this case, the predetermined portion is an intermediate portion (e.g., a knee) between the distal portion of the leg body and the base body. Hence, if, for example, a human-like robot is on a knee thereof, then the external force acting on the knee can be controlled. Incidentally, the link mechanisms provided on the robot may include arm bodies rather than being limited to leg bodies. In such a case, the specific link mechanisms may be only leg bodies or arm bodies, or they may include both leg bodies and arm bodies.

Further, in the aforesaid first invention (or the first and the second inventions), the specific link mechanisms, for example, are leg bodies extended from buttocks connected to the base body through the intermediary of joints, and the predetermined portion is the buttocks (a third invention). In this case, when a robot is sitting or the like, the external force acting on the buttocks can be controlled so as to control the posture of the robot (particularly the posture of the base body, such as the body) to a proper stable posture.

Moreover, preferably, the aforesaid first invention (or the first to the third inventions) comprises an actual posture detecting means for detecting the actual posture of a second predetermined portion, such as the base body, of the mobile robot; and a desired motion determining means for determining a desired posture of the second predetermined portion, wherein the desired external force determining means determines the desired external force on the basis of at least the difference between the actual posture and the desired posture of the second predetermined portion (a fourth invention).

According to the fourth invention, the external force acting on the predetermined portion can be controlled so as to restore the actual posture of the second predetermined portion (e.g., the base body) to a predetermined desired posture, thus allowing the stability of a posture of the robot to be enhanced.

Furthermore, preferably, the aforesaid first invention (or the first to the fourth inventions) comprises an actual posture detecting means for detecting the actual posture of a second predetermined portion, such as the base body, of the mobile robot; and a desired motion determining means for determining the desired posture of the second predetermined portion, wherein the joint controlling means comprises a means for determining the manipulated variable of an external force on the basis of the difference between the actual posture and the desired posture of the second predetermined portion, and the displacement of the joint is controlled such that the detected or estimated external force approximates the resultant force of the desired external force and the manipulated variable of the external force (a fifth invention).

According to the fifth invention, the displacement of a joint is controlled such that the external force acting on the predetermined portion approximates a desired external force and also the actual posture of the second predetermined portion (e.g., the base body) approximates a desired posture, thus making it possible to stabilize a posture of the robot and also to properly control an external force acting on a predetermined portion.

Incidentally, the second predetermined portion in the fourth invention and the fifth invention may be identical to a predetermined portion that comes in contact with an external in the aforesaid specific motion posture.

BRIEF DESCRIPTION OF THE DRAWINGS

FIG. 6 is a diagram showing the hierarchical structure of nodes in the first reference example, FIG. 7 is a diagram showing a relationship between desired node floor reaction force central points and weights, FIG. 8 is a diagram showing a relationship between desired node floor reaction forces and weights.

FIG. 42 and FIG. 43 are diagrams for explaining the processing for hierarchical relativization in a four-legged robot and a six-legged robot, respectively.

FIG. 44 is a diagram showing examples of setting request modes of nodes related to the estimation of a floor configuration.

FIG. 61 is a diagram showing a hierarchical structure of nodes in the first embodiment.

BEST MODE FOR CARRYING OUT THE INVENTION

Figure 1:
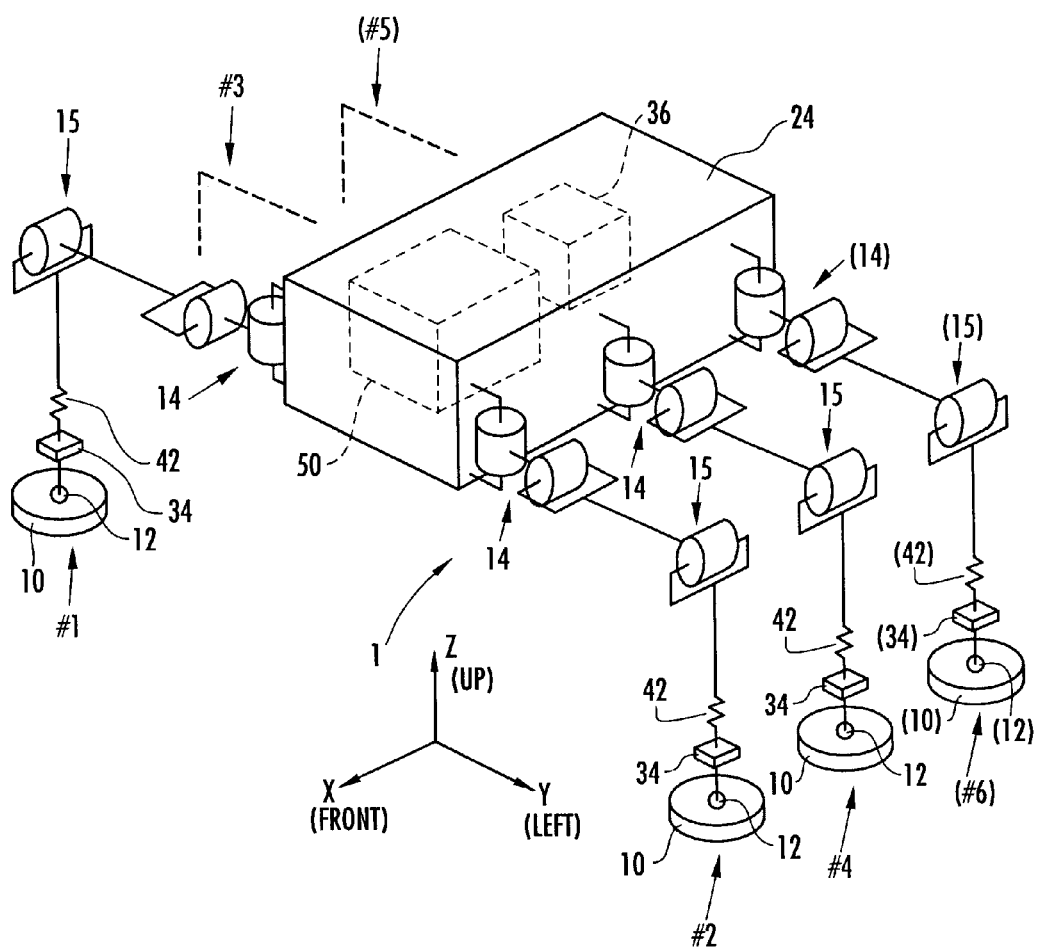
FIG. 1 is an overall external view of a robot in accordance with a first reference example and a second reference example related to the present invention.

First, major terms to be used in the explanation of the embodiments in the present description will be explained.

In the technology of the composite-compliance control disclosed in Japanese Unexamined Patent Application Publication No. H10-277969 previously proposed by the present applicant, floor reaction forces are sorted for each leg on the assumption that floor reaction forces are received at the distal portions (feet) of legs of a robot. In comparison therewith, according to the reference examples of the present description, situations are also considered in which floor reaction forces are received at portions other than the distal portions of legs, e.g., a situation in which a human type robot is on its knee or sitting, or has its arm or arms in contact with the ground. For this reason, a portion of a legged mobile robot that comes in contact with a floor and receives a reaction force in a predetermined operation of the robot is referred to as "the ground contact portion." In this case, "floor" does not simply refers to a floor (or the ground) in a usual sense, but "floor" also includes an object with which the robot comes in contact and which receives a reaction force in its motion, such as a chair (a chair on which the robot sits) fixed to the floor (or the ground). Thus, if, for example, a two-legged mobile robot sits on a chair or the like, then the waist of the robot will correspond to the ground contact portion. In a normal travel of a legged mobile robot (in the walking or the like of the two-legged mobile robot), the distal portion (foot or the like) of each leg will of course correspond to the ground contact portion.

To categorize (discriminate) ground contact portions, even if ground contact portions are distributed such that they are separated at a plurality of locations on the same link (a part corresponding to a single rigid body)(if a plurality of portions separated from each other on the same link is in contact with the ground), that is, even if a plurality of ground contact surfaces are not connected on the same link, these will be put together and defined as one ground contact portion. For instance, if the ground contact portion provided with four spike pins comes in contact with the ground through the intermediary of the spike pins, then the individual ground contact surfaces of the four spike pins will be put together and regarded as one ground contact portion. However, it is not always required to put the ground contact surfaces together into one.

An n-th ground contact portion is a designation for identifying the ground contact portion which has been categorized (discriminated) according to such a rule and to which an identification number n (n=1, 2, 3, . . . ) has been assigned.

A ground contact portion floor reaction force refers to a floor reaction force acting on a ground contact portion, and the floor reaction force acting on an n-th ground contact portion, in particular, is referred to as the n-th ground contact portion floor reaction force. The total floor reaction force is the resultant force of the floor reaction forces acting on all ground contact portions. Further, the floor reaction force central point is the point of action at which the horizontal component of a moment generated by a floor reaction force at that point is zero.

A floor reaction force, such as a ground contact portion floor reaction force or a total floor reaction force, is usually expressed by a set of the point of action of a force and a translational force and moment applied to that point of action. For the same floor reaction force, there are a limitless number of sets of point of action, translational force and moment for expressing it. Among them, there is an expression of a floor reaction force that uses, as the point of action, a point at which a moment component (the horizontal component of a moment) except a component about a vertical axis (vertical component) is zero. The point of action in this expression is referred to as a floor reaction force central point in the present description. A floor reaction force central point may be defined as a point at which the floor surface parallel component (the component parallel to a floor surface) of a moment generated by a floor reaction force at that point is zero.

In the present description, "floor surface" may alternatively be a virtual floor surface (a floor surface assumed on a desired gait and it does not necessarily coincide with an actual floor surface) described in Japanese Unexamined Patent Application Publication No. H5-318340 previously proposed by the present applicant.

Supplementally, the floor reaction force central point of a ground contact portion is usually set on the ground contact surface thereof (the surface in contact with a floor) if the ground contact portion is in contact with the ground. Meanwhile, the ground contact portion floor reaction force while the ground contact portion is moving in the air is always zero, so that a moment horizontal component of the ground contact portion floor reaction force will be zero at any point of action.

This means that the floor reaction force central point can be arbitrarily set. However, to smoothly control the operation of a robot, it is preferred that a desired floor reaction force central point moves in continuity. Hence, in the embodiments of the present description, a floor reaction force central point of a ground contact portion floor reaction force is defined as the point of action that moves together with the ground contact portion when the ground contact portion moves in the air.

In the embodiments of the present description, in the compliance control operation wherein the position/posture of each ground contact portion are corrected on the basis of at least an actual floor reaction force (a floor reaction force actually acting on a robot), the compliance control operation is not simply performed on each of ground contact portions irrelevantly (independently) from each other. The embodiments of the present description are characterized in that ground contact portion are classified into a tree structure and operations for correcting the positions/postures of ground contact portions are determined on the basis of at least an actual floor reaction force acting on each group that has been classified (the actual floor reaction forces acting on all ground contact portions included in each group or the resultant force thereof). Hereinafter, sorting by the tree structure may be referred to as "hierarchization."

For the desired values of variables generated by a gait generating device of a legged mobile robot in the embodiments of the present description, "desired" will be attached to the beginning of the names of variables. For the values of the variables in an actual legged mobile robot (actually detected values or estimated values, because true values are unknown), "actual" will be attached to the beginning of the names of variables. The above "actual floor reaction force" is an example thereof.

The targets of the total floor reaction forces (the resultant force of the actual floor reaction forces acting on all ground contact portions of the robot) in the compliance control (floor reaction force control) to be discussed later will be referred to as desired total floor reaction forces. The point at which the moment horizontal component of a desired total floor reaction force is zero will be referred to as a desired total floor reaction force central point.

The point on a floor surface at which the moment horizontal component of the resultant force of an inertial force generated by a motion of a desired gait of a mobile robot (the motion of each portion of the robot in a desired gait) and the gravity acting on the robot becomes zero will be referred to as a desired ZMP. The motion of a desired gait is determined by the time series of the desired position/posture of each portion of the robot in the desired gait, so that the time series of the desired position/posture of the portion will be generically referred to as a motion of a desired gait or a desired motion. Supplementally, if these time series can be specified, then desired motions may be described by expressions that are different from the desired motions defined as described above. For example, a set of the time series of the desired displacements of joints of a robot and the time series of the desired position/posture of a particular portion, such as a base body, may be used as a desired motion.

A desired total floor reaction force is usually a total floor reaction force that dynamically balances with the motion patter of a desired gait (the time-series pattern of a desired motion). Hence, a desired total floor reaction force central point usually agrees with a desired ZMP. Thus, in the following explanation, a desired total floor reaction force central point and a desired ZMP will be used without discriminating them in many cases. Exceptionally, however, in the case of controlling a robot explained in, for example, U.S. Pat. No. 3,269,852 previously proposed by the present applicant, a desired total floor reaction force central point and a desired ZMP do not necessarily agree with each other. In the following explanation, the term, desired ZMP, will be used in some cases, but there will be some places where the term, desired total floor reaction force central point, should be used to be precise.

It may be assumed that, in a desired gait of a mobile robot, the robot is subject to a reaction force (an external force) other than a floor reaction force from an environment. And, the reaction force (the external force) other than a floor reaction force may be referred to as, for example, a desired object reaction force, and the definition of a desired ZMP described above may be expanded as follows. The resultant force of the inertial force generated by a motion pattern of a desired gait of a robot, the gravity acting on the robot, and a desired object reaction force may be dynamically determined, and if the moment generated at a certain point on a floor surface by the resultant force is zero except for a component about a vertical axis, then the point may be defined anew as a desired ZMP. However, if a desired object reaction force is taken as one form of a floor reaction force, then the definition of a desired ZMP may be the same as the definition previously described.

Based on the above, the reference examples related to the present invention and the embodiments of the present invention will be explained in detail below. It should be noted that, for the convenience of explanation, the reference examples will be explained for a while, and then the embodiments of the present invention will be explained. The reference examples include first through fifth reference examples.

FIRST REFERENCE EXAMPLE

FIG. 1 is an external view of a general multi-legged mobile robot (legged mobile robot) according to first and second reference examples. FIG. 1 shows that the robot 1 has six legs (leg bodies), namely, a first leg #1 to a sixth leg #6; however, it does not have the fifth leg #5 and the sixth leg #6 in the first reference example. This means that, in the first reference example, the robot 1 is a four-legged robot having four legs (leg bodies), the first leg #1 to the fourth leg #4. In FIG. 1, the components of the robot 1 according to the second reference example are shown by parenthesized reference numerals.

As shown in FIG. 1, in the robot 1 (the four-legged robot) according to the first reference example, two legs (the first leg #1 and the third leg #3) are extended from the right side of a body 24, which is the base body of the robot 1, such that they are arranged side by side in the longitudinal direction, and in the same manner, two legs (the second leg #2 and the fourth leg #4) are extended from the left side of the body 24 such that they are arranged side by side in the longitudinal direction. A discoid ground contact portion 10 is attached to the distal portion of each of the legs #1 to #4 through the intermediary of a spherical joint 12, which is a free joint. Hereinafter, when the ground contact portions 10 need to be discriminated among the legs #1 to #4, they will be referred to as the first ground contact portion, the second ground contact portion, the third ground contact portion, and the fourth ground contact portion.

Each ground contact portion 10 is engaged with the spherical joint 12 such that its central point agrees with the central point of the spherical joint 12 and that a floor reaction force moment (the moment component of a floor reaction force) will not act on the central point of the ground contact portion 10 (strictly speaking, the spherical joint 12). This means that the floor reaction force moment (actual floor reaction force moment) at the central point of the ground contact portion 10 will be always zero.

In the robot 1 shown in the figure, each of the legs #1 to #4 is provided with joints 14 and 15 at a portion adjacent to the body 24 of the robot 1 and at an intermediate portion, respectively, and a compliance mechanism 42 composed of an elastic member, such as a spring, and a six-axis force sensor 34 serving as a floor reaction force detecting means (external force detecting means) for detecting an actual floor reaction force acting on the ground contact portion 10 are provided in the vicinity of the distal portion of each of the legs #1 to #4 (a portion of the link connecting the spherical joint 12 and the joint 14, the portion being adjacent to the spherical joint 12). In the example shown in the figure, the joints 14 can be rotated about two axes, while the joints 15 can be rotated about one axis. The bottom surfaces of the ground contact portions may be provided with elastic members made of sponge, rubber or the like serving as compliance mechanisms.

The displacement operation (the rotational operation about each axis) of each of the joints 14 and 15 is performed by an actuator, such as an electric motor, which is not shown. And, an actual joint displacement, which is the actual displacement amount (the angle of rotation about each axis), of each of the joints 14 and 15 is detected by a sensor, such as a rotary encoder, which is not shown. The six-axis force sensor 34 is capable of detecting the translational forces in the directions of three axes and the moments about three axes; however, in the robot 1 in the first reference example, no actual floor reaction force moment acts on the central points of the ground contact portions 10, as described above. Hence, three-axis force sensors that detect the translational forces in the directions of three axes or force sensors that detect only the vertical components of the translational forces of actual floor reaction forces may be used in place of the six-axis force sensors 34.

The body 24 incorporates a control system 50 constructed of an electronic circuit unit that includes a microcomputer, an actuator drive circuit, etc., a posture sensor 36 for detecting the postures of the body 24, and a power source not shown (a secondary battery, a capacitor, or the like). The posture sensor 36 is constructed of, for example, an acceleration sensor and a gyro sensor. In the present description, "posture" generally means a spatial orientation (however, "the posture" of the entire robot means an instantaneous value of a motion of the robot). Further, in the present reference example, the posture sensor 36 detects the posture inclinations (inclination angles) of the postures of the body 24 in, for example, the pitch directions and roll directions in relation to the vertical direction. In other words, the posture sensor 36 functions as an actual posture inclination detecting means for detecting actual posture inclinations of the body 24.

If the postures (rotational angles) of the body 24 of the robot 1 also in the yaw direction are to be controlled, then the rotational angles of the body 24 in the yaw direction (in other words, the postures of the body 24 in the directions of three axes) may be also detected by the posture sensor 36.

Figure 2:
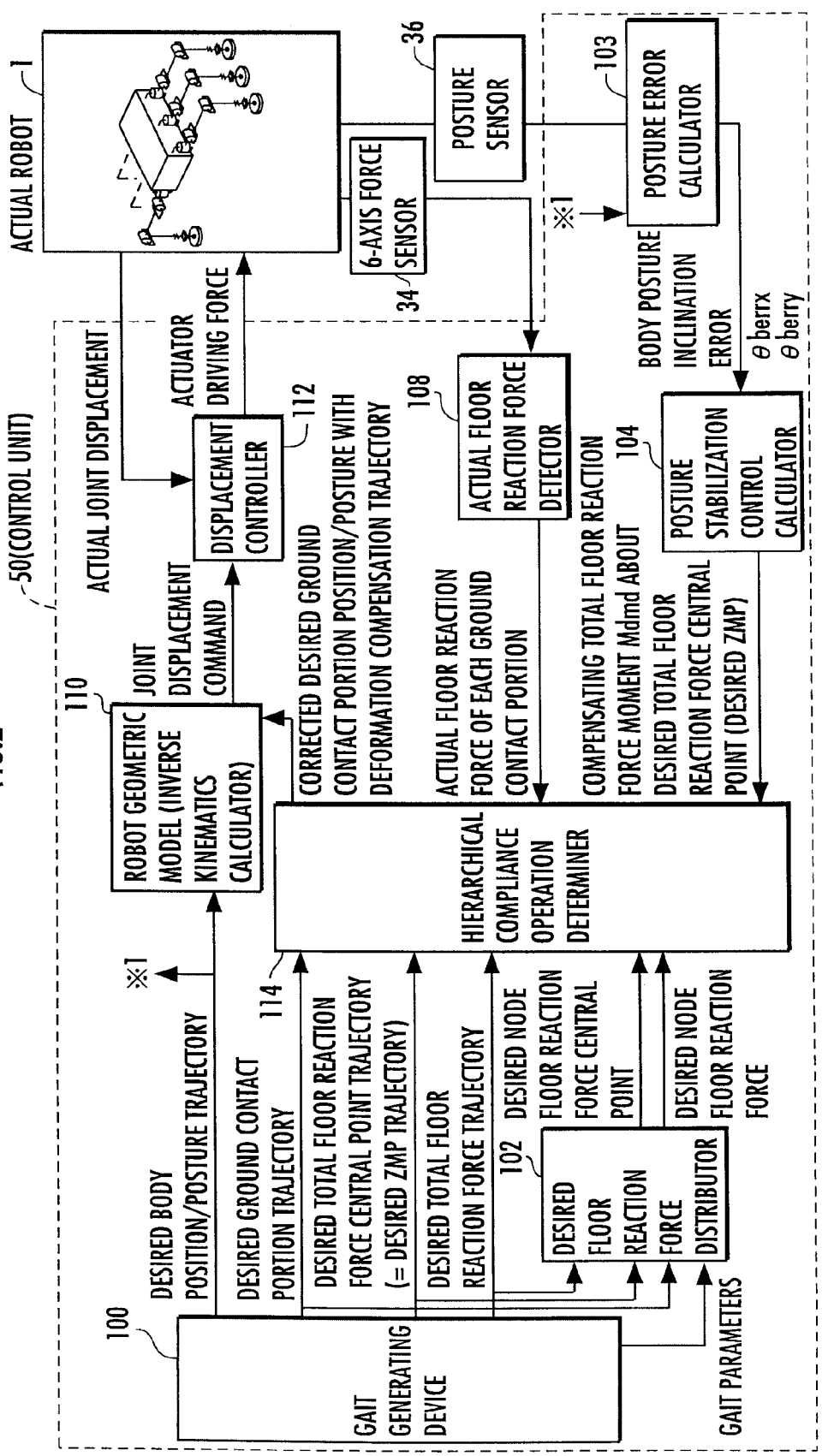
FIG. 2 is a block diagram showing the functional construction of a control system of the first reference example.

FIG. 2 is a block diagram showing the functional construction and operations of the control system 50. The actual robot 1 shown in FIG. 2 is the robot 1 shown in FIG. 1 from which the control system 50, the posture sensor 36, and the six-axis force sensor 34 have been removed. Here, a predetermined coordinate system (XYZ coordinate system) fixed to a floor, in which the approximately front direction of the robot 1 is defined as X axis, approximately left side direction thereof is defined as Y axis, and the upward direction thereof is defined as Z axis, as shown in FIG. 1, is referred to as "a supporting leg coordinate system" or "a global coordinate system." Hereinafter, positions, postures, translational forces and moments will be expressed in terms of the sets of coordinate components of the supporting leg coordinate system (the global coordinate system) unless otherwise specified. The origin of the supporting leg coordinate system (global coordinate system) does not have to be steadily fixed at a single point; the position of the origin with respect to a floor may be changed while the robot 1 is traveling. For example, the position of the origin of the supporting leg coordinate system (the global coordinate system) may be changed each time a predetermined leg of the robot 1 lands.

As shown in FIG. 2, the control system 50 is provided with a gait generating device 100, a desired floor reaction force distributor 102, a robot geometric model (inverse kinematics calculator) 110, a hierarchical compliance operation determiner 114, a displacement controller 112, an actual floor reaction force detector 108, a posture error calculator 103, and a posture stabilization control calculator 104 as its functional components (functional means). The following will explain the overviews of the components of the control system 50.

The gait generating device 100 has a function as a desired gait determining means or a desired motion determining means, and generates (determines) and outputs a desired gait that specifies an operation of the robot 1. In the present reference example, a desired gait is formed of the trajectory of a desired motion of the robot (the time series of the desired position/posture of each portion of the robot) and the trajectory of a desired floor reaction force (the time series of a set of the desired position of the action point of a reaction force received by the robot from a floor and the desired values of a translational force and moment applied to the action point). In the present description, "trajectory" means a time-series pattern (temporal change pattern).

The trajectory of a desired motion output by the gait generating device 100 is constructed of a desired ground contact portion trajectory, which is the trajectory of the desired values of the position and the posture of each ground contact portion 10 of the robot 1, and a desired body position/posture trajectory, which is the trajectory of the desired values of the position and the posture of the body 24 of the robot 1. A gait generating device in a robot equipped with joints related to arms or the head, as in the first reference example to be discussed later, determines and outputs the desired position/posture trajectories of the arms or the head as constituents of desired motions.

Further, in the present reference example, the trajectory of a desired floor reaction force output by the gait generating device 100 is formed of a desired total floor reaction force central point trajectory, which is the trajectory of a desired position of the total floor reaction force central point of the robot 1, and a desired total floor reaction force trajectory, which is the trajectory of a desired value of a total floor reaction force that uses the above desired total floor reaction force central point as an action point. In the present reference example, a desired total floor reaction force central point trajectory is regarded as identical to a desired ZMP trajectory, which is the trajectory of a desired position of ZMP.

The position of each ground contact portion 10 is the position of a certain representative point of the ground contact portion 10, and the representative point is, for example, the projected point obtained by projecting, in the vertical direction, the central point of each ground contact portion 10 (the central point of the spherical joint 12) onto the ground contact surface (bottom surface) of the ground contact portion 10, or the central point of the ground contact portion 10 (the central point of the spherical joint 12). Hereinafter, the position of the representative point of each ground contact portion 10 will be referred to simply as the ground contact portion position. The trajectory of a desired value of the ground contact portion position (a desired ground contact portion position trajectory) is included in the aforesaid desired ground contact portion trajectory determined by the gait generating device 100.

Here, in the robot 1 of the present reference example, the ground contact portions 10 are engaged with the spherical joints 12, which are free joints, so that the postures of the ground contact portions 10 cannot be controlled. Therefore, in the present reference example, the gait generating device 100 does not actually generate the trajectories of desired postures of the ground contact portions 10 (does not have to generate them). In the present reference example, therefore, the aforesaid desired ground contact portion trajectory means the same as a desired ground contact portion position trajectory.

However, if the ground contact portions are attached to the distal portions of the legs such that their postures can be controlled (if the ground contact portions are attached to the distal portions of the legs through joints that can be operated by actuators), as in the robot of the first embodiment to be discussed later, then the trajectories of desired postures of the ground contact portions should be included in the aforesaid desired ground contact portion trajectories. In the present description, the term "ground contact portion position/posture" will be frequently used to generally consider the aforesaid case, the term substantially meaning "ground contact portion position" in the present reference example.

Referring to FIG. 3(a) to FIG. 3(c) and FIG. 4(a) to FIG. 4(c), a desired ground contact portion trajectory (a desired ground contact portion position trajectory) and a desired total floor reaction force central point trajectory will be explained more specifically. In the first reference example, a travel of the robot 1 is accomplished by carrying out the motions of the legs #1 to #4 by causing a pair of legs, which are to be free legs, to leave a floor and move in the air and then land at a desired position by repeating, in order, a period during which the pair of the first leg #1 and the fourth leg #4 out of the legs #1 to #4 is a pair of supporting legs, while the pair of the second leg #2 and the third leg #3 is a pair of free legs, a period during which all legs #1 to #4 are supporting legs, and a period during which the pair of the first leg #1 and the fourth leg #4 is a pair of free legs, while the pair of the second leg #2 and the third leg #3 is a pair of supporting legs. A supporting leg is a leg that is in contact with the ground to support the self-weight of the robot 1 (a leg to be subject to a floor reaction force that is not zero), and a free leg is a non-supporting leg.

FIG. 3(a) to FIG. 3(c) and FIG. 4(a) to FIG. 4(c) show the desired ground contact portion positions (more specifically, the positions on a horizontal plane (XY plane)) of the distal ends of the legs #1 to #4 during the aforesaid travel of the robot 1 in time series in sequence (in the sequence of time t1 to t6). The triangles corresponding to reference characters Q1 to Q4 in these figures indicate the desired ground contact portion positions of the first to the fourth ground contact portions 10, respectively (the positions of the aforesaid representative points of the first to the fourth ground contact portions 10 on a horizontal plane (XY plane)).

Supplementally, to be precise, the triangles with the reference characters Q1 to Q4 in FIG. 3 and FIG. 4 indicate the positions of desired node floor reaction force central points (desired ground contact portion floor reaction force central points) to be discussed later, which are related to the ground contact portions 10. In the present reference example, however, the representative points of the ground contact portions 10 are set as described above, so that the desired ground contact portion positions (the desired positions of the representative points) of the first to the fourth ground contact portions 10 agree with the positions of the desired node floor reaction force central points Qn (n=1, 2, 3, 4), which will be discussed later, or have a certain positional relationship with the positions of the respective desired node floor reaction force central points Qn (n=1, 2, 3, 4) (the positions on the horizontal plane (XY plane) agree). For this reason, the triangles corresponding to the reference characters Q1, Q2, Q3 and Q4 in FIG. 3 and FIG. 4 denote the desired node floor reaction force central points, which will be discussed later, of the first to the fourth ground contact portions 10, respectively, and also denote the positions of the first to the fourth ground contact portions 10, respectively.

Figure 3A:
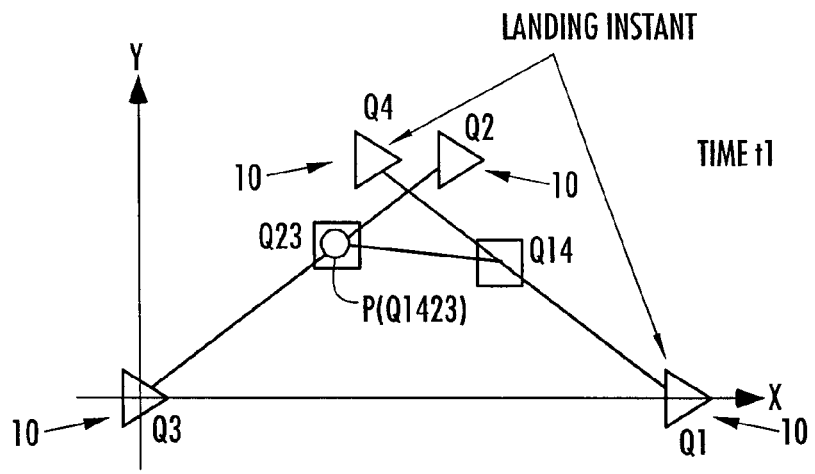
FIGS. 3(a) to (c) and FIGS. 4(a) to (c) are diagrams for explaining an operation of the robot (four-legged robot) of the first reference example.
Figure 3B:
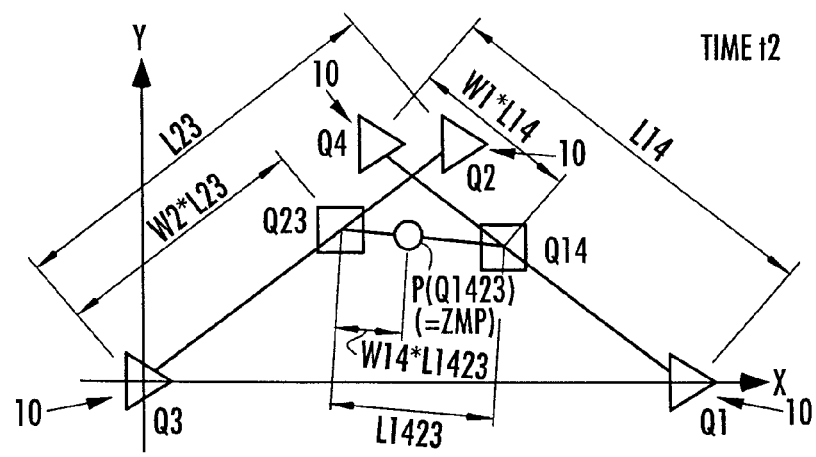
Figure 3C:
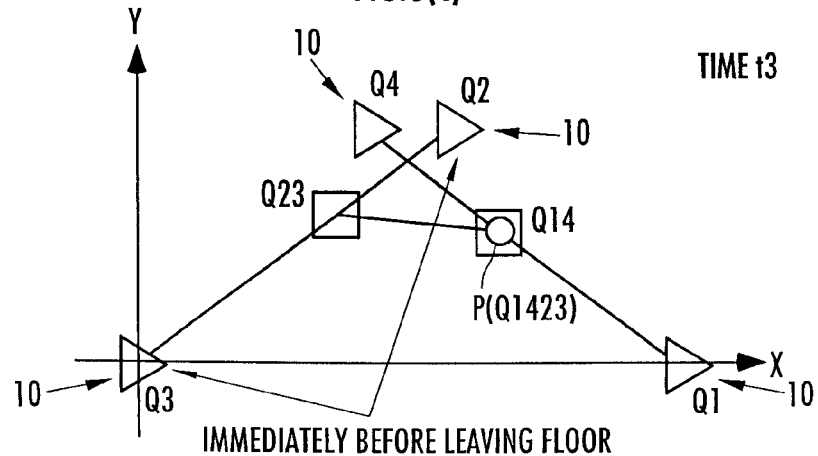
Figure 4A:
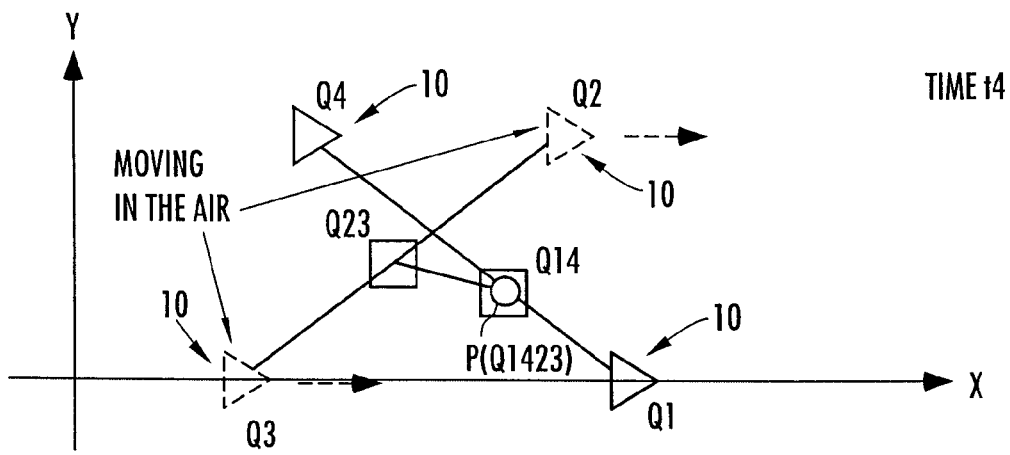
Figure 4B:
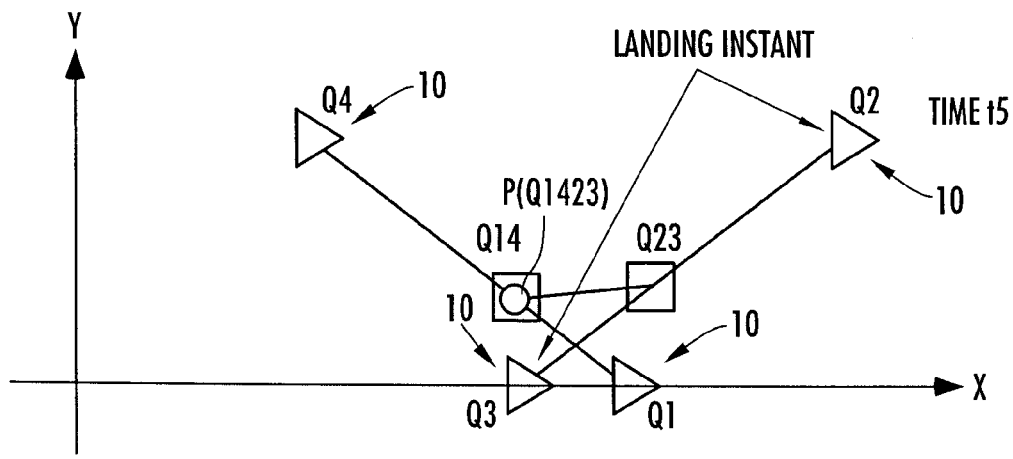
Figure 4C:
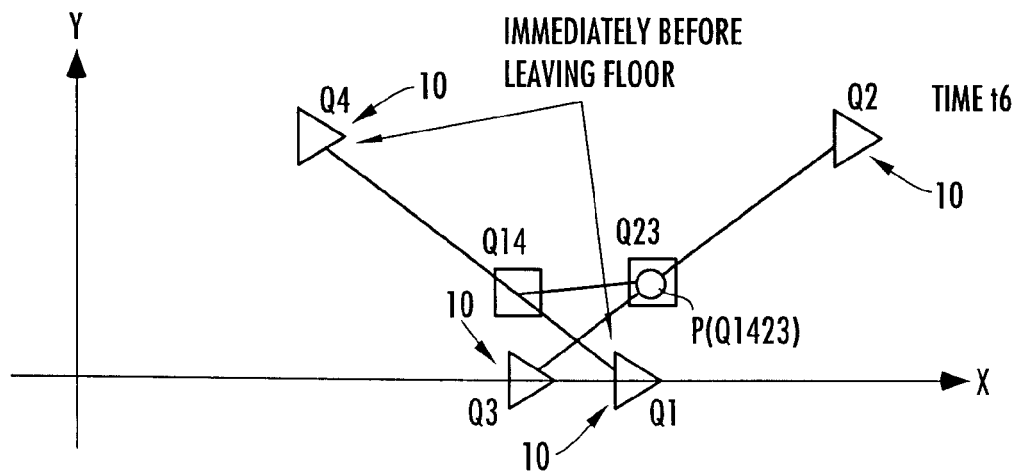

FIG. 3(a) shows the desired ground contact portion positions of the ground contact portions 10 at the moment (time t1) when the pair of the first leg #1 and the fourth leg #4 as free legs are landed, the pair of the second leg #2 and the third leg #3 being supporting legs, FIG. 3(b) shows the desired ground contact portion positions at time t2 in a state wherein all the legs #1 to #4 are supporting legs, and FIG. 3(c) shows the desired ground contact portion positions at time t3 immediately before the pair of the second leg #2 and the third leg #3 as free legs is separated from a floor (lifted into the air), the pair of the first leg #1 and the fourth leg #4 being supporting legs. Further, FIG. 4(a) shows the desired ground contact portion positions at time t4 in a state wherein the pair of the second leg #2 and the third leg #3 as free legs is lifted into the air, the pair of the first leg #1 and the fourth leg #4 being supporting legs, FIG. 4(b) shows the desired ground contact portion positions at the moment (time t5) when the pair of the second leg #2 and the third leg #3 as free legs are landed, the pair of the first leg #1 and the fourth leg #4 being supporting legs, and FIG. 4(c) shows the desired ground contact portion positions at time t6 immediately before the pair of the first leg #1 and the fourth leg #4 as free legs is separated from a floor, the pair of the second leg #2 and the third leg #3 being supporting legs. Incidentally, in FIG. 4(a), the desired ground contact portion positions of the second leg #2 and the third leg #3, which are free legs, are indicated by dashed-line triangles. Supplementally, the trajectory of the positions of the ground contact portions 10 of free legs in the vertical direction (the Z-axis direction) are determined such that they rise from a floor surface to a predetermined height and then lower to land again.

Figure 5A:
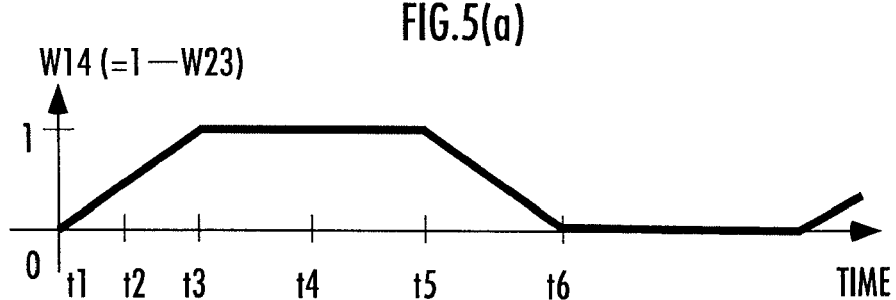
FIGS. 5(a) to (c) are graphs showing setting examples of weights in the first reference example.
Figure 5B:
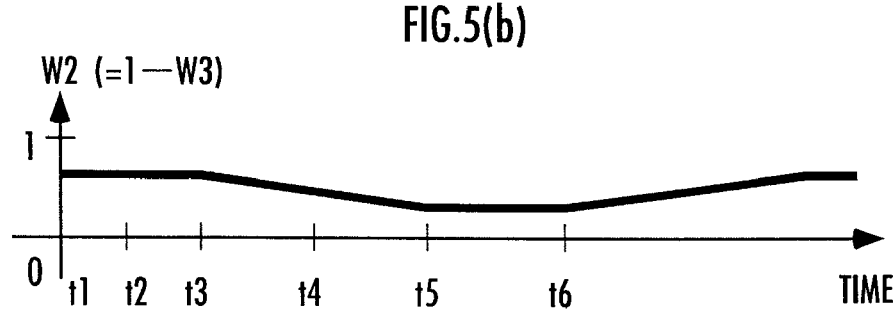
Figure 5C:
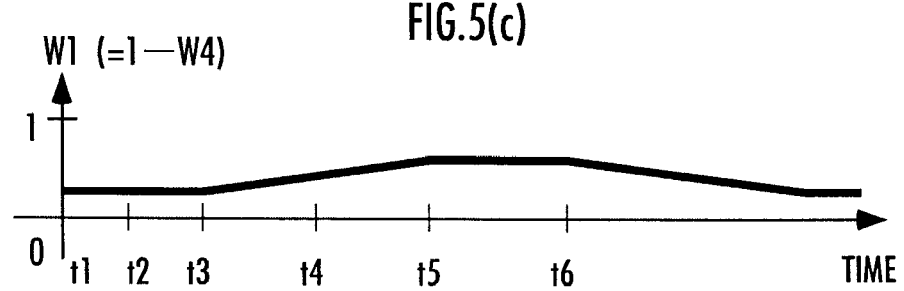
Figure 5D:
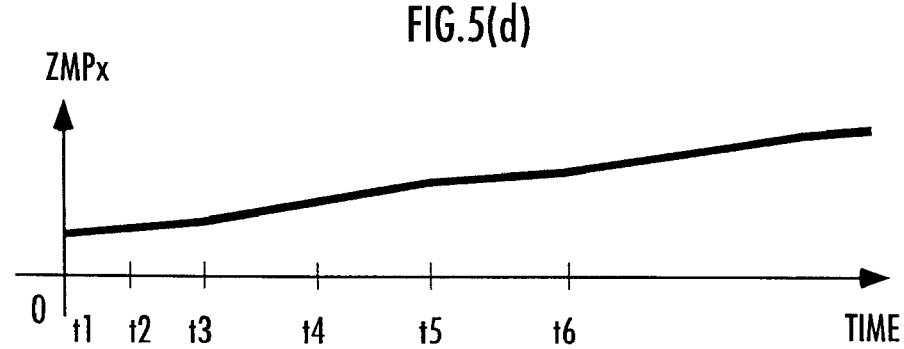
FIG. 5(d) is a graph showing a setting example of a ZMP (desired total floor reaction force central point) in the first reference example.

Points P in these FIG. 3 and FIG. 4 indicate desired total floor reaction force central points (desired ZMPs). The desired total floor reaction force central point trajectories are determined such that they continuously move while existing in a range in which ZMPs may exist (a region on a floor surface corresponding to a so-called supporting polygon) at positions not excessively close to the boundaries of the range (e.g., at an approximately central position of the range wherein a ZMP may exist). In the first reference example, when two legs #1 and #4 or #2 and #3 are supporting legs (refer to FIGS. 3(a) and (c) and FIGS. 4(a) to (c)), a desired total floor reaction force central point is set on a segment connecting the representative points of the ground contact portions 10 and 10 of those legs such that it is not excessively close to an end point of the segment. When all legs #1 to #4 are supporting legs (refer to FIG. 3(b)), a desired total floor reaction force central point is set within a polygon having the representative points of all ground contact portions 10 as its apex angles such that it is not excessively close to a boundary of the polygon. FIG. 5(d) is a graph illustrating a trajectory of a component ZMPx in the X-axis direction (in the direction in which the robot 1 advances) of the position of the desired total floor reaction force central point (desired ZMP) determined as described above. FIGS. 5(a) to (c) are graphs illustrating setting examples of weights, which will be discussed later.

Further, a desired body position/posture trajectory determined by the gait generating device 100 is determined using at least a dynamic model or the like of the robot 1 such that the horizontal component of a moment generated about a desired ZMP by the resultant force of the inertial force generated by a desired motion of the robot 1 and the gravity acting on the robot 1 becomes zero. Incidentally, "the body position" is the position of a certain representative point of the body 24.

A desired total floor reaction force determined by the gait generating device 100 is constructed of the desired values of the translational force and the moment acting on a desired total floor reaction force central point, and it is determined such that it balances with the resultant force of the inertial force generated by a desired motion of the robot 1 and the gravity acting on the robot 1 at a desired total floor reaction force central point in the present reference example. The moment horizontal component of the desired total floor reaction force about the desired total floor reaction force central point (desired ZMP) is zero. Supplementally, it is not necessary to determine all components of the translational force and the moment acting on the desired total floor reaction force central point as desired values. For instance, if the posture or the floor reaction force of the robot 1 about the vertical axis is not controlled, then it is not necessary to determine the component of the moment of the desired total floor reaction force about the vertical axis (the component in the Z-axis direction).

The desired ground contact portion trajectory determined by the gait generating device 100 (the desired ground contact portion position trajectory) is corrected by a hierarchical compliance operation determiner 114, which will be discussed later.

The desired floor reaction force distributor 102 groups (that is, hierarchizes) the first to the fourth ground contact portions 10 of the robot 1 into a tree structure, and associates the nodes of the tree structure with each of the hierarchized groups. Hence, in the following explanation, the nodes may be expressed by replacing them by the groups. Each node is a group constructed of one or more ground contact portions 10.

In the first reference example, the ground contact portions 10 are hierarchized, as shown in FIG. 6. More specifically, the n-th ground contact portion 10 (n=1, 2, 3, 4) is associated with the n-th node, the node having a first node and a fourth node as child nodes is defined as a 14th node, the node having a second node and a third node as child nodes is defined as a 23rd node, and the node having the 14th node and the 23rd node as child nodes is defined as the 1423rd node. Thus, the first to the fourth nodes are nodes that are constructed of the first, the second, the third, and the fourth ground contact portions 10, respectively, the 14th node is a node constructed of the first ground contact portion 10 and the fourth ground contact portion 10, the 23rd node is a node constructed of the second ground contact portion 10 and the third ground contact portion 10, and the 1423rd node is the node constructed of all the ground contact portions 10.

According to general designations in a tree structure, a node having no child node is referred to as a leaf node, and a node having no parent node is referred to as a root node. Thus, the n-th node (n=1, 2, 3, 4) is a leaf node, while the 1423rd node is a root node. In the present description, to identify nodes, leaf nodes will be assigned the same numbers (1, 2, 3, . . . ) as those of the ground contact portions (or legs) associated therewith, while nodes other than the leaf nodes will be assigned with numbers that are greater than those of the leaf nodes. Further, the nodes other than the leaf nodes and the root node will be referred to as intermediate nodes. In the first reference example, the intermediate nodes are the 14th node and the 23rd node.

Input to the desired floor reaction force distributor 102 are a desired total floor reaction force central point trajectory, a desired total floor reaction force trajectory, and a desired ground contact portion trajectory out of a desired gait determined by the gait generating device 100. The gait parameters (the estimated landing position, an estimated landing time, etc. of the ground contact portion 10 of a free leg of the robot 1) used by the gait generating device 100 to determine the desired gait may be also input to the desired floor reaction force distributor 102. Then, on the basis of these inputs, the desired floor reaction force distributor 102 determines desired node floor reaction force central points (desired n-th node floor reaction force central points) Qn (n=1, 2, 3, 4, 14, 23, 1423), which are the desired positions of the floor reaction force central points of the nodes hierarchized as described above, and weights Wn (n=1, 2, 3, 4, 14, 23) of the nodes except the root node. Each weight Wn will be a nonnegative value of 1 or less.

The technique for determining desired node floor reaction force central points Qn (n=1, 2, 3, 4, 14, 23) and the weights Wn (n=1, 2, 3, 4, 14, 23) will be explained in detail below with reference mainly to FIG. 3(b), FIG. 5, and FIG. 7. FIG. 3(b) shows a relationship between Qn and Wn in a state illustrated in the figure, FIGS. 5(a) to (c) show setting examples of Wn, and FIG. 7 shows a relationship between weights and desired node floor reaction force central points.

The desired node floor reaction force central point of the 1423rd node, which is the root node, (the desired 1423rd node floor reaction force central point) Q1423 is determined to be identical to the desired total floor reaction force central point (point P in FIG. 3 and FIG. 4) (P=Q1423). Accordingly, in the following explanation, the same reference character P as that of a desired total floor reaction force central point will be frequently used as the mark denoting the desired 1423rd node floor reaction force central point.

Further, a weight W1423 of the root node is set to "1" for the sake of convenience in order to maintain the uniformity of expressions.

In the present reference example, the desired floor reaction force central point of an n-th ground contact portion 10 (n=1, 2, 3, 4) (also referred to as a desired n-th ground contact portion floor reaction force central point) is always set to the central point of an n-th ground contact portion 10 (the central point of the spherical joint 12). Further, the desired node floor reaction force central point Qn (n=1, 2, 3, 4) of a leaf node associated with the n-th ground contact portion 10 is determined to be identical to the desired floor reaction force central point of the n-th ground contact portion 10. Hence, the desired node floor reaction force central point Qn (n=1, 2, 3, 4) is also always set to the central point of the n-th ground contact portion 10 (the position of this point is uniquely determined from a desired ground contact portion position of the n-th ground contact portion 10). The position of the desired node floor reaction force central point Qn (n=1, 2, 3, 4) of the leaf node determined as described above is uniquely determined from the desired ground contact portion position of the n-th ground contact portion 10. In other words, the desired node floor reaction force central point Qn (n=1, 2, 3, 4) of a leaf node defines the desired position of the n-th ground contact portion 10. In the following explanation, the desired node floor reaction force central point of a leaf node may be referred to as a desired ground contact portion floor reaction force central point in some cases. Each desired ground contact portion trajectory is set such that it continuously changes, so that Qn (n=1, 2, 3, 4) will also continuously change.

Supplementally, in the present reference example, the desired floor reaction force central point Qn (n=1, 2, 3, 4) of an n-th leaf node (an n-th ground contact portion 10) has been set to the central point of the n-th ground contact portion 10; however, in a robot that allows the postures of ground contact portions to be controlled, the desired floor reaction force central point of each leaf node (each ground contact portion) may be set, for example, within the ground contact surface of the ground contact portion defined by the desired position/posture of the ground contact portion associated with the leaf node (the surface that comes in contact with a floor surface assumed in a desired gait).

Hereinafter, in general, a segment that connects arbitrary two points A and B or the length thereof will be denoted as AB. In addition, an operator "*" means multiplication for a pair of scalar and scalar or a pair of scalar and vector, while it means an outer product (vector product) for a pair of vector and vector.

The weight Wn (n=1, 2, 3, 4, 14, 23) of each node except the root node and desired node floor reaction force central points Q14 and Q23 of the intermediate nodes are determined such that a desired 14th node floor reaction force central point Q14 will be the internally dividing point of a segment Q1Q4 that satisfies a relational expression, Q1Q14:Q14Q4=W4:W1=(1−W1):W1, a desired 23rd node floor reaction force central point Q23 will be the internally dividing point of a segment Q2Q3 that satisfies a relational expression, Q2Q23:Q23Q3=W3:W2=(1−W2):W2, and a desired 1423rd node floor reaction force central point P(=desired total floor reaction force central point) will be the internally dividing point of a segment Q14Q23 that satisfies Q14P:PQ23=W23:W14=(1−W14):W14.

In other words, Q14, Q23 and Wn (n=1, 2, 3, 4, 14, 23) are determined to satisfy at least the following expressions 1, 2 and 3. Incidentally, Qn (n=1, 2, 3, 4, 14, 23) in these expressions 1 to 3 means the position (positional vector) of the point.

$Q14=Q1*W1+Q4*W4, W1+W4=1$     Expression 1

$Q23=Q2*W2+Q3*W3, W2+W3=1$     Expression 2

$P=Q14*W14+Q23*W23, W14+W23=1$     Expression 3

Wn (n=1, 2, 3, 4, 14, 23) takes a nonnegative value of 1 or less, so that the coefficients (weights) of Qn (n=1, 2, 3, 4, 14, 23) in the right sides of the above expressions 1, 2 and 3 will be all nonnegative values.

The above expressions 1 to 3 mean that the position of a desired node floor reaction force central point of each node having child nodes (that is, each node that is not a leaf node) is set to a weighted average position of the position of the desired node floor reaction force central points of the child nodes of the node by using a predetermined nonnegative weight. In other words, as shown in FIG. 3(b) and FIG. 7 mentioned above, the desired node floor reaction force central point Qn (n=14, 23, 1423) of each node having child nodes is set at the internally dividing point of the desired node floor reaction force central points of all the child nodes of the node. FIG. 7 is a diagram showing a relationship between the desired node floor reaction force central points Qn (n=1, 2, 3, 4, 14, 23, 1423) of nodes and the weight Wn (n=1, 2, 3, 4, 14, 23). Incidentally, L23, L14 and L1423 in FIG. 3(b) denote the lengths of segments Q2Q3, Q1Q4 and Q23Q14, respectively.

Supplementally, Q1 to Q4 and P(=Q1423) are determined as described above, so that once Wn (n=1, 2, 3, 4, 14, 23) is determined, Q14 and Q23 that satisfy expressions 1 to 3 are uniquely determined. In other words, if Q14 and Q23 are determined, then Wn (n=1, 2, 3, 4, 14, 23) satisfying expressions 1 to 3 will be uniquely determined. Accordingly, the weight Wn (n=1, 2, 3, 4, 14, 23) may be determined and then the desired node floor reaction force central points Q14 and Q23 of intermediate nodes according to the above expressions 1 to 3 may be determined, or the desired node floor reaction force central points Q14 and Q23 of the intermediate node may be determined and then the weight Wn (n=1, 2, 3, 4, 14, 23) may be determined according to the above expressions 1 to 3. Either of the aforesaid ways may be used.

The desired node floor reaction force central points Q14 and Q23 of the intermediate nodes move as the ground contact portions 10 move, as shown in time series in FIG. 3(a) to FIG. 3(c) and FIG. 4(a) to FIG. 4(c). Weights W14(=1−W23), W1(=1−W4) and W3(=1−W2) at this time are determined such that they continuously change, as shown in, for example, the graphs of FIGS. 5(a) to (c), respectively. The trajectory of Qn and the weight Wn of the n-th node (n=1, 2, 3, 4) are set such that they continuously change, so that the desired node floor reaction force central points Q14 and Q23 are also set such that they continuously move. This means that all desired node floor reaction force central points (desired n-th node floor reaction force central points (n=1, 2, 3, 4, 14, 23, 1423)) are set such that they continuously move.

The desired floor reaction force distributor 102 outputs the desired node floor reaction force central point of each node determined as described above. The desired floor reaction force central point of the root node is the same as the desired total floor reaction force central point determined by the gait generating device 100, so that it does not have to be output from the desired floor reaction force distributor 102.

The desired floor reaction force distributor 102 determines and outputs a desired node floor reaction force, which is the desired value of the floor reaction force acting on the desired floor reaction force central point of each node. The desired node floor reaction force that is output includes at least a desired node floor reaction force (a desired n-th node floor reaction force) acting on a desired node floor reaction force central point Qn of an n-th node (n=1, 2, 3, 4), which is a leaf node, that is, the desired floor reaction force of each ground contact portion 10. This desired node floor reaction force is necessary primarily to compensate for the flexures of the compliance mechanisms 42 or the like (refer to FIG. 1) of the legs #1 to #4 (more specifically, compensation for the positional displacement of the ground contact portions 10 caused by the flexures of the compliance mechanisms 42 and the link mechanisms of the legs), the compensation being carried out by the processing of a hierarchical compliance operation determiner 114, which will be discussed later. Supplementally, if the robot 1 is provided with compliance mechanisms in addition to those on the distal portions of the legs #1 to #4, then preferably, a desired 14th node floor reaction force and a desired 23rd node floor reaction force (the desired node floor reaction forces of intermediate nodes) are also determined and output in order to determine the deformations of the compliance mechanisms.

Generally, a desired floor reaction force (a desired node floor reaction force) acting on a desired node floor reaction force central point of each node may be determined from a desired total floor reaction force and the weight of each node. Specifically, the desired floor reaction force of any one node may be determined by multiplying the product of the weight of the node and the weight of all ancestor nodes of the node by a desired total floor reaction force. More specifically, a desired n-th node floor reaction force is calculated according to the following expression 4a (or expression 4b).

Desired *n*-th node floor reaction force =  Expression 4a
    Weight of the *n*-th node * Product of the
    weights of all ancestor nodes of the *n*-th
        node * Desired total floor reaction force Desired *n*-th node floor reaction force =  Expression 4b
    Weight of the *n*-th node * Product of the weight of
    all ancestor nodes (excluding the root node) of
        the *n*-th node * Desired total floor reaction force Alternatively, desired node floor reaction forces are determined such that the desired floor reaction force of an arbitrary n-th node that is not a leaf node agrees with the sum (resultant force) of the desired floor reaction forces of all child nodes of the n-th node and the desired floor reaction force of the root node agrees with a desired total floor reaction force. This relationship is shown in FIG. 8.

More specifically, if a desired n-th node floor reaction force, which is the desired floor reaction force of an n-th node, is denoted by Fn (n=1, 2, 3, 4, 14, 23, 1423) and a desired total floor reaction force is denoted by Ftotalref, then Fn is determined from Ftotalref and the weight Wn (n=1, 2, 3, 4, 14, 23) according to the expressions shown in FIG. 8. The expressions in FIG. 8 are equivalent to the above expression 4a or 4b.

Determining the desired floor reaction force central point of each node (a desired node floor reaction force central point) and the desired floor reaction force of each node (a desired node floor reaction force) as described above is to determine the desired floor reaction force central point and the desired floor reaction force of each node such that the horizontal component of the moment generated about a desired n-th node floor reaction force central point by the resultant force of the desired floor reaction forces of all child nodes of an n-th node becomes zero. Accordingly, the moment horizontal component of a desired node floor reaction force is zero for any nodes.

A set of each desired node floor reaction force central point Qn (n=1, 2, 3, 4, 14, 23), each weight Wn (n=1, 2, 3, 4, 14, 23) and each desired node floor reaction force Fn (n=1, 2, 3, 4, 14, 23) is determined such that the desired floor reaction force of the ground contact portion 10 not in contact with the ground (in a no-contact-with-ground state)(the desired node floor reaction force of a leaf node associated with the ground contact portion 10 not in contact with the ground) is zero. Hence, in the first reference example, the weight W14 is set to zero (W23=1) during a period in which the first ground contact portion 10 and the fourth ground contact portion 10 are free legs and off a floor (the ground contact portions 10 of the free legs are moving in the air), while the weight W23 is set to zero (W14=1) during a period in which the second ground contact portion 10 and the third ground contact portion 10 are free legs and off a floor, as shown in FIG. 5(*a*). Thus, the weight of an intermediate node having child nodes is set to zero during a period in which none of the ground contact portions belonging as leaf nodes to the intermediate node are in contact with the ground. In other words, the weight of an intermediate node is not set to zero during a period in which any one of the ground contact portions belonging to the intermediate node is in contact with the ground (strictly speaking, a period during which a non-zero floor reaction force is acting on any one of the ground contact portions).

Supplementally, the first reference example does not have a period during which only one of the first ground contact portion 10 and the fourth ground contact portion 10 belonging to the intermediate node Q14 is placed in a no-contact-with-ground state; therefore, the weights W1 and W4 corresponding to these ground contact portions 10 and 10 do not have any periods during which they become 0 or 1. If, however, a desired ground contact portion trajectory is determined so as to include a period during which only one of the first ground contact portion 10 and the fourth ground contact portion 10 will be placed in the no-contact-with-ground state, then the weight associated with the ground contact portion 10 that will be placed in the no-contact-with-ground state during the period may be set to 0, and the weight associated with the ground contact portion 10 to be in contact with the ground may be set to 1. In this case, the weight of the intermediate node Q14 during that period will be set to a non-zero value. The same applies to the weights associated with the intermediate node Q23 and the second ground contact portion 10 and the third ground contact portion 10, which are leaf nodes belonging thereto. Generally speaking, the weight of a node having child nodes is set to a non-zero value if any one of the ground contact portions belonging to the node is in contact with the ground, while it is set to zero if all of the ground contact portions belonging to the node are in no-contact-with the ground.

The desired node floor reaction forces determined as described above continuously change, making them suited for achieving a movement (walking) of the robot 1 with less impact.

As described above, according to the first reference example, each desired node floor reaction force central point Qn(n=1, 2, 3, 4, 14, 23, 1423), each weight Wn(n=1, 2, 3, 4, 14, 23) and each desired each node floor reaction force Fn (n=1, 2, 3, 4, 14, 23, 1423) are determined by the desired floor reaction force distributor 102 such that they satisfy the following conditions A) to G).

A) The desired node floor reaction force central point Qn (n=1, 2, 3, 4) of each leaf node agrees with the central point of the ground contact portion 10 corresponding to the leaf node. More generally, Qn (n=1, 2, 3, 4) is determined according to a desired gait (a desired motion, such as a desired ground contact portion trajectory). Supplementally, for example, the desired floor reaction force central point of each ground contact portion 10 may be determined by the gait generating device 100, and in this case, the desired node floor reaction force central point Qn (n=1, 2, 3, 4) may be determined on the basis of the desired floor reaction force determined by the gait generating device 100.

B) The desired node floor reaction force central point of the root node agrees with a desired total floor reaction force central point P.

C) The desired node floor reaction force central point Qn (n=1, 2, 3, 4, 14, 23) and the weight Wn (n=1, 2, 3, 4, 14, 23) of each node excluding the root node satisfy the relational expressions of the above expressions 1 to 3. In other words, the desired node floor reaction force central point Qn of an arbitrary n-th node (n=14, 23, 1423) having child nodes will be a weighted average point of the desired node floor reaction force central points of the child nodes of the n-th node.

D) The desired node floor reaction force Fn of an arbitrary n-th node (n=14, 23, 1423) having child nodes agrees with the sum (resultant force) of the desired node floor reaction forces of all child nodes of the n-th node, and the desired node floor reaction force F1423 of the root node (the 1423rd node) agrees with the desired total floor reaction force Ftotalref. In other words, the desired floor reaction force Fn and the weight Wn of the n-th node (n=1, 2, 3, 4, 14, 23, 1423) satisfy the relational expressions in FIG. 8.

E) The desired node floor reaction force of a leaf node associated with the ground contact portion 10 not in contact with the ground is zero.

F) Qn, Wn, and Fn (n=1, 2, 3, 4, 14, 23, 1423) continuously change.

G) The weight of a leaf node corresponding to the ground contact portion 10 in a no-contact-with-ground state or the weight of any one of the ancestor nodes of the leaf node is zero.

Incidentally, a desired node floor reaction force may be determined on the basis of each desired node floor reaction force central point in place of determining it on the basis of a weight as described above. More specifically, each desired node floor reaction force central point may be determined such that the aforesaid conditions A) to C) are satisfied, then each weight may be determined on the basis of the desired node floor reaction force central point and the aforesaid expressions 1 to 3, and then the desired node floor reaction force may be determined according to the aforesaid expression 4 by using the determined weight.

Returning to the explanation of FIG. 2, the posture error calculator 103 calculates the error of an actual body posture with respect to a desired body posture and outputs the calculated error to the robot 1. In the present reference example, the posture error calculator 103 receives an inclination angle of the body 24 relative to the vertical direction detected by the posture sensor 36 (hereinafter referred to as the actual body posture inclination) and a desired body position/posture determined by the gait generating device 100 (specifically, the inclination angle in a desired body posture relative to the vertical direction; hereinafter referred to as the desired body posture inclination), and then calculates an error θberr between them (Actual body posture inclination−Desired body posture inclination; hereinafter referred to as the body posture inclination error θberr). The calculated θberr is composed of a component about the X axis (the component in the roll direction) θberrx and a component about the Y axis (the component in the pitch direction) θberry. If a desired body posture inclination is, for example, steadily zero, then θberr=actual body posture inclination, so that a detected value (actual body posture inclination) of a posture sensor 36 may be directly output as the body posture inclination error θberr.

Generally speaking, the posture stabilization control calculator 104 calculates a compensating total floor reaction force, which is a compensation amount of a total floor reaction force (the correction amount of a desired total floor reaction force) for stabilizing the posture of the robot 1 according to the state of the robot 1 that is detected or estimated on the basis of the information of a sensor provided in the robot 1, such as the aforesaid body posture inclination error.

To stabilize the posture of the robot 1 in the long term, a translational force and a moment necessary to restore the actual position/posture of a predetermined portion, such as the body 24, of the robot 1 to desired position/posture are determined, and these have to be additionally generated, the desired total floor reaction force central point (desired ZMP) being the point of action. The additional translational force and moment are referred to as a compensating total floor reaction force. The moment component of a compensating total floor reaction force is referred to as a "compensating total floor reaction force moment Mdmd" (specifically, a compensating total floor reaction force moment Mdmd about a desired total floor reaction force central point (desired ZMP)).

In the present reference example, the posture stabilization control calculator 104 calculates the compensating total floor reaction force moment Mdmd so as to restore (bring close) an actual body posture inclination to a desired body posture inclination. Hence, the body posture inclination errors θberr (θberrx, θberry) determined by the posture error calculator 103 are input to the posture stabilization control calculator 104.

The posture stabilization control calculator 104 calculates the compensating total floor reaction force moment Mdmd on the basis of the input body posture inclination error θberr. The calculated Mdmd is composed of a component about the X axis Mdmdx and a component about the Y axis Mdmdy.

Specifically, Mdmdx and Mdmdy are determined by, for example, the feedback control law (PD control law here) of expressions 5 and 6 given below. More specifically, Mdmdx and Mdmdy are determined such that the body posture inclination errors θberrx and θberry approximate zero.

$$Mdmdx = -Kthx*\theta berrx - Kwx*(d\theta berrx/dt) \quad \text{Expression 5}$$

$$Mdmdy = -Kthy*\theta berry - Kwy*(d\theta berry/dt) \quad \text{Expression 6}$$

where Kthx, Kthy, Kwx and Kwy denote predetermined gains. Further, (dθberrx/dt) and (dθberry/dt) denote the time differential values of the body posture inclination errors θberrx and θberry, respectively.

In the present reference example, a component of the compensating total floor reaction force moment Mdmd about the Z axis (the component in the yaw direction) Mdmdz is not used, so that Mdmdz is not determined; however, Mdmdz may be determined to prevent the robot 1 from spinning (slippage about the vertical axis). A method for determining Mdmdz is explained in detail in Japanese Patent Application No. 2003-185613 or Japanese Patent Application No. 2003-185930 previously proposed by the present applicant. Moreover, for example, to restore the position of an actual center-of-gravity of the robot 1 to the position of the center-of-gravity in a desired gait, the translational force of a compensating total floor reaction force can be determined on the basis of a positional error of the center-of-gravity.

The floor reaction force detector 108 detects the actual floor reaction forces, which are the actual values of the floor reaction forces acting on the ground contact portions 10 of the actual robot 1 (that is, the actual floor reaction forces of leaf nodes (actual node floor reaction forces)) on the basis of the outputs of the six-axis force sensor 34 of the legs #1 to #4. In addition, the floor reaction force detector 108 calculates the relative positions/postures (the relative positions in the first reference example) of the ground contact portions 10 relative to the coordinate system fixed to the body 24 on the basis of the actual joint displacements of the joints 14 and 15 (the actual rotational angles of the joints 14 and 15 about individual rotational axes) of the legs #1 to #4 detected by sensors, such as encoders, (not shown) provided on the joints 14 and 15 of the robot 1. At this time, joint displacement commands, which are the displacement command values (rotational angle command values) of the joints 14 and 15 may be used in place of actual joint displacements, or both actual joint displacements and joint displacement commands may be used. Then, based on the calculated relative positions/postures of the ground contact portions 10, the detected values of the six-axis force sensors 34 of the legs #1 to #4 (these being the values on the local coordinate systems fixed to the six-axis force sensors 34 or the like) are coordinate-converted to calculate actual floor reaction forces represented on the coordinate system fixed to the body 24, and then the calculated actual floor reaction forces are converted into the actual floor reaction forces represented on a supporting leg coordinate system (global coordinate system). For the coordinate conversion into the supporting leg coordinate system, detected values of the posture sensor 36 or desired body posture inclinations may be used. Supplementally, in the robot 1 of the first reference example, no floor reaction force moment acts on the central points of the ground contact portions 10, as described above, so that there is no need to detect a moment component in the actual floor reaction force of each ground contact portion 10. In this case, as mentioned above, in place of the six-axis force sensor 34, a three-axis force sensor may be used to detect translational force components of actual floor reaction forces in three axes, or a one-axis floor reaction force sensor may be used to detect only translational force vertical components of actual floor reaction forces.

Based on a final desired trajectory of each ground contact portion position/posture (this being determined by a hierarchical compliance operation determiner 114, which will be discussed later) and desired body position/posture or the like, the robot geometric model (inverse kinematics calculator) 110 performs inverse kinematics calculation to calculate joint displacement commands, which are the command values of the displacements (rotational angles) of the joints 14 and 15 of the robot 1 and which satisfy the above. In the present reference example, the equation of the solution of the inverse kinematics calculation has been determined beforehand, and the joint displacement commands have been calculated simply by substituting desired body position/posture and the final desired position of each ground contact portion into the equation. More specifically, the robot geometric model 110 receives a desired body position/posture trajectory determined by the gait generating device 100 and a corrected desired ground contact portion trajectory corrected as will be discussed later by the hierarchical compliance operation determiner 114 (a corrected desired ground contact portion trajectory with deformation compensation), and calculates the joint displacement commands of the joints 14 and 15 of the legs #1 to #4 by the inverse kinematics calculation from the received values.

In the case of a robot having joints, such as arm joints and a neck joint, in addition to leg joints, as in the first embodiment to be discussed later, the displacements of joints other than the leg joints are determined by the inverse kinematics calculation on the basis of the relative positions/postures of hands, the head or the like with respect to the body.

The displacement controller 112 having a function as a joint controlling means receives the actual joint displacements (detected values) of the joints 14 and 15 of the robot 1 and the joint displacement commands calculated by the robot geometric model (inverse kinematics calculator) 110, and controls (feedback-control) actuators (not shown) of the joints 14 and 15 by using the joint displacement commands as the desired values such that the actual joint displacements follow the desired values.

The hierarchical compliance operation determiner 114 corrects a desired ground contact portion trajectory such that an actual total floor reaction force approximates the resultant force of a desired total floor reaction force and a compensating total floor reaction force, and outputs a corrected desired ground contact portion position/posture trajectory with deformation compensation, which is the desired ground contact portion trajectory after the correction. In the present reference example, the postures of the ground contact portions 10 cannot be controlled; therefore, the corrected desired ground contact portion position/posture trajectory with deformation compensation is actually a corrected desired ground contact portion position trajectory with deformation compensation.

The hierarchical compliance operation determiner 114 generally corrects the desired ground contact portion trajectories of the ground contact portions 10 so as to satisfy the following three requirements as much as possible.

Requirement 1) In order to stabilize the position/posture of the robot 1, an actual total floor reaction force is made to follow the resultant force of a compensating total floor reaction force (moment Mdmd) output by the posture stabilization control calculator 104 and a desired total floor reaction force. According to the first reference example, in order to stabilize the posture inclination (the inclination relative to the vertical direction) of the body 24 of the robot 1, the horizontal component of an actual total floor reaction force moment about a desired total floor reaction force central point is made to follow horizontal components Mdmdx and Mdmdy of the compensating total floor reaction force moment Mdmd. Supplementally, the horizontal component of the desired total floor reaction force moment about the desired total floor reaction force central point is zero, so that the resultant force of this and Mdmd agrees with Mdmd.

Requirement 2) The absolute value of the actual floor reaction force moment about a desired floor reaction force central point of each node, which is not a leaf node, is minimized as much as possible to prevent an actual floor reaction force from being focused on some ground contact portions 10 of a plurality of ground contact portions 10 to be in contact with the ground, causing the actual floor reaction force on other ground contact portions 10 to be excessively reduced, which will lead to extremely deteriorated ground contacting properties of the ground contact portions 10 having the reduced actual floor reaction force. In the first reference example, the absolute values of the actual floor reaction force moments about the desired floor reaction force central points of the 14th node, the 23rd node, and the 1423rd node are minimized as much as possible.

Requirement 3) In order to secure the ground contacting properties of the ground contact portions 10 to be in contact with the ground, that is, to prevent local ground contacting properties of the ground contact portions 10 from deteriorating due to uneven local ground contact pressure distribution (the distribution of an actual floor reaction force) in the ground contact portions 10, the absolute value of the actual floor reaction force moment about the desired floor reaction force central point of each ground contact portion 10 (leaf node) is minimized as much as possible. However, in the robot 1 of the first reference example, the actual floor reaction force moment about the desired floor reaction force central point of each ground contact portion 10 is always zero; therefore, it is unnecessary to consider this requirement 3).

In general, it is impossible to fully satisfy all of requirements 1) to 3) or requirements 1) and 2). For example, it is often physically impossible to zero the actual floor reaction force moment about the desired floor reaction force central point of each ground contact portion 10 while making an actual total floor reaction force agree with the resultant force of a compensating total floor reaction force and a desired total floor reaction force. Hence, the hierarchical compliance operation determiner 114 usually corrects the desired ground contact portion trajectories of the ground contact portions 10 at certain compromise points while satisfying requirements 1) to 3) or requirements 1) and 2) as much as possible.

The above has given the overviews of the functional means (functional components) of the control system 50.

Supplementally, the hierarchical compliance operation determiner 114, the posture stabilization control calculator 104, and a robot geometric model (inverse kinematics calculator) 110 correspond to the node operation control means in the present invention.

Figure 9:
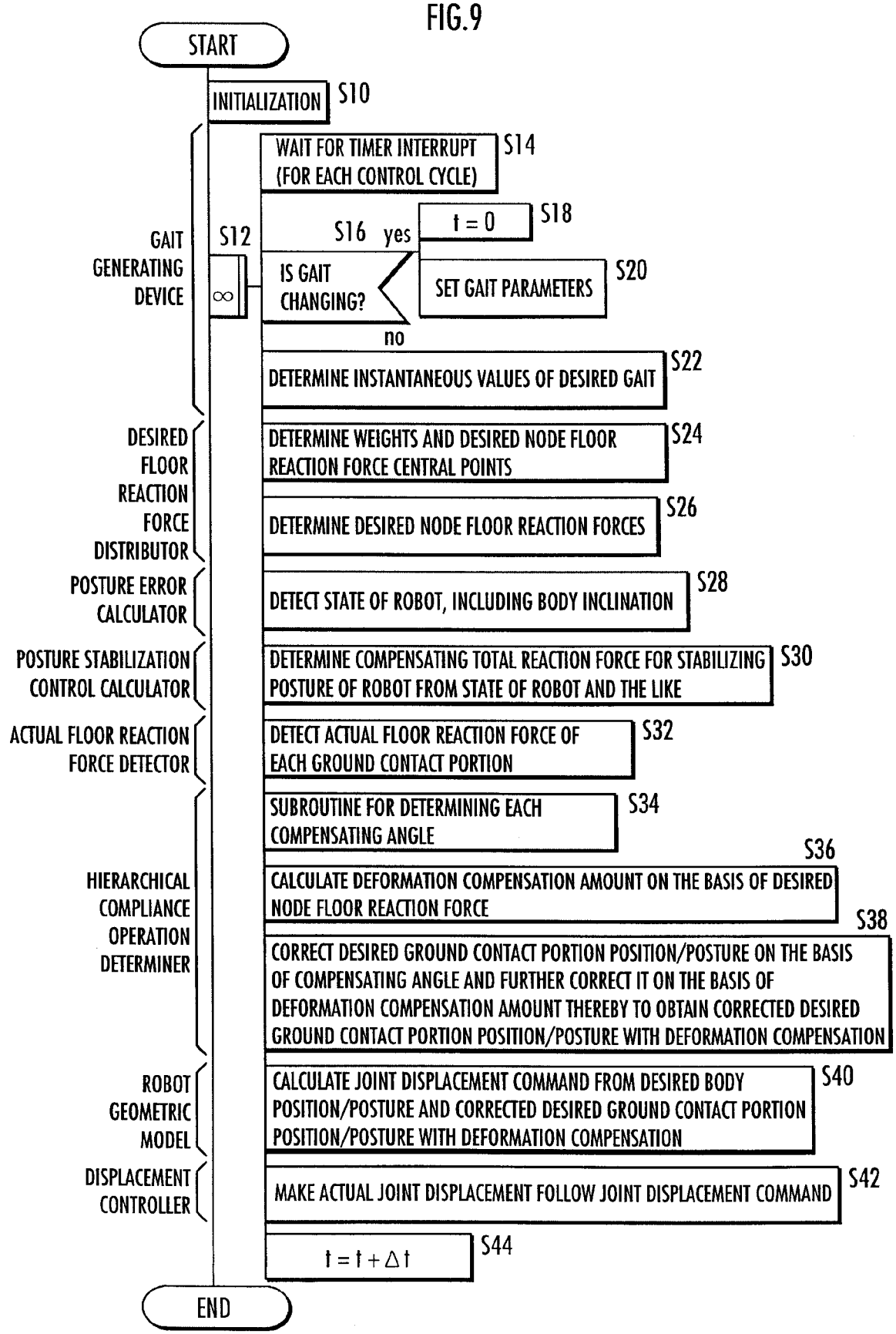
FIG. 9 is a flowchart showing main routine processing of the control system of the first reference example.

Referring now to the flowchart of FIG. 9, the overall operation (arithmetic processing) of the control system 50 will be explained in more detail. FIG. 9 is a flowchart (structured flowchart) showing the main routine processing of the control system 50. The components of the control system 50 carrying out pertinent processing are shown on the left end in FIG. 9.

First, the initialization of the control system 50 is performed in S10, then the processing advances to S14 via S12. The arithmetic processing of the control system 50 waits for a timer interrupt for each control cycle. The control cycle is, for example, 50 ms.

Subsequently, the processing proceeds to S16 wherein it determines whether a gait change is observed, and if the determination result is NO, then it proceeds to S22, which will be discussed later. If the determination result in S16 is YES, then the processing proceeds to S18 wherein it initializes time t to zero, and proceeds to S20 wherein it sets gait parameters. In the present reference example, for example, a desired gait of a predetermined period from the moment a predetermined leg (e.g., #1) of the robot 1 leaves a floor to the moment it leaves the floor next (or from the moment it lands to the moment it lands next) is taken as a unit, and gait parameters that are the parameters defining the desired gait for the predetermined period (the parameters used in the algorithm for determining the desired gait) are set in S20. The "gait change" mentioned in S16 means the change of the desired gait for the predetermined period. Whether the desired gait has changed may be determined mainly on the basis of time or a detected value of the six-axis force sensor 34 on the predetermined leg.

The gait parameters set in S20 are composed of motion parameters that define the desired motion trajectories (specifically, a desired ground contact portion trajectory and a desired body position/posture trajectory) of the robot 1 and the floor reaction force parameters that define desired floor reaction force trajectories (specifically, a desired total floor reaction force trajectory and a desired total floor reaction force central point trajectory). Supplementally, once the desired motion of the robot 1 is determined, the desired total floor reaction force can be obtained by reversing the sign of the resultant force of the inertial force generated by the desired motion and the gravity acting on the robot 1, so that the floor reaction force parameters may be the ones that define only a desired total floor reaction force central point trajectory. Further, motion parameters do not have to include parameters that define a desired body position/posture trajectory if a desired ground contact portion trajectory (more generally, the parameter of a desired motion other than desired body position/posture) and a desired total floor reaction force central point are determined, and then desired body position/posture are determined using a dynamic model of the robot 1 such that the horizontal component of a moment generated about a desired total floor reaction force central point (desired ZMP) by the resultant force of the inertial force generated by a desired motion, including desired body position/posture of the robot 1, and the gravity acting on the robot 1 becomes zero.

Subsequently, the processing proceeds to S22 wherein the instantaneous value of a desired gait is determined on the basis of the aforesaid gait parameters. Here, "instantaneous value" means a value for each control cycle, and a desired gait instantaneous value is composed of the instantaneous values of desired body position/posture, a desired ground contact portion position (the instantaneous value of a desired ground contact portion trajectory), a desired total floor reaction force, and a desired total floor reaction force central point position (a desired ZMP position). In the present reference example, the postures of the ground contact portions 10 cannot be controlled, so that the instantaneous values of the desired postures of the ground contact portions 10 are not determined. In a case where the postures of the ground contact portions can be controlled, the parameters defining the desired postures of the ground contact portions may be included in the gait parameters and the instantaneous values of the desired postures of the ground contact portions may be determined on the basis of the parameters.

The processing of S14 to S22 described above is the processing carried out by the gait generating device 100.

Subsequently, the processing proceeds to S24 wherein the weight Wn (n=1, 2, 3, 4, 14, 23) of each node and a desired floor reaction force central point of each node (a desired node floor reaction force central point) Qn (n=1, 2, 3, 4, 14, 23) are determined. This processing is the processing carried out as described above by the desired floor reaction force distributor 102.

Subsequently, the processing proceeds to S26 wherein desired node floor reaction forces (including at least the desired floor reaction forces of the ground contact portions 10 (leaf nodes)) are determined. In the first reference example, the desired node floor reaction forces of leaf nodes (desired ground contact portion floor reaction forces) are determined. This processing of S26 is also the processing carried out as described above by the desired floor reaction force distributor 102. As described above, if the compliance mechanisms are provided on other portions in addition to the distal portions of the legs #1 to #4, then the desired floor reaction forces of intermediate nodes that are not leaf nodes should be also determined. Supplementally, the moment horizontal component of a desired node floor reaction force is zero.

Subsequently, the processing proceeds to S28 wherein the state of the robot 1, such as the actual body posture inclination, is detected from an output of the posture sensor 36 or the like. In the first reference example, the value of an actual body posture inclination detected by the posture sensor 36 is captured by the posture error calculator 103, and a body posture inclination error θberr is calculated from the detected value and the desired body posture inclination (the instantaneous value at the current time) out of the desired body position/posture.

Subsequently, the processing proceeds to S30 wherein a compensating total floor reaction force for stabilizing the posture of the robot 1 is determined from the state of the robot 1 detected in S28. In the first reference example, the horizontal components Mdmdx and Mdmdy of a compensating total floor reaction force moment Mdmd about a desired total floor reaction force central point (desired ZMP) are calculated by the posture stabilization control calculator 104 from the body posture inclination error θberr according to the above expression 5 and expression 6.

Subsequently, the processing proceeds to S32 wherein the actual floor reaction force of each ground contact portion 10 is detected. This is the processing carried out by the actual floor reaction force detector 108. As described above, the actual floor reaction force for each ground contact portion 10 detected by the six-axis force sensor 34 that is converted to a supporting leg coordinate system (global coordinate system) is determined. Hereinafter, the actual floor reaction force of each ground contact portion 10 may be referred to as an actual ground contact portion floor reaction force in some cases.

Subsequently, from S34 to S38, the processing of the hierarchical compliance operation determiner 114 is carried out.

For a while, the following will explain the overall processing of the hierarchical compliance operation determiner 114 before the processing of these S34 to S38 is specifically explained. In this explanation, for the convenience of understanding, the state shown in FIG. 3(*b*) mentioned above (the state wherein all the legs #1 to #4 of the robot 1 are supporting legs) will be primarily taken as an example.

The hierarchical compliance operation determiner 114 determines the translational force components and moment components of the desired node floor reaction forces of nodes excluding leaf nodes (more specifically, the translational force components and the moment components that have desired node floor reaction force central points as the points of action) mainly on the basis of the desired node floor reaction forces of the leaf nodes determined by the desired floor reaction force distributor 102.

Figure 10:
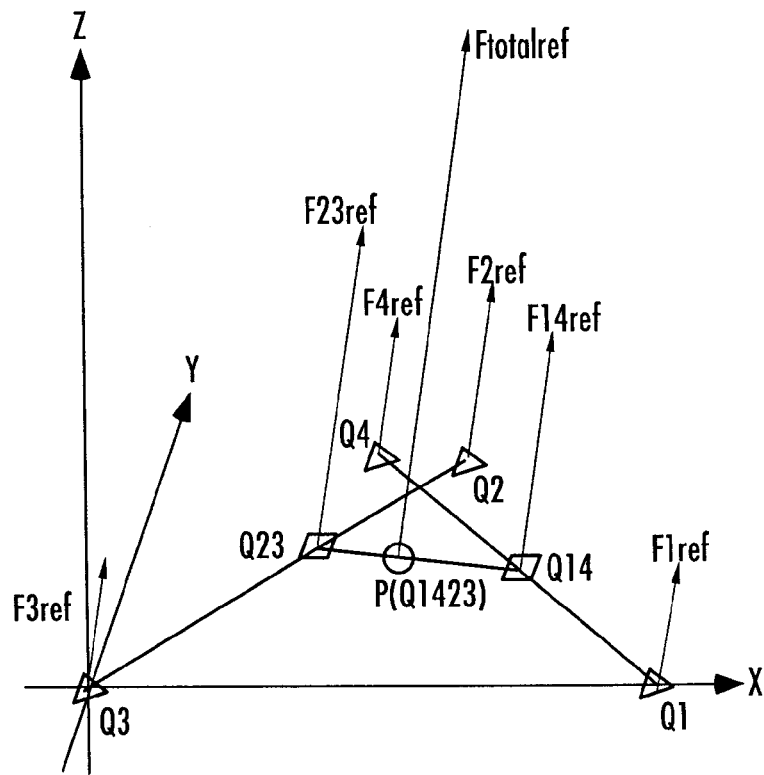
FIG. 10 to FIG. 14 are diagrams illustrating desired node floor reaction force translational force components, actual node floor reaction force translational force components, actual node floor reaction force moments, compensating total floor reaction force moments, and node compensating floor reaction force moments, respectively, of a robot (four-legged robot) of the first reference example.

The translational force components of the desired floor reaction forces (desired node floor reaction forces) of the nodes in the state shown in FIG. 3(*b*) are illustratively shown in FIG. 10. In this figure, a vector Fn_ref (n=1, 2, 3, 4, 14, 23) denotes the translational force component of a desired n-th node floor reaction force. Further, Ftotalref denotes the translational force component of a desired total floor reaction force(=desired 1423rd node floor reaction force). As shown in FIG. 8 mentioned above, a desired n-th node floor reaction force of an arbitrary n-th node (n=14, 23, 1423) that is not a leaf node is determined to be the resultant force of the desired node floor reaction forces of all child nodes of the n-th node. Therefore, F14ref=F1ref+F4ref, F23ref=F2ref+F3ref, and Ftotalref(=F1423ref)=F14ref+F23ref. The hierarchical compliance operation determiner 114 determines the translational force components F14ref(=F1ref+F4ref) and F23ref(=F2ref+F3ref) of the desired node floor reaction forces of intermediate nodes, as described above, from the translational force components Fn_ref (n=1, 2, 3, 4) of the desired node floor reaction forces of the leaf nodes (the ground contact portion 10) determined by the desired floor reaction force distributor 102. Ftotalref(=F1423ref) is set to the translational force component of the desired total floor reaction force determined by the gait generating device 100.

Furthermore, the hierarchical compliance operation determiner 114 determines the moment component of a desired node floor reaction force of each node, excluding leaf nodes, a desired node floor reaction force central point being the point of action, as in the case of the translational force component of a desired node floor reaction force. In this case, however, according to the definition of a desired node floor reaction force central point Qn (n=1, 2, 3, 4, 14, 23), the moment horizontal component of a desired n-th node floor reaction force is always set to zero. The moment horizontal component of a desired 1423rd node floor reaction force (=desired total floor reaction force) is also set to zero.

In the robot 1 of the present reference example, the ground contact portions 10 are engaged with the spherical joints 12 (free joints) at the distal portions of the legs #1 to #4, so that floor reaction force moments (horizontal components and vertical components) cannot be generated in the ground contact portions 10 (leaf nodes). For this reason, in the hierarchical compliance operation determiner 114, the moment vertical components of the desired node floor reaction forces of the ground contact portions 10 (leaf nodes) are also set to zero.

If a desired node floor reaction force moment vertical component of a node that is not a leaf node is determined so as to dynamically balance with a desired motion of the robot 1, then it could generally take a non-zero value; however, in the present reference example, the control related to the rotation (the rotation in the yaw direction) of the posture of the robot 1 about the vertical axis is not carried out. In the present reference example, therefore, the setting of the vertical component of the moment of a desired node floor reaction force of a node that is not a leaf node will be omitted. For this reason, the moment components of desired node floor reaction forces in the state shown in FIG. 3(*b*) will not be shown. If the control related to the rotation of the posture of the robot 1 about the vertical axis is carried out, then the desired floor reaction force moment vertical components of the nodes should be also set.

Supplementally, if the translational force components and the moment components of the desired node floor reaction forces of the nodes, including leaf nodes, are determined by the desired floor reaction force distributor 102, then the determination need not be performed by the hierarchical compliance operation determiner 114.

Further, the hierarchical compliance operation determiner 114 also determines the translational force component and the moment component of an actual node floor reaction force, which is the actual floor reaction force of each node.

Figure 11:
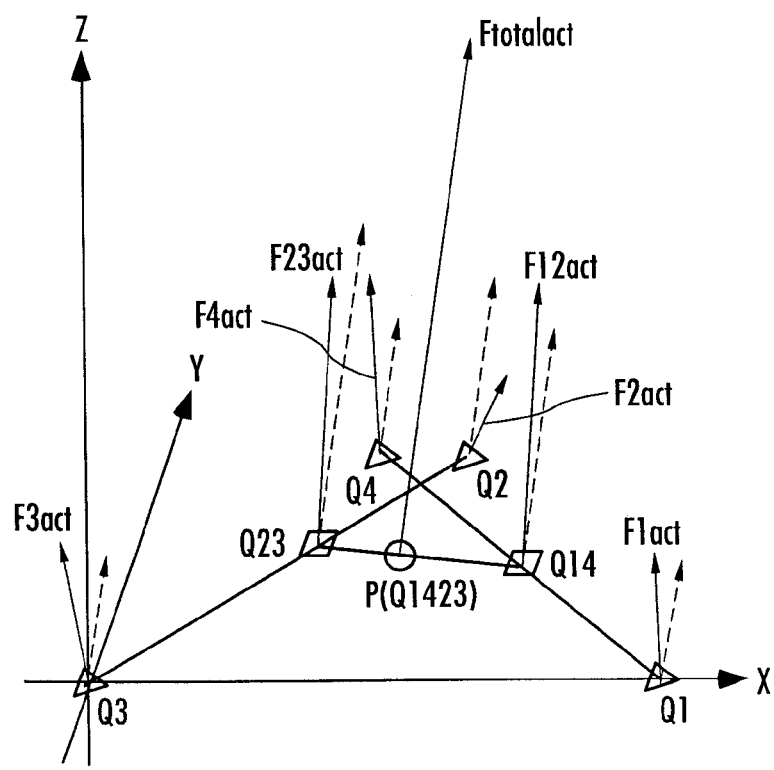

The translational force components of the actual floor reaction forces of the nodes (actual node floor reaction forces) in the state shown in FIG. 3(*b*) are illustratively shown in FIG. 11. In the diagram, a vector Fn_act (n=1, 2, 3, 4, 14, 23) denotes a translational force component of an actual n-th node floor reaction force. Further, Ftotalact denotes the translational force component of an actual total floor reaction force(=actual 1423rd node floor reaction force). In general, the translational force component of the actual floor reaction force of each node that is not a leaf node is the resultant force of the translational force components of the actual floor reaction forces of all child nodes of the node. Accordingly, the translational force components of the actual floor reaction forces of the 14th node, the 23rd node, and the 1423rd node are F14act=F1act+F4act, F23act=F2act+F3act, and Ftotalact (=F1423act)=F14act+F23act. The translational force components F1act, F2act, F3act, and F4act of the actual floor reaction forces of the leaf nodes are the translational force components of the actual floor reaction forces (actual ground contact portion floor reaction forces) of the ground contact portions 10 obtained by the actual floor reaction force detector 108. The vectors shown by dashed lines in FIG. 11 indicate the translational force components of the desired node floor reaction forces shown in FIG. 10 mentioned above. The hierarchical compliance operation determiner 114 determines the translational force components of the actual node floor reaction forces of the nodes from the actual floor reaction forces of the ground contact portions 10 obtained by the actual floor reaction force detector 108.

Figure 12:
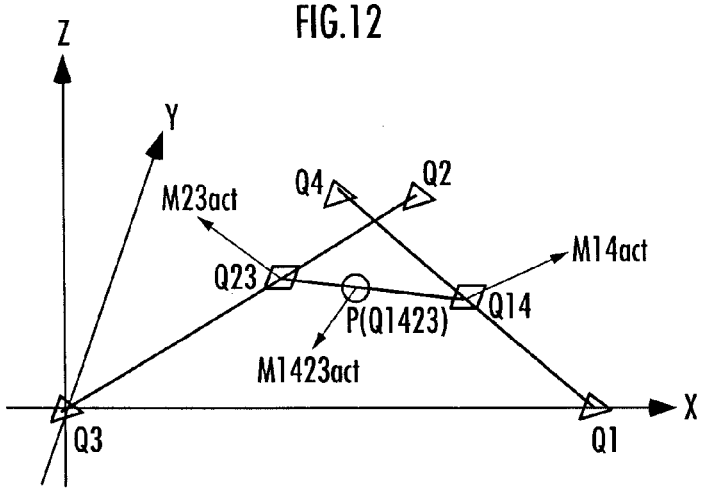

The moment components of the actual floor reaction forces of the nodes in the state shown in FIG. 3(*b*) are illustratively shown in FIG. 12. In the diagram, a vector Mn_act (n=14, 23, 1423) denotes the moment component of an actual n-th node floor reaction force. In this case, as with the translational force components of the actual floor reaction forces of the nodes, in general, the moment component of an actual floor reaction force M14act, M23act or M1423act(=Mtotalact) of a node that is not a leaf node is defined as the moment component of the resultant force of the actual floor reaction forces of all child nodes of the node (the moment component having the desired floor reaction force central point Q14, Q23 or Q1423 of the node as the point of action).

In the robot 1 of the present reference example, no floor reaction force moment can be generated in the ground contact portions 10 (leaf nodes), as described above, so that the moment components of the actual floor reaction forces of leaf nodes (actual ground contact portion floor reaction forces) will be always zero. Thus, the moment components of the actual node floor reaction forces of the leaf nodes will not be shown.

The actual floor reaction force moment components of nodes that are not leaf nodes (in the present reference example, M14act, M23act and M1423act) are not generally zero. For example, a moment is usually generated about the desired 14th node floor reaction force central point Q14 by the horizontal components of the translational force components of the actual floor reaction forces of the first ground contact portion 10 (the 1st node) and the fourth ground contact portion 10 (the 4th node). However, in the robot 1 in the present reference example, the distal portions of the legs are provided with the spherical joints 12, which are free joints, so that a component in the same direction as a segment Q1Q4 of M14act and a component in the same direction as a segment Q2Q3 of M23act will be zero.

In a robot having the distal joints of its legs provided with actuators (a robot in which the postures of the distal ground contact portions of the legs are controllable), even if the control related to the rotation of the posture of the robot about the vertical axis is not carried out, the desired floor reaction force moment horizontal components of the ground contact portions are also set and the actual floor reaction force moments of the ground contact portions are also detected, as shown in an embodiment disclosed in Japanese Unexamined Patent Application Publication No. H10-277969 previously proposed by the present applicant. Then, an operation for correcting the postures of the ground contact portions should be performed such that the actual floor reaction force moment horizontal component of each ground contact portion approximates a desired floor reaction force moment horizontal component or that the actual floor reaction force moment of each ground contact portion approximates the sum (the vector sum) of the desired floor reaction force moment horizontal component and its ground contact portion compensating floor reaction force moment.

Figure 13:
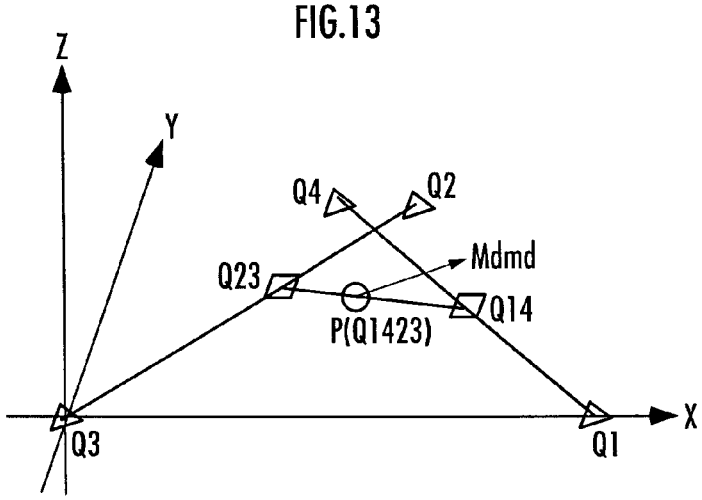

The processing of the hierarchical compliance operation determiner 114 will be explained in more detail. In this case, a situation is assumed in which the posture of the body 24 of the robot 1 is about to fall toward left rear in the state shown in FIG. 3(b) and the compensating total floor reaction force moment Mdmd determined by the posture stabilization control calculator 104 is as shown in FIG. 13.

To restore the posture (the inclination relative to the vertical direction) of the body 24 of the robot 1 (to restore the inclination in a desired body posture), the horizontal component of an actual total floor reaction force moment about a desired total floor reaction force central point (a desired ZMP) may be made to follow the horizontal component of the sum of a desired total floor reaction force moment Mtotalref (=M1423ref) and a compensating total floor reaction force moment Mdmd.

Meanwhile, at the desired total floor reaction force central point (the desired ZMP), the horizontal component of the desired total floor reaction force moment Mtotalref is zero. Hence, to restore the posture (inclination) of the body 24 of the robot 1 in the longitudinal and lateral directions, the horizontal component of the actual total floor reaction force moment about the desired total floor reaction force central point (the desired ZMP) may be made to follow the horizontal components (Mdmdx, Mdmdy) of Mdmd. Further, in the present reference example, the actual floor reaction force moment about the desired floor reaction force central point of each ground contact portion 10 is zero.

Therefore, the hierarchical compliance operation determiner 114 in the first reference example corrects the desired ground contact portion position (especially the position in the height direction) of each ground contact portion 10 determined by the gait generating device 100 so as to satisfy the aforesaid requirements 1) and 2) as much as possible.

To make the correction, the hierarchical compliance operation determiner 114 determines a compensating angle. The compensating angle is a manipulated variable (a rotational amount) for correcting the relative relationship among the positions of the ground contact portions 10 by the operation of rotation about a certain point (correcting in the vertical direction in the present reference example). In the present reference example, there are a 14th node compensating angle $\theta 14$, a 23rd node compensating angle $\theta 23$, and a 1423rd node compensating angle $\theta 1423$ as the compensating angles. In other words, they are the compensating angles of the nodes other than leaf nodes. Then, the hierarchical compliance operation determiner 114 determines a desired n-th node floor reaction force central point Qn' obtained by correcting the desired n-th node floor reaction force central point Qn (n=1, 2, 3, 4, 14, 23) on the basis of these compensating angles $\theta 14$, $\theta 23$ and $\theta 1423$.

Figure 15:
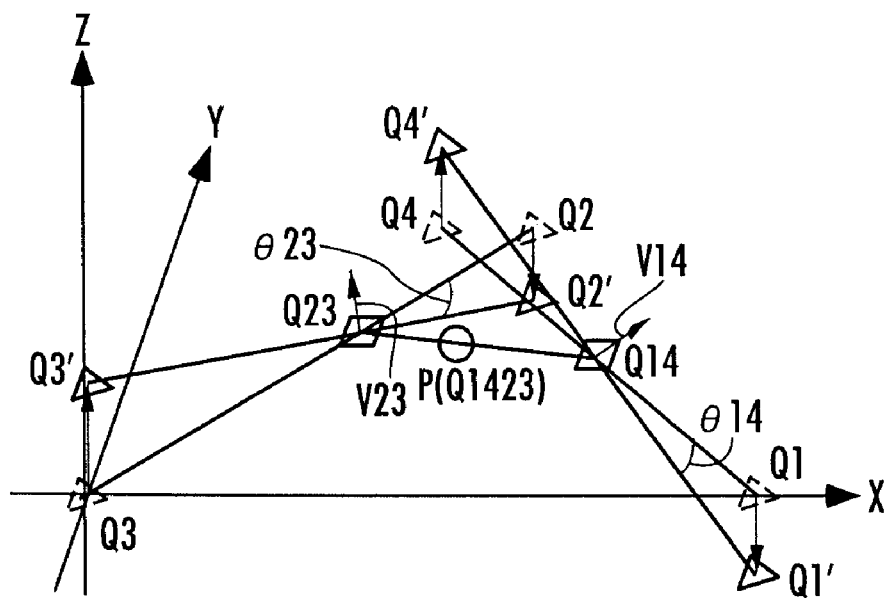
FIG. 15 and FIG. 16 are diagrams for explaining position corrections based on node compensating angles (compliance operation) in the first reference example.
Figure 16:
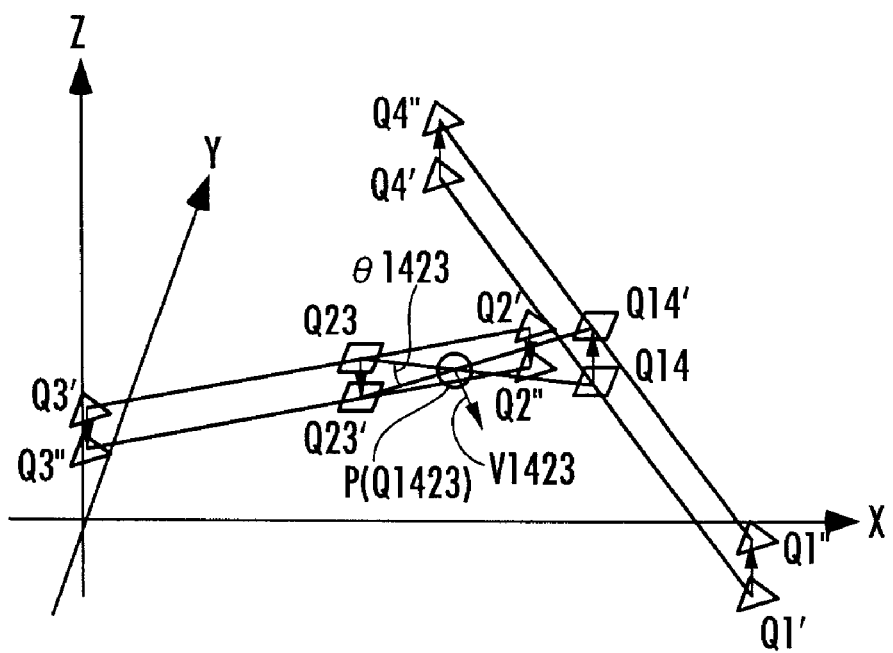

As shown in FIG. 15, the 14th node compensating angle $\theta 14$ is the angle formed by a segment Q1Q4 and a segment Q1'Q4', and the 23rd node compensating angle $\theta 23$ is the angle formed by a segment Q2Q3 and a segment Q2'Q3'. Further, as shown in FIG. 16, the 1423rd node compensating angle $\theta 1423$ is the angle formed by a segment Q14Q23 and a segment Q14'Q23'. The technique for determining these node compensating angles $\theta 14$, $\theta 23$ and $\theta 1423$ will be described later.

Referring to FIG. 15 and FIG. 16, the correction of the desired n-th node floor reaction force central point Qn (n=1, 2, 3, 4, 14, 23) on the basis of the compensating angles $\theta 14$, $\theta 23$ and $\theta 1423$ is made as follows.

Referring to FIG. 15, a normal vector V14 of a plane that includes a desired first node floor reaction force central point Q1 (the desired floor reaction force central point of a first ground contact portion 10) and a desired fourth node floor reaction force central point Q4 (the desired floor reaction force central point of a second ground contact portion 10) and that is perpendicular to a horizontal plane is determined. The magnitude of V14 is 1. The coordinate (position) of the desired first node floor reaction force central point Q1 is rotationally moved about a normal vector V14 with the desired 14th node floor reaction force central point Q14 being the center of rotation (about the axis that passes Q14 and is parallel to V14) by the aforesaid 14th node compensating angle $\theta 14$. The point after Q1 is moved by the above rotational movement is defined as Q1'. Similarly, the coordinate (position) of the desired fourth node floor reaction force central point Q4 is rotationally moved about the normal vector V14 with the desired 14th node floor reaction force central point being the center of rotation by the 14th node compensating angle $\theta 14$. The point after Q4 is moved by the above rotational movement is defined as Q4'. In other words, the end points of a segment obtained by rotating the segment Q1Q4 about V14 by $\theta 14$ with Q14, which is an internally dividing point thereof, being the center of rotation are defined as Q1' and Q4'. Thus, the 14th node compensating angle $\theta 14$ is a manipulated variable for moving the relative relationship of the positions of the desired floor reaction force central points Q1 and Q4 of the first node and the fourth node, respectively, which are child nodes of the 14th node, without moving the position of the desired floor reaction force central point Q14 of the 14th node.

Moreover, a normal vector V23 of a plane that includes a desired second node floor reaction force central point Q2 and a desired third node floor reaction force central point Q3 and that is perpendicular to a horizontal plane is determined. The magnitude of V23 is 1. The coordinate (position) of the desired second node floor reaction force central point Q2 is rotationally moved about the normal vector V23 with the desired 23rd node floor reaction force central point Q23 being the center of rotation (about the axis that passes Q23 and is parallel to V23) by the 23rd node compensating angle θ23. As shown in FIG. 15, the point after Q2 is moved by the above rotational movement is defined as Q2'. Similarly, the coordinate (position) of the desired third ground contact portion floor reaction force central point Q3 is rotationally moved about the normal vector V23 with the desired 23rd node floor reaction force central point being the center of rotation by the 23rd node compensating angle θ23. The point after Q3 is moved by the above rotational movement is defined as Q3'. In other words, the end points of a segment obtained by rotating the segment Q2Q3 about V23 by θ23 with Q23, which is an internally dividing point thereof, being the center of rotation are defined as Q2' and Q3'. Thus, the 23rd node compensating angle θ23 is a manipulated variable for moving the relative relationship of the positions of the desired floor reaction force central points Q2 and Q3 of the second node and the third node, respectively, which are child nodes of the 23rd node, without moving the position of the desired floor reaction force central point Q23 of the 23rd node.

Next, referring to FIG. 16, a normal vector V1423 of a plane that includes a desired 14th node floor reaction force central point Q14 and a desired 23rd node floor reaction force central point Q23 and that is perpendicular to a horizontal plane is determined. The magnitude of V1423 is 1. The coordinate (position) of the desired 14th node floor reaction force central point Q14 is rotationally moved about the normal vector V1423 with the desired total floor reaction force central point P(=Q1423) being the center of rotation (about the axis that passes P and is parallel to V1423) by the 1423rd compensating angle θ1423. The point after Q14 is moved by the above rotational movement is defined as Q14'. Similarly, the coordinate (position) of the desired 23rd ground contact portion floor reaction force central point Q23 is rotationally moved about the normal vector V1423 with the desired total floor reaction force central point P being the center of rotation by the 1423rd compensating angle θ1423. The point after Q23 is moved by the above rotational movement is defined as Q23'. In other words, the end points of a segment obtained by rotating a segment Q14Q23 about V1423 by θ1423 with P(=Q1423), which is an internally dividing point thereof, being the center of rotation are defined as Q14' and Q23'. Thus, the 1423rd node compensating angle θ1423 is a manipulated variable for moving the relative relationship of the positions of the desired floor reaction force central points Q14 and Q23 of the 14th node and the 23rd node, respectively, which are child nodes of the 1423rd node, without moving the position of the desired floor reaction force central point P of the 1423rd node.

Hereinafter, generally, a vector whose start point is A and end point is B will be denoted as a vector A_B.

Next, a point Q1" that would be obtained when Q1' is moved for a vector Q14_Q14' is determined. Similarly, a point Q4" that would be obtained when Q4' is moved for a vector Q14_Q14' is determined. Further, a point Q2" that would be obtained when Q2' is moved for a vector Q23_Q23' is determined. Similarly, a point Q3" that would be obtained when Q3' is moved for a vector Q23_Q23' is determined.

Subsequently, the desired ground contact portion position of an n-th ground contact portion (n=1, 2, 3, 4) is moved in parallel by a vector Qn_Qn" (substantially vertical movement). This corrects the desired ground contact portion position of each ground contact portion 10. Supplementally, as with the desired floor reaction force central point of each node, if the position of each leaf node is set to the position of the ground contact portion 10 corresponding to the leaf node, and the position of each node having child nodes is defined as a weighted average position of the positions of all child nodes of the node, using the weights set as described above, then the processing for moving the desired floor reaction force central points of the child nodes of the 14th node, the 23rd node, and the 1423rd node, respectively, on the basis of the compensating angles θ14, θ23, and θ1423, as described above, is equivalent to moving the positions of the child nodes of the 14th node, the 23rd node, and the 1423rd node, respectively, on the basis of the compensating angles θ14, θ23, and θ1423.

In a robot in which the distal portions of its legs have no free joints (a robot in which the postures of ground contact portions can be controlled), the aforesaid parallel movement is performed without changing the postures (desired postures) of ground contact portions, and then the n-th ground contact portion is further rotated by a certain rotational angle θn_x about a longitudinal axis (X axis) and also rotated about a lateral axis (Y axis) by a certain rotational angle θn_y, with Qn" being the center. This corrects the desired postures of ground contact portions. The rotational angle θn (a two-dimensional amount composed of θn_x and θn_y) in this case is referred to as an n-th ground contact portion compensating angle, θn_x is referred to as an n-th ground contact portion compensating angle X component, and θn_y is referred to as an n-th ground contact portion compensating angle Y component. The n-th ground contact portion compensating angle θn may be determined according to the technique described in Japanese Unexamined Patent Application Publication No. H10-277969 previously proposed by the present applicant.

Supplementally, the desired node floor reaction force central point of the node being the point of action, each of the node compensating angles is determined such that a resultant force of a desired floor reaction force moment (the horizontal component thereof is zero) and a node compensating floor reaction force moment Mn_dmd is generated there. In this case, the compensating total floor reaction force moment Mdmd, which provides the basis of the node compensating floor reaction force moment Mn_dmd, is determined such that an actual posture inclination error approximates zero. Hence, each node compensating angle will function as a manipulated variable for manipulating the relative positional relationship among the ground contact portions 10 such that an actual posture inclination error approximates zero while bringing a floor reaction force moment about a desired total floor reaction force central point close to a desired moment (a compensating total floor reaction force moment in this case).

As described above, the processing for correcting the desired ground contact portion positions (specifically, the mutual relative relationship among the positions) of the ground contact portions 10 is the hierarchical compliance operation in the first reference example. In the compliance operation, for each node having child nodes, the manipulated variable (correction amount) of the relative relationship among the desired ground contact portion positions (relative positional relationship) of the ground contact portions 10, which are the descendant nodes of the node, is determined for each of the compensating angles θ14, θ23, and θ1423, and the manipulated variables (correction amounts) are combined so as to correct the mutual relative relationship of the desired ground contact portion positions of the ground contact portions 10. The desired ground contact portion position/posture corrected as described above are referred to as corrected desired ground contact portion position/posture.

In such a compliance operation, generally, if the aforesaid compensating angles (compensating operation amounts) are not excessive, then a ground contact region (a region of the ground contact surface wherein the pressure is positive) remains unchanged even if the ground contact pressure distribution of each ground contact portion 10 changes. In this case, the compliance mechanism 42 attached to each ground contact portion 10 deforms in proportion to a compensating angle, and an actual floor reaction force of each ground contact portion 10 based on the amount of the deformation is generated. As a result, the relationship between the compensating angles and the changing amounts of the actual floor reaction forces generated by the compensating angles has good characteristics, namely, linear characteristics, shown below.

Characteristic 1) If only the compensating angles about the desired floor reaction force central points of nodes that are not leaf nodes are manipulated to move the desired ground contact portion positions of the ground contact portions 10, then the translational force components of the actual floor reaction forces of the ground contact portions 10 that have been lowered increase, while the translational force components of the actual floor reaction forces of the ground contact portions 10 that have been raised decrease. At this time, the actual floor reaction force moments about the corrected desired floor reaction force central points of the ground contact portions 10 (leaf nodes) hardly change.

Characteristic 2) If only an n-th ground contact portion compensating angle is manipulated to rotate the desired posture of the n-th ground contact portion, then the moment component of the actual floor reaction force acting on the desired floor reaction force central point of the n-th ground contact portion changes, while the translational force component does not change much.

Characteristic 3) If the compensating angle about the desired floor reaction force central point of a node that is not a leaf node and an n-th ground contact portion compensating angle are simultaneously manipulated, then the change amount of the actual floor reaction forces of the ground contact portions 10 will be equivalent to the sum of the change amounts obtained when each of them is independently manipulated.

Figure 17:
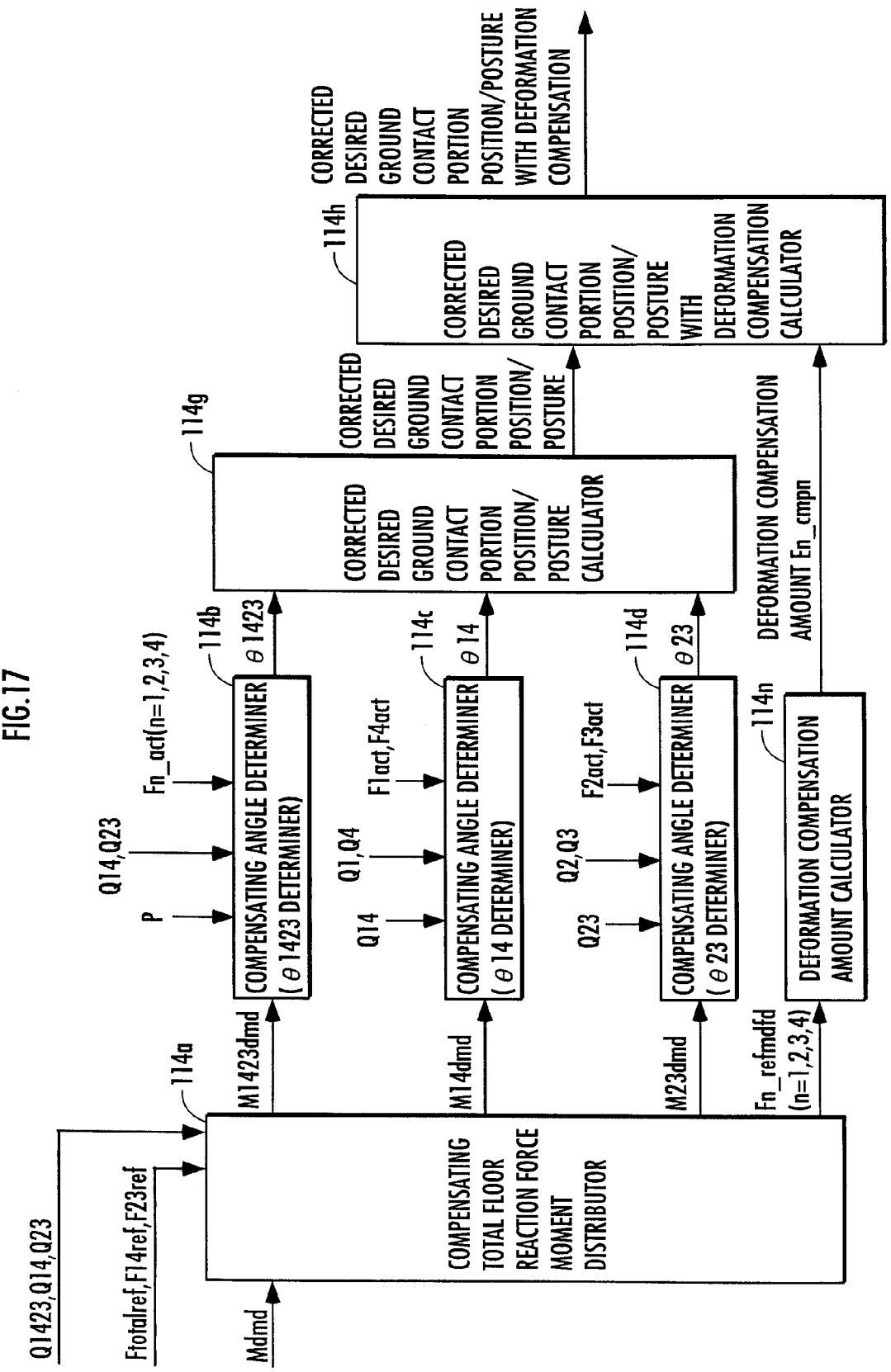
FIG. 17 to FIG. 21 are block diagrams showing the functional constructions of a hierarchical compliance operation determiner, a compensating total floor reaction force moment distributor, a $\theta1423$ determiner (compensating angle determiner), a $\theta14$ determiner (compensating angle determiner), and a mechanism deformation compensation amount calculator, respectively, in the first reference example.

FIG. 17 is a block diagram showing the functions of the hierarchical compliance operation determiner 114 in the present reference example. Referring to the diagram, the processing of the hierarchical compliance operation determiner 114 will be explained in further detail.

The hierarchical compliance operation determiner 114 is equipped with, as its functional means, a compensating total floor reaction force moment distributor 114*a*, compensating angle determiners 114*b*, 114*c* and 114*d*, a corrected desired ground contact portion position/posture calculator 114*g*, a deformation compensation amount calculator 114*n*, and a corrected desired ground contact portion position/posture with deformation compensation calculator 114*h*.

The compensating total floor reaction force moment distributor 114*a* distributes the aforesaid compensating total floor reaction force moment Mdmd (Mdmdx, Mdmdy) to the 1423rd node compensating floor reaction force moment M1423dmd, the 14th node compensating floor reaction force moment M14dmd and the 23rd node compensating floor reaction force moment M23dmd.

The 1423rd node compensating floor reaction force moment M1423dmd is the desired value of a moment to be generated about the desired 1423rd node floor reaction force central point(=desired total floor reaction force central point (desired ZMP)) by the translational force components of the floor reaction forces of the ground contact portions 10 (specifically, the first to the fourth ground contact portions) when the 1423rd compensating angle θ1423 is manipulated.

The component of the 1423rd node compensating floor reaction force moment M1423dmd in the direction of the aforesaid vector V1423 (the component about the axis in the V1423 direction) is described as M1423dmdv. The vector V1423 is the vector defined in the general explanation of the compliance operation of the hierarchical compliance operation determiner 114 (refer to FIG. 16). If a vector orthogonal to V1423 and also orthogonal to the vertical direction is defined as U1423, then the component in the direction of U1423 of the 1423rd node compensating floor reaction force moment M1423dmd (the component about the axis in the U1423 direction) M1423dmdu is set to zero in the present reference example. This is because the component of a floor reaction force moment in the U1423 direction cannot be generated even if the 1423rd node compensating angle θ1423 is manipulated in the robot 1 of the present reference example. Further, in the present reference example, the rotation of the posture of the robot 1 about the vertical axis is not controlled; therefore, the component M1423dmdz of M1423dmd in the vertical direction is also set to zero.

The 14th node compensating floor reaction force moment M14dmd is the desired value of a moment to be generated about the desired 14th node floor reaction force central point by the translational force components of the floor reaction forces of the ground contact portions 10 (specifically, the first and the fourth ground contact portions) when the 14th compensating angle θ14 is manipulated.

The component of the 14th node compensating floor reaction force moment M14dmd in the direction of the vector V14 is described as M14dmdv. The vector V14 is the vector defined in the general explanation of the compliance operation of the hierarchical compliance operation determiner 114 (refer to FIG. 15). If a vector orthogonal to V14 and also orthogonal to the vertical direction is defined as U14, then the component M14dmdu in the direction of U14 of the 14th node compensating floor reaction force moment M14dmd is set to zero in the present reference example. This is because the component of a floor reaction force moment in the U14 direction cannot be generated even if the 14th node compensating angle θ14 is manipulated in the robot 1 of the present reference example. In the present reference example, the component of M14dmd in the vertical direction is also set to zero.

The 23rd node compensating floor reaction force moment M23dmd is the desired value of a moment to be generated about the desired 23rd node floor reaction force central point by the translational force components of the floor reaction forces of the ground contact portions 10 (specifically, the second and the third ground contact portions) when the 23rd compensating angle θ23 is manipulated.

The component of the 23rd node compensating floor reaction force moment M23dmd in the direction of the vector V23 is described as M23dmdv. The vector V23 is the vector defined in the general explanation of the compliance operation of the hierarchical compliance operation determiner 114 (refer to FIG. 15). If a vector orthogonal to V23 and also orthogonal to the vertical direction is defined as U23, then the component M23dmdu in the direction of U23 of the 23rd node compensating floor reaction force moment M23dmd is set to zero in the present reference example. This is because the component of a floor reaction force moment in the U23 direction cannot be generated even if the 23rd node compensating angle θ23 is manipulated in the robot 1 of the present reference example. In the present reference example, the component of M23dmd in the vertical direction is also set to zero.

The 1423rd node compensating floor reaction force moment M1423dmd, the 14th node compensating floor reaction force moment M14dmd, and the 23rd node compensating floor reaction force moment M23dmd are determined, for example, as follows.

On an arbitrary n-th node, if a desired n-th node floor reaction force central point has been corrected while maintaining the horizontal component of an n-th node compensating floor reaction force moment at zero so as to be equivalent to adding the n-th node compensating floor reaction force moment to the desired n-th node floor reaction force central point, then the desired n-th node floor reaction force central point position that has been corrected is referred to as a corrected desired n-th node floor reaction force central point position.

The relationships between a corrected desired 1423rd node floor reaction force central point Pmdfd(=Q1423mdfd), a corrected desired 14th node floor reaction force central point Q14mdfd, and a corrected desired 23rd node floor reaction force central point Q23mdfd, and node compensating floor reaction force moments are shown by the following expressions 7 to 9. The desired 1423rd node floor reaction force central point Q1423 agrees with the total floor reaction force central point P, so that the corrected desired 1423rd node floor reaction force central point Pmdfd may be referred to as a corrected desired total floor reaction force central point in some cases.

$$M1423dmd = (Pmdfd - P)*Ftotalref \qquad \text{Expression 7}$$

$$M14dmd = (Q14mdfd - Q14)*F14ref \qquad \text{Expression 8}$$

$$M23dmd = (Q23mdfd - Q23)*F23ref \qquad \text{Expression 9}$$

The difference between two points, such as (Pmdfd–P) in expression 7, means the difference in the positional vectors of the points. Further, Ftotalref, F14ref, and F23ref denote the translational force components of the desired node floor reaction forces of the 1423rd node, the 14th node, and the 23rd node, respectively, as shown in FIG. 10.

To maintain high ground contact properties of the robot 1, control should not be carried out to bring the floor reaction force of the ground contact portion 10 to be in contact with the ground excessively close to zero or a negative value. Hence, the following conditions 1) to 3) should be satisfied.

Corrected Node Existing Position Condition 1)

Pmdfd is not excessively close to an end point of the segment Q14Q23 from the total floor reaction force central point P and exists on the segment Q14Q23. The range in which the corrected desired 1423rd node floor reaction force central point (corrected desired total floor reaction force central point) Pmdfd should exist is referred to as the existence permissible range of the corrected desired 1423rd node floor reaction force central point (corrected desired total floor reaction force central point).

Corrected Node Existing Position Condition 2)

Q14mdfd is not excessively close to an end point of the segment Q1Q4 from the desired 14th node floor reaction force central point Q14 and exists on the segment Q1Q4. The range in which the corrected desired 14th node floor reaction force central point Q14mdfd should exist is referred to as the existence permissible range of the corrected desired 14th node floor reaction force central point.

Corrected Node Existing Position Condition 3)

Q23mdfd is not excessively close to an end point of the segment Q2Q3 from the desired 23rd node floor reaction force central point Q23 and exists on the segment Q2Q3. The range in which the corrected desired 23rd node floor reaction force central point Q23mdfd should exist is referred to as the existence permissible range of the corrected desired 23rd node floor reaction force central point.

Meanwhile, to obtain an appropriate posture restoring force actually generated in the robot 1 (the force for restoring the inclination of the body 24 to a desired body posture inclination), the resultant force of the 1423rd node compensating floor reaction force moment M1423dmd, the 14th node compensating floor reaction force moment M14dmd, and the 23rd node compensating floor reaction force moment M23dmd should approximately agree with the compensating total floor reaction force moment Mdmd. In other words, the following expression 10 should be approximately satisfied.

$$Mdmd = M1423dmd + M14dmd + M23dmd \qquad \text{Expression 10}$$

In the present reference example, therefore, the 1423rd node compensating floor reaction force moment M1423dmd, the 14th node compensating floor reaction force moment M14dmd, and the 23rd node compensating floor reaction force moment M23dmd are determined according to expressions 11 to 13 given below as long as the positions of the corrected desired node floor reaction force central points Pmdfd, Q14mdfd and Q23mdfd determined by the above moments and the aforesaid expression 7, expression 8, and expression 9 satisfy the aforesaid corrected node existence position conditions 1), 2) and 3).

$$M1423dmd = Mat1423*Mdmd*V1423 \qquad \text{Expression 11}$$

$$M14dmd = Mat14*Mdmd*V14 \qquad \text{Expression 12}$$

$$M23dmd = Mat23*Mdmd*V23 \qquad \text{Expression 13}$$

where Mat1423, Mat14, and Mat23 denote gain matrixes (1-row, 3-column matrixes whose third elements are zero), and these are set such that M1423dmd, M14dmd, and M23dmd determined according to expression 11, expression 12, and expression 13 satisfy expression 10.

More precisely, the gain matrixes Mat1423, Mat14, and Mat23 are determined such that a simultaneous equation composed of expression 10, expression 11, expression 12, and expression 13 identically holds regardless of the value of Mdmd. The gain matrix for the simultaneous equation to identically hold is not uniquely determined, so that an appropriate gain matrix may be determined depending on, for example, which one of the corrected node existence position conditions 1), 2) and 3) is especially important. Supplementally, the gain matrixes are desirably changed continuously so as to make the compensating angles θ1423, θ14 and θ23 continuously change. Further, the policy of setting gain matrixes may be changed according to whether the robot 1 is standing upright or the difference in movement mode or the like.

If the 1423rd node compensating floor reaction force moment M1423dmd, the 14th node compensating floor reaction force moment M14dmd, and the 23rd node compensating floor reaction force moment M23dmd determined according to expression 11, expression 12, and expression 13 do not satisfy any one of the corrected node existence position conditions 1), 2) and 3), then they are corrected to satisfy the conditions 1), 2) and 3). More specifically, of the corrected desired n-th node floor reaction force central points (n=1423, 14, 23), a corrected desired node floor reaction force central point that has exceeded the existence permissible range is set at a point on the boundary of the existence permissible range, and the remaining corrected desired node floor reaction force central points are determined so that they satisfy expression 11, expression 12, and expression 13 as much as possible (to minimize the absolute value of the difference between a left side and a right side as much as possible). Generally, however, the behavior of an object under control does not considerably change even if a feedback amount slightly changes in feedback control; therefore, it is not required to strictly or forcibly satisfy expression 11, expression 12, and expression 13.

Figure 14:
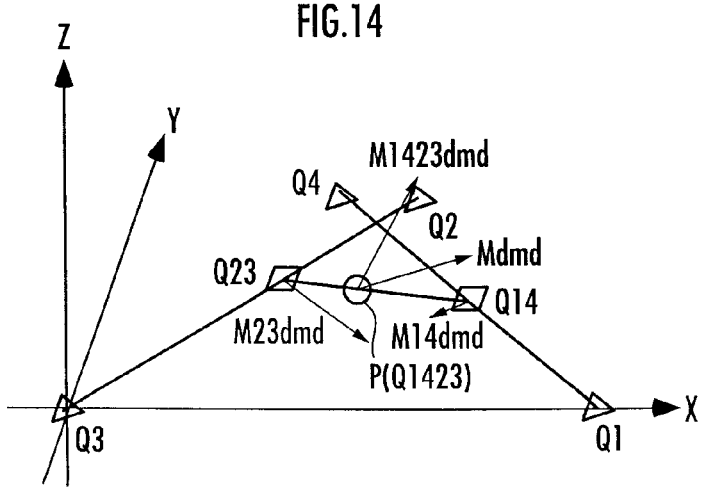

The compensating total floor reaction force moment distributor 114a determines the node compensating floor reaction force moments M1423dmd, M14dmd, and M23dmd as described above. FIG. 14 shows the examples of the node compensating floor reaction force moments M1423dmd, M14dmd, and M23dmd determined as described above. In the figure, Mdmd is the same as that shown in FIG. 13 mentioned above.

Moreover, the compensating total floor reaction force moment distributor 114a determines the corrected desired ground contact portion floor reaction forces Fn_refmdfd (n=1, 2, 3, 4), which are the desired floor reaction forces of the ground contact portions 10 that are corrected by adding node compensating floor reaction force moments to desired ground contact portion floor reaction forces, on the basis of the desired ground contact portion floor reaction forces, which are the desired floor reaction forces of the ground contact portions 10 (the desired node floor reaction forces of leaf nodes), and the node compensating floor reaction force moments M1423dmd, M14dmd and M23dmd.

At this time, the corrected desired ground contact portion floor reaction forces Fn_refmdfd (n=1, 2, 3, 4) may be determined from the desired floor reaction force central points Qn(n=1, 2, 3, 4), the corrected total floor reaction force central points Pmdfd, the corrected desired node floor reaction force central points Q14mdfd and Q23mdfd, and the desired total floor reaction forces Ftotalref of the ground contact portions 10 by the same technique as the technique for determining desired node floor reaction forces from the desired floor reaction force central points (the desired node floor reaction force central points of leaf nodes) Qn(n=1, 2, 3, 4), the desired total floor reaction force central points P, the desired node floor reaction force central points Q14 and Q23, and the desired total floor reaction forces Ftotalref of the ground contact portions 10. In other words, the weights of the nodes are determined according to the aforesaid expressions 1 to 3 from the desired floor reaction force central points Qn(n=1, 2, 3, 4), the corrected total floor reaction force central points Pmdfd, and the corrected desired node floor reaction force central points Q14mdfd and Q23mdfd of the ground contact portions 10, and the corrected desired ground contact portion floor reaction forces Fn_refmdfd (n=1, 2, 3, 4) may be determined according to the aforesaid expression 4 by using the determined weight.

As is obvious from the above, generating a node compensating floor reaction force moment at a desired n-th node floor reaction force central point of an n-th node having child nodes (correcting the moment component of the desired floor reaction force acting on a desired n-th node floor reaction force central point) is equivalent to correcting the weights of the child nodes of the n-th node.

Figure 18:
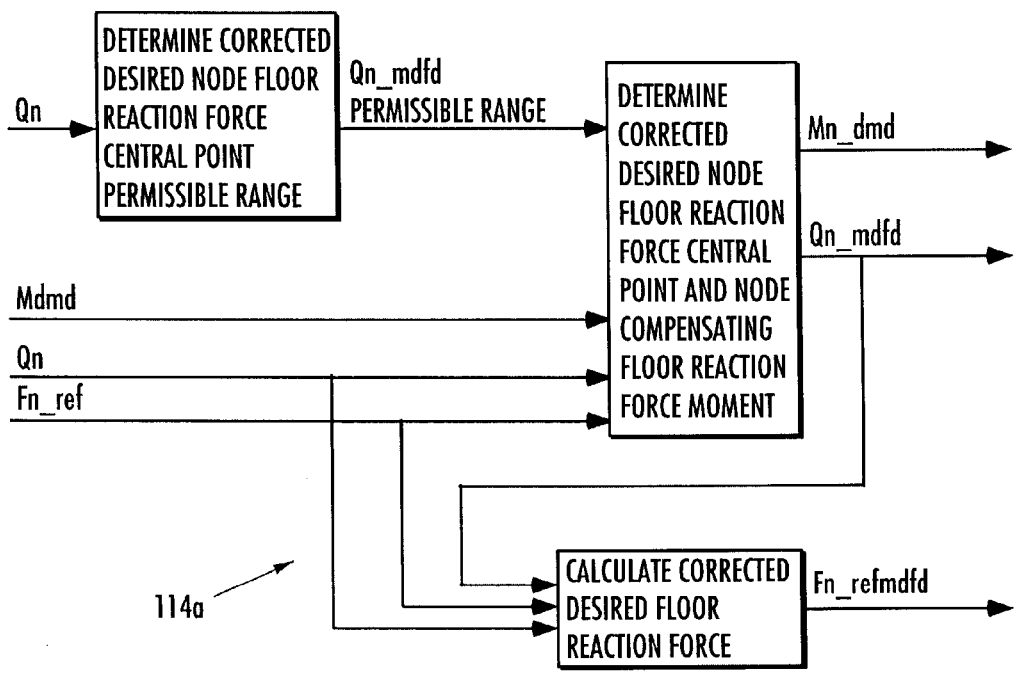

The processing of the compensating total floor reaction force moment distributor 114a explained above is represented by the functional block diagram shown in FIG. 18. More specifically, based on the desired node floor reaction force central points Qn (n=1, 2, 3, 4, 14, 23), the existence permissible ranges of the 14th node, the 23rd node, and the corrected desired node floor reaction force central points Qn_mdfd (n=14, 23, 1423) are determined according to the aforesaid corrected node existence position conditions 1), 2) and 3). Further, the corrected desired node floor reaction force central points Qn_mdfd (n=14, 23, 1423) and the node compensating floor reaction force moments Mn_dmd (n=14, 23, 1423) are determined on the basis of the compensating total floor reaction force moment Mdmd, the desired floor reaction force central points of nodes Qn (n=1, 2, 3, 4, 14, 23, 1423), the desired floor reaction forces Fn_ref (n=1, 2, 3, 4, 14, 23, 1423) and the aforesaid existence permissible ranges. In addition, the corrected desired ground contact portion floor reaction forces Fn_refmdfd (n=1, 2, 3, 4) are determined on the basis of the corrected desired node floor reaction force central points Qn_mdfd (n=14, 23, 1423), the desired floor reaction force central points Qn (n=1, 2, 3, 4) of the ground contact portions 10, and the desired total floor reaction force Ftotalref.

Next, the processing of the compensating angle determiner ($\theta$1423 determiner) 114b out of the aforesaid compensating angle determiners 114b to 114d will be explained with reference to the block diagram of FIG. 19. If the translational force component (F1act+F4act) of the resultant force of the actual first node floor reaction force and the actual fourth node floor reaction force acts on a desired 14th node floor reaction force central point Q14 and the translational force component (F2act+F3act) of the resultant force of the actual second node floor reaction force and the actual third node floor reaction force acts on a desired 23rd node floor reaction force central point Q23, then a moment M1423act generated about the desired total floor reaction force central point P (the desired 1423rd node floor reaction force central point) by the above translational force components is determined according to expression 14 given below.

$$M1423act = P\_Q14*(F1act+F4act) + P\_Q23*(F2act+F3act) \quad \text{Expression 14}$$

where P_Q14 denotes a vector whose start point is P and end point is Q14, and P_Q23 denotes a vector whose start point is P and end point is Q23.

In actuality, there will be hardly a problem if expression 15 given below is used in place of expression 14 to calculate M1423act.

$$M1423act = P\_Q1*F1act + P\_Q2*F2act + P\_Q3*F3act + P\_Q4*F4act \quad \text{Expression 15}$$

The right side of expression 15 is an expression for calculating the actual total floor reaction force moment Mtotalact acting about the desired total floor reaction force central point P from the translational force components Fn_act (n=1, 2, 3, 4) of the actual floor reaction forces of the first to the fourth nodes (leaf nodes). Supplementally, in expression 14, the actual floor reaction force moment acting about the desired 14th node floor reaction force central point Q14 and the actual floor reaction force moment acting about the desired 23rd node floor reaction force central point Q23 are subtracted from the actual total floor reaction force moment Mtotalact acting about the desired total floor reaction force central point P.

In general, an actual n-th node floor reaction force moment Mn_act of an arbitrary n-th node, which is a leaf node, is the actual floor reaction force moment of an n-th ground contact portion. Regarding an arbitrary n-th node, which is not a leaf node, the moment from the floor reaction forces of all child nodes thereof acting on the desired n-th node floor reaction force central point (the floor reaction forces of the child nodes here are, strictly speaking, the floor reaction forces acting on the desired floor reaction force central points of the child nodes) is referred to as an actual n-th node floor reaction force moment Mn_act. As in expression 14 and expression 15, an actual n-th node floor reaction force moment has a definition that includes the actual floor reaction force moments of child nodes and a definition that does not include them; however, either of the definitions may be used. Especially when the responsiveness of feedback control for controlling the horizontal components of the actual floor reaction force moments of child nodes is high, the horizontal components of the actual floor reaction force moments of the child nodes immediately converge to zero, so that the behavior of the control of the actual floor reaction force of an n-th node does not change much when either of the definitions is used.

Expression 16 shown below is a general expression for calculating an actual n-th node floor reaction force moment corresponding to expression 14, and expression 17 is a general expression for calculating an actual n-th node floor reaction force moment corresponding to expression 15. However, in expression 16 and expression 17, Qn_Qm is a vector whose start point is Qn and end point is Qm. An actual floor reaction force moment Mm_act of an m-th node, which is a leaf node, is an actual floor reaction force moment of each ground contact portion detected by an actual floor reaction force detector.

If m∈ {set of numbers of child nodes of n-th node}, then $$Mn\_act = \Sigma(Qn\_Qm * Fm\_act) \qquad \text{Expression 16}$$

If m∈ {set of numbers of leaf nodes, which are descendants of n-th node}, then $$Mn\_act = \Sigma(Qn\_Qm * Fm\_act + Mm\_act) \qquad \text{Expression 17}$$

Σ in expressions 16 and 17 means the total sum regarding m. Supplementally, in the first reference example, the actual floor reaction force moment about the desired floor reaction force central point of a leaf node (each ground contact portion) becomes zero; therefore, the right side of the above expression 15 does not include a component of Mm_act of expression 17. In a robot in which the postures of ground contact portions can be controlled, Mm_act of expression 17 generally does not become zero.

The 1423rd node compensating angle θ1423 may generally be determined by feedback control law or the like such that the difference between M1423act determined as described above and the 1423rd node compensating floor reaction force moment M1423dmd previously determined by the compensating total floor reaction force moment distributor 114a (M1423act−M1423dmd) approximates zero. For example, θ1423 may be determined by, for example, multiplying the difference by a predetermined gain matrix (tertiary diagonal matrix).

However, in the present reference example, the 1423rd node compensating angle θ1423 about the axis in the direction of the aforesaid vector V1423 may be determined, so that θ1423 may be determined on the basis of the difference between a component M1423actv in the direction of the vector V1423 of M1423act and a component M1423dmdv in the direction of the vector V1423 of M1423dmd. And, at this time, in the present reference example, M1423actv and M1423dmdv are passed through a filter before determining θ1423 on the basis of the difference therebetween in order to enhance the responsiveness and stability of the control of floor reaction forces.

Specifically, the component M1423actv of M1423act in the direction of the vector V1423 determined as described above is extracted. This is obtained by the following expression 18 using a scalar product calculation "·" of a vector.

$$M1423actv = M1423act \cdot V1423 \qquad \text{Expression 18}$$

Figure 19:
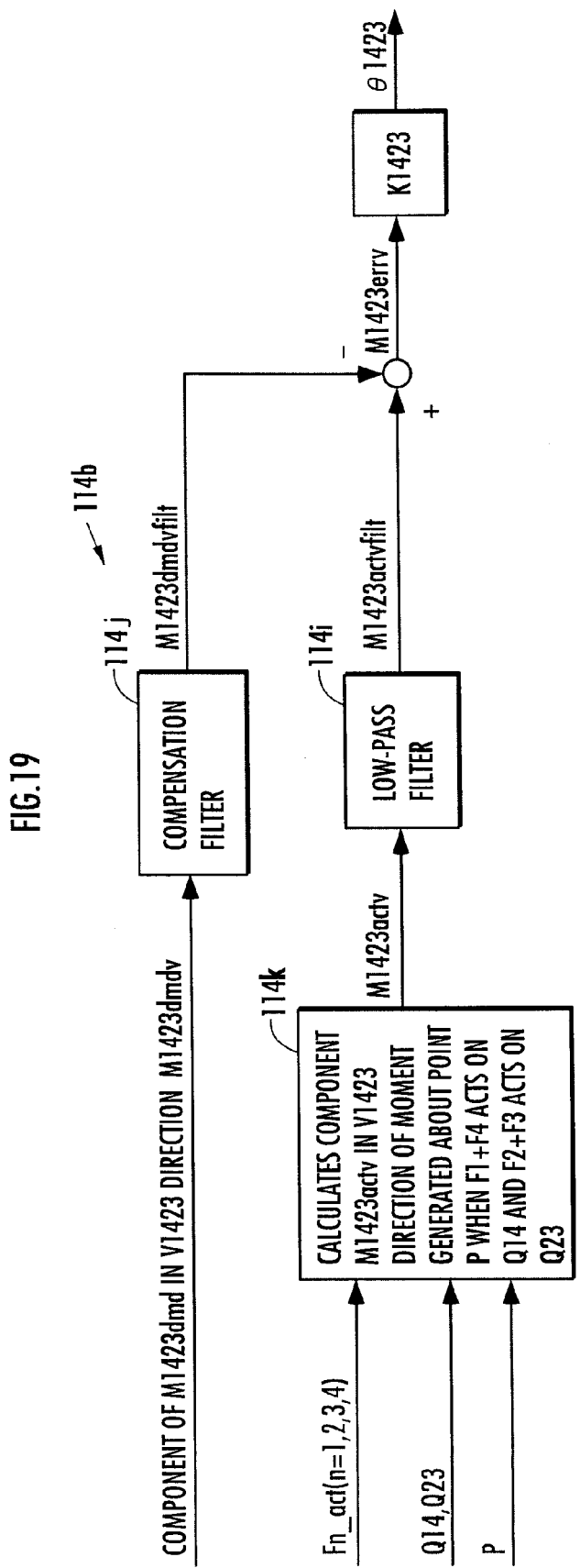

The processing for calculating M1423actv as described above is executed by a calculator indicated by a reference numeral 114k in FIG. 19.

Next, the aforesaid M1423actv is passed through a low-pass filter 114i to obtain M1423actvfilt. Furthermore, the component M1423dmdv of the aforesaid 1423rd node compensating floor reaction force moment M1423dmd in the V1423 direction is passed through a compensating filter 114j to obtain M1423dmdvfilt. Incidentally, M1423dmdv is determined by the scalar product calculation of M1423dmd and V1423, as with the aforesaid expression 18. Then, the result obtained by subtracting M1423dmdvfilt from M1423actvfilt provides a component M1423errv in the direction of an error moment V1423.

The aforesaid compensating filter 114j improves the frequency response characteristic of transfer functions from M1423dmdv to an actual total floor reaction force moment in a control system.

Lastly, the aforesaid 1423rd node compensating angle θ1423 is obtained by the calculation of the feedback control law (proportional control law in this case) of the following expression 19. Here, K1423 denotes a control gain, and it is normally set to a positive value.

$$\theta 1423 = K1423 * M1423errv \qquad \text{Expression 19}$$

This means that the component M1423errv in the direction of the error moment V1423 is multiplied by the control gain K1423 to obtain the 1423rd node compensating angle θ1423.

The processing of the compensating angle determiner (θ14 determiner) 114c in FIG. 17 will now be explained with reference to FIG. 20. If the translational force component F1act of the actual first node floor reaction force (the actual floor reaction force of the first ground contact portion 10) acts on a desired first node floor reaction force central point Q1 and the translational force component F4act of the actual fourth node floor reaction force (the actual floor reaction force of the fourth ground contact portion 10) acts on a desired fourth node floor reaction force central point Q4, then a moment M14act generated about the desired 14th node floor reaction force central point Q14 by the above translational force components is determined according to the aforesaid expression 16, which is a general expression.

More specifically, it is determined according to the following expression 20.

$$M14act = Q14\_Q1 * F1act + Q14\_Q4 * F4act \qquad \text{Expression 20}$$

where Q14_Q1 denotes a vector whose start point is Q14 and end point is Q1, and Q14_Q4 denotes a vector whose start point is Q14 and end point is Q4.

In actuality, for the reason described previously, there will be hardly a problem if the following expression 21 (expression substantiating the above expression 17) is used in place of expression 20.

$$M14act = Q14\_Q1 * F1act + Q14\_Q4 * F4act + M1act + M4act \quad \text{Expression 21}$$

where M1act denotes an actual first node floor reaction force moment and M4act denotes an actual fourth node floor reaction force moment. In the first reference example, the distal portions of the legs #1 to #4 are provided with free joints (spherical joints 12), so that M1act and M4act are zero.

Expression 21 is an expression for calculating the moment acting about the desired 14th node floor reaction force central point generated by the resultant force of the actual floor reaction forces of all leaf nodes of the 14th node. Incidentally, expression 20 subtracts the actual first node floor reaction force moment and the actual fourth node floor reaction force moment from the moment acting about the desired 14th floor reaction force central point generated by the resultant force of the actual floor reaction forces of all leaf nodes of the 14th node.

The 14th node compensating angle θ14 may be generally determined by the feedback control law or the like such that the difference between M14act determined as described above and the 14th node compensating floor reaction force moment M1423dmd previously determined by the compensating total floor reaction force moment distributor 114a (M14act−M14dmd) approximates zero.

In the present reference example, however, for the same reason as that in the case of θ1423, θ14 is determined on the basis of the difference between the component M14actv of M14act in the aforesaid direction of the vector V14 and the component M14dmdv of M14dmd in the direction of the vector V14, which have been respectively passed through a filter.

More specifically, the component M14actv of M14act in the direction of the vector V14 determined as described above is extracted. This is obtained by expression 22 given below that uses the scalar product calculation of vectors.

$$M14actv = M14act \cdot V14 \quad \text{Expression 22}$$

Figure 20:
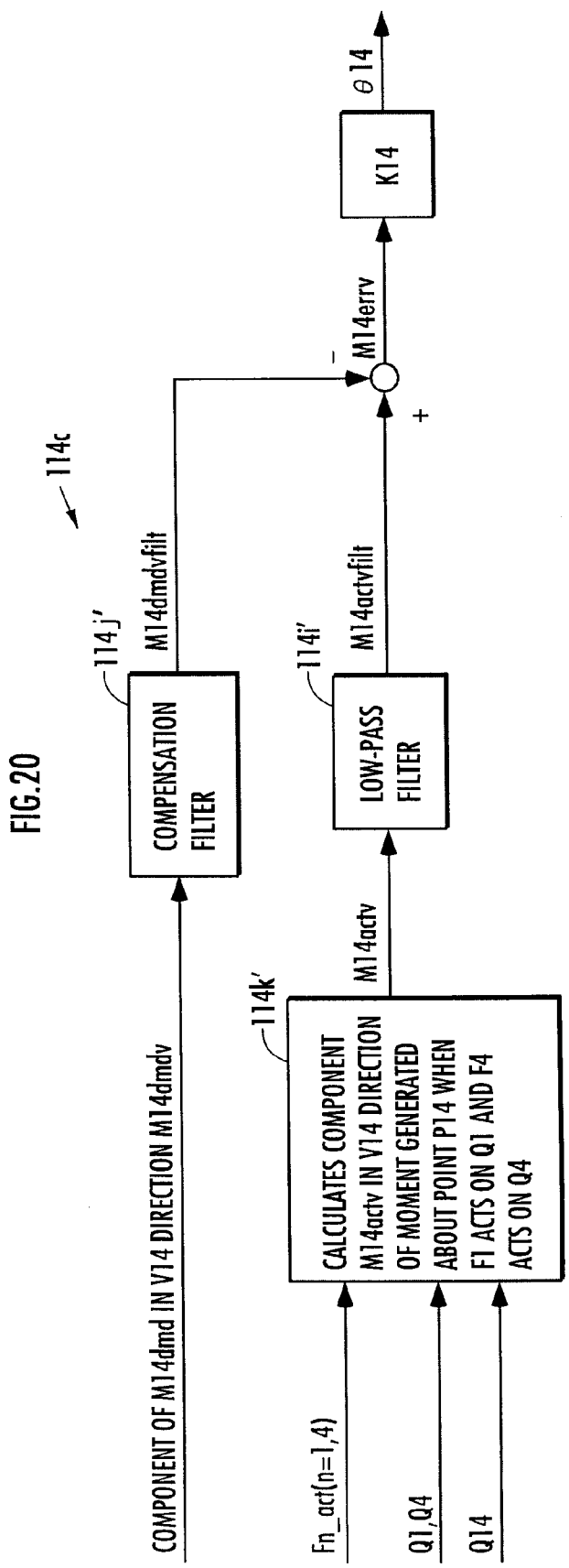

The processing for calculating M14actv as described above is carried out by a calculator indicated by a reference character 114k' in FIG. 20.

Next, the aforesaid M14actv is passed through a low-pass filter 114i' to obtain M14actvfilt. Further, the component M14dmdv of the aforesaid 14th node compensating floor reaction force moment M14dmd in the direction of V14 is passed through a compensating filter 114j' to obtain M14dmdvfilt. Incidentally, M14dmdv is determined by the scalar product calculation of M14dmd and V14. Then, M14dmdvfilt is subtracted from M14actvfilt to obtain a component M14errv in the direction of an error moment V14. Incidentally, the compensating filter 114j' improves the frequency response characteristics of transfer functions from M14dmdv to actual total floor reaction force moments in a control system.

Lastly, the aforesaid 14th node compensating angle θ14 is obtained by the calculation of the feedback control law (proportional control law in this case) of expression 23 given below. Here, K14 denotes a control gain, which is normally set to a positive value.

$$\theta 14 = K14 * M14errv \quad \text{Expression 23}$$

The processing of the compensating angle determiner (θ23 determiner) 114d in FIG. 17 is the same as the processing of the 14th node compensating angle θ14 determiner 114c; therefore, detailed explanation thereof will be omitted here. The following provides an overview of the processing. A component M23actv of a moment M23act in the direction of a vector V23, the moment being generated about a desired 23rd node floor reaction force central point Q23 by the actual floor reaction forces of the child nodes of a 23rd node, is calculated on the basis of the aforesaid expression 16 or 17. Then, the 23rd node compensating angle θ23 is calculated by the arithmetic processing of the feedback control law (proportional control law) from a component M23errv in the direction of the error moment V23 obtained by subtracting M23actvfilt, which is obtained by passing the above M23actv through a low-pass filter, from M23dmdvfilt obtained by passing the component M23dmdv of the aforesaid 23rd node compensating floor reaction force moment M23dmd in the direction of V23 through a compensating filter.

The processing of the compensating angle determiners 114b to 114d determines the sets of the node compensating angles θ1423, θ14, and θ23 such that the horizontal components of the actual moments Mact acting on the desired total floor reaction force central points P approximate the compensating total floor reaction force moment Mdmd. In the present reference example, θ1423 has been determined by the aforesaid expression 19; alternatively, however, it may be determined on the basis of the difference between M1423act+M14act+M23act (the total sum of actual node floor reaction force moments) and M1423dmd or the difference between the total sum of actual node floor reaction force moments and M1423dmd, which have been respectively passed through a filter, in place of M1423err of the right side of expression 19.

Supplementally, in the present reference example, a node compensating floor reaction force moment has been determined without changing the desired node floor reaction force central point Qn of each node, the Qn being the point of action. Then, the difference between the node floor reaction force compensating moment (more precisely, the resultant force of the node compensating floor reaction force moment and the moment component of the desired node floor reaction force having Qn as its point of action) and an actual node floor reaction force moment having Qn as its point of action has been used as a control amount to determine a node compensating angle such that the control amount approximates zero. Instead of determining the node compensating angles as described above, the node compensating angles θ1423, θ14 and θ23 may be determined as follows. On each n-th node (n=14, 23, 1423) having child nodes, a floor reaction force central point that causes the horizontal component of the moment of the actual node floor reaction force of the n-th node (the resultant force of the actual node floor reaction forces of all child nodes of the n-th node) to become zero is determined as an actual n-th node floor reaction force central point. Alternatively, a floor reaction force central point that causes the horizontal component of a moment, which is obtained by subtracting the moment acting on the desired node floor reaction force central point of each child node due to the actual node floor reaction force of the child node from the moment of the actual node floor reaction force of an n-th node (n=14, 23, 1423), to become zero is determined as an actual n-th node floor reaction force central point. For example, the actual 14th node floor reaction force central point related to the 14th node is determined as a point obtained by shifting, on the segment Q1Q4, the desired 14th node floor reaction force central point by the value obtained by dividing the horizontal component of M14act determined by the aforesaid expression 16 or 17 by the vertical component of the resultant force of F1act and F4act (the translational force component of an actual 14th node floor reaction force).

The same applies to the node floor reaction force central points of the 23rd node and the 1423rd node. Then, the difference between the desired node floor reaction force central point of an n-th node (n=14, 23, 1423) and the actual n-th node floor reaction force central point determined as described above, or the difference between the values obtained by passing each of the above node floor reaction force central points through a filter is defined as a control amount, and the node compensating angles θ1423, θ14 and θ23 are determined on the basis of the control amount such that the control amount approximates zero (e.g., θ1423, θ14 and θ23 are determined by multiplying the control amount by a certain gain).

The corrected desired ground contact portion position/posture calculator 114g in FIG. 17 obtains corrected desired ground contact portion position/posture by correcting the desired ground contact portion position/posture, which are the desired position and the desired posture of each ground contact portion 10, according to a technique for correcting the desired ground contact portion position/posture of the aforesaid hierarchical compliance operation (the technique explained with reference to FIG. 15 and FIG. 16) on the basis of the 1423rd node compensating angle θ1423, the 14th node compensating angle θ14, and the 23rd node compensating angle θ23. However, in the present reference example, the distal portions of the legs #1 to #4 have free joints (spherical joints 12), and the posture of each ground contact portion 10 cannot be intentionally changed, so that the corrected desired ground contact portion position/posture actually mean the corrected desired ground contact portion position.

Figure 21:
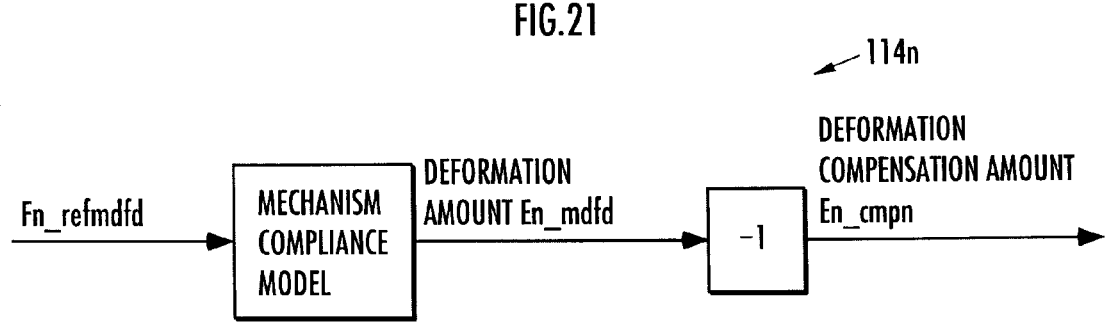

FIG. 21 is a functional block diagram showing the processing of the aforesaid deformation compensation amount calculator 114n in FIG. 17. As shown in FIG. 21, the deformation compensation amount calculator 114n determines deformation amounts En_mdfd (n=1, 2, 3, 4), which are the deformation amounts of the legs #1 to #4 (the deformation amounts of the link mechanisms of the legs and the compliance mechanism 42), the deformation being expected to occur due to the corrected desired ground contact portion floor reaction forces Fn_refmdfd (n=1, 2, 3, 4) of the ground contact portions 10 that are output from the compensating total floor reaction force moment distributor 114a (the desired ground contact portion floor reaction forces that have been corrected by adding the 1423rd node compensating floor reaction force moment M1423dmd, the 14th node compensating floor reaction force moment M14dmd and the 23rd node compensating floor reaction force moment M23dmd to desired ground contact portion floor reaction forces). The deformation amounts En_mdfd (n=1, 2, 3, 4) are determined by using a mechanism compliance model showing the relationship between the forces (or floor reaction forces) acting on the legs and the deformations of the legs. Then, the deformation compensation amount calculator 114n determines deformation compensation amounts En_cmpn (n=1, 2, 3, 4) for canceling the deformation amounts En_mdfd (n=1, 2, 3, 4). The deformation compensation amount En_cmpn is determined by multiplying each deformation amount En_mdfd by (−1).

The corrected desired ground contact portion position/posture with deformation compensation calculator 114h in FIG. 17 adds a further correction to the corrected desired ground contact portion position/posture of each ground contact portion 10 (the position/posture determined by the aforesaid corrected desired ground contact portion position/posture calculator 114g) so as to cancel the calculated deformation amount En_mdfd, thereby obtaining the corrected desired ground contact portion position/posture with deformation compensation of each ground contact portion 10. The corrected desired ground contact portion positions/postures with deformation compensation are determined by adding individually corresponding deformation compensation amounts En_cmpn to the corrected desired ground contact portion position/posture of the ground contact portions 10.

For example, if it is calculated that a corrected desired ground contact portion floor reaction force causes the compliance mechanism 42 or the like of a leg corresponding to a certain ground contact portion 10 to contract by z in the vertical direction, then the corrected desired ground contact portion floor reaction force is corrected so as to lower the desired position of the ground contact portion 10 by z. More specifically, the corrected desired ground contact portion position/posture with deformation compensation is calculated such that the position/posture when the ground contact surface (bottom surface) of the ground contact portion 10 after deformation compensation is deformed under a desired ground contact portion floor reaction force agrees with the desired position/posture of the ground contact surface of the ground contact portion before the deformation compensation. Incidentally, detailed explanation thereof is explained in detail in Japanese Unexamined Patent Application Publication No. H10-277969. In the robot 1 of the present reference example, the postures of the ground contact portions 10 cannot be controlled, so that the corrected desired ground contact portion position/posture with deformation compensation calculator 114h actually corrects the corrected desired ground contact portion positions of the ground contact portions 10.

The deformation compensation described above is implemented by control for canceling in a feed-forward manner the shifts in actual ground contact portion position/posture caused by a deformation of the compliance mechanism 42 or the like. In comparison with a case where no such control is carried out, it is possible to enable the robot 1 to travel in a mode that is further closer to a desired gait.

The above has given the details of the processing of the hierarchical compliance operation determiner 114.

Figure 22:
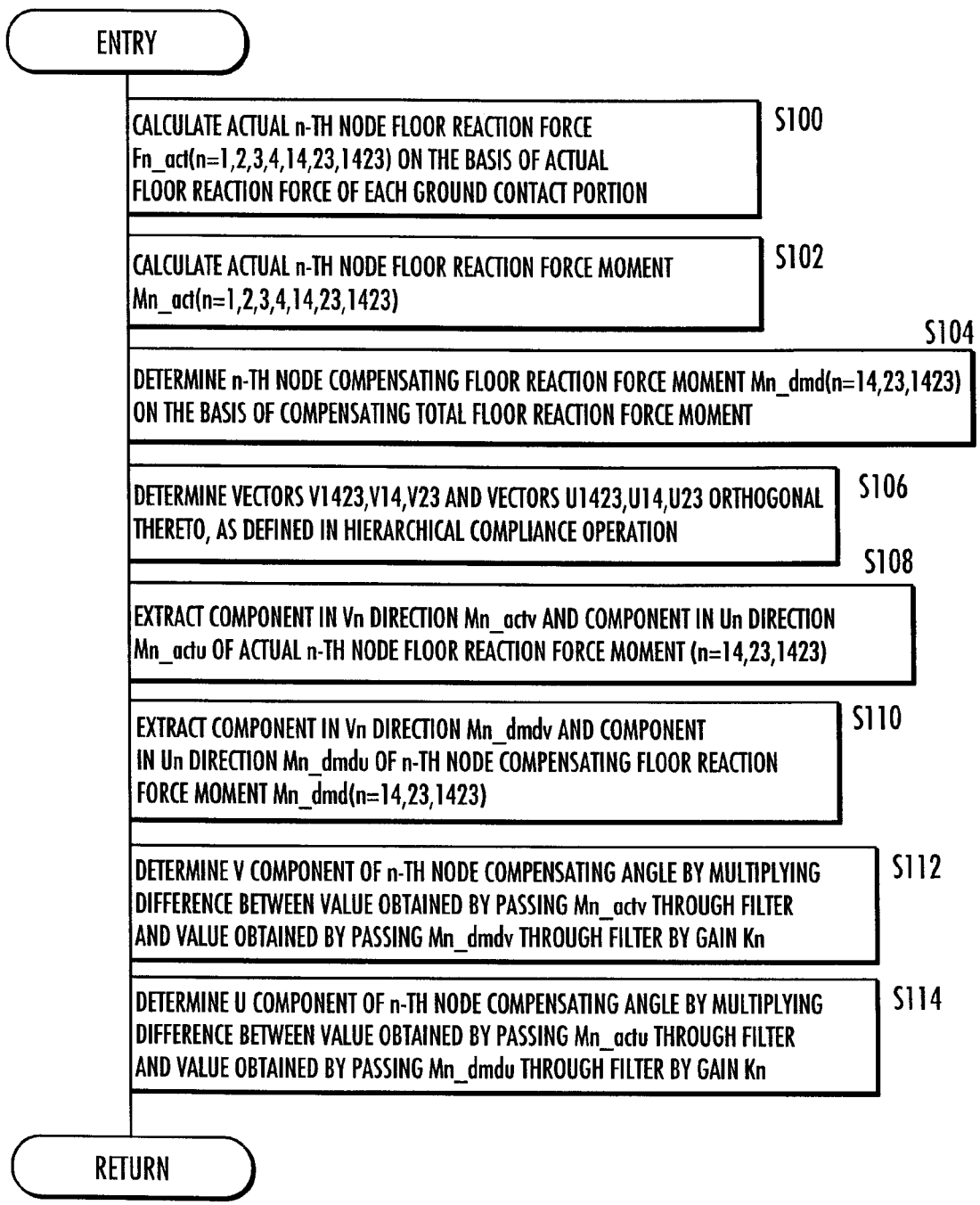
FIG. 22 is a flowchart showing the processing for determining compensating angles.

Based on the above, resuming the explanation of the flowchart in FIG. 9, compensating angles are determined as described above in S34. FIG. 22 is a flowchart showing a generalized subroutine of the processing for determining the compensating angles.

To explain with reference to the figure, first, the translational force components Fn_act (n=1, 2, 3, 4, 14, 23, 1423) of actual n-th node floor reaction forces are calculated on the basis of the actual floor reaction forces of the ground contact portions 10 (the actual floor reaction forces obtained by the aforesaid actual floor reaction force detector 108). In this case, the translational force components Fn_act (n=1, 2, 3, 4) of the actual node floor reaction forces of the leaf nodes are the translational force components of the detected values of the actual floor reaction forces of the ground contact portions 10 by the aforesaid actual floor reaction force detector 108. Further, the translational force component Fn_act (n=14, 23, 1423) of the actual node floor reaction force of a node that is not a leaf node is the translational force component of the resultant force of the actual node floor reaction forces of the child nodes of the node, as described above.

Subsequently, the processing proceeds to S102 to calculate an actual n-th node floor reaction force moment Mn_act (n=1, 2, 3, 4, 14, 23, 1423). In the robot 1 of the first reference example, the actual node floor reaction force moment Mn_act (n=1, 2, 3, 4) of each leaf node is zero. Further, the actual node floor reaction force moment Mn_act (n=14, 23, 1423) of each node that is not a leaf node is calculated on the basis of the aforesaid expression 16 or expression 17 from Fn_act (n=1, 2, 3, 4) obtained in S100 and the desired node floor reaction force central point Qn (n=1, 2, 3, 4, 14, 23, 1423).

Subsequently, the processing proceeds to S104 wherein the n-th node compensating floor reaction force moment Mn_dmd (n=14, 23, 1423) is determined on the basis of the compensating total floor reaction force moment Mdmd determined by the aforesaid posture stabilization control calculator 104. This processing is carried out as described above by the aforesaid compensating total floor reaction force moment distributor 114a.

Subsequently, the processing proceeds to S106 to determine the vectors V1423, V14 and V23, which have been defined in the explanation of the hierarchical compliance operation, and vectors U1423, U14 and U23 orthogonal thereto. In the first reference example, however, the floor reaction force moments in the directions of the vectors U1423, U14 and U23 cannot be generated; therefore, it is unnecessary to determine U1423, U14 and U23.

Supplementally, as in a second reference example to be described hereinafter, if the number of child nodes of an n-th node is 3 or more, then Vn may be taken in any direction as long as it does not suddenly change timewise; hence, the direction of Vn may be appropriately determined by, for example, setting it to the direction of the X axis of a supporting leg coordinate system or the direction of the body of a robot. Further, Un is to be orthogonal to Vn.

Subsequently, the processing proceeds to S108 to extract a component Mn_actv in the Vn direction and a component Mn_actu in the Un direction of an actual n-th node floor reaction force moment Mn_act (n=14, 23, 1423). This may be accomplished by carrying out the scalar product calculation of Mn_act and Vn and Un. Incidentally, if the number of child nodes of an arbitrary n-th node that is not a leaf node is two or less, as in the first reference example, then the component Mn_actu in the Un direction is zero. Hence, it is unnecessary to determine Mn_actu.

Subsequently, the processing proceeds to S110 to extract a component Mn_dmdv in the Vn direction and a component Mn_dmdu in the Un direction of an n-th node compensating floor reaction force moment Mn_dmd (n=14, 23, 1423). This may be accomplished by carrying out the scalar product calculation of Mn_dmd and Vn and Un. Incidentally, if the number of child nodes of an arbitrary n-th node that is not a leaf node is two or less, as in the first reference example, then the component Mn_dmdu in the Un direction of the n-th node compensating floor reaction force moment Mn_dmd is set to zero. Alternatively, it is unnecessary to determine Mn_dmdu.

Subsequently, the processing proceeds to S112 to determine a Vn component of an n-th node compensating angle θn by multiplying the difference between a value obtained by passing Mn_actv through a filter and a value obtained by passing Mn_dmdv through a filter by a gain Kn (more generally, according to the feedback control law from the difference). In the first reference example, this processing is carried out as described above on the 14th node, the 23rd node and the 1423rd node by the aforesaid compensating angle determiners 114b, 114c and 114d.

Subsequently, the processing proceeds to S114 to determine a Un component of an n-th node compensating angle θn by multiplying the difference between a value obtained by passing Mn_actu through a filter and a value obtained by passing Mn_dmdu through a filter by the gain Kn (more generally, according to the feedback control law from the difference). However, if the number of child nodes of an arbitrary n-th node that is not a leaf node is two or less, as in the first reference example, then an n-th node compensating angle U component is set to zero. Alternatively, it is unnecessary to carry out the processing of S114.

The above is the subroutine processing of S34 in FIG. 9. Supplementally, the processing of S106 to S114 may be regarded as the processing for determining an n-th node compensating angle such that the actual n-th node floor reaction force moment acting on a desired n-th node floor reaction force central point converges to an n-th node compensating floor reaction force moment (more precisely, the resultant force of the n-th node compensating floor reaction force moment and the desired node floor reaction force moment acting on the desired n-th node floor reaction force central point).

Subsequently, the processing proceeds to S36 of the flowchart of FIG. 9 to calculate the aforesaid deformation compensation amount. This processing is carried out by the aforesaid deformation compensation amount calculator 114n as described above.

Subsequently, the processing proceeds to S38 to correct desired ground contact portion position/posture on the basis of the compensating angle determined in S34 and to further correct it on the basis of the deformation compensation amount determined in S36, thereby obtaining the corrected desired ground contact portion position/posture with deformation compensation of each ground contact portion 10. In the first reference example, the corrected desired ground contact portion positions of the ground contact portions 10 are determined on the basis of the compensating angles θ1423, θ14 and θ23 as described above (as explained with reference to the aforesaid FIG. 15 and FIG. 16) by the corrected desired ground contact portion position/posture calculator 114g. Then, the determined corrected desired ground contact portion positions are further corrected by the corrected desired ground contact portion position/posture with deformation compensation calculator 114h on the basis of the aforesaid deformation compensation amount En_cmpn(n=1, 2, 3, 4), as described above, thereby obtaining the corrected desired ground contact portion positions with deformation compensations of the ground contact portions 10.

The processing from S32 to S38 in FIG. 9 explained above is the processing of the hierarchical compliance operation determiner 114.

Subsequently, the processing proceeds to S40 to calculate the joint displacement command of the robot 1 from the desired body position/posture and the corrected ground contact portion position/posture with deformation compensation (the corrected ground contact portion position with a deformation compensation in the first reference example). This processing is carried out as described above by the aforesaid robot geometric model 110.

Subsequently, the processing proceeds to S42 to make an actual joint displacement follow the joint displacement command. This follow-up control (servo control) is carried out by the aforesaid displacement controller 112.

Subsequently, the processing proceeds to S44 to update time by Δt (the arithmetic processing cycle of the control system 50) and returns to S14 to repeat the processing described above.

Owing to the hierarchical compliance operation as in the first reference example explained above, the controls of node floor reaction forces hardly interfere with each other, thus allowing the node floor reaction forces to be controlled easily and properly also in a mobile robot having three or more ground contact portions. This restrains control interference and also restrains the actual floor reaction force of each node from deviating from a desirable value or from vibrating. Thus, even if a floor surface has not only an undulation or tilt over a large area thereof but also unexpected changes in the floor configuration, including local projections or depressions or slopes, floor reaction forces acting on a legged mobile robot can be properly controlled without being influenced much by them. Moreover, control for stabilizing the posture of a mobile robot can be easily accomplished and the landing shocks to the mobile robot can be reduced, thus allowing the ground contact properties of the mobile robot to be enhanced and also preventing the mobile robot from slipping or spinning when it travels. Furthermore, the load on the actuators of the mobile robot can be reduced. Hence, the floor reaction forces of ground contact portions can be properly controlled, so that high posture stability can be obtained.

To supplement the advantages contributing to the stabilization of a posture of a robot, when the entire robot inclines from a state in which the robot is walking as expected on an expected floor surface, the relationship between an inclination angle error $\theta berr$ ($\theta berrx$, $\theta berry$) and an increasing amount $\Delta M$ of the moment horizontal component about a desired total floor reaction force central point generated in response thereto is preferably a proportional relationship. If not, it is still preferred that expression 24 given below holds for a certain rotational matrix T and a certain diagonal matrix diag(a,b). Incidentally, T and diag(a,b) are secondary square matrices.

$$T^* \Delta M = \text{diag}(a,b) * T^* \theta berr \qquad \text{Expression 24}$$

If these relationships are not satisfied, then there is a danger in that the inclination angle error $\theta berr$ will not linearly converge to zero when the robot restores its posture from the inclined state, leading to a precession movement. For instance, in a state wherein the body of a robot inclines forward, the force (restoring force) to fall sideways other than the restoring force for returning backward excessively acts, and the inclination angle error $\theta berr$ does not linearly returns to zero. Instead, a restoring force acts toward back sideways and the inclination angle error $\theta berr$ spirally converges to zero.

For the same reason as that described above, in the compliance control, the relationship between a changing rate $d\theta berr/dt$ of the inclination angle error $\theta berr$ of the entire robot and an increasing amount $\Delta M\_d$ of the moment generated in response thereto is also preferably a proportional relationship. If not, it is still preferred that expression 25 given below holds for a certain rotational matrix T and a certain diagonal matrix diag(e,f). Incidentally, T and diag(e,f) are secondary square matrixes.

$$T^* \Delta M\_d = \text{diag}(e,f) * T^* d\theta berr/dt \qquad \text{Expression 25}$$

In general, if compliance control is independently carried out on each leg of a robot, these relationships may not be satisfied and a precession movement may take place. In the hierarchical compliance control shown in the first reference example, the relationships of the aforesaid expressions 24 and 25 can be satisfied, so that the convergence of the posture control of the robot is high and it is possible to prevent oscillation or vibration.

In the aforesaid first reference example, the desired ground contact portion positions have been amended (corrected) so as to rotationally move about node floor reaction force central points without changing the postures of the ground contact portions (without controlling the postures), thereby correcting the relative heights among the ground contact portions 10 from the relative heights among the desired ground contact portion positions. Alternatively, however, only the heights of the ground contact portions 10 may be corrected by moving the desired ground contact portion positions only in the vertical direction. Specifically, a desired ground contact portion position is corrected according to the following procedure.

First, by the following expressions 26 and 27, a vertical position correction amount Z14 of a desired 14th node floor reaction force central point and a vertical position correction amount Z23 of a desired 23rd node floor reaction force central point are determined.

$$Z14 = -PQ14 * \theta1423 \qquad \text{Expression 26}$$

$$Z23 = PQ23 * \theta1423 \qquad \text{Expression 27}$$

Here, the value determined by the aforesaid expression 19 is substituted into $\theta 1423$.

Next, the vertical position correction amounts Zn (n=1, 2, 3, 4) of the desired floor reaction force central points of the ground contact portions (the desired node floor reaction force central points of leaf nodes) are determined according to the following expressions.

$$Z1 = -Q14Q1 * \theta14 + Z14 \qquad \text{Expression 28}$$

$$Z4 = Q14Q4 * \theta14 + Z14 \qquad \text{Expression 29}$$

$$Z2 = -Q23Q2 * \theta23 + Z23 \qquad \text{Expression 30}$$

$$Z3 = Q23Q3 * \theta23 + Z23 \qquad \text{Expression 31}$$

Here, the value determined by the aforesaid expression 23 is substituted into $\theta 14$, and the value determined in the same manner as that for $\theta 14$ is substituted into $\theta 23$.

The corrected desired ground contact portion positions are obtained by adding Z1, Z2, Z3 and Z4 determined as described above to the desired ground contact portion positions in the vertical direction.

Figure 23:
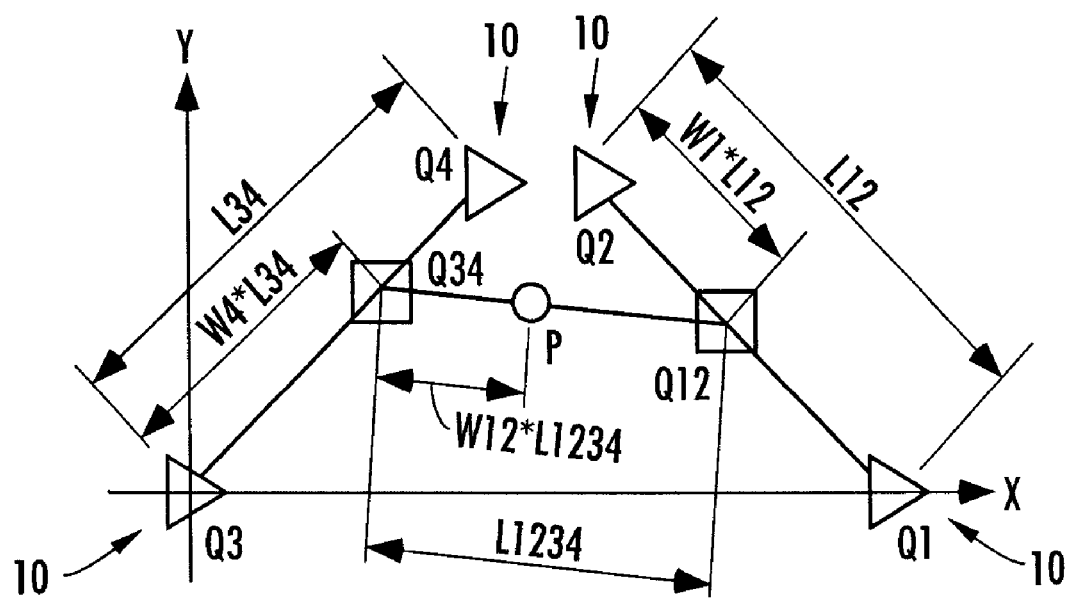
FIG. 23 is a diagram for explaining another example of a hierarchical structure related to the robot of the first reference example.

Further, in the aforesaid first reference example, the ground contact portions 10 have been hierarchized as shown in the aforesaid FIG. 6; however, the hierarchical structure does not necessarily have to be decided in advance to be one hierarchical structure. For example, the hierarchical structure may be changed according to the travel mode (the motion mode of legs when traveling) of the robot 1, such as trotting or galloping. For instance, the ground contact portions 10 may be hierarchized as shown in FIG. 23. FIG. 23 illustrates, as in the aforesaid FIG. 3(b), an example wherein the pair of the first ground contact portion 10 and the second ground contact portion 10 is defined as a 12th node and the pair of the third ground contact portion 10 and the fourth ground contact portion 10 is defined as a 34th node in a period during which all legs #1 to #4 of the robot 1 are all supporting legs. In this example, the desired node floor reaction force central points Qn (n=1, 2, 3, 4, 12, 34, 1234) of the nodes are set as illustrated. With this arrangement, the aforesaid compliance operation and the estimation of a floor configuration, which will be discussed later, can be performed more accurately in some cases.

SECOND REFERENCE EXAMPLE

The following will explain a second reference example of the present invention with reference to the aforesaid FIG. 1 and FIG. 24 to FIG. 34. Referring to FIG. 1, the explanation will be focused on the aspects of a robot 1 of the second reference example that are different from the robot of the first reference example. The robot 1 of the second reference example is provided with, in addition to the first to the fourth legs #1 to #4, a fifth leg #5 and a sixth leg #6 having the same structures as those of the legs #1 to #4. This means that the robot 1 of the second reference example is a six-legged robot.

The fifth leg #5 is behind the third leg #3 and extended from the right side of the body 24 of the robot 1, and the sixth leg #6 is behind the fourth leg #4 and extended from the left side of the body 24 of the robot 1. The rest of the mechanical structure of the robot 1 is the same as that of the first reference example, so that the like reference numerals as those of the first reference example will be assigned and the explanation thereof will be omitted.

The basic concept of the technique of the hierarchical compliance control of the robot 1 (six-legged robot) of the second reference example is the same as that of the first reference example. However, the hierarchical compliance control of the second reference example differs from that of the first reference example in that there is a node having three child nodes and control processing is expanded to handle them.

The following will explain the control processing of the robot 1 of the second reference example, focusing mainly on the different aspects. Regarding the reference numerals and terms used in the explanation of the second reference example, the same reference numerals and terms as those in the first reference example will be used for those that have the meanings equivalent to those in the first reference example, and detailed explanation thereof will be omitted.

Figure 24:
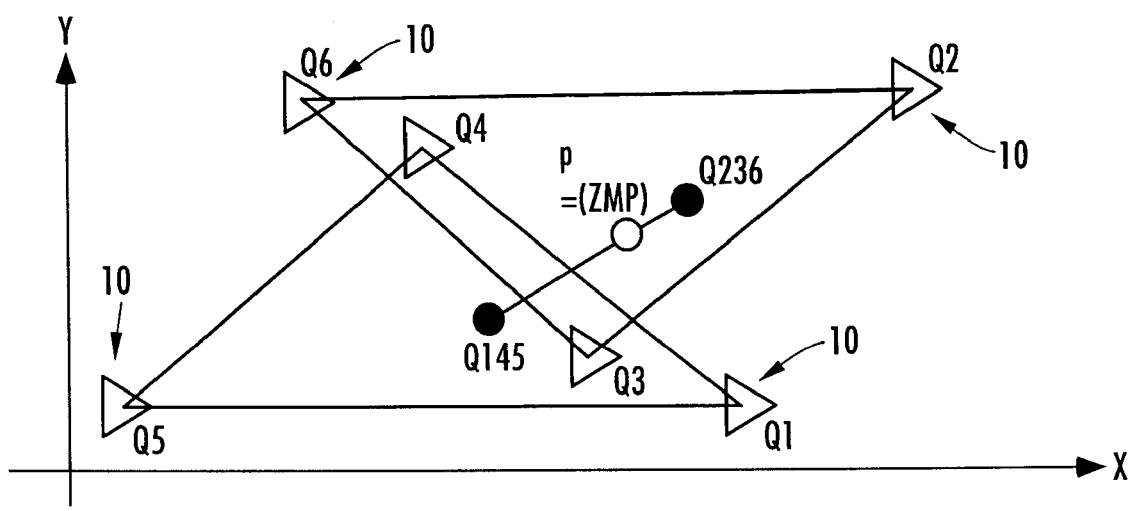
FIG. 24 is a diagram for explaining the hierarchical structure of a robot (six-legged robot) of a second reference example.

FIG. 24 is a diagram for explaining the hierarchical structure in the second reference example, and it is a diagram corresponding to FIG. 3(b) in the first reference example. As shown in FIG. 24, in the second reference example, the six individual ground contact portions 10 are defined as leaf nodes (the first to the sixth nodes), and the set of all the six ground contact portions 10 is defined as a root node (the 145236th node). In addition, the set of the first, the fourth, and the fifth ground contact portions 10, which are the ground contact portions of the first leg #1, the fourth leg #4, and the fifth leg #5, is defined as a 145th node, and the set of the second, the third, and the sixth ground contact portions 10, which are the ground contact portions of the second leg #2, the third leg #3, and the sixth leg #6, is defined as a 236th node. In other words, the 145th node is an intermediate node having the first, the fourth, and the fifth nodes (three leaf nodes) as child nodes, and the 236th node is an intermediate node having the second, the third, and the sixth node (three leaf nodes) as child nodes.

In the second reference example, for example, the set of the three ground contact portions 10 of the 145th node and the set of the three ground contact portions 10 of the 236th node are alternately lifted and landed to move the robot 1. FIG. 24 shows the state wherein both sets are landed (the state wherein both sets are supporting legs). The triangles with the reference marks Qn (n=1, 2, 3, 4, 5, 6) in the figure correspond to the positions of the ground contact portions 10.

Incidentally, Qn (n=1, 2, 3, 4, 5, 6) denotes the desired floor reaction force central point (desired node floor reaction force central point) of each of the first to the sixth ground contact portions 10, which are leaf nodes, Q145 and Q236 denote the desired floor reaction force central points (=desired node floor reaction force central points) of the 145th node and the 236th node, respectively, and P denotes the desired total floor reaction force central point(=desired ZMP) as the desired floor reaction force central point (desired node floor reaction force central point) Q145236 of the root node (the 145236th node). As with the first reference example, Qn (n=1, 2, 3, 4, 5, 6) agrees with the central point of each corresponding ground contact portion 10.

The overall functional construction of a control system 50 in the second reference example is the same as that shown in FIG. 2 explained in conjunction with the aforesaid first reference example.

In this case, a gait generating device 100 in the second reference example determines and outputs desired motion trajectories (a desired ground contact portion trajectory and a desired body position/posture trajectory) of the robot 1 and desired floor reaction force trajectories (a desired total floor reaction force central point trajectory and a desired total floor reaction force trajectory), as with that in the first reference example. In the second reference example, however, the desired ground contact portion trajectory is the trajectory of the desired ground contact portion position of each of the six ground contact portions 10. If the ground contact portions are provided such that their postures are controllable, then the trajectory of desired ground contact portion postures is also included in the desired ground contact portion trajectory. Further, the desired total floor reaction force central point trajectories are determined such that they continuously move while existing in a range in which ZMPs may exist at positions not excessively close to a boundary of the range (e.g., at an approximately central position of the range wherein a ZMP may exist) according to the motion modes of the legs #1 to #6 (especially the positions at which supporting legs are expected to land) in the second reference example.

A desired floor reaction force distributor 102 in the second reference example determines desired node floor reaction force central points, the weights of nodes, and desired node floor reaction forces such that the following conditions A') to G') are satisfied, as with the first reference example.

A') The desired node floor reaction force central point Qn (n=1, 2, 3, 4, 5, 6) of each leaf node agrees with the central point of the ground contact portion 10 corresponding to the leaf node. More generally, Qn (n=1, 2, 3, 4, 5, 6) is determined according to a desired gait (a desired motion, such as a desired ground contact portion trajectory). For example, if the desired floor reaction force central point of each ground contact portion 10 is determined by the gait generating device 100, then the desired node floor reaction force central point Qn (n=1, 2, 3, 4, 5, 6) may be determined on the basis of the desired floor reaction force determined by the gait generating device 100.

B') The desired node floor reaction force central point of the root node agrees with a desired total floor reaction force central point P.

C') The desired node floor reaction force central point Qn of an arbitrary n-th node (n=145, 236, 145236) having child nodes will be a weighted average point of the desired node floor reaction force central points of the child nodes of the n-th node. More specifically, a desired node floor reaction force central point Q145 of a 145th node provides the internally dividing point of a triangle having, as its apexes, desired node floor reaction force central points Q1, Q4 and Q5 of the first, the fourth and the fifth nodes, which are the child nodes (leaf nodes) thereof (points on a boundary of the triangle being included), and a desired node floor reaction force central point Q236 of a 236th node provides the internally dividing point of a triangle having, as its apexes, desired node floor reaction force central points Q2, Q3 and Q6 of the second, the third and the sixth nodes, which are the child nodes (leaf nodes) thereof (points on a boundary of the triangle being included). Further, a desired node floor reaction force central point Q145236(=desired total floor reaction force central point P) of a 145236th node (root node) provides an internally dividing point of a segment connecting the desired node floor reaction force central points Q145 and Q236 of the 145th node and the 236th node, which are the child nodes (intermediate nodes) thereof.

D') The desired node floor reaction force Fn of an arbitrary n-th node (n=145, 236, 145236) having child nodes agrees with the sum (resultant force) of the desired node floor reaction forces of all child nodes of the n-th node, and the desired node floor reaction force F145236 of the root node (the 145236th node) agrees with the desired total floor reaction force Ftotalref. Alternatively, the desired node floor reaction force Fn (n=1, 2, 3, 4, 5, 6, 145, 236, 145236) of each node has the relationship of the aforesaid expression 4a or 4b with the weight of each node.

E') The desired node floor reaction force of a leaf node associated with the ground contact portion 10 not in contact with the ground is zero.

F') The desired node floor reaction force central point, the weight, and the desired node floor reaction force of each node (n-th node (n=1, 2, 3, 4, 145, 236, 145236)) continuously change.

G') The weight of a leaf node corresponding to the ground contact portion 10 in a no-contact-with-ground state or the weight of any one of the ancestor nodes of the leaf node is zero.

The weight of the root node has been set to "1" for the sake of convenience, as with the aforesaid first reference example.

The processing of a posture error calculator 103 and a posture stabilization control calculator 104 in the second reference example is the same as that in the first reference example; a compensating total floor reaction force moment Mdmd (Mdmdx, Mdmdy) is determined as explained in the first reference example.

An actual floor reaction force detector 108 in the second reference example detects the actual floor reaction forces acting on the ground contact portions 10 (the six ground contact portions in the present reference example) from the outputs of six-axis force sensors 34 provided on the legs #1 to #6 and converts them into actual floor reaction forces represented by a supporting leg coordinate system (the global coordinate system shown in FIG. 1, which is fixed to a floor), as that in the first reference example.

Primarily on the basis of the final desired trajectories of ground contact portion positions and desired body position/posture, a robot geometric model (inverse kinematics calculator) 110 in the second reference example calculates joint displacement commands of the robot 1 that satisfy them by inverse kinematics calculation, as that in the first reference example.

Further, a displacement controller 112 in the second reference example controls actuators (not shown) of the joints 14 and 15 of the robot 1 so as to make actual joint displacements follow the aforesaid joint displacement commands, as that in the first reference example.

Further, a hierarchical compliance operation determiner 114 in the second reference example corrects the desired ground contact portion trajectories of the ground contact portions 10 so as to satisfy the aforesaid requirements 1) and 2) as much as possible, as that in the first reference example. The present reference example, however, has intermediate nodes each having three child nodes, so that the specific processing of the hierarchical compliance operation determiner 114 is somewhat more complicated than that in the first reference example. If a robot is constructed such that the postures of the ground contact portions 10 are controllable, then the hierarchical compliance operation determiner 114 should correct the desired ground contact portion trajectories of the ground contact portions 10 to also satisfy the aforesaid requirement 3) as much as possible.

Figure 25:
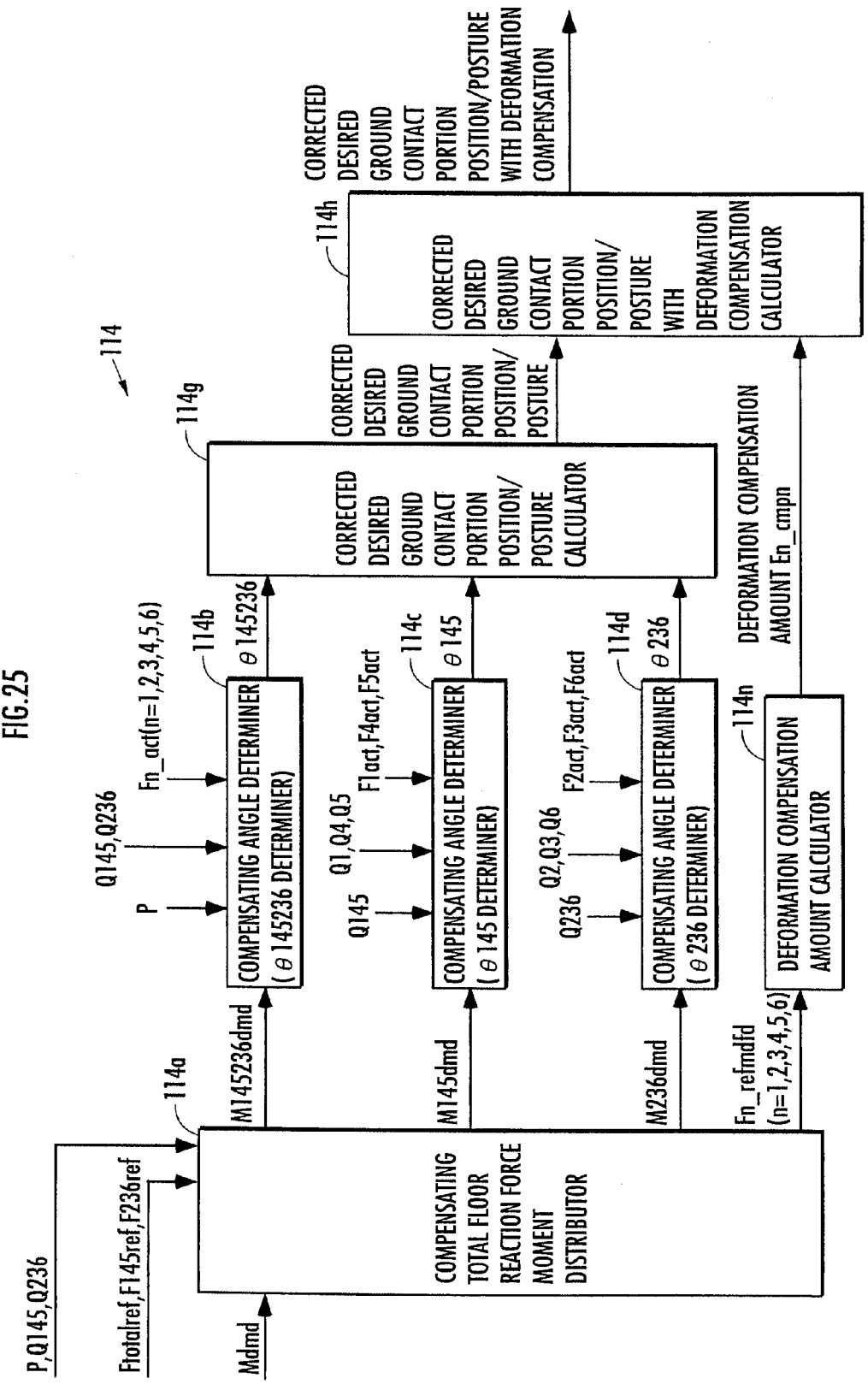
FIG. 25 is a block diagram showing the functional construction of a hierarchical compliance operation determiner in the second reference example.

FIG. 25 is a block diagram showing the functions of the hierarchical compliance operation determiner 114 of the second reference example, and it corresponds to FIG. 17 in the first reference example. Referring to FIG. 25, the hierarchical compliance operation determiner 114 of the second reference example is equipped with, as its components (functional means), a compensating total floor reaction force moment distributor 114a, compensating angle determiners 114b, 114c and 114d, a corrected desired ground contact portion position/posture calculator 114g, a deformation compensation amount calculator 114n, and a corrected desired ground contact portion position/posture with deformation compensation calculator 114h, as with the first reference example. Incidentally, in the second reference example, compensating angles include a 145236th compensating angle $\theta 145236$, a 145th compensating angle $\theta 145$, and a 236th compensating angle $\theta 236$ related to the 145236th node, the 145th node, and the 236th node, respectively, and the compensating angle determiners 114b, 114c and 114d determine $\theta 145236$, $\theta 145$, and $\theta 236$, respectively.

The following will explain the processing of the hierarchical compliance operation determiner 114 in the second reference example, focusing mainly on the aspects different from those of the first reference example.

The hierarchical compliance operation determiner 114 in the second reference example, as that in the first reference example, determines the translational force component and the moment component of the desired node floor reaction force of each node primarily on the basis of an output of the desired floor reaction force distributor 102, and also determines the translational force component and the moment component of the actual node floor reaction force of each node on the basis of an output of the actual floor reaction force detector 108.

Figure 26:
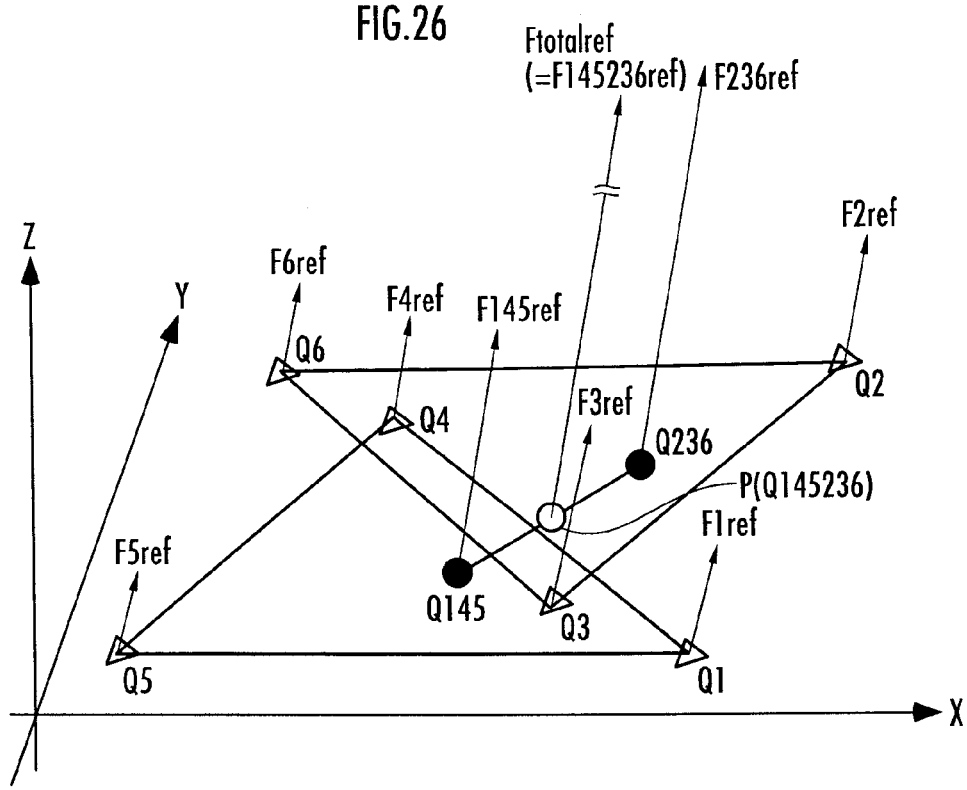
FIG. 26 to FIG. 28 are diagrams respectively illustrating the translational force components of desired node floor reaction forces, the translational force components of actual node floor reaction forces, and actual node floor reaction force moments of the robot (six-legged robot) of the second reference example, FIGS. 29(a) and (b) are diagrams for explaining the technique for setting a node compensating floor reaction force moment in the second reference example.
Figure 27:
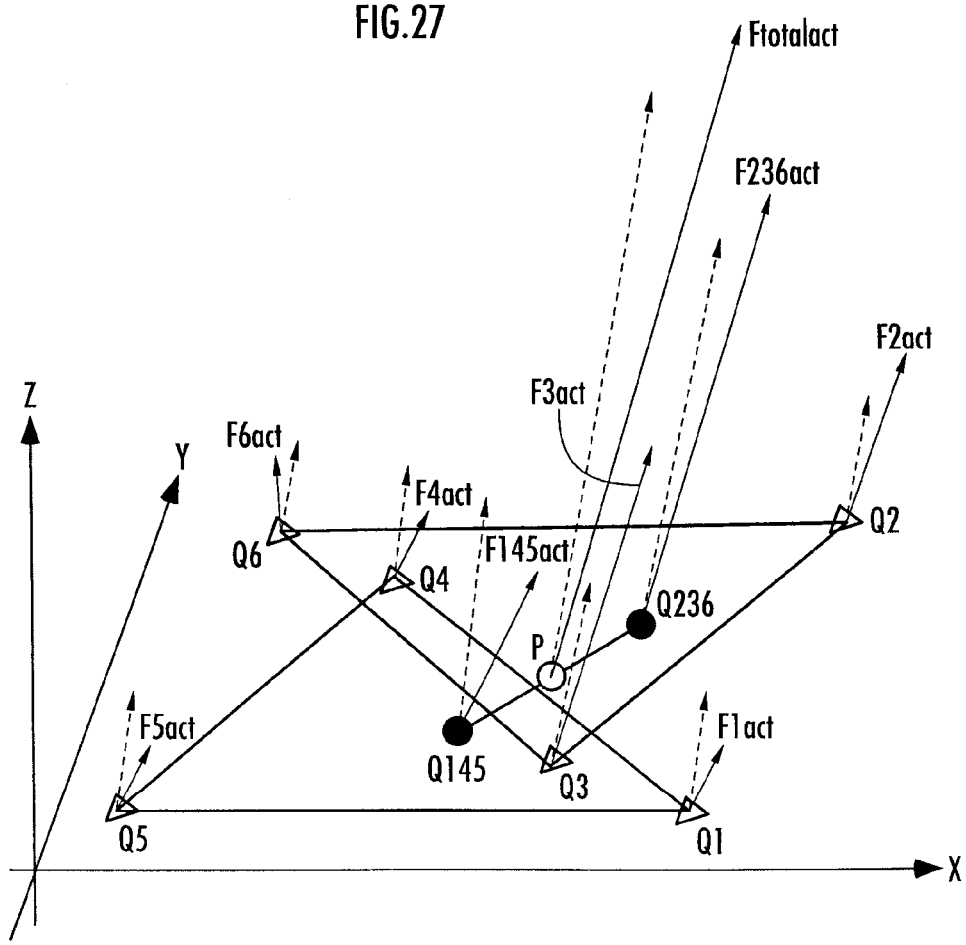
Figure 28:
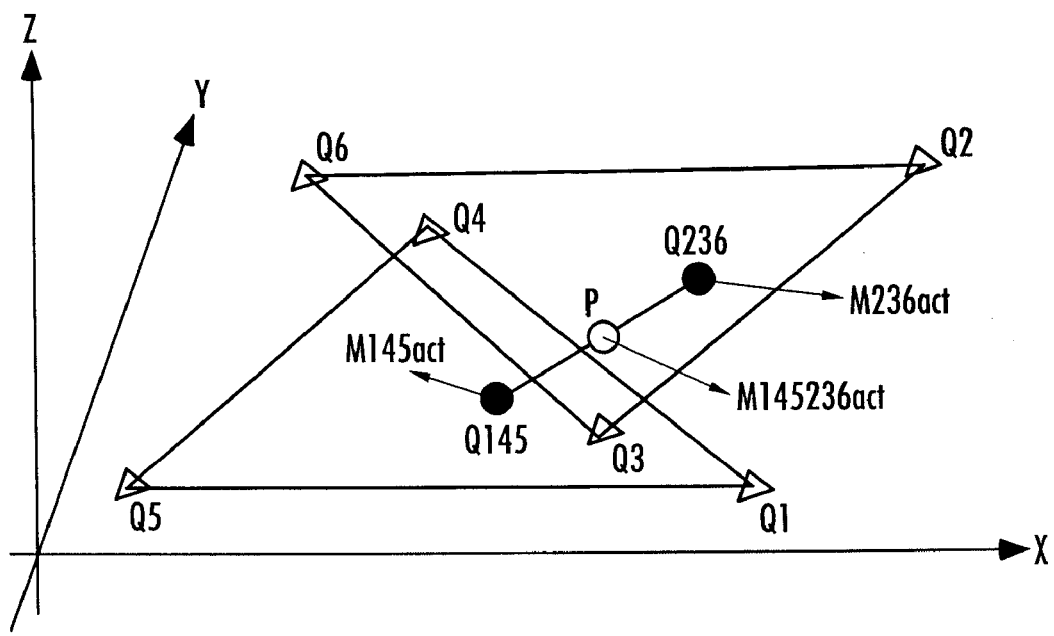

More specifically, referring to FIG. 26, a translational force component Fn_ref (n=1, 2, 3, 4, 5, 6) of the desired node floor reaction force of each leaf node is identical to the translational force component of the desired node floor reaction force determined by the desired floor reaction force distributor 102, and a translational force component F145236ref of the desired node floor reaction force of the root node is identical to a translational force component Ftotalref of the desired total floor reaction force determined by the gait generating device 100. Further, a translational force component Fn_ref (n=145, 236) of a desired node floor reaction force of an intermediate node other than leaf nodes and the root node is determined to be the translational force component of the resultant force of the desired node floor reaction forces of the child nodes of the intermediate node (F145ref=F1ref+F4ref+F5ref, F236ref=F2ref+F3ref+F6ref). In this case, the parent node of the intermediate node is the root node, so that F145ref+F236ref=Ftotalref. Incidentally, FIG. 26 illustrates the translational force component Fn_ref of the desired node floor reaction force of each node in a state wherein all the ground contact portions 10 of the robot 1 in the second reference example are in contact with the ground.

The moment component of the desired node floor reaction force of each node (more precisely, the moment component of the desired node floor reaction force using the desired node floor reaction force central point of the node as its point of action) is always set to zero.

Figure 30:
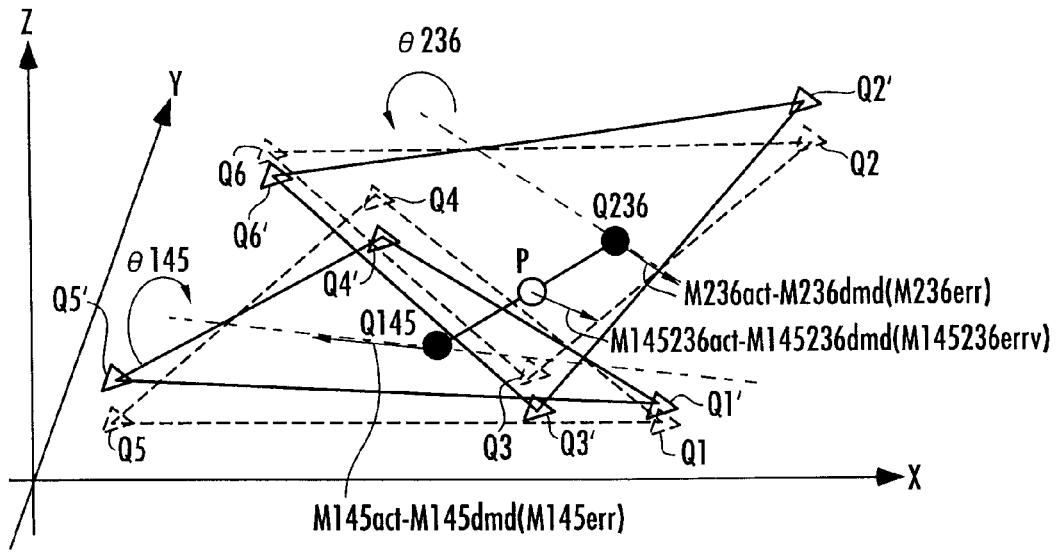
FIG. 30 and FIG. 31 are diagrams for explaining a position correction based on a node compensating angle (compliance operation) in the second reference example.

Referring to FIG. 30, a translational force component Fn_act (n=1, 2, 3, 4, 5, 6) of the actual node floor reaction force of each leaf node is identical to the translational force component of the actual floor reaction force of each ground contact portion 10 detected by the actual floor reaction force detector 108. Further, a translational force component Fn_act (n=145, 236, 145236) of the actual node floor reaction force of each node having child nodes is determined to be the translational force component of the resultant force of the actual node floor reaction forces of the child nodes of the node. Therefore, F145act=F1act+F4act+F5act, F236act=F2act+F3act+F6act, F145236act(=Ftotalact)= F145act+F236act. FIG. 30 illustrates the translational force component $Fn_{13}$ act of the actual node floor reaction force of each node in the state wherein all the ground contact portions 10 of the robot 1 in the second reference example are in contact with the ground.

Figure 31:
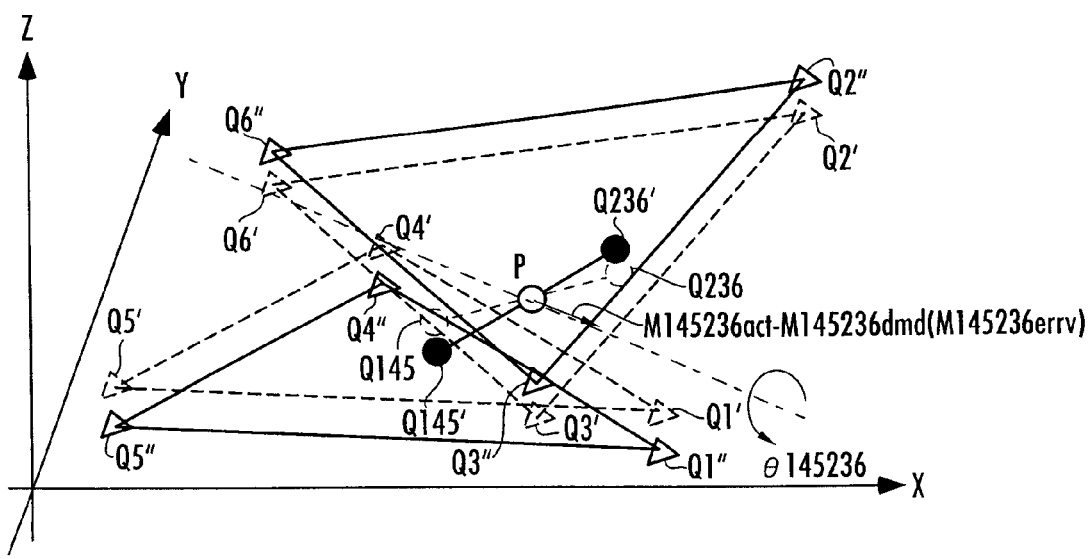

Further, referring to FIG. 31, a moment component of the actual node floor reaction force of each leaf node (a moment component, the point of action of which is the desired node floor reaction force central point of the leaf node) Mn_act (n=1, 2, 3, 4, 5, 6) is basically identical to the moment component of the actual floor reaction force of each ground contact portion 10 detected by the actual floor reaction force detector 108. In the present reference example, however, no actual moment occurs at the central point of each ground contact portion 10, i.e., the desired floor reaction force central point of the ground contact portion 10; therefore, the moment component of the actual node floor reaction force of each leaf node is set to zero. Further, regarding the moment component Mn_act of the actual node floor reaction force of each n-th node (n=145, 236, 145236) that has child nodes, the resultant force of the actual node floor reaction forces of the child nodes of the n-th node is basically determined to be the moment component (this generally does not become zero) acting on the desired node floor reaction force central point of the n-th node.

The compensating total floor reaction force moment distributor 114a in the second reference example distributes the aforesaid compensating total floor reaction force moment Mdmd (Mdmdx, Mdmdy) to a 145236th node compensating floor reaction force moment M145236dmd, a 145th node compensating floor reaction force moment M145dmd, and a 236th node compensating floor reaction force moment M236dmd.

The 145236th node compensating floor reaction force moment M145236dmd is the desired value of the moment to be generated about a desired total floor reaction force central point P (desired ZMP) by the translational force component of the floor reaction force of each ground contact portion 10 generated by manipulating the 145236th compensating angle θ145236 (by rotating the set of the first, the fourth, and the fifth ground contact portions and the set of the second, the third, and the sixth ground contact portions about a desired total floor reaction force central point P(=Q145236) by θ145236).

The 145th node compensating floor reaction force moment M145dmd is the desired value of a moment to be generated about a desired 145th node floor reaction force central point by the translational force components of the floor reaction forces of ground contact portions 10 (specifically, the first, the fourth, and the fifth ground contact portions) generated by manipulating the 145th compensating angle θ145 (by rotating the first, the fourth, and the fifth ground contact portions 10 belonging to the 145th node about a desired 145th node floor reaction force central point Q145 by θ145).

The 236th node compensating floor reaction force moment M236dmd is the desired value of a moment to be generated about the desired 236th node floor reaction force central point by the translational force components of the floor reaction forces of ground contact portions 10 (specifically, the second, the third, and the sixth ground contact portions) generated by manipulating the 236th compensating angle θ236 (by rotating the second, the third, and the sixth ground contact portions 10 belonging to the 236th node about a desired 236th node floor reaction force central point Q236 by θ236).

In the present reference example, as with the first reference example, the posture of the robot 1 about the vertical axis is not controlled (because the component of the compensating total floor reaction force moment Mdmd about the vertical axis is zero), so that M145236dmd, M145dmd, and M236dmd are all moments (horizontal vectors) whose components about the vertical axis are zero, and the compensating angles θ145236, θ145, and θ236 are rotational angles about the horizontal axis. In particular, M145236dmd is the moment about the horizontal axis perpendicular to a segment Q145Q236.

These node compensating floor reaction force moments M145236dmd, M145dmd, and M236dmd are basically determined such that the following conditions 11) and 12) are satisfied.

11) On the 145th node, the 236th node, and the 145236th node, as defined in the aforesaid first reference example, when corrected desired node floor reaction force central points Q145mdfd, Q236mdfd, and Pmdfd (=Q145236mdfd) that satisfy the relational expressions of the following expressions 7a to 9a are introduced, these Q145mdfd, Q236mdfd, and Pmdfd exist in their respective predetermined existence permissible range.

$$M145236dmd = (Pmdfd - P) * Ftotalref \quad \text{Expression 7a}$$

$$M145dmd = (Q145mdfd - Q145) * F145ref \quad \text{Expression 8a}$$

$$M236dmd = (Q236mdfd - Q236) * F236ref \quad \text{Expression 9a}$$

Figure 29A:
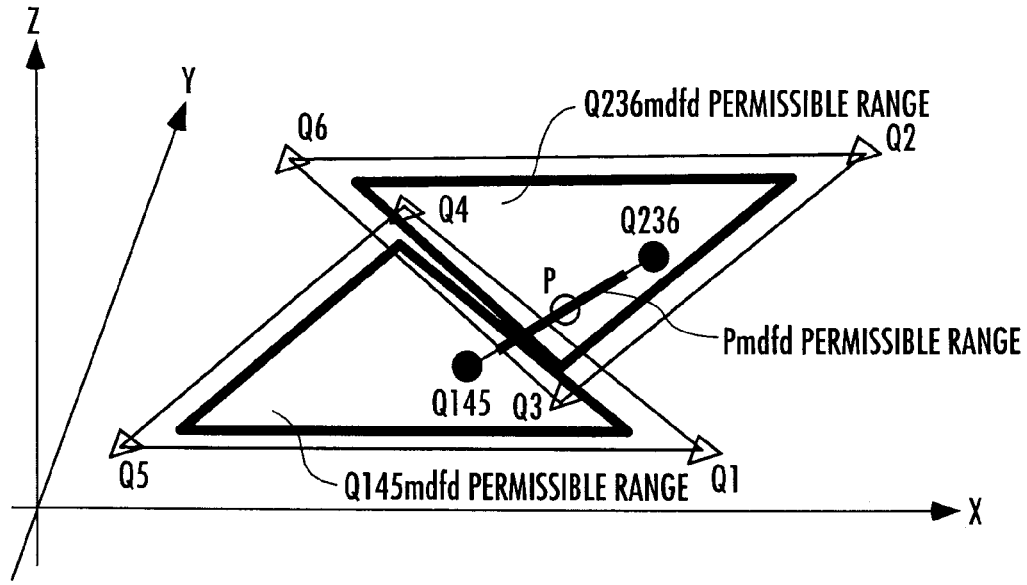
Figure 29B:
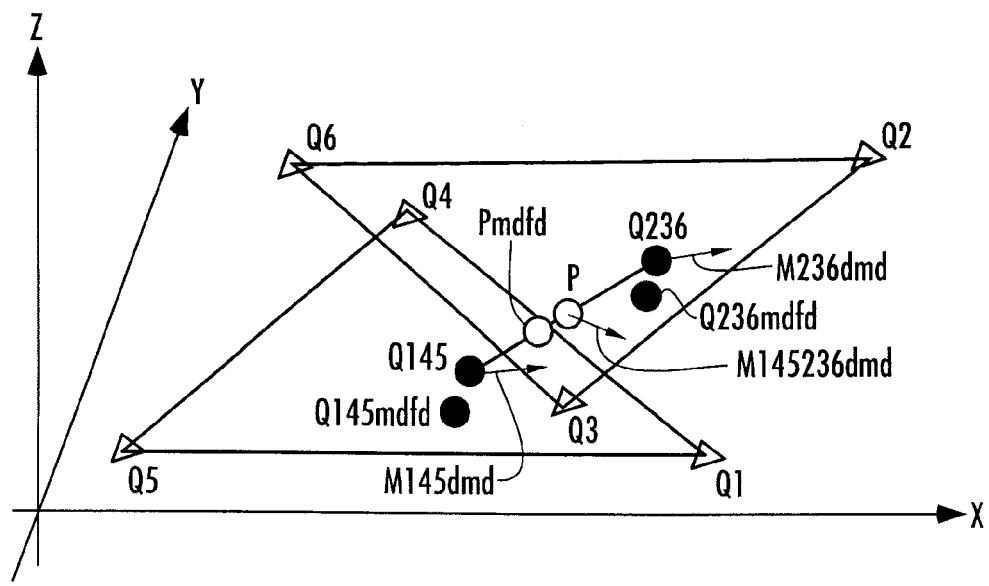

The existence permissible ranges of Q145mdfd, Q236mdfd, and Pmdfd are set, for example, as shown in FIG. 29(a) in a state wherein all the ground contact portions 10 of the robot 1 of the second reference example are in contact with the ground. More specifically, the existence permissible range of Q145mdfd is the region on the triangle in the bold line in the figure (the sides of and the region in the triangle), and this is the region set in the triangle, which has the desired node floor reaction force central points Q1, Q4, and Q5 of the child nodes of the 145th node as its apexes, such that it is not excessively close to the boundary of the triangle Q1Q4Q5. The existence permissible range of Q236mdfd is similar to the above. Further, the existence permissible range of Pmdfd is the region on the segment in bold line in the figure, and this is the region set on a segment Q145Q236 connecting the desired floor reaction force central points Q145 and Q236 of the child nodes of the 145236th node (root node) such that it is not excessively close to the end points of the segment Q145Q236.

12) Mdmd=M145236dmd+M145dmd+M236dmd is substantially satisfied.

Further, in the present reference example, the root node (the 145236th node) has two child nodes, so that M145236dmd is limited to a vector in the same direction as that of a horizontal unit vector (this being denoted by V145236) orthogonal to the segment Q145Q236, as with each node compensating floor reaction force moment in the aforesaid first reference example. Hence, in the present reference example, M145236dmd, M145dmd, and M236dmd are determined such that they satisfy the following condition 13).

13) The component of M145236dmd+M145dmd+M236dmd in the direction of a vector V145236 takes a value close to the component of Mdmd in the direction of the vector V145236 as much as possible.

M145236dmd, M145dmd, and M236dmd satisfying these conditions 11) to 13) are determined, for example, as follows. First, M145236dmd is determined to be the component of Mdmd in the V145236 direction. However, if the corrected desired node floor reaction force central point Pmdfd determined by the aforesaid expression 7a does not fall within its existence permissible range, then M145236dmd is corrected such that Pmdfd becomes a point of a boundary of the existence permissible range. Subsequently, Mdmd145 and Mdmd236 are determined such that the vector obtained by subtracting M145236dmd determined as described above from Mdmd substantially agrees with the sum of Mdmd145 and Mdmd236, and the component of Mdmd145+Mdmd23 in the V145236 direction is close to the V145236 component of Mdmd−Mdmd145236 as much as possible and also satisfies the aforesaid condition 11). In this case, Mdmd145 and Mdmd236 are vectors that are parallel to each other.

Examples of M145236dmd, M145dmd, and M236dmd determined as described above are shown in FIG. 29(b). Supplementally, M145236dmd is the horizontal vector perpendicular to the segment Q145Q236 as described above.

If the posture of the robot 1 about the vertical axis is also controlled, the vertical components of M145236dmd, M145dmd, and M236dmd may be also determined.

Compensating angle determiners 114b to 114d in the second reference example basically determine node compensating angles θ145236, θ145, and θ236 on the basis of the difference between the node compensating floor reaction force moment and the actual node floor reaction force moment (the moment having a desired node floor reaction force central point as the point of action) of each n-th node (n=145236, 145, 236) such that the difference approximates zero. The examples are shown in FIG. 30 and FIG. 31. In this case, in the present reference example, θ145 is the angle of rotation in the same direction as the difference M145act−M145dmd and about an axis that passes the desired 145th node floor reaction force central point Q145, as shown in FIG. 30, and θ236 is the angle of rotation in the same direction as the difference M236act−M236dmd and about an axis that passes the desired 236th node floor reaction force central point Q236, as shown in FIG. 30. Further, θ145236 is the angle of rotation in the same direction as the difference M145236act−M145236dmd (the horizontal direction perpendicular to the segment Q145Q236) and about an axis that passes the desired total floor reaction force central point P, as shown in FIG. 31.

However, in the present reference example also, as with the first reference example, the node compensating angles θ145236, θ145, and θ236 are determined on the basis of the difference between the node compensating floor reaction force moment of an n-th node (n=145236, 145, 236) that has been passed through a filter and the actual node floor reaction force moment thereof that has been passed through a filter.

Figure 32:
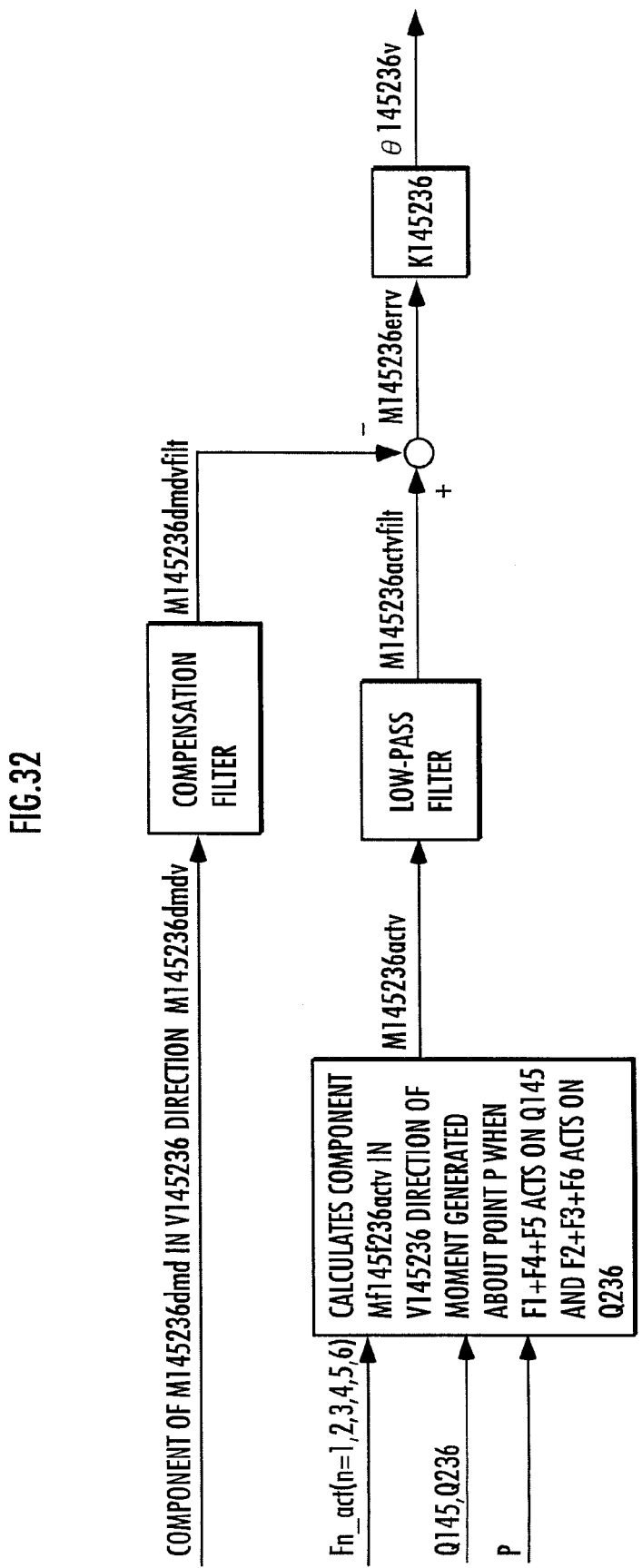
FIG. 32 and FIG. 33 are block diagrams showing the functions of a $\theta145236$ determiner (compensating angle determiner) and a $\theta145$ determiner (compensating angle determiner), respectively, in the second reference example.

FIG. 32 is a block diagram showing the functions of the compensating angle determiner 114b (θ145236 determiner) that determines the node compensating angle θ145236 as described above, and FIG. 33 is a block diagram showing the functions of the compensating angle determiner 114c (θ145 determiner) that determines the node compensating angle θ145 as described above. The processing of the compensating angle determiner 114d (θ236 determiner) is the same as the processing of the θ145 determiner 114b, so that it will neither be explained nor shown.

The compensating angle determiner (θ145236 determiner) 114b first determines the moment M145236act generated about the desired total floor reaction force central point P (the desired 145236th node floor reaction force central point) according to the aforesaid expression 16 or 17 if the translational force component (F1act+F4act+F5act) of the resultant force of actual first, fourth, and fifth node floor reaction forces acts on the desired 145th node floor reaction force central point Q145 and the translational force component (F2act+F3act+F6act) of the resultant force of actual second, third, and sixth node floor reaction forces acts on the desired 236th node floor reaction force central point Q236. Then, a component M145236actv of the determined M145236act in the direction of a vector V145236 is determined by scalar product calculation. Here, the vector V145236 is a horizontal unit vector that is perpendicular to the segment Q145Q236. Regarding the 145236th node, it is unnecessary to determine the component of M145236act in a vector U145236 direction because the positions of the desired floor reaction force central points of the child nodes (the 145th node and the 236th node) cannot be manipulated about the axis in the direction of a horizontal unit vector U145236 perpendicular to V145236.

Subsequently, as with the first reference example, a difference M145236errv(=M145236actvfilt−M145236dmdvfilt) between M145236actvfilt obtained by passing the M145236actv through a low-pass filter and M145236dmdvfilt obtained by passing a component M145236dmdv of the aforesaid 145236th node compensating floor reaction force moment M145236dmd in the direction of a vector V through a compensation filter is multiplied by a predetermined gain K145236 so as to determine the 145236th node compensating angle θ145236.

The compensating angle determiner (θ145 determiner) 114c first calculates a moment M145act generated about the 145th node floor reaction force central point Q145 when translational force components F1act, F4act, and F5act of actual first, fourth, and fifth node floor reaction forces act on desired first, fourth, and fifth node floor reaction force central points Q1, Q4, and Q5, respectively. In this case, M145act to be calculated is formed of components in the directions of vectors V145 and U145, respectively, which are horizontal unit vectors that are orthogonal to each other. The directions of the vectors V145 or U145 may be arbitrary.

Subsequently, a difference M145err(=M145actfilt−M145dmdfilt) between M145actfilt obtained by passing the M145act through a low-pass filter and M145dmdfilt obtained by passing the aforesaid 145th node compensating floor reaction force moment M145dmd (a component in the vector V direction and a component in the vector U direction) through a compensation filter is multiplied by a predetermined gain matrix K145 (diagonal matrix) so as to determine the 145th node compensating angle θ145. θ145 is constructed of an angle component about the axis of the vector V and an angle component about the axis of the vector U.

The processing for determining the 236th node compensating angle θ236 by the compensating angle determiner (θ236 determiner) 114d is carried out in the same manner as the processing of the aforesaid θ145 determiner 114c.

The processing by the compensating angle determiners 114b to 114d explained above determines a set of the node compensating angles θ145236, θ145, and θ236 such that the horizontal component of the actual moment Mact acting on the desired total floor reaction force central point P approximates the compensating total floor reaction force moment Mdmd.

As supplementally explained in conjunction with the first reference example, the node compensating angles θ145236, θ145, and θ236 may be determined as follows. For each n-th node (n=145, 236, 145236) having child nodes, a floor reaction force central point that causes the horizontal component of the moment of the actual node floor reaction force of the n-th node (the resultant force of the actual node floor reaction forces of all child nodes of the n-th node) to be zero is determined as an actual n-th node floor reaction force central point. Alternatively, a floor reaction force central point that causes the horizontal component of the moment, which is obtained by subtracting the moment acting on a desired node floor reaction force central point of each node that is generated by the actual node floor reaction force of the node from the moment of the actual node floor reaction force of an n-th node (n=145, 236, 145236), to be zero is determined as an actual n-th node floor reaction force central point. Then, the difference between the desired node floor reaction force central point of the n-th node (n=145, 236, 145236) and the actual n-th node floor reaction force central point determined as described above, or the difference between the values obtained by passing the node floor reaction force central points through filters, respectively, is defined as a control amount, and the node compensating angles θ145236, θ145, and θ236 are determined on the basis of the control amount (e.g., θ145236, θ145, and θ236 are determined by multiplying the control amount by a certain gain) such that the control amount approximates zero.

A corrected desired ground contact portion position/posture calculator 114g in the second reference example shown in FIG. 25 corrects the desired ground contact portion position/posture (actually the desired ground contact portion position in the robot shown in FIG. 1) of each ground contact portion 10 so as to obtain corrected desired ground contact portion position/posture. More specifically, referring to FIG. 30 and FIG. 31, the desired floor reaction force central points Q1, Q4, and Q5 of the first, the fourth, and the fifth nodes, respectively, which are the child nodes of the 145th node, are rotationally moved by the 145th node compensating angle θ145 (horizontal vector), the desired floor reaction force central point Q145 of the 145th node being the center of rotation. The Q1, Q4, and Q5 after the rotational movement are denoted by Q1', Q4', and Q5', respectively. Thus, the 145th node compensating angle θ145 is the manipulated variable for moving the relative relationship among the positions of the desired floor reaction force central points Q1, Q4, and Q5 of the first, the fourth, and the fifth nodes, which are the child nodes of the 145th node, without moving the position of the desired floor reaction force central point Q145 of the 145th node.

Similarly, the desired floor reaction force central points Q2, Q3, and Q6 of the second, the third, and the sixth nodes, respectively, which are the child nodes of the 236th node, are rotationally moved by the 236th node compensating angle θ236 (horizontal vector), the desired floor reaction force central point Q236 of the 236th node being the center of rotation. The Q2, Q3, and Q6 after the rotational movement are denoted by Q2', Q3', and Q6', respectively. Thus, the 236th node compensating angle θ236 is the manipulated variable for moving the relative relationship among the positions of the desired floor reaction force central points Q2, Q3, and Q6 of the second, the third, and the sixth nodes, which are the child nodes of the 236th node, without moving the position of the desired floor reaction force central point Q236 of the 236th node.

These rotational movements are visually shown in FIG. 30.

Subsequently, the desired floor reaction force central points Q145 and Q236 of the 145th and the 236th nodes, which are the child nodes of the 145236th node, are rotationally moved by the 145236th node compensating angle θ145236 about the axial center in the same direction (horizontal direction orthogonal to a segment Q145Q236) as that of the vector (horizontal vector) of the aforesaid error M145236errv, the desired floor reaction force central point P (desired total floor reaction force central point) of the 145236th node being the center of rotation. The Q145 and Q236 after the rotational movement are denoted by Q145' and Q236', respectively, as shown in FIG. 31. Thus, the 145236th node compensating angle θ145236 is the manipulated variable for moving the relative relationship between the positions of the desired floor reaction force central points Q145 and Q236 of the 145th and the 236th nodes, which are the child nodes of the 145236th node, without moving the position of the desired floor reaction force central point P of the 145236th node (root node).

Next, referring to FIG. 31, the desired node floor reaction force central points Q1', Q4', and Q5' after the previous rotational movement are moved in parallel by a vector Q145_Q145'. This provides final corrected desired node floor reaction force central points Q1", Q4", and Q5" of the first, the fourth, and the fifth nodes. Similarly, the desired node floor reaction force central points Q2', Q3', and Q6' after the previous rotational movement are moved in parallel by a vector Q236_Q236'. This provides final corrected desired node floor reaction force central points Q2", Q3", and Q6" of the second, the third, and the sixth nodes.

Lastly, the desired ground contact portion position of an n-th ground contact portion (n=1, 2, 3, 4, 5, 6) is moved in parallel (moved substantially vertically) by a vector Qn_Qn". This corrects the desired ground contact portion position of each ground contact portion 10 (more precisely, the relative relationship among the desired ground contact portion positions of the ground contact portions 10). More specifically, for each node having child nodes, the manipulated variable (correction amount) of the relative relationship (relative positional relationship) among the desired ground contact portion positions of the ground contact portions 10, which are the descendant nodes of the node, is determined on the basis of the compensating angles θ145, θ236, and θ145236, and the manipulated variables (correction amounts) are combined so as to correct the mutual relative relationship among the desired ground contact portion positions of the ground contact portions 10.

In a robot in which the postures of ground contact portions are controllable and floor reaction force moments can be generated about the desired floor reaction force central points of the ground contact portions, the operation of a foot posture rotation about a desired ground contact portion floor reaction force central point (desired node floor reaction force central point) of each ground contact portion may be performed by the technique shown in Japanese Unexamined Patent Application Publication No. H10-277969 (composite-compliance control). More specifically, as supplementally explained in conjunction with the first reference example, the desired posture of the n-th ground contact portion may be corrected about Q" after the n-th ground contact portion is moved in parallel as described above.

A deformation compensation amount calculator 114n in the second reference example shown in FIG. 25 determines, as with that in the aforesaid first reference example, a deformation compensation amount $En_{13}$ cmpn (n=1, 2, 3, 4, 5, 6) for compensating for an influence caused by the deformation of the compliance mechanism 42 of each of the legs #1 to #6. More specifically, the deformation compensation amount calculator 114n determines a deformation amount En_mdfd (n=1, 2, 3, 4, 5, 6) of the compliance mechanism 42 or the like of each of the legs #1 to #6 that is expected to occur due to a corrected desired ground contact portion floor reaction force Fn_refmdfd (n=1, 2, 3, 4, 5, 6) of each ground contact portion 10 (the desired ground contact portion floor reaction force corrected by adding the node compensating floor reaction force moments M145236dmd, M145dmd, and M236dmd to a desired ground contact portion floor reaction force) output from the compensating total floor reaction force moment distributor 114a in the second reference example by using a mechanism compliance model. This En_mdfd is multiplied by (−1) to determine the deformation compensation amount En_cmpn.

The corrected desired ground contact portion position/posture with deformation compensation calculator 114h in the second reference example shown in FIG. 25 determines, as with that in the first reference example, the corrected desired ground contact portion position/posture with deformation compensation by adding a corresponding deformation compensation amount En_cmpn to the corrected desired ground contact portion position/posture (the position/posture determined by the aforesaid corrected desired ground contact portion position/posture calculator 114g) of each ground contact portion 10.

The above is the detailed explanation of the processing of the hierarchical compliance operation determiner 114 in the present reference example (the second reference example).

The arithmetic processing of the control system 50 other than that explained above is the same as that of the first reference example.

Figure 34:
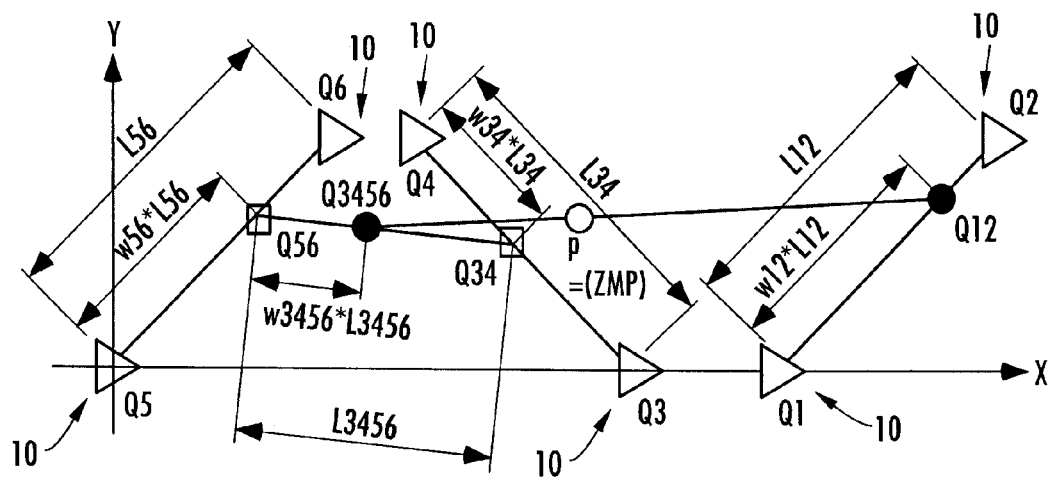
FIG. 34 is a diagram for explaining another example of a hierarchical structure related to the robot of the second reference example.

Incidentally, the hierarchical structure in the second reference example may be altered according to an operation mode (traveling mode) or the like of the robot 1, as in the case of the first reference example. For example, the hierarchical structure may be set as shown in FIG. 34. The example in the figure is equipped with, as intermediate nodes, a 12th node having a first ground contact portion and a second ground contact portion as child nodes (leaf nodes), a 34th node having a third ground contact portion and a fourth ground contact portion as child nodes (leaf nodes), a 56th node having a fifth ground contact portion and a sixth ground contact portion as child nodes (leaf nodes), and a 3456th node having a 56th node and a 34th node as child nodes, the root node having the 3456th node and the 12th node as child nodes. This arrangement makes it possible to perform compliance operations and floor configuration estimations, which will be discussed hereinafter, more accurately in some cases. Incidentally, the meanings of the reference characters in the figure are the same as those shown mainly in the aforesaid FIG. 3(b) or FIG. 24.

THIRD REFERENCE EXAMPLE

An explanation will now be given of a third reference example in which a floor configuration estimating function and a function for correcting the operation of the robot 1 on the basis of the result of the estimation have been added to the robot 1 (six-legged robot) of the second reference example. In the present reference example, the explanation will be focused mainly on the six-legged robot shown in the second reference example; however, supplemental explanation will be added also to a four-legged robot in some cases. In addition, for the convenience of the understanding of the present reference example, a two-legged robot will be also referred to in some cases.

The mechanical construction of the robot 1 in the present reference example is the same as that shown in FIG. 1 explained in the first or the second reference example (except that the robot 1 has six legs #1 to #6). Hence, the explanation of the mechanical construction of the robot 1 will be omitted.

The functional construction of a control system 50 provided in the robot 1 in the present reference example is also the same as that shown in the aforesaid FIG. 2. In the present reference example, however, the hierarchical compliance operation determiner 114 in FIG. 2 has newly added functions, making it different from that in the second reference example. Further, the processing of the components of the control system 50 except for the hierarchical compliance operation determiner 114 is the same as that of the second reference example. Thus, the explanation of the present reference example will be focused mainly on the processing of the hierarchical compliance operation determiner 114, and a detailed explanation of the processing of the control system 50 other than that will be omitted.

Figure 35:
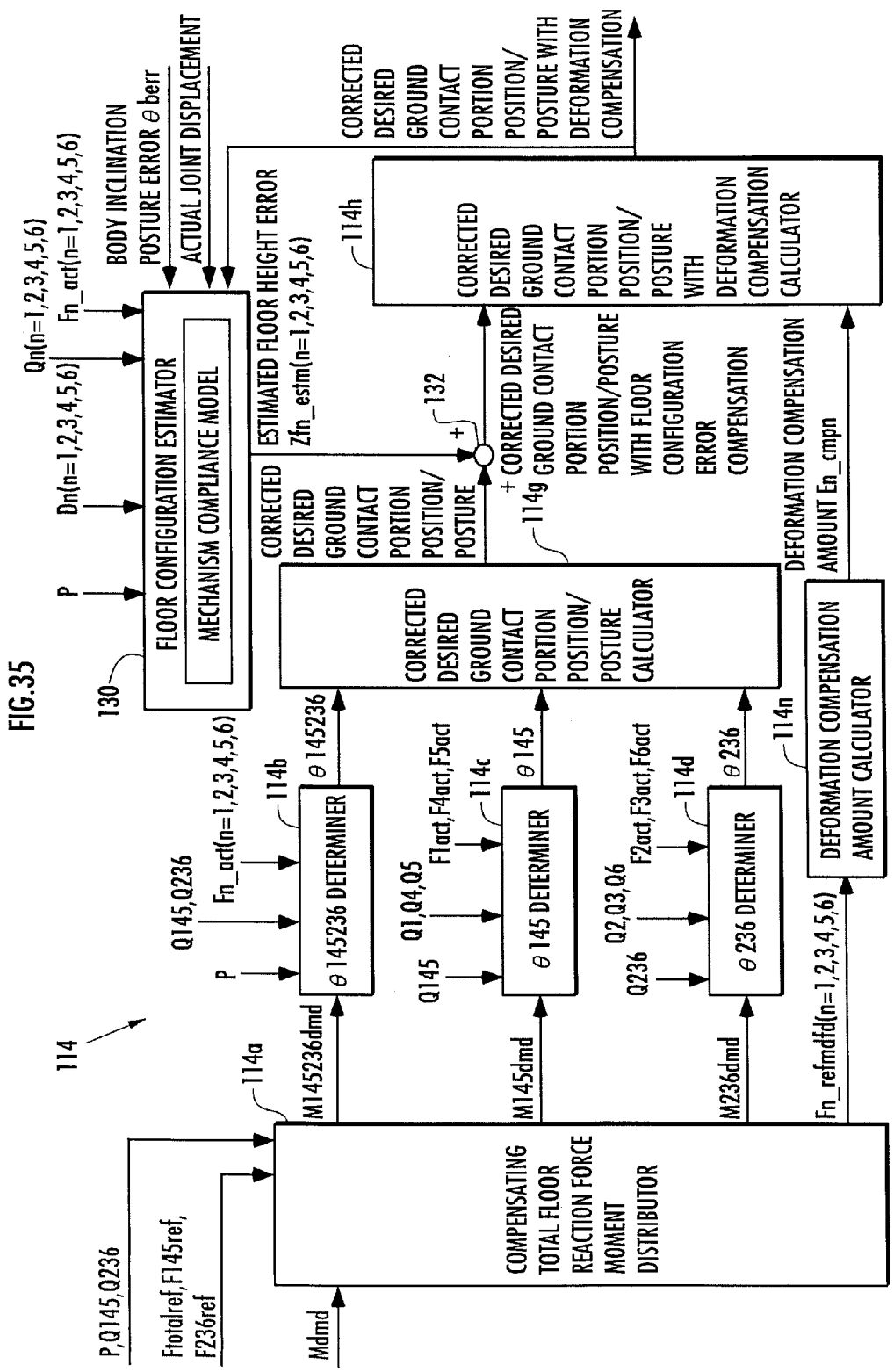
FIG. 35 is a block diagram showing the functional construction of a hierarchical compliance operation determiner in a third reference example.

FIG. 35 is a block diagram showing the processing functions of the hierarchical compliance operation determiner 114 in the present reference example. Of the functions, those functions that are different from those in the second reference example will be explained. A floor configuration estimator 130 as a floor configuration estimating means and an adder 132 that adds an estimated floor configuration error (more specifically, the estimated value of floor height error, which will be discussed later, related to each ground contact portion 10) output (estimated) by the floor configuration estimator 130 to corrected desired ground contact portion position/posture have been newly added to the hierarchical compliance operation determiner 114 in the present reference example, and outputs of the adder 132 in place of corrected desired ground contact portion position/posture are supplied to the corrected desired ground contact portion position/posture with deformation compensation calculator 114h. The rest of the processing of the components of the hierarchical compliance operation determiner 114 is the same as the processing thereof in the second reference example.

Figure 36:
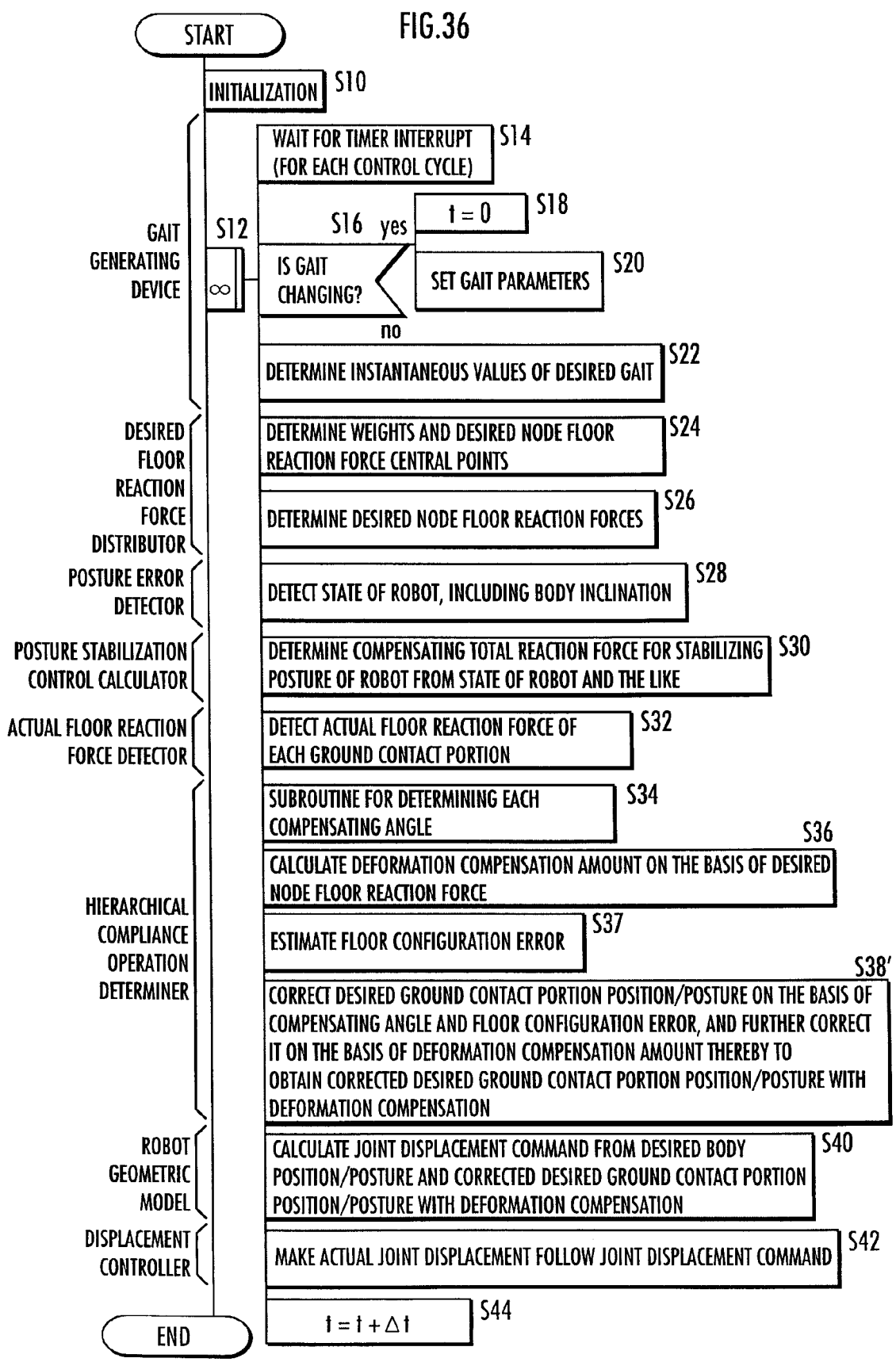
FIG. 36 is a flowchart showing main routine processing of a control system in the third reference example.

Accordingly, the control processing of the main routine of the control system 50 in the present reference example is partly different from the control processing shown in the flowchart of the aforesaid FIG. 9. FIG. 36 is a flowchart showing the control processing of the main routine of the control system 50 in the present reference example. As illustrated, in the present reference example, the processing for estimating a floor configuration error (the processing of the floor configuration estimator 130) in S37 is newly added following S36. Furthermore, in S38', desired ground contact portion position/posture are corrected on the basis of the compensating angles θ145236, θ145, and θ236 explained in the aforesaid second reference example and the floor configuration error estimated in S37, and the desired ground contact portion position/posture after the correction is further corrected on the basis of a deformation compensation amount so as to obtain corrected desired ground contact portion position/posture with deformation compensation, which are final desired ground contact portion position/posture. In this case, more specifically, corrected desired ground contact portion position/posture are determined on the basis of the compensating angles θ145236, θ145, and θ236, as in the second reference example, then the corrected desired ground contact portion position/posture are corrected on the basis of a floor configuration error, and this is further corrected on the basis of a deformation compensation amount, thereby obtaining corrected desired ground contact portion position/posture with deformation compensation. The items other than the above are the same as the processing of FIG. 9.

Hereinafter, the aspects of the present reference example that are different from the second reference example will be specifically explained.

Before starting the detailed explanation of the present reference example, the concepts and terms to be used when the floor configuration estimator 130 performs estimation will be defined as follows. In the explanation here, for the sake of convenience, schematic diagrams of an average robot, rather than limiting to the six-legged robot 1 in the present reference example, will be used.

Figure 37:
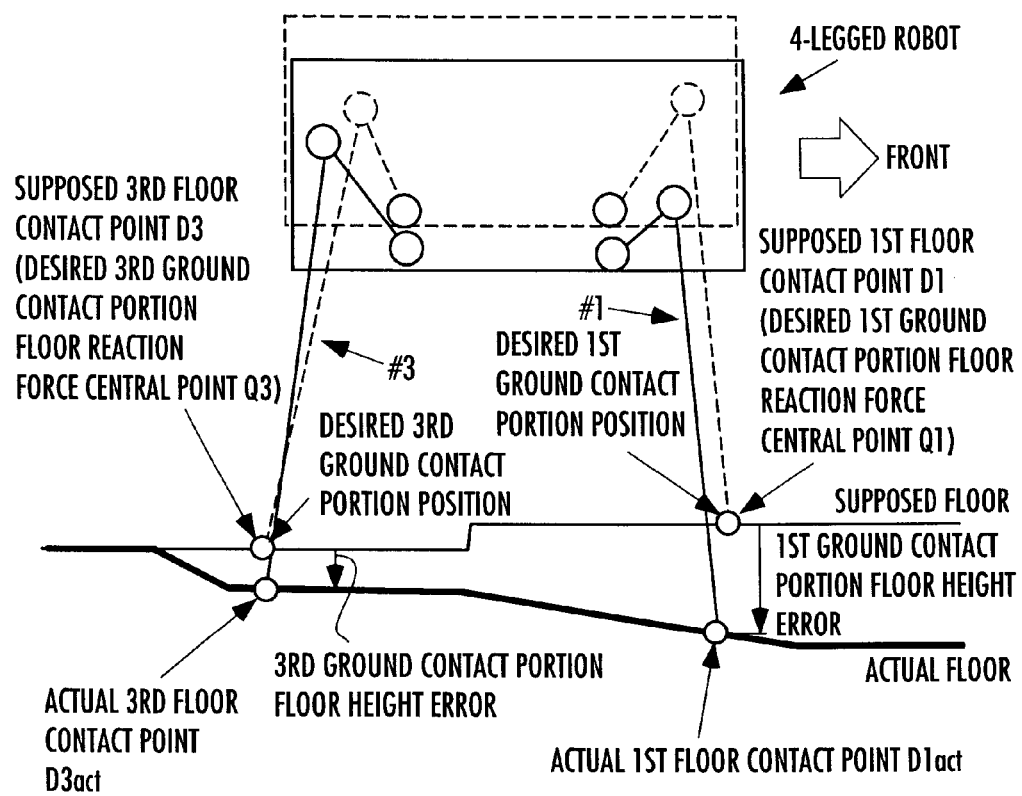
FIG. 37 to FIG. 39 are diagrams for explaining concepts and terms in the third reference example.
Figure 38:
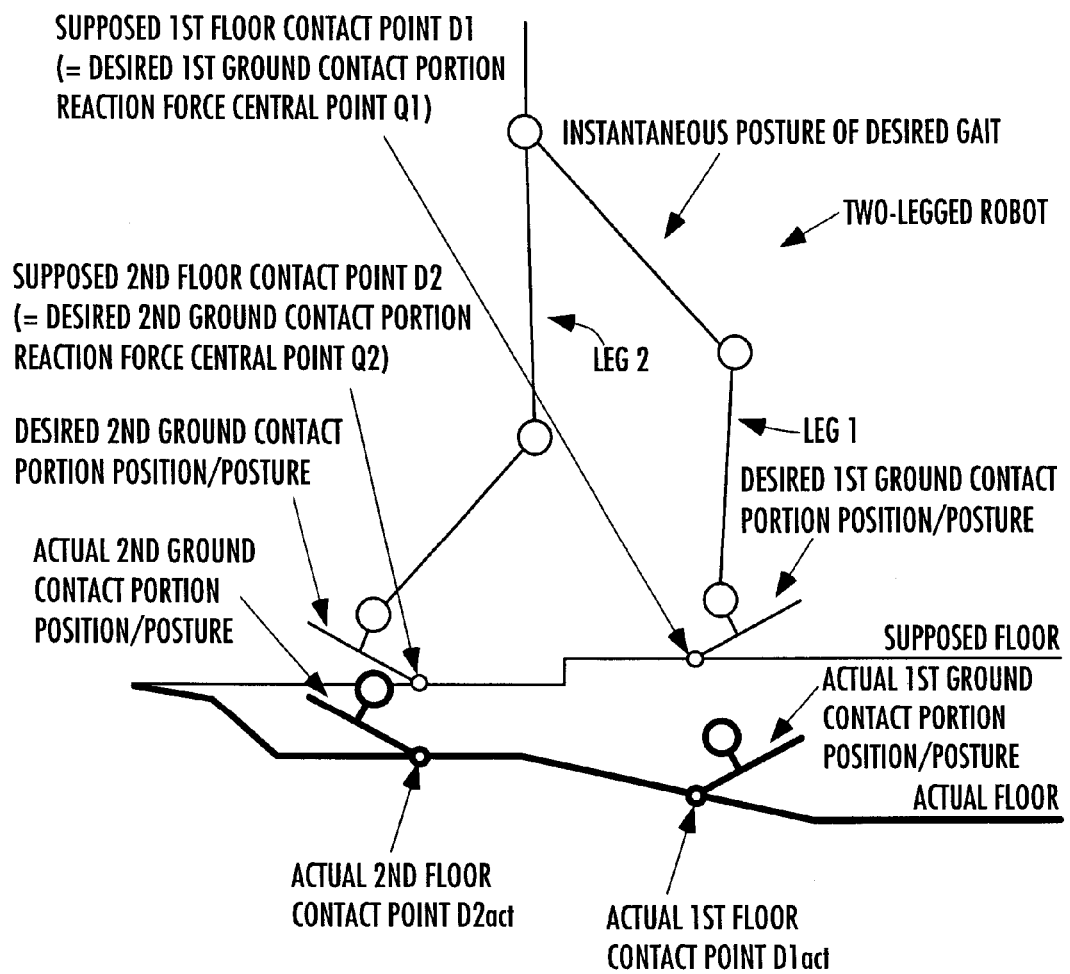
Figure 39:
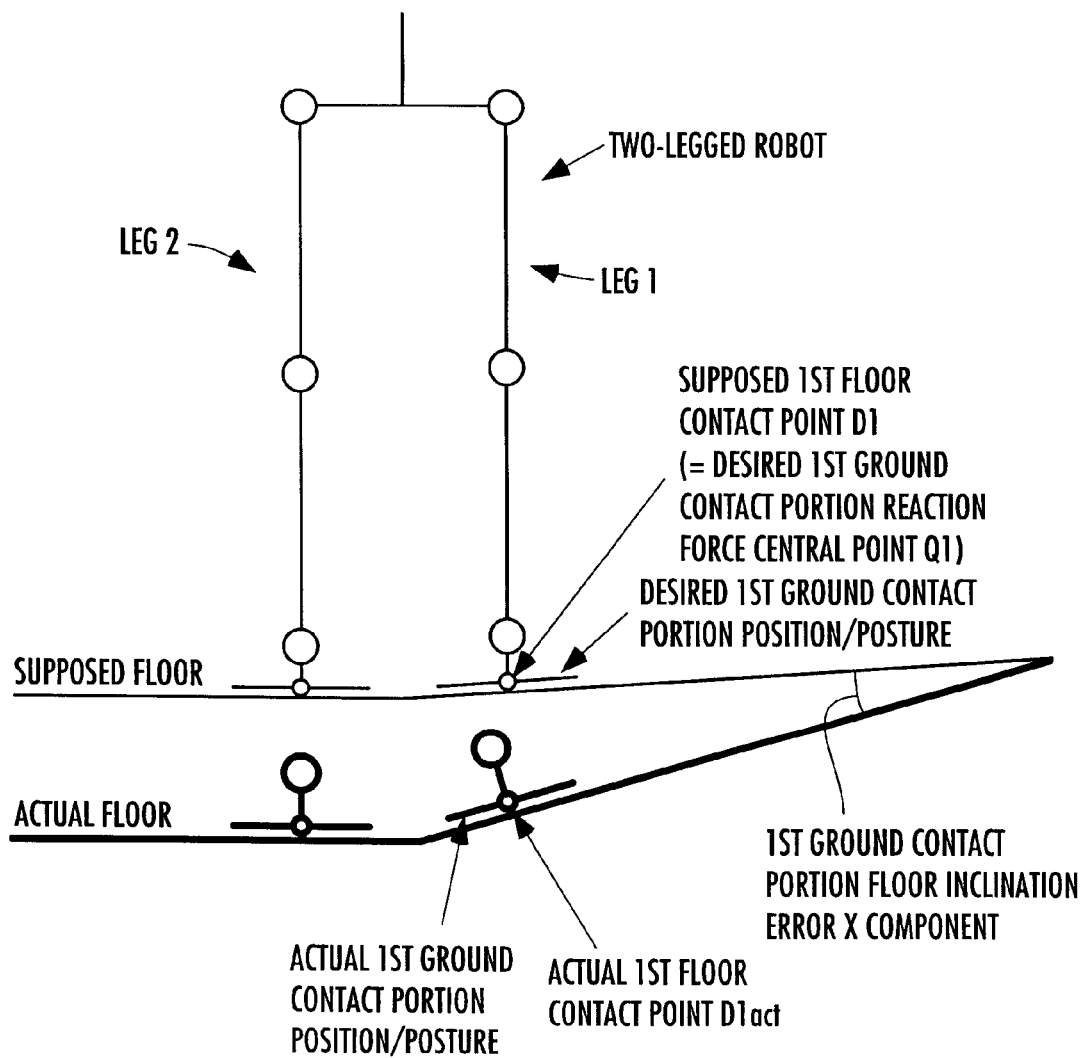

As shown in FIG. 37, FIG. 38, and FIG. 39, a floor (or a floor surface) supposed in a desired gait is referred to as "supposed floor." An actual floor on which a robot travels is referred to as "actual floor." For the convenience of explanation, FIG. 37 shows the four-legged robot explained in the first reference example, and FIG. 38 and FIG. 39 show a two-legged robot. The meanings of the terms explained below remain the same in any multi-legged robots, including the six-legged robot 1 in the present reference example.

The desired n-th ground contact portion floor reaction force central point Qn defined in the hierarchical compliance control explained in the aforesaid first and the second reference examples has been the point set at the central point of an n-th ground contact portion; however, the floor reaction force central point Qn may alternatively be set on the ground contact surface (bottom surface) of the n-th ground contact portion. In this case, in the desired gait, the point on the supposed floor surface that is supposed to be in contact with the desired n-th ground contact portion floor reaction force central point On is referred to as "supposed n-th floor contact point Dn."

As is obvious from the definition, during the period in which the n-th ground contact portion is in contact with the ground in the desired gait of a robot, the desired n-th ground contact portion floor reaction force central point Qn and the supposed n-th floor contact point Dn share the same coordinates as observed from a supporting leg coordinate system (global coordinate system). In comparison to this, the point at which the point that corresponds to the desired n-th ground contact portion floor reaction force central point Qn on the bottom surface of an actual n-th ground contact portion when the robot 1 is actually traveling comes in contact with an actual floor is referred to as "actual n-th floor contact point Dnact."

Examples showing the relationships among these points are shown in FIG. 37, FIG. 38, and FIG. 39. Incidentally, FIG. 37 shows a four-legged robot viewed from the direction of the normal line of a vertical plane that passes a desired first ground contact portion floor reaction force central point Q1 and a desired second ground contact portion floor reaction force central point Q2 (that is, substantially sideways), FIG. 38 shows a traveling (walking) two-legged robot viewed from the direction of the normal line of a vertical plane that passes the desired first ground contact portion floor reaction force central point Q1 and the desired second ground contact portion floor reaction force central point Q2 (that is, substantially sideways), and FIG. 39 shows a two-legged robot substantially in an upright posture viewed from the direction of the normal line of a vertical plane that passes the desired first ground contact portion floor reaction force central point Q1 and the desired second ground contact portion floor reaction force central point Q2 (that is, substantially from rear).

In these FIG. 37 to FIG. 39, the sections of the supposed floors in the aforesaid vertical planes are indicated by thin lines, while the sections of actual floors in the aforesaid vertical planes are indicated by thick lines. Incidentally, in FIG. 37, the desired posture of the robot (the entire posture of the robot at an instantaneous value of a desired gait) and the actual posture are indicated by dashed lines and solid lines, respectively. Further, in FIG. 38 and FIG. 39, the desired postures of the robots (the entire postures of the robots at instantaneous values of desired gaits) and actual ground contact portion position/posture are indicated by thin lines and thick lines, respectively. Actual n-th floor contact points in these situations are the points on actual floor surfaces, and they are at the positions shown in FIG. 37, FIG. 38, and FIG. 39.

The error in configuration of an actual floor surface with respect to a supposed floor surface is referred to as a floor configuration error. As the indexes for quantitatively representing floor configuration errors, an n-th node floor height error and an n-th node floor inclination error are defined as follows.

The height of a floor surface at an n-th floor contact point is referred to as "n-th ground contact portion floor height." In relation to an n-th node that is a leaf, the difference between an actual n-th ground contact portion floor height and a supposed n-th ground contact portion floor height is referred to as "n-th ground contact portion floor height error" or "n-th node floor height error." The inclination of the floor surface at an n-th floor contact point is referred to as "n-th ground contact portion floor inclination." In relation to an n-th node that is a leaf, the difference between an actual n-th ground contact portion floor inclination and a supposed n-th ground contact portion floor inclination is referred to as "n-th ground contact portion floor inclination error" or "n-th node floor inclination error." An example of the ground contact portion floor inclination error is shown in FIG. 39.

With respect to all j-th nodes, which are leaf nodes, the set of node compensating angles for the relationship between desired j-th ground contact portion position/posture and the height and inclination of a supposed j-th floor surface (specifically, the height and inclination of a supposed floor surface at a supposed j-th floor contact point) and the relationship between corrected desired j-th ground contact portion position/posture that has been corrected by a compliance operation using a set of node compensating angles and the height and inclination of an actual j-th floor surface (specifically, the height and inclination of an actual floor surface at an actual j-th floor contact point) to agree with each other is referred to as "(the set of) node floor inclination errors)," and among these, the component of the node floor inclination error corresponding to an n-th node compensating angle is referred to as "n-th node floor inclination error." If an n-th node is a leaf node, then the "n-th node floor inclination error" thus defined agrees with "the n-th node floor inclination error"(=the difference between an actual n-th ground contact portion floor inclination and a supposed n-th ground contact portion floor inclination) defined in relation to the leaf nodes previously described.

After all, the set of node floor inclination errors corresponds to a compensation amount necessary to shift all ground contact portions of a robot that is traveling according to a desired gait from a state in which they are parallel to a desired floor surface to a state in which they are parallel to an actual floor surface.

Therefore, by estimating a floor configuration error while walking and by adding the estimated floor configuration error to desired ground contact portion position/posture, the actual floor reaction force moment of each node will be the same as that when the robot is walking on a supposed floor even if there is a floor configuration error. Naturally, the actual floor reaction force moment of the ground contact portion, which is the actual floor reaction force moment of a leaf node, agrees with a desired ground contact portion floor reaction force moment.

Normally, a floor configuration may be represented using the "n-th node floor inclination error" defined as above. If, however, a certain node has three child nodes, and the desired floor reaction force central points of the three child nodes are aligned on the same straight line or if a certain node has four or more child nodes, then it would be difficult to represent a floor configuration.

Hence, in the following explanation, the following expressions that can be generally applied will be used for n-th nodes that are not leaves. The weights used to determine a predetermined weighted average in the following definition are to be the same as the aforesaid weights determined as described above by the desired floor reaction force distributor 102.

Definition:

If the heights and inclinations of all desired ground contact portions are set to agree with the heights and inclinations of corresponding actual floor surfaces, and if the desired floor reaction force central point of an arbitrary node is expressed by a predetermined weighted average of the desired floor reaction force central points of all child nodes thereof (i.e., an internally dividing point based on a predetermined internal division ratio), then, on an arbitrary n-th node, the height obtained by subtracting the height (the position in the vertical direction) of the desired floor reaction force central point of a parent node of the n-th node from the height (the position in the vertical direction) of the desired floor reaction force central point of the n-th node is referred to as "actual n-th node relative floor height."

Definition:

If the heights and inclinations of all desired ground contact portions are set to agree with the heights and inclinations of corresponding supposed floor surfaces, and if the desired floor reaction force central point of an arbitrary node is expressed by a predetermined weighted average of the desired floor reaction force central points of all child nodes thereof (i.e., an internally dividing point based on a predetermined internal division ratio), then, on an arbitrary n-th node, the height obtained by subtracting the height (the position in the vertical direction) of the desired floor reaction force central point of a parent node of the n-th node from the height (the position in the vertical direction) of the desired floor reaction force central point of the n-th node is referred to as "supposed n-th node relative floor height."

The height obtained by subtracting a supposed n-th node relative floor height from an actual n-th node relative floor height is referred to as an "n-th node relative floor height error." The n-th node relative floor height error will take the same value when defined as follows.

Definition:

If the heights and postures of all desired ground contact portions are made to agree with corresponding ground contact portion floor height errors and ground contact portion floor inclination errors, and the desired floor reaction force central point of an arbitrary node is expressed by a predetermined weighted average of the desired floor reaction force central points of all child nodes thereof (i.e., an internally dividing point based on a predetermined internal division ratio), then, on an arbitrary n-th node, the height obtained by subtracting the desired floor reaction force central point height of a parent node of the n-th node from the desired floor reaction force central point height of the n-th node is referred to as "n-th node relative floor height error."

As is obvious from the definition of the n-th node relative floor height error described above, regarding each node having child nodes, the n-th node relative floor height errors of all child nodes thereof represent the relative relationship of floor height errors. Further, regarding each node having child nodes, the weighted average value of all child nodes thereof is zero.

In the present reference example (the third reference example), the difference between an actual floor surface and a supposed floor surface on a desired gait (i.e., a floor configuration error) is compensated so as to correct the desired positions/postures of ground contact portions 10 to make the ground contact portions 10 that are to be in contact with the ground properly come in contact with the actual floor surface. Further, in the present reference example, the n-th node relative floor height error defined as described above is used as a floor configuration parameter representing a floor configuration error, and based on this, each n-th ground contact portion floor height error (floor configuration error) is estimated. Then, based on each estimated n-th ground contact portion floor height error (hereinafter referred to simply as the n-th floor height error in some cases), the desired position of the n-th ground contact portion 10 is corrected.

Based on the above premise, essential sections of the present reference example will be explained in detail.

The inputs into the floor configuration estimator 130 of the hierarchical compliance operation determiner 114 shown in FIG. 35 are, in general, roughly divided as follows.
1) Desired floor reaction force central points (desired total floor reaction force central points P and desired n-th ground contact portion floor reaction force central points Qn (n=1, 2, 3, 4, 5, 6)).
2) Supposed floor surface configuration (coordinates of supposed n-th floor contact points and supposed n-th ground contact portion floor inclinations).
3) Final desired postures to be followed by an actual robot (corrected desired ground contact portion positions/postures with deformations compensation) or actual joint displacements or frequency weighted average thereof (weighted average based on a weight having a frequency characteristic).
4) Body posture inclination errors.
5) Actual floor reaction forces (the translational force component and the moment component of an actual n-th ground contact portion floor reaction force).

Incidentally, in the robot 1 in the present reference example, the postures of the ground contact portions 10 cannot be controlled, so that the supposed n-th ground contact portion inclination of a supposed floor surface configuration is unnecessary.

Further, in the robot 1 in the present reference example, the moment component of an actual n-th ground contact portion floor reaction force of an actual floor reaction force is zero. This, therefore, is not required to be supplied to the floor configuration estimator 130. However, in the explanation of the present reference example hereinafter, the n-th ground contact portion floor reaction force generally includes the moment component of an actual n-th ground contact portion floor reaction force also, considering a case where the postures of the ground contact portions 10 are controllable. Further, in the following explanation, the total number of ground contact portions will be frequently referred to as "last leaf node number" so as to make it possible to expandably apply the present reference example easily also to a case where the number of ground contact portions is other than four or six. For example, in the six-legged robot 1 shown in FIG. 1, the last leaf node number is "6".

Figure 40:
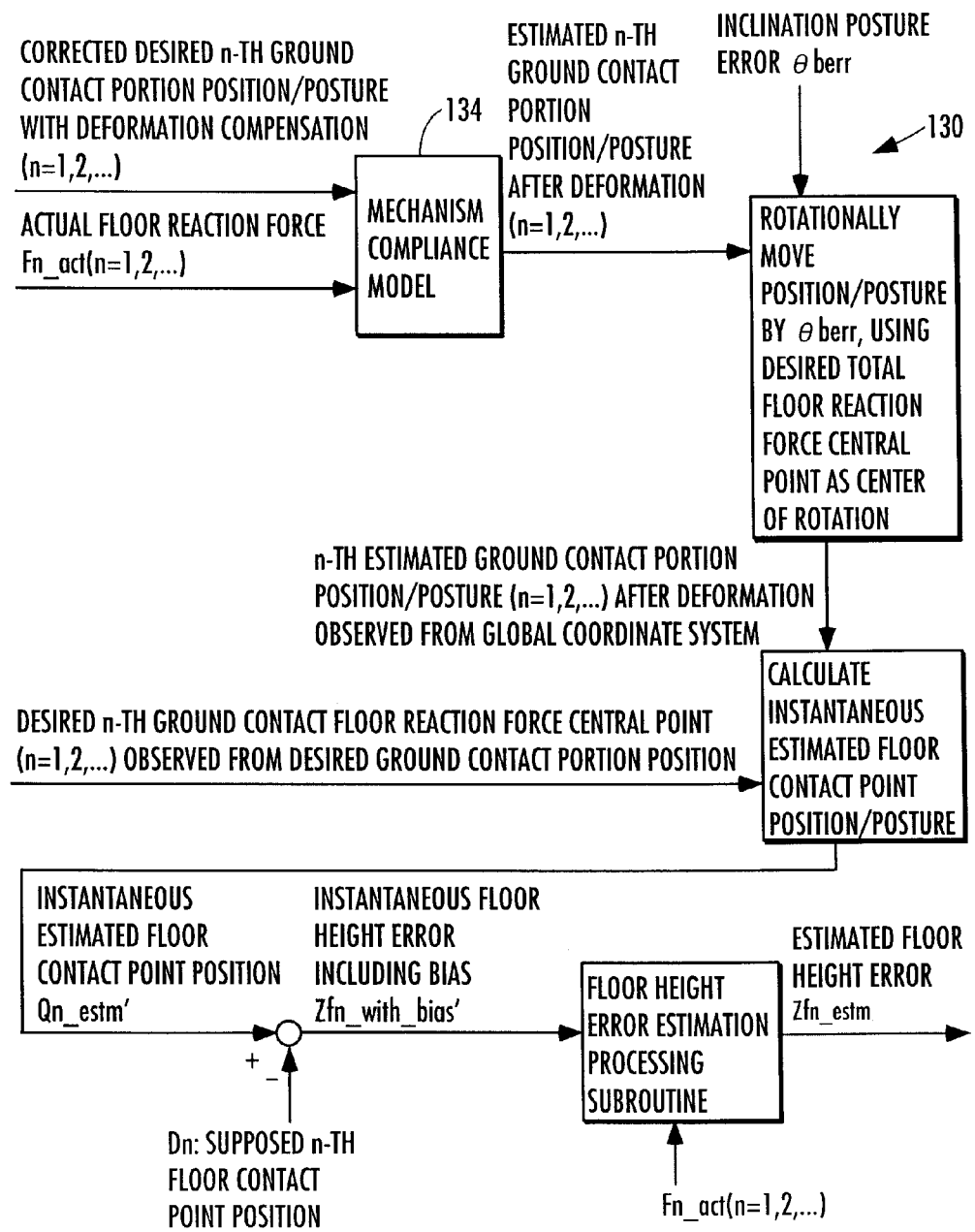
FIG. 40 is a block diagram showing the function of a floor configuration estimator in the third reference example.

FIG. 40 is a block diagram showing the processing functions of the floor configuration estimator 130. The functional elements constituting the floor configuration estimator 130 shown in FIG. 40 will be explained. The floor configuration estimator 130 is equipped with a mechanism compliance model 134.

The mechanism compliance model 134 determines the deformation amount of a compliance mechanism 42 or the like of each of the legs #1 to #6 (the compliance mechanism 42 and a link mechanism of each leg) when each of the ground contact portions 10 is subjected to an actual floor reaction force Fn_act (n=1, 2, . . . , last leaf node number), and adds the determined deformation amount to the corrected desired ground contact portion position/posture with deformation compensation, which are supplied to the aforesaid robot geometric model 110 (refer to FIG. 2), so as to determine estimated n-th ground contact portion position/posture (n=1, 2, . . . , last leaf node number), which are the estimated values of the position/posture of an n-th ground contact portion (each ground contact portion) after mechanism deformation (more specifically, the estimated values of the n-th ground contact portion position/posture when it is assumed that an actual body posture agrees with a desired body posture). Incidentally, the corrected desired ground contact portion position/posture with deformation compensation used in this case are the past values of the values or the like determined at the last control cycle.

When determining the estimated ground contact portion position/posture after mechanism deformation, if a follow-up delay of control of a joint displacement of the robot 1 cannot be ignored, then the position/posture obtained by passing corrected desired ground contact portion position/posture with deformation compensation through a low-pass filter corresponding to the follow-up delay may be used instead of using the corrected desired ground contact portion position/posture with deformation compensation as it is.

Alternatively, from a detected value of an actual joint displacement of the robot 1, actual ground contact portion position/posture without mechanism deformation, which are actual ground contact portion position/posture in a case where there is no mechanism deformation, are determined through a robot geometric model (the same model as the robot geometric model 110 in FIG. 2), and the determined values may be used in place of the corrected desired ground contact portion position/posture with deformation compensation.

Alternatively, a weighted average of the aforesaid actual ground contact portion position/posture without mechanism deformation and the corrected desired ground contact portion position/posture with deformation compensation may be determined by using a frequency weight (weight having a frequency characteristic), and this may be used in place of the corrected desired ground contact portion position/posture with deformation compensation.

Strictly speaking, the actual ground contact portion position/posture without mechanism deformation mentioned above should be used; however, any one of the above may be used with a result indicating no significant difference as long as the capability of joint displacement control is high.

Incidentally, the mechanism compliance model 134 is explained in detail in Japanese Unexamined Patent Application Publication No. H10-277969 previously proposed by the present applicant; therefore, no more explanation will be given herein.

Supplementally, in a case where an input to the robot geometric model 110 in FIG. 2 does not include deformation compensation, that is, if corrected desired ground contact portion position/posture without deformation compensation (the position/posture determined by the aforesaid corrected desired ground contact portion position/posture calculator 114g) is supplied to the robot geometric model 110, then the corrected desired ground contact portion position/posture without deformation compensation may be supplied to the mechanism compliance model 134 of the floor configuration estimator 130.

Returning to the explanation of FIG. 40, the estimated ground contact portion position/posture after mechanism deformation (n=1, 2, . . . , 6) is then rotationally moved by the aforesaid body posture inclination error θberr, the desired total floor reaction force central point P being the center of the rotation, thereby to determine n-th estimated ground contact portion position/posture after mechanism deformation (n=1, 2, . . . , last leaf node number) observed from a global coordinate system (supporting leg coordinate system). Subsequently, the position of the point corresponding to the desired n-th ground contact portion floor reaction force central point after the mechanism deformation observed from the global coordinate system is determined on the basis of the n-th estimated ground contact portion position/posture after the mechanism deformation (n=1, 2, . . . , last leaf node number) observed from the global coordinate system and the position of the desired n-th ground contact portion floor reaction force central point observed from the desired ground contact portion position of an n-th ground contact portion (the desired position of the representative point of the n-th ground contact portion). Then, the determined position of the point is defined as an instantaneous estimated floor contact point position (instantaneous estimated n-th floor contact point position) Qn_estm'. This Qn_estm' corresponds to the estimated value of the instantaneous position of an actual n-th floor contact point. The method for determining the instantaneous estimated floor contact point position Qn_estm' are equivalent to determining Q" of expression 21 in Japanese Unexamined Patent Application Publication No. H10-277969, so that no further explanation thereof will be given herein.

Subsequently, the supposed n-th floor contact point position Dn is subtracted from the instantaneous estimated n-th floor contact point position Qn_estm' to obtain a bias-included instantaneous n-th ground contact portion floor height error Zfn_with_bias'. This Zfn_with_bias' corresponds to the instantaneous estimated value of an n-th ground contact portion floor height error. In a case where no actual height of a body is detected, as with the present reference example, a bias error is usually included. Hence, Zfn_with_bias' is referred to as the bias-included instantaneous n-th ground contact portion floor height error.

Here, as previously defined, the supposed n-th floor contact point Dn lies at the same position as a desired n-th ground contact portion floor reaction force central point Qn in a period during which an n-th ground contact portion is in contact with the ground. In a desired gait, immediately before an n-th ground contact portion comes in contact with the ground, the position of the desired n-th ground contact portion floor reaction force central point Qn that is expected for the next ground contact is defined as the supposed n-th floor contact point Dn. In the desired gait, immediately after the n-th ground contact portion leaves a floor, the position of the desired n-th ground contact portion floor reaction force central point Qn that was expected at the time of leaving the floor is defined as the supposed n-th floor contact point Dn.

Subsequently, an estimated n-th node floor height error Zfn_estm (n=1, 2, . . . , last leaf node number) is determined by the floor height error estimation processing subroutine shown by the flowchart of FIG. 41 on the basis of the bias-included instantaneous n-th ground contact portion floor height error Zfn_with_bias' (n=1, 2, . . . , last leaf node number) and the n-th ground contact portion floor reaction force Fn_act (n=1, 2, . . . , last leaf node number).

Here, "hierarchical relativization processing" (or "hierarchical relativization") used in the floor height error estimation processing subroutine or the like will be explained.

The hierarchical relativization processing is generally defined as the processing for determining the output values of all nodes relative to the sets of input values (the values of predetermined types of state amounts) for all leaf nodes. More specifically, the hierarchical relativization processing is the processing for determining node output values such that the weighted average of output values corresponding to all childe nodes of an arbitrary node that is not a leaf node is zero and the input value (state amount) of an arbitrary leaf node agrees with the sum of the output value of the node and the output values of all ancestor nodes of the node.

Hereinafter, determining the value of a certain type of output BB by the hierarchical relativization processing from a certain type of input (state amount) AA for a leaf node will be referred to as "determining BB by hierarchically relativizing AA."

The following will explain the algorithm of the hierarchical relativization processing. In general, an input of the hierarchical relativization processing is an n-th ground contact portion height Zfn (n denoting a leaf node number) and an output thereof is an n-th node relative height Zn_rel (n=1, 2, ..., last node number). Incidentally, the "last node number" means the largest number among all node numbers; for example, in the hierarchical structure explained in the second reference example, the last node number=145236. Further, in the explanation of the algorithm, the "n-th ground contact portion height" is a designation that generically represents an input of the hierarchical relativization processing, such as the aforesaid n-th ground contact portion floor height or an n-th ground contact portion floor height error, and the "n-th node relative height" is a designation that generically represents an output of the hierarchical relativization processing, such as an n-th ground contact portion relative floor height error, which will be discussed later.

First, a bias-included n-th node height $Zn\_with\_bias$ is determined as follows. If an n-th node is a leaf node (i.e., a ground contact portion), then the value of an n-th ground contact portion height Zfn is substituted into the bias-included n-th node height $Zn\_with\_bias$. If the n-th node is not a leaf node (i.e., a ground contact portion), then the weighted average of the bias-included n-th node heights $Zn\_with\_bias$ of all child nodes of the n-th node is determined, and this determined weighted average is defined as the bias-included n-th node height $Zn\_with\_bias$. It should be noted that a weight $Wj$ (j=1, 2, ...) determined by the aforesaid desired floor reaction force distributor 102 is used as the weight for each child node.

More specifically, the bias-included n-th node height $Zn\_with\_bias$ is obtained by expression 32 given below.

If the $n$-th node is a leaf node, Expression 32 then $Zn\_with\_bias = Zfn$

If the $n$-th node is not a leaf node, then $Zn\_with\_bias = \Sigma(Zj\_with\_bias * Wj)$ where $\Sigma$ denotes the total sum on $j$, which is $j \in \left\{ \begin{array}{c} \text{set of child node numbers} \\ \text{of the } n\text{-th node} \end{array} \right\}$ According to the above rules, the bias-included node height $Zn\_with\_bias$ (n=1, 2, ..., last node number) is determined on every node.

Lastly, an n-th node relative height $Zn\_rel$ is determined by subtracting the bias-included height $Zh\_with\_bias$ of a parent node (this is supposed to be an h-th node) of the n-th node from the bias-included n-th node height $Zn\_with\_bias$.

More specifically, the n-th node relative height $Zn\_re$ is determined according to the following expression 33. It should be noted that the h-th node is the parent node of the n-th node.

$Zn\_rel = Zn\_with\_bias - Zh\_with\_bias$ Expression 33

According to the above rule, the node relative floor height $Zn\_rel$ (n denoting the number of each node) is determined on every node. It should be noted that a node relative height $Zk\_rel$ (k denoting the number of a root node) with respect to a root node is zero. FIG. 42 shows an example of calculation of a node relative height of a four-legged robot shown in the first reference example, while FIG. 43 shows an example of calculation of a node relative height of the six-legged robot in the present reference example.

The bias-included n-th node height $Zn\_rel\_with\_bias$ may alternatively be determined by the following method, which provides the same results.

If an n-th node is a leaf node (i.e., a ground contact portion), then the value of an n-th ground contact portion height Zfn is substituted into the bias-included n-th node height $Zn\_with\_bias$. If the n-th node is not a leaf node (i.e., a ground contact portion), then the weighted average of the bias-included heights of the leaf nodes of all descendants of the n-th node is determined, and this determined weighted average is defined as the bias-included n-th node height $Zn\_with\_bias$. It should be noted that a weight $Wj'$ for each leaf node j is the product of the weight $Wj$ determined for the node j by the aforesaid desired floor reaction force distributor 102 and the weight determined by the aforesaid desired floor reaction force distributor 102 for an ancestor node of the node j and all nodes, which are the descendant nodes of the n-th node.

More specifically, the bias-included n-th node height $Zn\_with\_bias$ is obtained by expression 34 given below.

If the $n$-th node is a leaf node, Expression 34 then $Zn\_with\_bias = Zfn$

If the $n$-th node is not a leaf node, then $Zn\_with\_bias = \Sigma(Zj\_with\_bias * Wj')$ where $\Sigma$ denotes the total sum on $j$, which is $j \in \left\{ \begin{array}{c} \text{set of leaf node numbers} \\ \text{of the descendants of a node } n \end{array} \right\}$ Supplementally, the weight $Wj'$ in this case agrees with the value obtained by dividing the desired floor reaction force of each leaf node by a desired j-th node floor reaction force if the desired j-th node floor reaction force is not zero.

The above is the hierarchical relativization processing.

Figure 41:
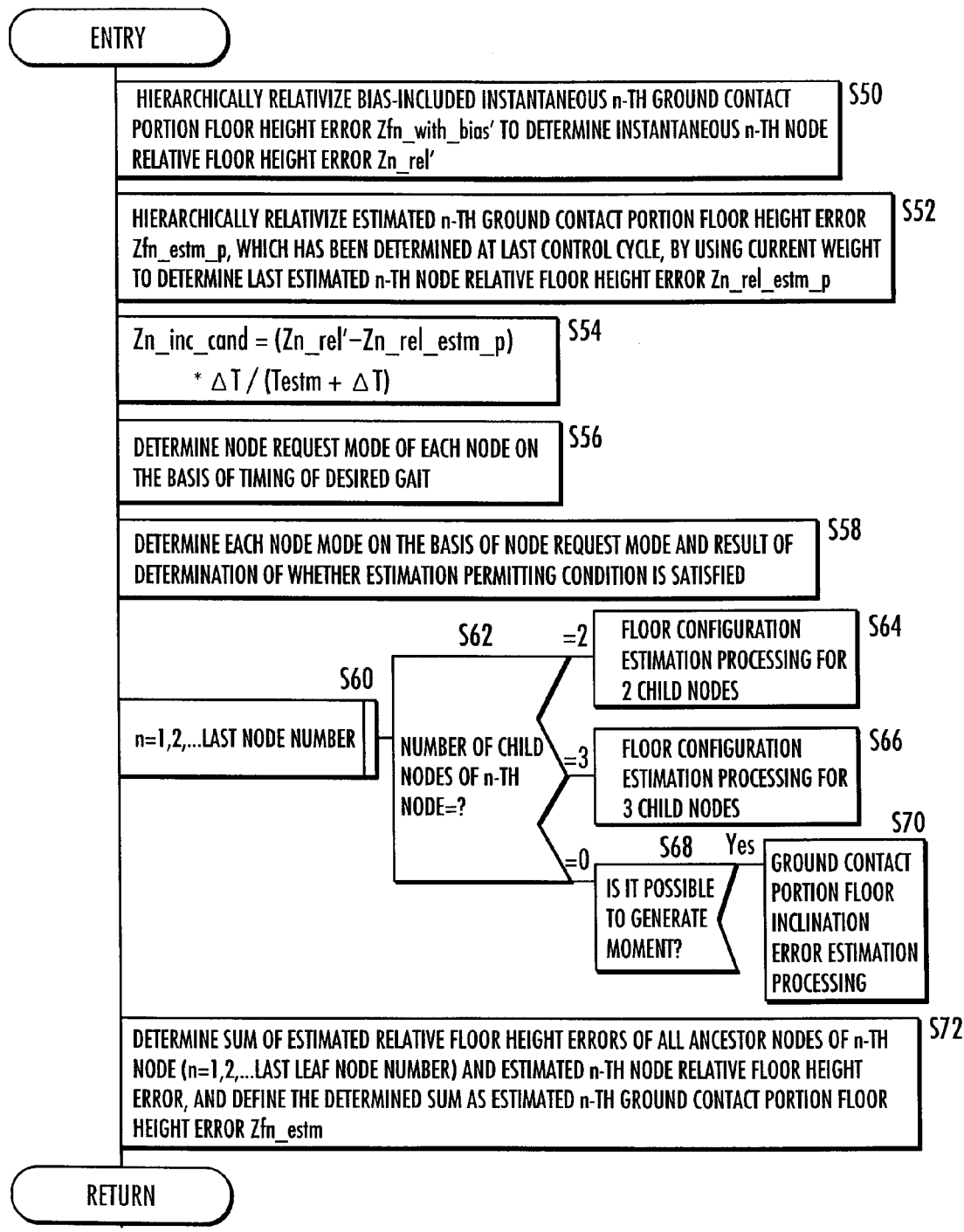
FIG. 41 is a flowchart showing the processing of a floor height error estimation processing subroutine in FIG. 40.

The subroutine processing of the estimation processing of a floor height error will now be explained below by mainly using the flowchart of FIG. 41 showing it. Incidentally, this processing uses an n-th ground contact portion floor height error as an input of the hierarchical relativization processing, and an n-th node relative floor height error as an output. The like symbols as those shown in the aforesaid expressions 32 to 34 or the like will be used as the reference symbols of these input and output.

Referring to FIG. 41, first, in S50, the aforesaid bias-included instantaneous n-th ground contact portion floor height error Zfn_with_bias' is hierarchically relativized to determine an instantaneous n-th node relative floor height error Zn_rel' (n=1, 2, . . . , last node number).

Subsequently, in S52, the output obtained by hierarchically relativizing an estimated n-th ground contact portion floor height error, which is an estimated value of the n-th ground contact portion floor height error determined at the last control cycle of the control system 50 (hereinafter referred to as the last estimated n-th ground contact portion floor height error Zfn_estm_p), is determined as the last estimated n-th node relative floor height error Zn_rel_estm_p (n=1, 2, . . . , last node number). It should be noted that, as the weight of each node used in this hierarchical relativization processing, the weight Wn (n=1, 2, . . . last node number) determined by the aforesaid desired floor reaction force distributor 102 at the current (present) control cycle of the control system 50 is used.

Supplementally, in general, if the weight determined in the current control cycle (hereinafter referred to as the current weight) and the weight determined in the last control cycle (hereinafter referred to as the last weight) are different, then the value of the last estimated relative floor height error of each node determined using the last weight and the value of the last estimated relative floor height error of each node determined using the current weight will be inconveniently different values even if the configuration of an actual floor does not change. Hence, the last estimated node relative floor height error of each node is calculated anew by using the current weight as described above instead of directly using the estimated relative floor height error of each node determined at the last control cycle as the last estimated node relative floor height error of each node.

Subsequently, in S54, an n-th node relative floor height error correction amount candidate value Zn_inc_cand (n=1, 2, . . . , last node number) is determined according to expression 35 given below. The Zn_inc_cand means the provisional value of the correction amount of the error when the n-th node relative floor height error is updated at the current control cycle.

In this case, the n-th node relative floor height error correction amount candidate value Zn_inc_cand is set to the product of the difference between the instantaneous n-th node relative floor height error Zn_rel' and the last estimated n-th node relative floor height error Zn_rel_estm_p and a predetermined coefficient ($\Delta T/(Testm+\Delta T)$), as shown by expression 35 given below.

$$Zn\_inc\_cand = (Zn\_rel' - Zn\_rel\_estm\_p) * \Delta T / (Testm + \Delta T) \quad \text{Expression 35}$$

where Testm in expression 35 denotes a time constant (the time constant of a primary delay) at the estimation (update) of an n-th node floor height error, and $\Delta T$ denotes a control cycle of the control system 50.

Thus, when Zn_inc_cand is set, Zn_inc_cand is added to Zn_rel_estm_p for each control cycle of the control system 50, causing the value of the result of the addition to change so as to gradually approximate Zn_rel'.

Subsequently, in S56, a node request mode (an n-th request mode mdn_dmd), which is a required value of the mode of each node, is determined on the basis of a timing of a desired gait.

Specifically, in the aforesaid six-legged robot 1, an n-th node request mode (n=1, 2, 3, 4, 5, 6), a 145th node request mode md145dmd, a 236th node request mode md236dmd, and a 145236th node request mode md145236dmd are set as shown in the timing chart of FIG. 44 with respect to the elapse of time of a desired gait, and a current request mode is determined on the basis thereof. However, if the gait is different, then the pattern of a node request mode should be changed accordingly. Incidentally, regarding ON/OFF in the timing charts of a first stage (the uppermost stage) and a second stage in FIG. 44, the state in which a ground contact portion is in contact with the ground corresponds to ON, while the state in which it is not in contact with the ground corresponds to OFF.

Supplementally, as the present applicant has disclosed in Japanese Unexamined Patent Application Publication No. H10-277969, in the case of a robot that has feet as ground contact portions and that is capable of estimating floor inclination errors at the ground contact portions, the request mode corresponding to the floor inclination error estimation of the ground contact portions should be set as explained in the Publication.

As shown in FIG. 44, the mode of each node (hereinafter referred to simply as the node mode) comes in ready mode, hold mode, and reset mode.

The ready mode is the mode for estimating a floor configuration. The hold mode is the mode for holding the estimated value of the floor configuration (an estimated n-th ground contact portion floor height error)(for maintaining an immediately preceding value). The hold mode is made to exist in a period during which the estimated value of a floor configuration may diverge and a period during which the accuracy of the estimated value of the floor configuration may deteriorate. Further, the reset mode is the mode for shifting the estimated value of the floor configuration to a predetermined initial value before the next floor configuration estimation is started (the next ready mode begins).

Regarding an n-th node (n=1, 2, 3, 4, 5, 6) that is a leaf node, if an n-th ground contact portion is in contact with the ground on a desired gait (that is, if a desired n-th ground contact portion floor reaction force is not zero), then the n-th node request mode is set to the ready mode. Thereafter, when the n-th ground contact portion leaves a floor on the desired gait (that is, when the desired n-th ground contact portion floor reaction force becomes zero), the n-th node request mode is set to the hold mode immediately thereafter. Then, after a while, the n-th node request mode is set to the reset mode. Further, immediately before the n-th ground contact portion comes in contact with the ground on the desired gait, the n-th node request mode is set to the ready mode.

Regarding an n-th node (n=145, 236, 145236) that is not a leaf node, that is, an n-th node having child nodes, if at least one ground contact portion belonging to the n-th node is in contact with the ground on the desired gait, then the n-th node request mode is set to the ready mode. Thereafter, when all ground contact portions belonging to the n-th node leave the floor on the desired gait, then the n-th node request mode is set to hold until immediately thereafter. Alternatively, the n-th node request mode may be set to the hold mode from immediately before all the ground contact portions belonging to the n-th node leave the floor. Then, after a while, the n-th node request mode is set to the reset mode. Further, immediately before at least one of the ground contact portions belonging to the n-th node comes in contact with the ground on the desired gait, the n-th node request mode is set to the ready mode.

Subsequently, in S58, it is determined whether an estimation enable condition is satisfied, and the mode of each node is finally determined on the basis of the result of the determination and the node request mode. The mode of each node to be determined is one of the aforesaid ready mode, hold mode, and reset mode. The aforesaid node request mode has been determined on the basis of whether the ground contact portions are in contact with the ground or not on the desired gait. In S58, the mode of each node is determined, considering whether the ground contact portions are actually in contact with the ground or not.

The estimation enable condition is satisfying either expression 36 or 37 given below. In this case, if neither expression 36 or 37 is satisfied, then the estimation enable condition does not hold.

$$Fn\_act\_z > Fn\_min \qquad \text{Expression 36}$$

$$Zn\_rel' < Zn\_rel\_estm\_p \qquad \text{Expression 37}$$

where $Fn\_act\_z$ denotes the translational force vertical component of an actual n-th ground contact portion floor reaction force (n=1, 2, . . . , last leaf node number).

The estimation enable condition is a condition under which, when an n-th node relative floor height error is estimated (when a floor configuration error is estimated), the estimated value does not diverge. The divergence here means a situation in which, when a correcting operation is performed to modify corrected desired ground contact portion position/posture so as to offset the influence of an actual n-th floor height error by using an estimated n-th floor height error $Zfn\_estm$ (the estimated value of the floor configuration error) that has been estimated as it will be discussed later, the estimated n-th floor height error $Zfn\_estm$ continues to increase and an n-th ground contact portion moves away from the floor (floats further from the floor).

If the estimation of $Zfn\_estm$ is ideally executed, a predetermined permissible value $Fn\_min$ may be zero, whereas in actuality, a detection error of $Fn\_act$ takes place, causing an estimated value to diverge in some cases. To prevent it, $Fn\_min$ is set to be a value that is sufficiently larger than a detection error of $Fn\_act$.

In the present reference example, the estimation enable condition is the condition under which divergence described above does not occur. However, the estimation enable condition may alternatively be a condition under which a required accuracy of estimating a floor configuration can be secured. Hence, in place of the translational force vertical component of the actual n-th ground contact portion floor reaction force $Fn\_act$, a component that is perpendicular to a supposed floor surface (or an estimated floor surface (estimated actual floor surface)) out of the translational force components of the actual n-th ground contact portion floor reaction force $Fn\_act$ may be used.

Incidentally, if a floor configuration error (a configuration error between an actual floor surface and a supposed floor surface) is simply estimated and not reflected in a walking operation, that is, if the correction of the corrected desired ground contact portion position/posture to cancel the influence of a floor configuration error is not carried out by using an estimated value of the floor configuration error, then the estimated value of the floor configuration error does not diverge.

The mode of each node is determined on the basis of the result of the determination on whether the estimation enable condition is satisfied and a node request mode.

If an n-th node request mode is the ready mode and the estimation enable condition is satisfied, then the n-th node mode is set to the ready mode.

If an n-th node request mode is the ready mode and the estimation enable condition is not satisfied, then the n-th node mode is set to the hold mode.

If an n-th node request mode is the hold mode, then the n-th node mode is set to the hold mode.

If an n-th node request mode is the reset mode, then the n-th node mode is set to the reset mode.

Thus, the mode of an n-th node is determined to be the ready mode at the end only if the request mode is the ready mode and the estimation enable condition is satisfied.

Subsequently, in S60 to S70, on all nodes, the n-th node relative floor height error (n=1, 2, . . . , last node number) associated with each node is estimated.

Supplementally, as disclosed in Japanese Unexamined Patent Application Publication No. H10-277969, in the case of a robot that has ground contact portions (feet) whose postures can be controlled and that is capable of estimating the floor inclination errors in the ground contact portions, it is preferred to also estimate the floor inclination errors associated with the ground contact portions.

Therefore, the processing of S60 to S70 is configured so as to allow floor configuration errors to be estimated also when the postures of ground contact portions can be controlled.

The following will specifically explain the processing of S60 to S70. In S62, the quantity of child nodes of an n-th node is determined. At this time, if the number of child nodes (the quantity of child nodes) is two, then the floor configuration estimation processing for a two-child node, which is the estimation processing of the floor configuration error for the quantity, is carried out in S64. If the number of child nodes is three, then the floor configuration estimation processing for a three-child node, which is the estimation processing of the floor configuration error for the quantity, is carried out in S66. If the number of child nodes is zero, then it is determined in S68 whether the n-th node ground contact portion permits the control of a floor reaction force moment.

The processing for the case where the number of child nodes is zero will be further explained. If the number of child nodes of an n-th node is zero, then the n-th node is a leaf node, and the n-th node corresponds to a ground contact portion. In this case, as described above, first, it is determined in S68 whether the n-th ground contact portion permits the control of a floor reaction force moment. Here, for example, in the case of a robot that has feet whose postures can be controlled as ground contact portions and its legs do not include free joints, as with a regular bipedal walking robot, floor reaction force moments can be generated at the ground contact portions. However, in the robot 1 (six-legged robot) in the present reference example, the ground contact portions 10 engage the spherical joints 12, which are free joints; therefore, none of the ground contact portions 10 can generate floor reaction force moments. In this case, no processing is carried out on the n-th node whose number of child nodes is zero.

Meanwhile, if it is determined in S68 that floor reaction force moments can be controlled, then ground contact portion floor inclination error estimation processing is carried out in S70. This processing is the processing for estimating the floor inclination error in each ground contact portion. This processing is the processing in which the foot floor reaction force central point in the floor inclination estimation processing in Japanese Unexamined Patent Application Publication No. H10-277969 previously proposed by the present applicant has been replaced by the desired floor reaction force central point of an n-th ground contact portion in the present reference example. Hence, further detailed explanation will be omitted in the present description.

Figure 45:
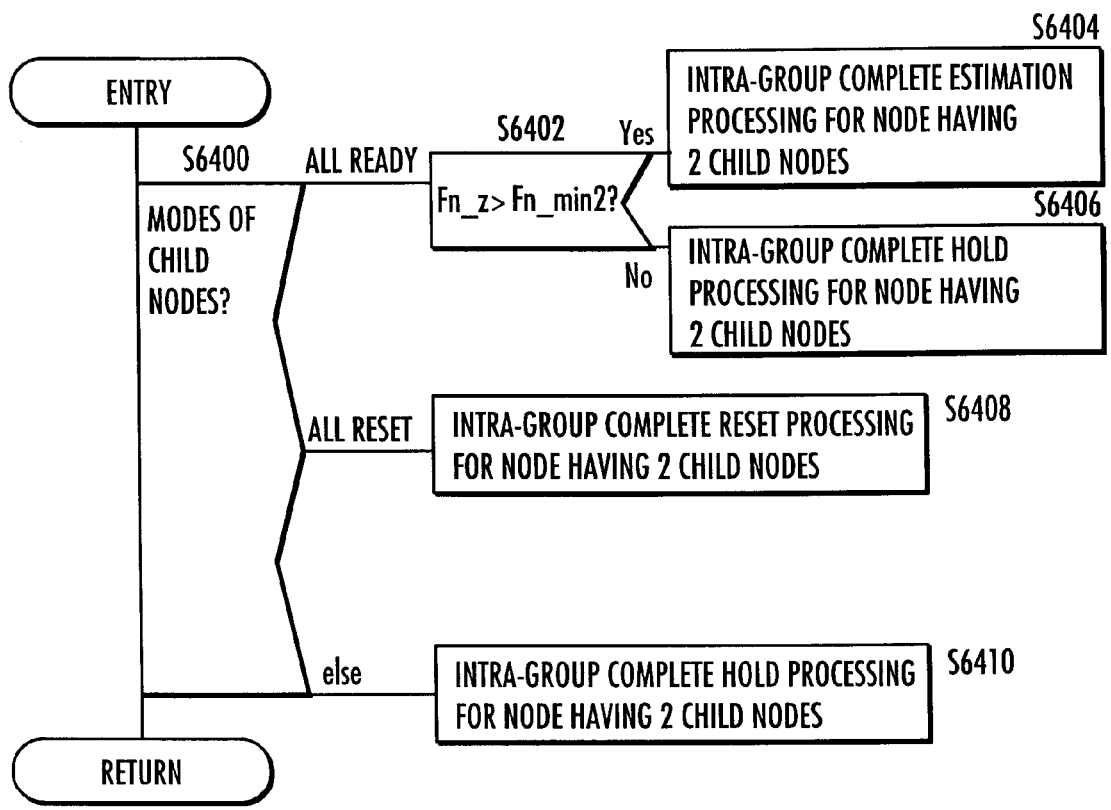
FIG. 45 to FIG. 55 are flowcharts showing the processing for estimating a floor configuration.
Figure 46:
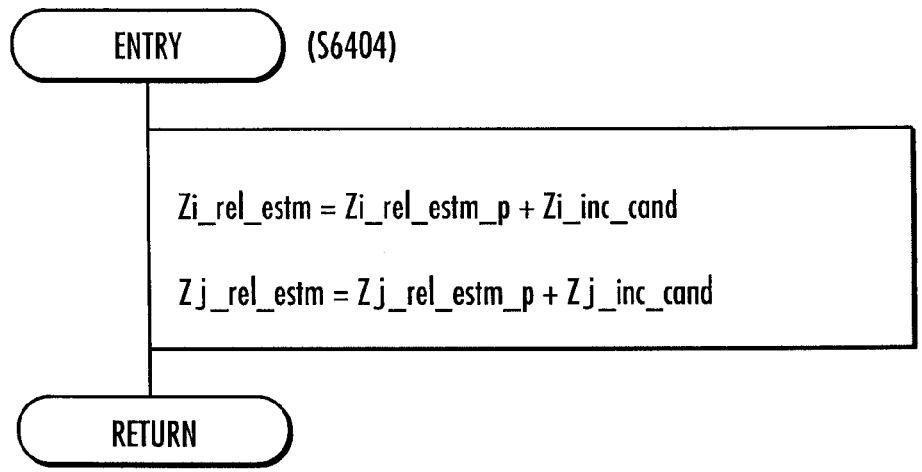
Figure 47:
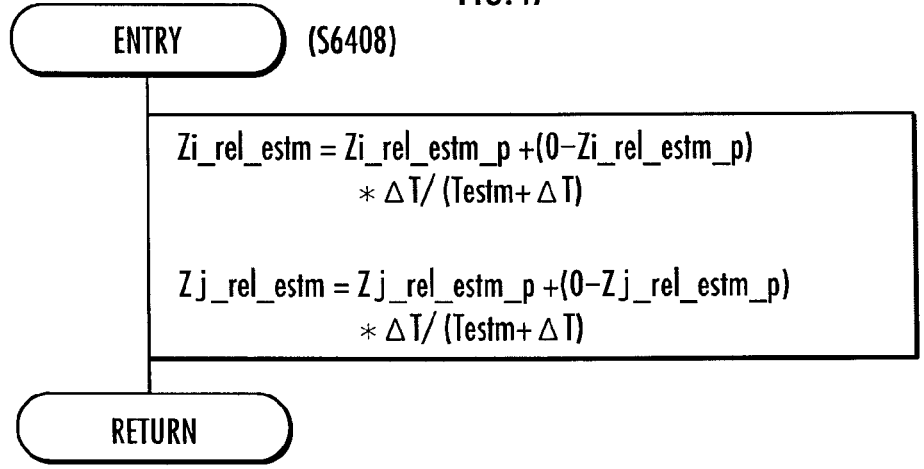
Figure 48:
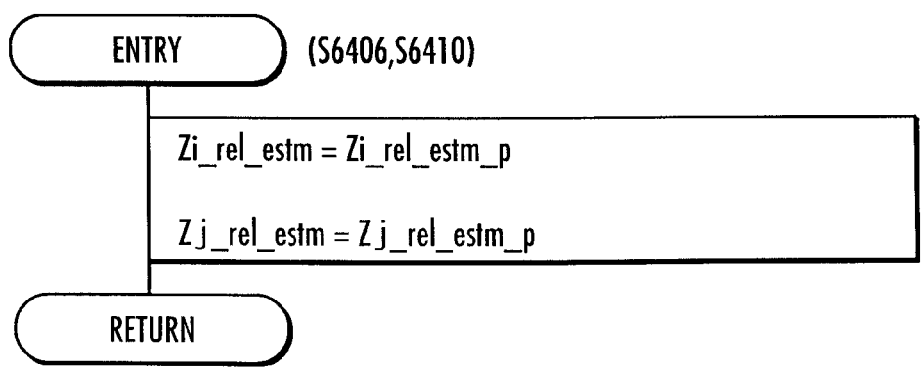

Next, the aforesaid floor configuration estimation processing for a two-child node will be explained with reference to FIG. 45 to FIG. 48. FIG. 45 is a flowchart showing the subroutine processing of the floor configuration estimation processing for a two-child node, FIG. 46 and FIG. 47 are flowcharts showing the subroutine processing of S6404 and S6408, respectively, of FIG. 45, and FIG. 48 is a flowchart showing the subroutine processing of S6406 and S6410 of FIG. 45.

In the floor configuration estimation processing for a two-child node, the modes of all child nodes of an n-th node having two child nodes (the mode determined in S58 of FIG. 41) are determined in S6400, as shown in the flowchart of FIG. 45. The results of the determination are divided into three, namely, "all ready," "all reset," and "others (else)." In the following explanation, the two child nodes of the n-th node will be denoted as the i-th node and the j-th node.

Here, if it is determined that the modes of the child nodes are "all ready," then it is determined in S6402 whether a resultant force $Fn\_z(=Fi\_act\_z+Fj\_act\_z)$ of the translational force vertical components $Fi\_act\_z$ and $Fj\_act\_z$ of the actual node floor reaction forces of the child nodes of the n-th node is larger than a predetermined value $Fn\_min2$. In other words, $Fn\_z$ denotes the translational force vertical component of the resultant force of the actual floor reaction forces of all ground contact portions belonging to the n-th node.

If the determination result of S6402 is YES, then intra-group all estimation processing for a node having two child nodes (the processing for virtually estimating the node relative floor height error of each of the two child nodes owned by the n-th node) is carried out in S6404. In this processing, estimated node relative floor height errors $Zi\_rel\_estm$ and $Zj\_rel\_estm$ of the i-th node and the j-th node, respectively, which are the two child nodes of the n-th node, are determined (updated) according to the expressions shown in the flowchart of FIG. 46. More specifically, $Zi\_rel\_estm$ will be representatively explained. An i-th node relative floor height error correction amount candidate value $Zi\_inc\_cand$ determined in the aforesaid S54 is added to a value $Zi\_rel\_estm\_p$ of $Zi\_rel\_estm$ in the last control cycle thereby to determine a new estimated i-th node relative floor height error $Zi\_rel\_estm$. The same applies to the j-th node.

Further, if the resultant force $Fn\_z$ of the floor reaction forces of the two child nodes of the n-th node is smaller than the predetermined value $Fn\_min2$ (if the determination result of S6402 is NO), then it means that the accuracy of estimating a floor configuration error would be excessively deteriorated, so that no substantial estimation processing is carried out, and the intra-group all hold processing for a node having two child nodes (the processing for holding the estimated node relative floor height errors of the two child nodes of the n-th node without updating them) is carried out in S6406. In the hold processing, as shown by the expressions in the flowchart of FIG. 48, the values of the estimated node relative floor height errors $Zi\_rel\_estm$ and $Zi\_rel\_estm$ of the i-th node and the j-th node, respectively, are maintained at the values $Zi\_rel\_estm\_p$ and $Zi\_rel\_estm\_p$ of the last control cycle.

Next, if it is determined in S6400 of FIG. 45 that the modes of the two child nodes are "all reset," then intra-group all reset processing for a node having two child nodes (the processing for resetting the estimated node relative floor height error of each of the two child nodes owned by the n-th node) is carried out in S6408. In the reset processing, the estimated node relative floor height errors $Zi\_rel\_estm$ and $Zi\_rel\_estm$ of the i-th node and the j-th node, respectively, are updated according to the expressions in the flowchart of FIG. 47 such that they gradually approximate zero. Incidentally, the meanings of $\Delta T$ and Testm in the expressions are the same as those of the aforesaid expression 35.

More generally speaking, the reset processing is the processing in which $Zi\_rel\_estm$ and $Zj\_rel\_estm$ are determined to take values that are closer to zero than $Zi\_rel\_estm\_p$ and $Zj\_rel\_estm\_p$ are, while satisfying a condition in which the weighted average value of $Zi\_rel\_estm$ and $Zj\_rel\_estm$ is zero, that is, $Wi*Zi\_rel\_estm+Wj*Zj\_rel\_estm=0$. Incidentally, the reset processing includes a primary delay element, so that infinite time is required for the node relative floor height errors to completely return to zero. Hence, a finite stabilization function generator previously proposed by the present applicant (Japanese Unexamined Patent Application Publication No. H5-324115) may be used to gradually reset the node relative floor height errors to zero.

Further, if the modes of the two child nodes are "others," that is, if the modes are neither "all ready" nor "all reset" in S6400 of FIG. 45 (for example, if the modes of the two child nodes are all hold modes), then the same processing as that of S6406 (refer to FIG. 48) is carried out in S6410.

As described above, only in a case where the modes of the two child nodes of the n-th node are all ready and there is no danger in that the divergence takes place in the processing of estimating node relative floor height errors, the substantial estimation processing of the node relative floor height errors of the two child nodes is carried out. And, even if the modes of the child nodes are all ready, if there is a danger of the occurrence of divergence in estimation processing, then the values of the estimated node relative floor height errors of the two child nodes are held. Further, in a situation wherein the actual node floor reaction forces of the two child nodes are both zero, that is, if no actual floor reaction forces act on every ground contact portions 10 belonging to an n-th node, then the node relative floor height errors of the two child nodes are reset so that they are gradually reset to zero.

Figure 49:
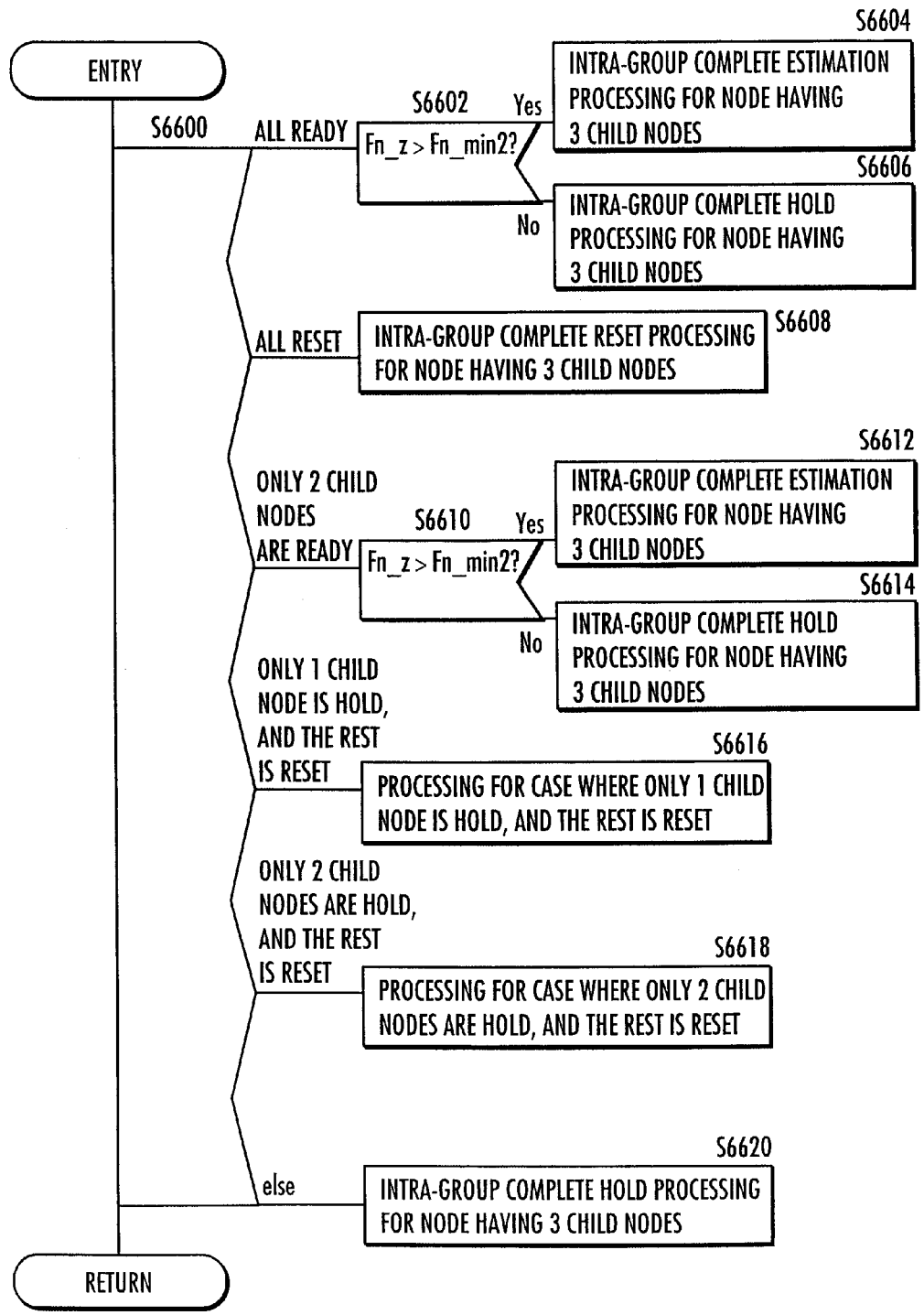
Figure 50:
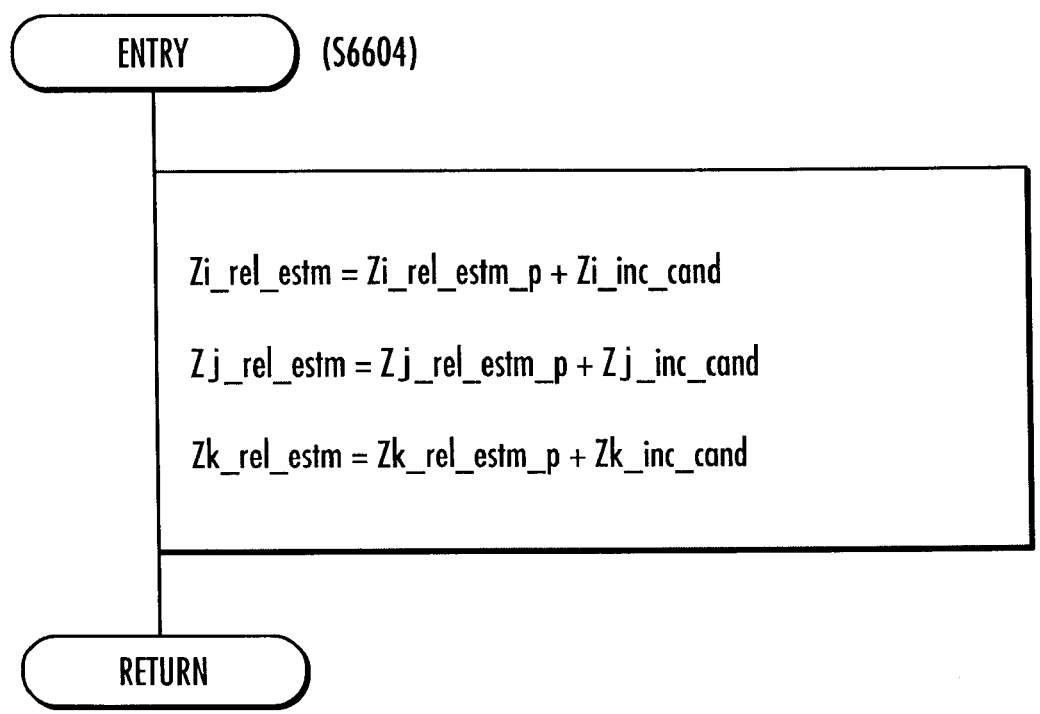
Figure 51:
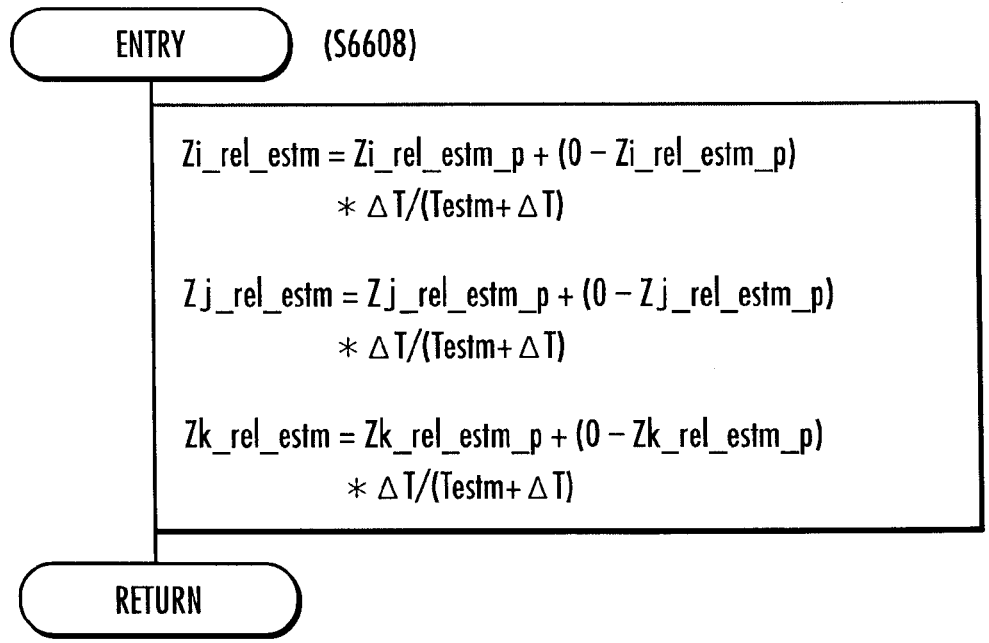
Figure 52:
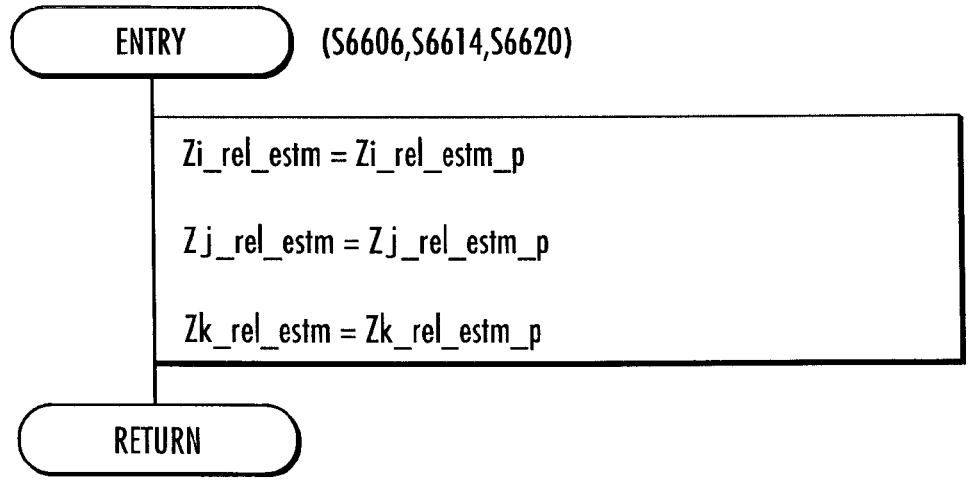
Figure 53:
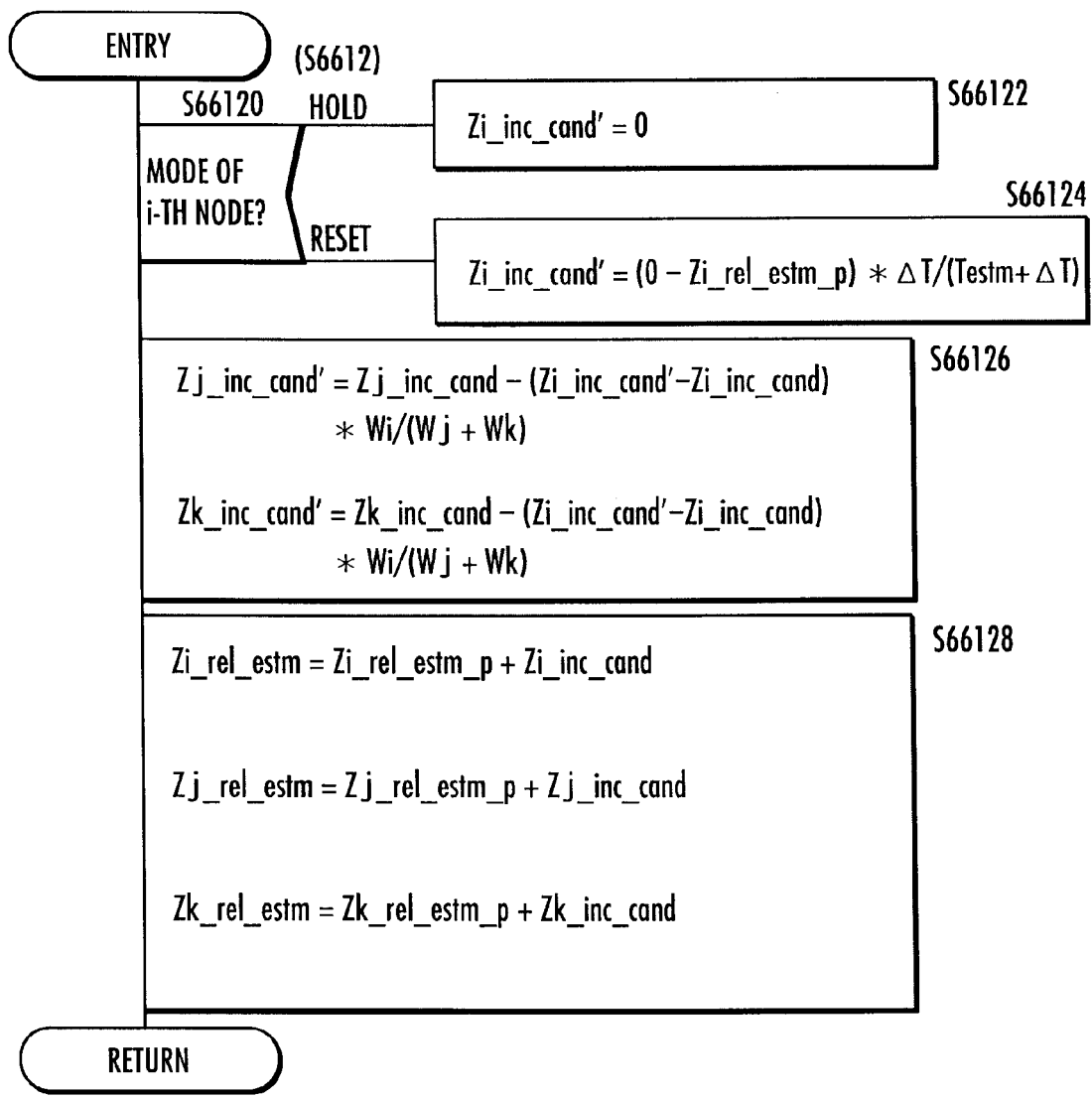
Figure 54:
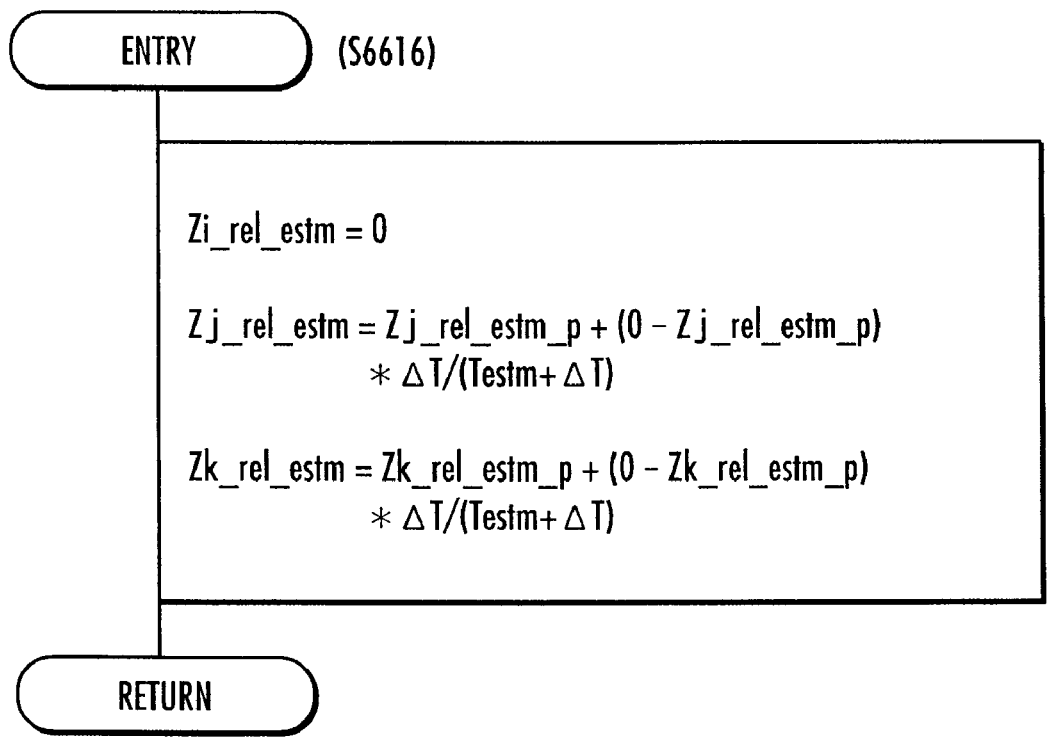

Referring now to FIG. 49 to FIG. 55, the three-child node floor configuration estimation processing of S66 of FIG. 41 will be explained. FIG. 49 is a flowchart showing the subroutine processing of the three-child node floor configuration estimation processing, FIG. 50 and FIG. 51 are flowcharts showing the subroutine processing of S6604 and S6608 of FIG. 49, FIG. 52 is a flowchart showing the subroutine processing of S6606, S6614, and S6618 of FIG. 49, and FIG. 53 and FIG. 54 are flowcharts showing the subroutine processing of S6612 and S6616, respectively, of FIG. 49.

In the three-child node floor configuration estimation processing, as shown in the flowchart of FIG. 49, the modes of all child nodes of an n-th node having three child nodes (the modes determined in S58 of FIG. 41) are determined in S6600. The determination results are divided into six, namely, "all ready," "all reset," "only two child nodes are ready," "only one child node is hold, and the remaining ones are reset," "only two child nodes are hold and the remaining ones are reset," and "others (else)."

Here, in the flowchart of FIG. 49, to explain more generally the floor configuration estimation processing for a three-child node, considerations are given not only to a case where all the ground contact portions 10 belonging to each intermediate node (the 145th node and the 236th node) simultaneously come in contact with the ground or leave a floor, as explained in the aforesaid second reference example, but also to a case where a desired gait of a robot is generated such that one of the ground contact portions of each intermediate node is in contact with the ground, while the remaining ground contact portions leave the floor. In this case, unlike the two-child node type, it is necessary to consider also a case where the modes of the three child nodes are "only two child nodes are ready," "only one child node is hold, and the remaining ones are reset," or "only two child nodes are hold, and the remaining ones are reset." In the following explanation, the three child nodes of an n-th node will be referred to as an i-th node, a j-th node, and a k-th node.

Here, if it is determined that the modes of child nodes are "all ready," then it is determined in S6602 whether a Fn_z (=Fi_act_z+Fj_act_z+Fk_act_z) resultant force of the translational force vertical components Fi_act_z, Fj_act_z, and Fk_act_z of the actual node floor reaction forces of the child nodes of the n-th node is larger than a predetermined value Fn_min2. In other words Fn_z denotes the translational force vertical component of the resultant force of the actual floor reaction forces of all ground contact portions belonging to the n-th node.

If the determination result of S6602 is YES, then intra-group all estimation processing for a node having three child nodes (the processing for virtually estimating the node relative floor height error of each of the three child nodes owned by the n-th node) is carried out in S6604. In this processing, estimated node relative floor height errors Zi_rel_estm, Zj_rel_estm, and Zk_rel_estm of the i-th node, j-th node, and the k-th node, respectively, which are the three child nodes of the n-th node, are determined (updated) according to the expressions shown in the flowchart of FIG. 50. More specifically, Zi_rel_estm will be representatively explained. An i-th node relative floor height error correction amount candidate value Zi_inc_cand determined in the aforesaid S54 is added to a value Zi_rel_estm_p of Zi_rel_estm in the last control cycle thereby to determine a new estimated i-th node relative floor height error Zi_rel_estm. The same applies to the j-th node and the k-th node.

If the determination result of S6602 is NO, then it means that the accuracy of estimating a floor configuration error would be excessively deteriorated, so that no substantial estimation processing is carried out, and the intra-group all hold processing for a node having three child nodes (the processing for holding the estimated node relative floor height errors of the three child nodes of the n-th node without updating them) is carried out in S6606. In the hold processing, as shown by the expressions in the flowchart of FIG. 52, the values of the estimated node relative floor height errors Zi_rel_estm, Zj_rel_estm, and Zk_rel_estm of the i-th node, the j-th node, and the k-th node, respectively, are maintained at the values Zi_rel_estm_p, Zj_rel_estm_p, and Zk_rel_estm_p in the last control cycle.

Further, if it is determined in S6600 of FIG. 49 that the modes of the three child nodes are "all reset," then intra-group all reset processing for a node having three child nodes (the processing for resetting the estimated node relative floor height error of each of the three child nodes owned by the n-th node) is carried out in S6608. In the reset processing, the estimated node relative floor height errors Zi_rel_estm, Zj_rel_estm, and Zk_rel_estm of the i-th node, the j-th node, and the k-th node, respectively, are updated according to the expressions in the flowchart of FIG. 51 such that they gradually approximate zero. Incidentally, the meanings of ΔT and Testm in the expressions are the same as those of the aforesaid expression 35.

More generally speaking, the reset processing is the processing in which Zi_rel_estm, Zj_rel_estm, and Zk_rel_estm are determined to take values that are closer to zero than Zi_rel_estm_p, Zj_rel_estm_p, and Zk_rel_estm_p are, while satisfying a condition in which their weighted average value is zero, that is, Wi*Zi_rel_estm+Wj*Zj_rel_estm+Wk*Zk_rel_estm=0. Incidentally, the aforesaid finite stabilization function generator (Japanese Unexamined Patent Application Publication No. H5-324115) may be used to reset Zi_rel_estm_p, Zj_rel_estm_p, and Zk_rel_estm_p to zero.

Further, if it is determined in S6600 of FIG. 49 that the modes of the three child nodes are "only two child nodes are ready," then it is determined in S6610 whether the translational force vertical component Fn_z of the resultant force of the actual node floor reaction forces of the child nodes of an n-th node (the resultant force of the actual floor reaction forces of all ground contact portions 10 belonging to the n-th node) is larger than the predetermined value Fn_min2.

If the result of the determination is YES, then the intra-group partial estimation processing for a node having three child nodes (the processing for substantially estimating the node relative floor height error of each of the three child nodes owned by the n-th node) is carried out in S6612. This processing is carried out as shown by the flowchart of FIG. 53. In this case, it is assumed that the i-th node is not in the ready mode, while the j-th node and the k-th node are in the ready mode.

First, in S66120, the mode of the i-th node is determined. If the result of the determination is the hold mode, then a new i-th node relative floor height error correction amount candidate value Zi_inc_cand' is determined to be zero in S66122, or if it is the reset mode, then the new i-th node relative floor height error correction amount candidate value Zi_inc_cand' is determined in S66124 according to the expression in the figure. Zi_inc_cand' determined in S66124 denotes an i-th node relative floor height error correction amount candidate value for gradually bringing Zi_rel_estm_p close to zero. The meanings of ΔT and Testm in the expressions of S66124 are the same as those of the aforesaid expression 35. Supplementally, the aforesaid finite stabilization function generator (Japanese Unexamined Patent Application Publication No. H5-324115) may be used to determine Zi_inc_cand' in S66124.

Subsequently, in S66126, a new j-th node relative floor height error correction amount candidate value Zj_inc_cand' and a new k-th node relative floor height error correction amount candidate value Zk_inc_cand' are determined according to the expressions in the figure.

More specifically, Zj_inc_cand' and Zk_inc_cand' are determined such that they satisfy a condition represented by Wi*Zi_inc_cand'+Wj*Zj_inc_cand'+Wk*Zk_inc_cand'=0 (a condition in which the weighted average value of Zi_inc_cand', Zj_inc_cand' and Zk_inc_cand' is zero) and a condition represented by Zj_inc_cand'−Zj_inc_cand=Zk_inc_cand'−Zk_inc_cand. A20

Subsequently, in S66128, Zi_inc_cand', Zi_inc_cand', and Zk_inc_cand' determined as described above are added to the values Zi_rel_estm_p, Zj_rel_estm_p, and Zk_rel_estm_p of the relative floor height errors of the i-th node, the j-th node, and the k-th node, respectively, in the last control cycle so as to determine new Zi_rel_estm, Zj_rel_estm, and Zk_rel_estm.

By determining Zi_rel_estm, Zj_rel_estm, and Zk_rel_estm as described above, Zi_rel_estm, Zj_rel_estm, and Zk_rel_estm will be determined such that Zj_rel_estm-Zk_rel_estm approximates Zj_inc_cand-Zk_inc_cand while satisfying Wi*Zi_rel_estm+Wj*Zi_rel_estm+Wk*Zk_rel_estm=0 at the same time.

If the result of the determination of S6610 of FIG. 49 is NO, then the accuracy of estimating a floor configuration error would be excessively deteriorated, so that no substantial estimation processing is carried out, but the same processing as that of the aforesaid S6606 (refer to FIG. 52) is carried out in S6614.

Further, if it is determined in S6600 of FIG. 49 that the modes of the three child nodes are "only one child node is hold and the remaining ones are reset," then the processing for a case where only one child node is hold and the remaining ones are reset is carried out in S6616. In the processing, new node relative floor height errors Zi_rel_estm, Zj_rel_estm and Zk_rel_estm are determined according to the expressions shown in the flowchart of FIG. 54. Incidentally, in this case, it is assumed that the mode of the i-th node is the hold mode and the modes of the j-th node and the k-th node are the reset mode. The meanings of ΔT and Testm in the expressions are the same as those in the aforesaid expression 35.

The processing of FIG. 54 is, more generally, the processing for determining Zi_rel_estm to be zero and determining Zj_rel_estm and Zk_rel_estm to take values that are closer to zero than Zj_rel_estm_p and Zk_rel_estm_p are, while satisfying Wi*Zi_rel_estm+Wj*Zj_rel_estm+Wk*Zk_rel_estm=0 (a condition in which the weighted average value of Zi_rel_estm, Zj_rel_estm and Zk_rel_estm is zero). Supplementally, by the moment the modes of the j-th node and the k-th node both become the reset mode, their node weights Wj and Wk should have become zero. Hence, based on a condition in that the sum of the weights Wi, Wj and Wk is 1, Wi will be 1 by that moment and Wi*Zi_rel_estm+Wj*Zj_rel_estm+Wk*Zk_rel_estm=0, so that Zi_rel_estm will be zero by that moment. Thus, holding the value of the i-th node Zi_rel_estm means maintaining the value at zero. Therefore, in the processing of FIG. 54, the value of Zi_rel_estm is determined to be zero.

Incidentally, the aforesaid finite stabilization function generator (Japanese Unexamined Patent Application Publication No. H5-324115) may be used in the processing for gradually resetting Zj_rel_estm and Zk_rel_estm to zero.

Further, if it is determined in S6600 of FIG. 49 that the modes of the child nodes are "only two child nodes are hold and the remaining ones are reset," then the processing for a case where only two child nodes are hold and the remaining ones are reset is carried out in S6618. In the processing, new node relative floor height errors Zi_rel_estm, Zj_rel_estm and Zk_rel_estm are determined according to the expressions shown in the flowchart of FIG. 55. Incidentally, in this case, it is assumed that the modes of the i-th node and the j-th node are both the hold mode and the mode of the k-th node is the reset mode. The meanings of ΔT and Testm in the expressions are the same as those in the aforesaid expression 35.

Figure 55:
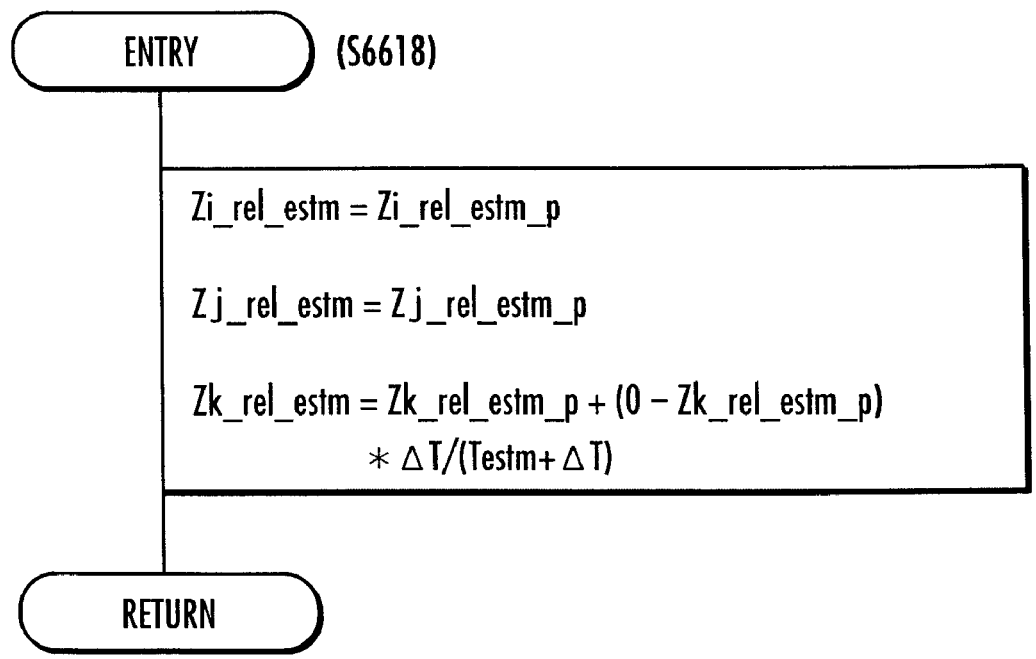

The processing of FIG. 55 is, more generally, the processing for holding Zi_rel_estm and Zj_rel_estm at the values in the last control cycle, and determining Zk_rel_estm to take a value that is closer to zero than Zk_rel_estm_p is, while satisfying Wi*Zi_rel_estm+Wj*Zj_rel_estm+Wk*Zk_rel_estm=0 (a condition in which the weighted average value of Zi_rel_estm, Zj_rel_estm and Zk_rel_estm is zero). Supplementally, by the moment the k-th node becomes the reset mode, Wk should have become zero.

Incidentally, the aforesaid finite stabilization function generator (Japanese Unexamined Patent Application Publication No. H5-324115) may be used in the processing for gradually resetting Zk_rel_estm to zero.

Further, if it is determined to be "Others" in S6620 of FIG. 49 (e.g., if the modes of the three child nodes are all hold mode), then the same processing as that of the aforesaid S6606 (refer to FIG. 52) is carried out in S6620.

As described above, only in a case where the modes of two or more child nodes are ready out of the modes of the three child nodes of the n-th node, and there is no danger of divergence taking place in the processing of estimating node relative floor height errors, the substantial estimation processing of the node relative floor height errors of the two or more child nodes is carried out. And, even if the modes of two or more child nodes are ready, if there is a danger of the occurrence of divergence in estimation processing, then the values of the estimated node relative floor height errors of the three child nodes are held.

As described above, in S60 to S66 of FIG. 41, estimated n-th relative floor height errors Zn_rel_estm (n=1, 2, . . . , last node number) are determined. Incidentally, the relative floor height error of the root node is zero.

In the processing of the flowchart of FIG. 41, lastly, in S72, the sum of the estimated relative floor height errors of all ancestor nodes of an n-th node (n=1, 2, . . . , last leaf node number) and an estimated n-th node relative floor height error is determined, and the determined sum is defined as an estimated n-th ground contact portion floor height error (estimated n-th floor height error) Zfn_estm.

The above is the subroutine processing of the estimation processing of floor height errors in FIG. 40.

Next, returning to the explanation of FIG. 35, the estimated n-th floor height error Zfn_estm (n=1, 2, . . . , last leaf node number) sequentially determined by the floor configuration estimator 130 as described above is added to the corrected desired ground contact portion position/posture of each ground contact portion 10 by an adder 132 so as to determine corrected desired ground contact portion position/posture with floor configuration error compensation. Then, the corrected desired ground contact portion position/posture with floor configuration error compensation is input, in place of corrected desired ground contact portion position/posture, to the corrected desired ground contact portion position/posture with deformation compensation calculator 114h.

The processing of the control system 50 including the floor configuration estimator 130 and the adder 132 explained above is repeatedly carried out for each control cycle of the control system 50, thereby causing the estimated n-th floor height error Zfn_estm to converge to an actual n-th floor height error. Further, desired ground contact portion positions/postures are corrected on the basis of the estimated n-th floor height errors Zfn_estm corresponding to the ground contact portions so as to absorb an influence exerted by an actual n-th floor height error on an actual floor reaction force.

If all n-th ground contact portions (n=1, 2, . . . , last leaf node number) are in contact with the ground, then the point corresponding to a desired n-th ground contact portion floor reaction force central point Qn on the actual ground contact surface of an n-th ground contact portion should agree with an actual n-th floor contact point Dn_act. Therefore, the aforesaid instantaneous n-th node relative floor height error Zn_rel' should not change. In actuality, however, the instantaneous n-th node relative floor height error Zn_rel' obtained by the aforesaid calculation algorithm of the aforesaid floor configuration estimator 130 significantly changes due to the vibrations and electrical noises of a mechanical system or control system of the robot 1. Therefore, if the instantaneous n-th node relative floor height error is directly used as an estimated n-th node relative floor height error, and if, based on this, the estimated n-th floor height error Zfn_estm is determined (that is, the sum of the instantaneous relative floor height errors of all ancestor nodes of an n-th node (n=1, 2, ..., last leaf node number) and the instantaneous n-th node relative floor height error is defined as the estimated n-th floor height error Zfn_estm), and further, if the result obtained by adding the estimated n-th floor height error Zfn_estm to the corrected desired ground contact portion position/posture is supplied to the corrected desired ground contact portion position/posture with deformation compensation calculator 114h, as shown in FIG. 35, then the ground contact portions 10 of the robot 1 will oscillate or severely vibrate.

Meanwhile, in the intra-group all estimation processing for a node having two child nodes, the intra-group all estimation processing for a node having three child nodes, and the intra-group partial estimation processing for a node having three child nodes described above, the transfer function from the instantaneous n-th node relative floor height error Zn_rel' to the estimated n-th node relative floor height error Zn_rel_estm will be a primary delay low-pass filter. In other words, the estimated n-th node relative floor height error Zn_rel_estm will be the one obtained by passing the instantaneous n-th node relative floor height error Zn_rel' through a low-pass filter. Therefore, even when the estimated n-th floor height error Zfn_estm determined on the basis of the estimated n-th node relative floor height error Zn_rel_estm is added to the corrected desired ground contact portion position/posture, as shown in FIG. 35, the oscillation or vibration of the ground contact portions 10 will hardly occur. This makes it possible to restrain the ground contact portions 10 from oscillating or vibrating.

Incidentally, in the present reference example, the time constant of the aforesaid low-pass filter is Testm. Other than the processing of the floor configuration estimator 130 explained in the present reference example, it is also possible to accomplish a construction in which the transfer function from the instantaneous n-th node relative floor height error Zn_rel' to the estimated n-th node relative floor height error Zn_rel_estm will be a low-pass filter.

The characteristics of the floor configuration estimator 130 in the present embodiment will now be explained.

Even if each node compensating angle is changed and the corrected desired ground contact portion position/posture with deformation compensation, which are the final desired ground contact portion position/posture, are changed to generate node compensating moments required for the stabilization control of the posture of the robot 1, the point corresponding to the desired n-th ground contact portion floor reaction force central point Qn of the n-th ground contact portion 10 on an actual ground contact surface remains in agreement with the actual n-th floor contact point Dnact as long as the ground contact portions 10 are actually in contact with the ground. Instead, the compliance mechanism 42 or the like of each leg deforms or the position/posture of the body 24 change. In other words, the compliance mechanism 42 or the like deforms or the position/posture of the body 24 change in order to cancel the change of the corrected desired ground contact portion position/posture with deformation compensation.

The floor configuration estimator 130 in the present reference example cancels the influences exerted on the estimated n-th floor height error Zfn_estm by the deformation amount of the compliance mechanism 42 or the like, which is calculated by the mechanism compliance model 134 on the basis of an actual floor reaction force, and the body posture inclination error θberr by the time the estimated n-th floor height error Zfn_estm (n=1, 2, ..., last leaf node number) is calculated from the corrected desired ground contact portion position/posture with deformation compensation. Hence, even if a body posture inclination error occurs or corrected desired ground contact portion position/posture with deformation compensation change, the estimated n-th floor height error Zfn_estm is not influenced thereby.

This means that the processing for estimating a floor configuration is not subjected to interference by the compliance control or posture control of the robot 1. Therefore, even when the estimated n-th floor height error Zfn_estm is added to the corrected desired ground contact portion position/posture, as shown in FIG. 35, the stability allowance (resistance to oscillation) of the control system of the robot 1 hardly reduces. In other words, control and processing will not interfere with each other and cause oscillation even if the compliance control, posture control and the floor configuration estimation processing and the operation for correcting a desired gait of the robot 1 by using the estimated value of a floor configuration error are simultaneously performed. This means, in brief, that the leg compensating operation to cancel the influence exerted on a floor reaction force by a floor configuration error (the operation for correcting the position/posture of a ground contact portion) can be simultaneously performed while simultaneously estimating a plurality of parameters of the floor configuration error. Moreover, the leg compensating operation for posture control (the operation for correcting the position/posture of a ground contact portion) can be simultaneously performed.

Further, if the estimated n-th floor height error Zfn_estm of each ground contact portion 10 is added to the corrected desired ground contact portion position/posture, as shown in FIG. 35, then even if there is actually an n-th floor height error, the influence thereof can be offset, so that the actual total floor reaction force will steadily be the same as that in a case where the robot 1 is traveling on a supposed floor. Furthermore, the estimation of the estimated n-th floor height error Zfn_estm and the correction of corrected desired ground contact portion position/posture by using the estimated n-th floor height error Zfn_estm are sequentially carried out for each control cycle; therefore, even if a floor configuration changes in the middle, the n-th floor height error after the change can be estimated and the influence exerted by the change in the floor configuration can be cancelled on the basis of the estimated value. However, the floor configuration estimator 130 includes a low-pass filter, as mentioned above, so that an actual total floor reaction force is transitionally subject to the influence of a floor configuration error immediately after the ground contact portions 10 come in contact with the ground or if the floor configuration changes in the middle. Thereafter, however, the influence is attenuated by the time constant Testm.

Further, there are the following characteristics.
1) Control is resistant to failure even if a floor configuration error is large. This is because the hierarchical compliance control does not carry out approximation limited to minute compensating angles.
2) The accuracy of estimating floor configuration errors is high.
3) Resistant to the occurrence of oscillation attributable to the interference with the robot posture stabilization control, permitting a shorter time constant for estimation processing to be achieved. This makes it possible to enhance the responsiveness of the leg compensating operation to offset the influence exerted by a floor configuration error on a floor reaction force, so that the transitional influence exerted by the floor configuration error on the floor reaction force can be quickly eliminated.

If there is no correlation in the relationship between the estimated n-th floor height error in a landing period of one step before (a period in which a certain ground contact portion 10 comes in contact with the ground) and the estimated n-th floor height error in a landing period following the above landing period of one step before when a robot is traveling, then it is preferred to forcibly and gradually converge the estimated n-th floor height error to zero, as shown in the present reference example. However, if, for example, it is known that the undulation of an actual floor surface not considered in a supposed floor is gentle, then it is considered that there is some correlation in the aforesaid relationship. In this case, the estimated n-th floor height error in the current landing period may be forcibly and gradually converged to the value obtained by multiplying the estimated n-th floor height error in the landing period of one step before by a positive constant that is smaller than 1.

Further, the convergence desired value of an estimated n-th floor height error in the current landing period may be determined by using not only the estimated n-th floor height error in the landing period of one step before but also the estimated n-th floor height error in the landing period of a plurality of steps before. Further, the convergence desired value may be determined by using the estimated n-th node floor height error and the estimated n-th node floor inclination error of another node in the landing period of current step, one step before or a plurality of steps before.

Since the present reference example (the third reference example) has been constructed as described above, the estimation of floor configurations, specifically, the floor height errors associated with ground contact portions, can be simultaneously, in other words, compositely, estimated with high accuracy even in a robot having many ground contact portions, which has been difficult to accomplish with conventional technologies. Moreover, if the ground contact portions of a robot are provided such that their postures can be controlled, and floor inclination errors are estimated in addition to floor height errors in the processing for estimating floor configurations, then the floor inclination errors can be also simultaneously estimated with high accuracy.

Furthermore, by correcting a desired ground contact portion position/posture trajectory on the basis of the result of estimating a floor configuration, even if a floor configuration is different from a supposed configuration, the influence thereof can be absorbed, thus making it possible to generate a floor reaction force as desired.

In particular, the steady error of an actual floor reaction force from a control desired value, which has not been completely removed by the hierarchical compliance control that does not include corrections based on the estimated values of floor configuration errors, can be brought close to zero as much as possible. In other words, the steady errors of floor reaction forces caused by floor configuration errors can be eliminated.

Furthermore, the arrangement has been made such that the estimation of a floor configuration is interrupted in a situation wherein the accuracy of estimating a floor configuration may deteriorate or a situation wherein the estimated value thereof may diverge. This adds to the aforesaid advantages by preventing estimated values from being inappropriate.

Incidentally, the floor configuration estimator 130 of a robot according to the present reference example is expected to estimate floor configurations by the aforesaid techniques, and it is not essential to correct motions on the basis of estimated values.

FOURTH REFERENCE EXAMPLE

A control system (a floor configuration estimator in particular) of a mobile robot according to a fourth reference example of the present invention will now be explained. In the fourth reference example, to explain it in brief, the block diagram of the floor configuration estimator 130 shown in FIG. 40 of the aforesaid third reference example has been equivalently converted. More specifically, the floor reaction force of each node is estimated on the basis of the estimated value of a floor configuration estimated immediately before (the past value of an estimated value, such as the estimated value in the last control cycle), a desired gait that has been finally corrected and determined (detailedly, corrected desired ground contact portion position/posture with deformation compensation including a compliance operation)(or an actual joint displacement), and an actual body posture inclination error $\theta$berr. Based on the difference between the estimated value and the actual floor reaction force of each node, the correction amount candidate value of the estimated value of the floor configuration is determined to bring the difference close to zero. If it is determined that the estimation of the floor configuration will not diverge, then the estimated value of the floor configuration that has been estimated immediately before is corrected on the basis of the correction amount candidate value of the estimated value of the floor configuration. This processing corresponds to a hierarchical floor configuration estimating means that is an advanced version of the means for estimating a floor inclination related to each foot such that the difference between the supposed moment about the floor reaction force central point of the foot of each leg of a biped mobile robot and an actual moment approximates zero and the means for estimating the interference angle between both legs such that the difference between the supposed moment about a total floor reaction force central point and an actual moment approximates zero in Japanese Unexamined Patent Application Publication No. H10-277969 previously proposed by the present applicant.

Thus, the present reference example differs from the third reference example only in the processing of a floor configuration estimator 130, so that the explanation of the processing of those other than the floor configuration estimator 130 will be omitted.

Figure 57:
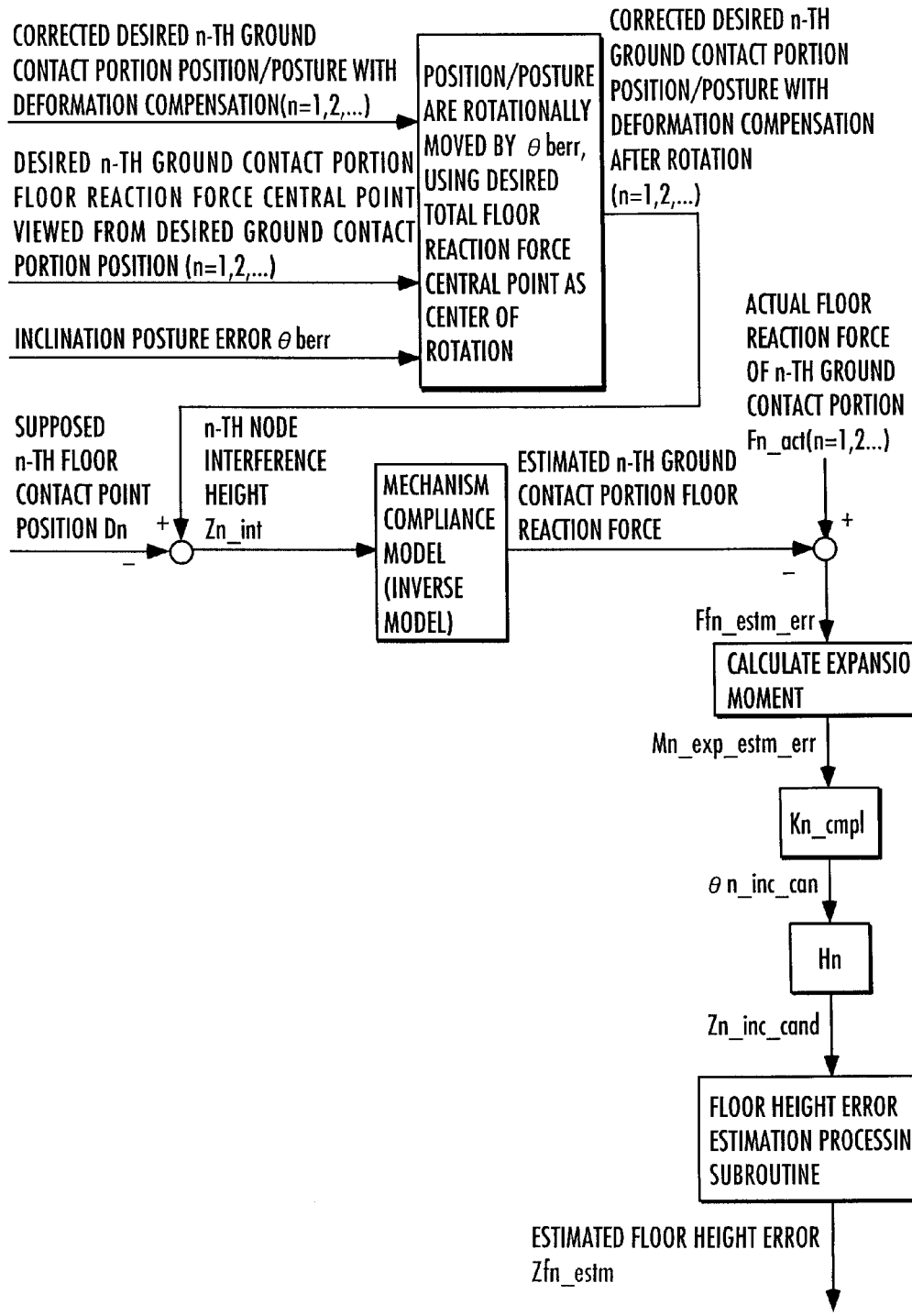
FIG. 57 is a block diagram showing the functions of a floor configuration estimator in a fifth reference example.

FIG. 57 is a block diagram showing the functional means of the floor configuration estimator 130 in the present reference example. Referring to this FIG. 57, the floor configuration estimator 130 in the present reference example will be explained below.

First, based on corrected desired n-th ground contact portion position/posture with deformation compensation (n=1, 2, . . . , last leaf node number) of each ground contact portion 10, the desired n-th ground contact portion floor reaction force central point of the ground contact portion 10 observed from the desired ground contact portion position of each ground contact portion 10, and the aforesaid posture inclination error $\theta$berr, the corrected desired n-th ground contact portion position/posture with deformation compensation is rotationally moved by $\theta$berr, a desired total floor reaction force central point being the center of the rotation, so as to determine the corrected desired n-th ground contact portion position/posture (n=1, 2, . . . , last leaf node number) with deformation compensation after rotation. A supposed n-th floor contact position Dn (n=1, 2, . . . , last leaf node number)

on a desired gait is subtracted from the determined corrected desired n-th ground contact portion position/posture (n=1, 2, ..., last leaf node number) with deformation compensation after rotation so as to determine an n-th ground contact portion interference height Zn_int. This is supplied to a mechanism compliance model (inverse model) provided in a floor configuration estimator 130, thereby determining an estimated n-th ground contact portion floor reaction force, which is the estimated value of the floor reaction force of each ground contact portion 10.

Incidentally, the mechanism compliance model here is used to determine the mutual relative relationship among the estimated ground contact portion floor reaction forces on the basis of the mutual relative relationship among ground contact portion interference heights, and it finds no meaning in absolute values. Further, if the detected value of an actual floor reaction force Fn_act of an n-th ground contact portion is smaller than a certain threshold value Fn_min3, then it is assumed that the n-th ground contact portion is not in contact with the ground also in the aforesaid mechanism compliance model.

Further, the aforesaid estimated n-th ground contact portion floor reaction force is subtracted from the detected value of the actual floor reaction force Fn_act of an n-th ground contact portion (n=1,2, ..., last leaf node number) to determine the estimated error of the n-th ground contact portion floor reaction force Ffn_estm_err. The estimated error of the n-th ground contact portion floor reaction force Ffn_estm_err is expressed in terms of a force, so that it is converted into a height error by a conversion value Cn (e.g., the reciprocal of a spring constant) and the result is adopted as an n-th ground contact portion floor height error correction amount candidate value Zfn_inc_cand. Incidentally, the conversion value Cn is not necessarily a diagonal matrix.

Subsequently, hierarchical relativization is performed by the "hierarchical relativization processing" described above on the basis of the determined n-th ground contact portion floor height error correction amount candidate value $Zfn_{13}$_inc_cand so as to determine an n-th node relative floor height error correction amount candidate value Zn_inc_cand (n=1, 2, ..., last node number). Then, based on the n-th node relative floor height error correction amount candidate value Zn_inc_cand, an estimated floor height error (estimated n-th floor height error) Zfn_estm (n=1, 2, ..., last leaf node number) is determined by the subroutine processing of the estimation processing of floor height errors. The subroutine processing of the estimation processing of floor height errors here is identical to the processing of S56 to S72 shown in FIG. 41.

It is desirable to carry out the ground contact portion floor inclination error estimation processing as explained in conjunction with S70 of FIG. 41 in the case of a robot that has feet whose postures can be controlled as ground contact portions and that is capable of estimating the floor inclination errors in ground contact portions, as disclosed in Japanese Unexamined Patent Application Publication No. H10-277969.

The third reference example and the fourth reference example (the present reference example) will now be compared. The fourth reference example is, in brief, the converted equivalent of the block diagram of the floor configuration estimator 130 of the third reference example. Hence, the advantages of the fourth reference example are the same as the advantages of the third reference example. Further, as with the third reference example, it is not essential to correct motions on the basis of the estimated values of floor configurations.

In the third and the fourth reference examples, distributed pressure sensors may be used as floor reaction force sensors. Distributed pressure sensors make it possible to estimate more finely the deformations of ground contact portions due to actual floor reaction forces than force sensors, such as the six-axis force sensor 34, so that the accuracy in estimating floor configurations can be improved.

Furthermore, as shown in FIG. 1 of U.S. Pat. No. 3,035,051 by the present applicant, a plurality of contact sensors may be disposed on a ground contact portion (e.g., on the four corners of the ground contact portion), and it may be determined in which direction the ground contact portion is likely to float on the basis of the output signals thereof. Then, the estimation of a floor configuration in the direction in which a contact sensor that is not in contact with the ground is likely to further float may be interrupted, or the estimation of a floor configuration may be interrupted also when all contact sensors are floating.

FIFTH REFERENCE EXAMPLE

In the first to the fourth reference examples described above, the cases where the total number of child nodes of a node having child nodes is three or less have been taken as examples in the above explanation; however, also in a case where the number of child nodes is four or more, the concepts of the moments and inclination angles can be expanded as shown below by introducing the concept of a weighted average.

The concept can be expanded for any of desired values, actual values, and errors. Here, therefore, the desired values, the actual values, and errors will not be discriminated; instead, the moment for a general set of ground contact portion floor reaction forces Fn (n=1, 2, ...) will be expanded and defined as shown below.

A set of the floor reaction forces of an n-th ground contact portion Fn (n=1, 2, ..., last leaf node number) is hierarchically relativized to determine an n-th node relative floor reaction force Fn_rel (n=1, 2, ..., last node number).

The number of the child nodes of an n-th node is denoted by r.

The identification number of a j-th child node of the n-th node is denoted by aj (j=1, 2, ..., r).

The weight of the j-th child node of the n-th node is denoted by Wj (j=1, 2, ..., r).

The column vector having, as a j-th element, the weight of the j-th child node of the n-th node is denoted by UWn.

Thus, UWn is defined as shown by the following expression 38, where "T" means transposition, and a column vector can be expressed by transposing a row vector.

$$UWn=(Wa1,Wa2,\ldots,War)^T \qquad \text{Expression 38}$$

r−1 mutually independent vectors orthogonal to the vector UWn (that is, the scalar product with the vector UWn is zero) are denoted by R(1),R(2), ..., R(r−1). R(j) (j=1, 2, ..., r−1) denotes the column vector of r row, 1 column. Incidentally, R(j) (j=1, 2, ..., r−1) are desirably orthogonal to each other, considering the ease of computation and control accuracy. A matrix having R(j) set to a j-th column (j=1, 2, ..., r−1) is denoted by Hn. Hn is the matrix of r row, r−1 column.

A column vector whose j-th element (j=1, 2, ..., r) is a relative floor reaction force Faj_rel of a j-th child node of the n-th node is defined as an n-th group relative floor reaction force vector Fn_rel_c.

In other words, Fn_rel_c is defined by the following expression 39.

$$Fn\_rel\_c = (Fa1\_rel, Fa2\_rel, \ldots, Far\_rel)^T \quad \text{Expression 39}$$

Fn_rel_c denotes a column vector of r row, 1 column.

A column vector Mn_exp satisfying the following expression 40 is referred to as an n-th node expansion floor reaction force moment.

$$Fn\_rel\_c = Hn * Mn\_exp \quad \text{Expression 40}$$

Mn_exp denotes a column vector of r−1 row, 1 column.

For the set of ground contact portion floor reaction forces Fn (n=1, 2, ...), the n-th node expansion floor reaction force moment Mn_exp is defined as described above.

More specifically, based on the ground contact portion floor reaction force Fn (n=1, 2, ...), a hierarchized node relative floor reaction force Fn_rel (n=1, 2, ...) is determined, and further, a vector having, as its element, the coefficient of the linear combination when a vector (Fa1_rel, Fa2_rel, ..., Far_rel)$^T$ having, as its elements, the relative floor reaction forces of all child nodes aj (j=a1, a2, ..., ar) of an n-th node is expressed by the liner combination of certain predetermined mutually independent vectors R(j) (j=1, 2, ..., r−1) that are orthogonal to a vector (Wa1, Wa2, ..., War)$^T$ having, as its elements, the weights of all child nodes of the n-th node is referred to as the n-th node expansion floor reaction force moment Mn_exp.

Incidentally, a j-th element (the element of a j-th row) of the n-th node expansion floor reaction force moment Mn_exp is referred to as the j-th component of the n-th node expansion floor reaction force moment.

Further, the n-th node expansion floor reaction force moment relative to the set of actual ground contact portion floor reaction forces Fn (n=1, 2, ...) is referred to as the actual n-th node expansion floor reaction force moment Mn_exp_act.

Further, the n-th node expansion floor reaction force moment relative to the set of desired ground contact portion floor reaction forces Fn (n=1, 2, ...) is referred to as the desired n-th node expansion floor reaction force moment Mn_exp_ref. The desired n-th node expansion floor reaction force moment is usually set to zero vector.

Further, the n-th node expansion floor reaction force moment relative to the set of ground contact portion floor reaction force errors Fn (n=1, 2, ...) is referred to as the n-th node expansion floor reaction force moment error Mn_exp_err.

Similarly, the inclination angle relative to a set of general ground contact portion heights Zn (n=1, 2, ...) is expanded and defined as follows.

A set of ground contact portion heights Zn (n=1, 2, ..., last leaf node number) is hierarchically relativized to determine an n-th node relative height Zn_rel (n=1, 2, ..., last node number).

A column vector whose j-th element (j=1, 2, ..., r) is a relative height Zaj_rel of a j-th child node of the n-th node is defined as an n-th node relative height vector Zn_rel_c.

In other words, Zn_rel_c is defined by the following expression 41.

$$Zn\_rel\_c = (Za1\_rel, Za2\_rel, \ldots, Zar\_rel)^T \quad \text{Expression 41}$$

A column vector θn_exp satisfying the following expression 42 is referred to as an n-th node expansion floor reaction force inclination angle.

$$Zn\_rel\_c = Hn * \theta n\_exp \quad \text{Expression 42}$$

θn_exp denotes a column vector of r−1 row, 1 column.

More specifically, based on the ground contact portion height Zn (n=1, 2, ...), a hierarchized node relative height Zn_rel (n=1, 2, ...) is determined, and further, a vector having, as its element, the coefficient of the linear combination when a vector (Za1_rel, Za2_rel, ..., Zar_rel)$^T$ having, as its elements, the relative heights of all child nodes aj (j=1, 2, ..., r) of an n-th node is expressed by the liner combination of certain predetermined mutually independent vectors R(j) (j=1, 2, ..., r−1) that are orthogonal to a vector (Wa1, Wa2, ..., War)$^T$ having, as its elements, the weights of all child nodes of the n-th node is referred to as the n-th node expansion inclination angle θn.

By using the expansion floor reaction force moment and the expansion inclination angle defined as described above, the compliance control and the processing for estimating floor configurations are expanded almost as they are even for a case where the number of the child nodes of an a-th node is four or more. The following will explain an example thereof as a fifth reference example. In the fifth reference example, the functional construction of a control system of a robot is the same as that shown in the aforesaid FIG. 2. In this case, the functional construction of a hierarchical compliance operation determiner may be the same as that explained with reference to the aforesaid FIG. 35 except for a compensating total floor reaction force moment distributor, a compensating angle determiner, and a floor configuration estimator.

[Expanding the Processing of the Compensating Total Floor Reaction Force Moment Distributor]

For example, the processing of the compensating total floor reaction force moment distributor in the hierarchical compliance operation determiner is expanded as shown below.

The expansion floor reaction force moment to be generated in addition to a desired n-th node expansion floor reaction force moment Mn_exp_rel (normally zero) to restore the posture of a robot is referred to as an n-th node compensating expansion floor reaction force moment Mn_exp_dmd.

Expression 43 given below holds between the n-th node compensating expansion floor reaction force moment Mn_exp_dmd and the n-th node compensating floor reaction force moment Mn_dmd. However, Cn_mech denotes a predetermined coefficient matrix (the matrix of 2 rows, r−1 column) determined by each desired node floor reaction force central point and the compliance characteristic of the mechanism of the robot.

$$Mn\_dmd = Cn\_mech * Mn\_exp\_dmd \quad \text{Expression 43}$$

Meanwhile, generalizing the aforesaid expression 10 provides the following expression 44.

$$Mdmd = \Sigma Mn\_dmd \quad \text{Expression 44}$$

where Σ means the total sum on all n-th nodes.

Hence, the compensating total floor reaction force moment distributor may determine the n-th node compensating expansion floor reaction force moment Mn_exp_dmd (n=1, 2, ...) and the n-th node compensating floor reaction force moment Mn_dmd such that expression 43 and expression 44 are satisfied.

[Expanding the Processing of the Compensating Angle Determiner (θn Determiner)]

Figure 33:
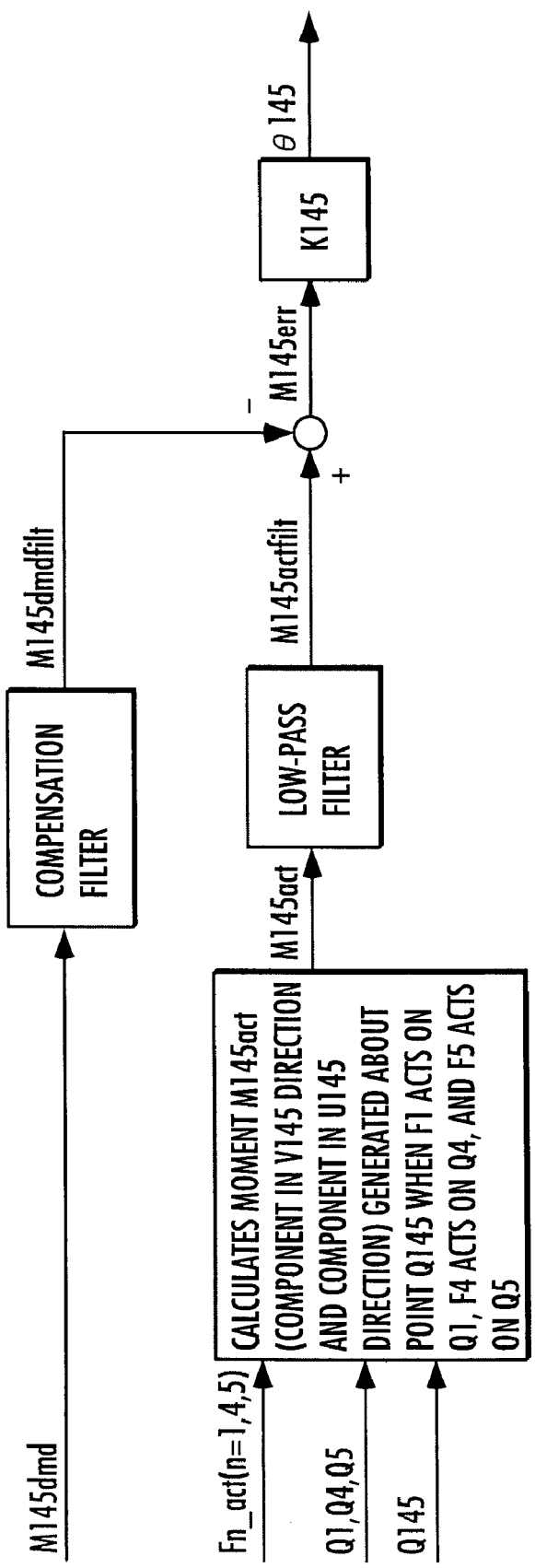

The processing of the n-th node compensating angle determiner in the fifth reference example is carried out as follows. For example, in the processing of the θ145 determiner in the third reference example (refer to FIG. 25 and FIG. 33), the processing until M145act is determined is replaced by the processing for determining the aforesaid actual n-th node expansion floor reaction force moment Mn_exp_act on the basis of the actual floor reaction force of each ground contact portion, 145 is replaced by n, and the dimension of the compensation filter, the low-pass filter, and gain Kn in FIG. 33 is expanded to the number obtained by subtracting 1 from the number of child nodes of an n-th node. The compensating angle θn of the n-th node can be determined by the processing that has been replaced as described above.

[Estimating a Floor Configuration by Using an Expansion Floor Reaction Force Moment]

As described below, the processing of the floor configuration estimator may partly incorporate a technique using the concept of the expansion floor reaction force moment.

Figure 56:
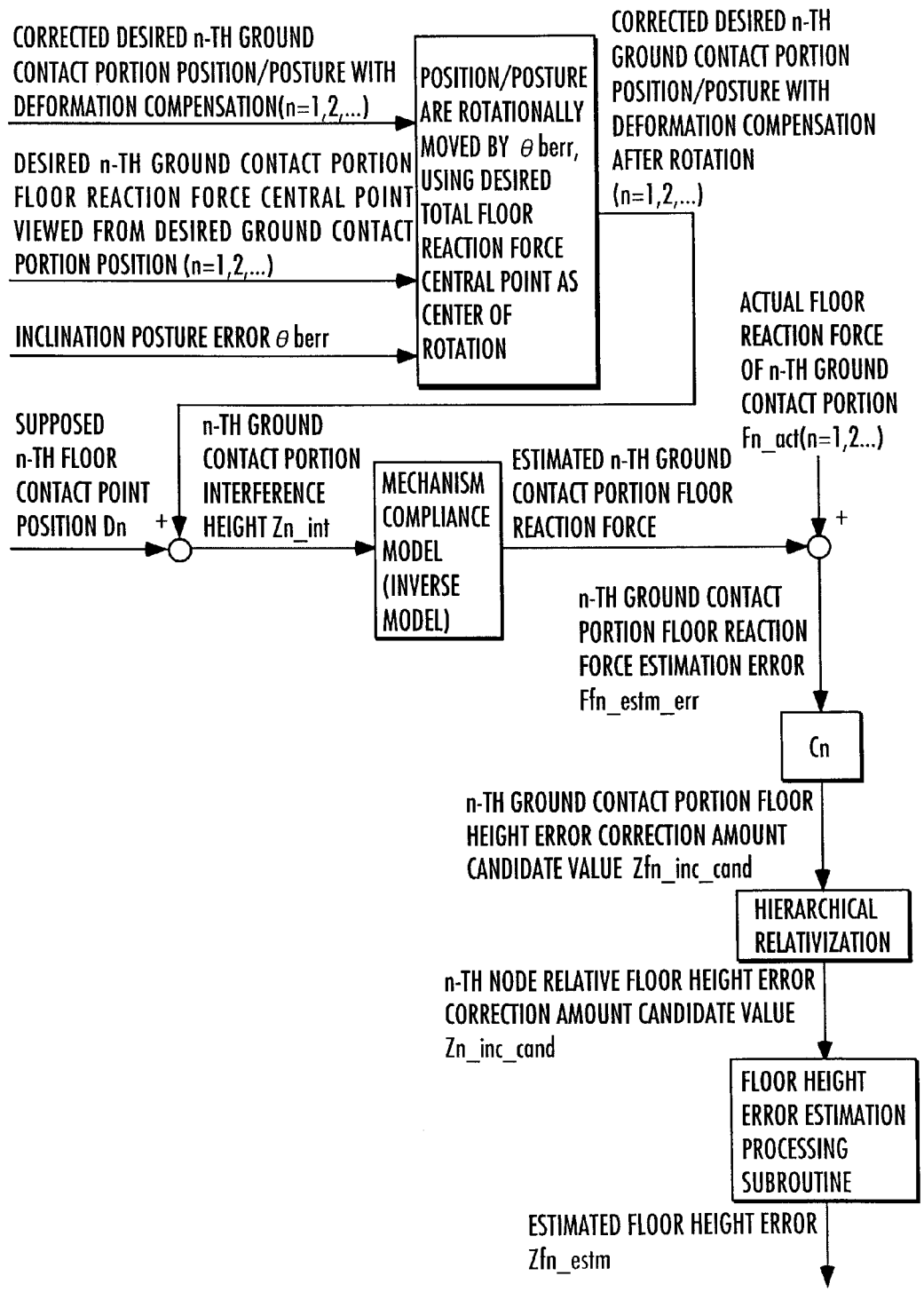
FIG. 56 is a block diagram showing the functions of a floor configuration estimator in a fourth reference example.

In place of the processing shown in FIG. 56 of the floor configuration estimator explained in the aforesaid fourth reference example, the processing shown in the block diagram of FIG. 57 is used to estimate floor configuration errors.

Referring to FIG. 57, this processing will be explained. First, an n-th node expansion floor reaction force moment estimation error Mn_exp_estm_err corresponding to an n-th ground contact portion floor reaction force estimation error Ffn_estm_err (n=1, 2, . . . ) is determined according to the definition of the expansion moment from the difference between the estimated n-th ground contact portion floor reaction force calculated as explained in conjunction with the aforesaid FIG. 56 and the actual floor reaction force of the n-th ground contact portion (the set of differences for each node). Incidentally, the aforesaid vector R(j) required to determine the n-th node expansion floor reaction force moment estimation error is determined on the basis of the weight of each node.

Subsequently, as shown in expression 45 given below, the n-th node expansion floor reaction force moment estimation error Mn_exp_estm_err is multiplied by a predetermined coefficient matrix Kn_cmpl thereby to determine an n-th node expansion inclination angle correction amount candidate value θn_inc_cand, which is the candidate value of the correction amount of the n-th node expansion inclination angle.

$$\theta n\_inc\_cand = Kn\_cmpl * Mn\_exp\_estm\_err \quad \text{Expression 45}$$

Incidentally, Kn_cmpl is not necessarily a diagonal matrix.

Subsequently, a coefficient for a vector R(j) (j=1, 2, . . . r−1) is defined as the j-th element of θn_inc_cand to determine a vector obtained by linearly combining the vectors R(j). The determined vector is defined as the n-th node relative floor height error correction amount candidate value Zn_inc_cand, which is the candidate value of the correction amount of the n-th node relative floor height error.

In other words, Zn_inc_cand is determined according to the following expression 46.

$$Zn\_inc\_cand = Hn * \theta n\_inc\_cand \quad \text{Expression 46}$$

As described above, the processing up to the step for determining the n-th node relative floor height error correction amount candidate value Zn_inc_cand from the n-th node floor reaction force estimation error Fn estm_err shown in FIG. 56 may be replaced by the one shown in FIG. 57.

The arithmetic processing of FIG. 57 other than the above is the same as the arithmetic processing of FIG. 56.

The subroutine processing of the floor height error estimation processing in the fifth reference example requires the processing for a case where the number of child nodes of an n-th node is four or more. This processing expands the aforesaid floor configuration estimation processing for a three-child node (refer to FIG. 41), and if the ground contact portion corresponding to any one child node j is likely to float and diverge, then the estimated j-th node relative floor height error Zj_rel_estm is maintained at the last value Zj_rel_estm_p (the j-th node relative floor height error correction amount candidate value Zj_inc_cand is set to zero), as with the floor configuration estimation processing for a three-child node. Further, the estimated node relative floor height errors Zk_rel_estm of the remaining child nodes are determined such that they approximate the value obtained by adding a certain predetermined bias value c to the sum of the last estimated k-th node relative floor height error Zk_rel_estm_p and Zn_inc_cand. However, the bias value c is determined such that the weighted average of the estimated node relative floor height errors of all child nodes of the n-th node is zero.

As described above, the floor configuration estimation processing can be expanded also when there is a node having four or more child nodes. However, the arithmetic processing will be easier if a hierarchical structure is determined not to have four or more child nodes rather than carrying out such processing.

Based on the first to the fifth reference examples explained above, the following will explain the embodiments of the present invention.

First Embodiment

Figure 58:
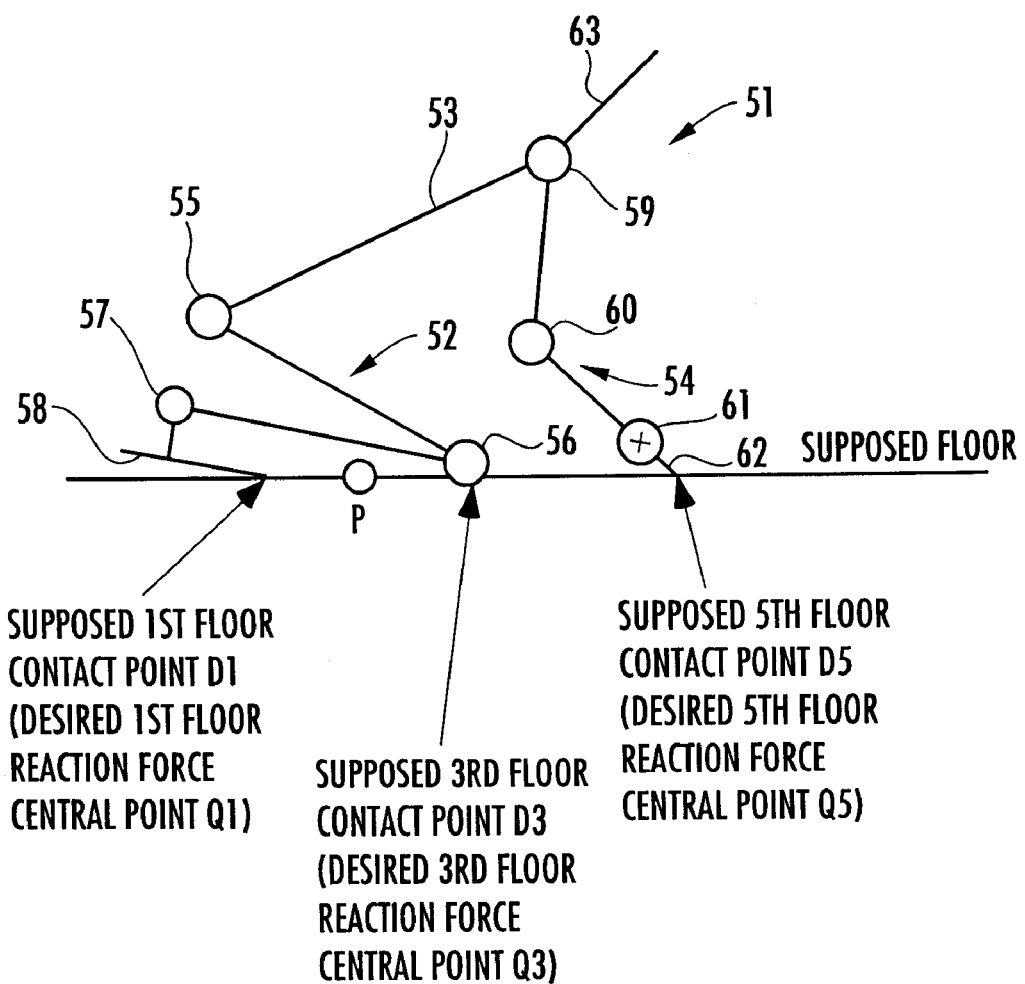
FIG. 58 and FIG. 59 are diagrams showing a state wherein a robot (two-legged mobile robot) in a first embodiment of the present invention is kneeling.
Figure 59:
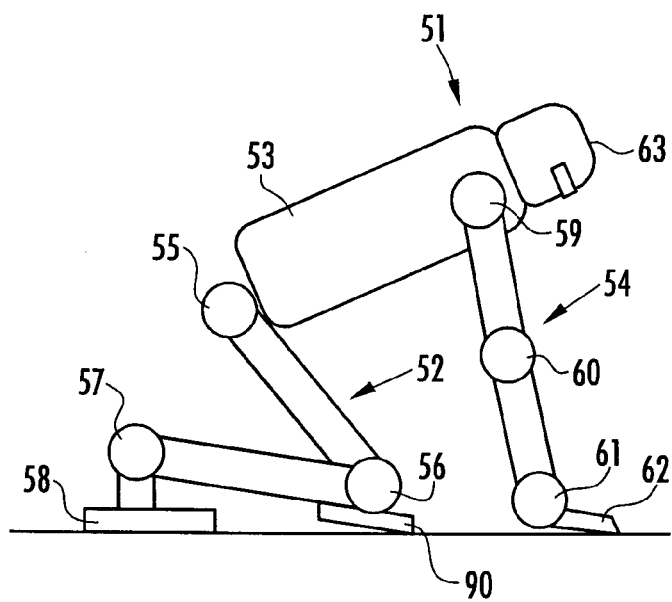
Figure 60:
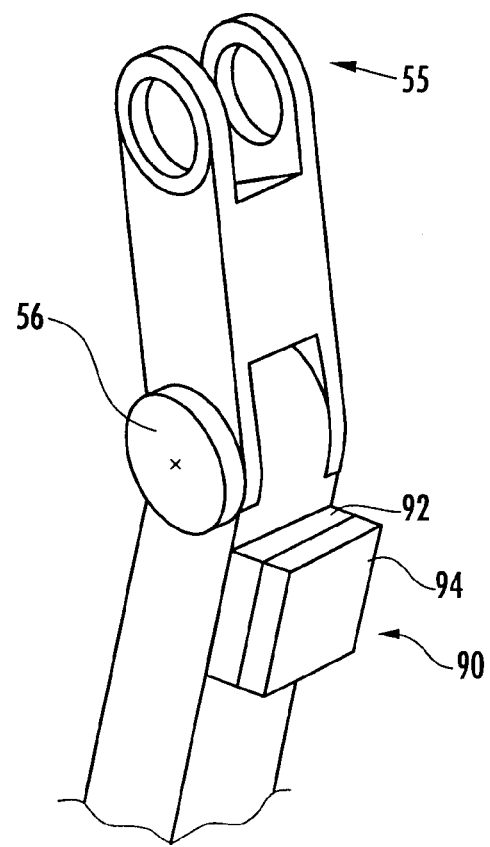
FIG. 60 is a diagram showing the construction of a floor reaction force sensor of a knee of the robot in the first embodiment.

Referring now to FIG. 58 to FIG. 65, a control system for a mobile robot according to a first embodiment of the present invention will be explained. FIG. 58 and FIG. 59 are side views showing a legged mobile robot 51 according to the first embodiment (a bipedal mobile robot in the present embodiment), the portion of a knee joint 56, which will be discussed later, being in contact with a floor (kneeling). Incidentally, FIG. 58 schematically shows the robot 51 as a linear link assembly.

An object of the invention related to the present embodiment is to stably control the posture of a robot by manipulating a reaction force (external force) received from a floor, including an object fixed on the floor, in a state wherein a portion, such as a knee, an elbow, or a trunk other than the distal portions of the legs or arms of the robot is in contact with the floor or the object fixed (set) on the floor (an object regarded as a material extended from the floor).

More specifically, the object is to permit posture control in a state wherein the robot is kneeling or in a state wherein it is sitting on a chair.

A conventional publicly known human-like robot is not provided with sensors for detecting floor reaction forces on, for example, its knees, so that it has been impossible to control the floor reaction forces acting on the knees. For instance, in the conventional human-like robot, when the robot is kneeling as shown in FIG. 58 and FIG. 59, the floor reaction forces acting on the right and left knees are dependent on (governed by) the projections or depressions of a floor, and the joint angles of legs have not been adjusted on the basis of the projections or depressions of the floor. Hence, there have been some cases where the portions of the robot in contact with the floor shake due to projections or depressions of the floor, leading to unstable ground contact states of the ground contact portions. And, in such a state, an attempt to make the robot move or work sometimes has caused instability of the posture of the robot.

Further, when, for example, the robot rises from the state wherein it is kneeling, there has been a danger of the robot falling down if an actual floor inclination is different from the inclination supposed in a desired gait, because the position of the center-of-gravity of the robot is not properly controlled and the robot tries to stand up with its body posture inclined.

Further, in a case where the robot sitting on a chair operates or works while maintaining its posture stable, it is desirable that not only the floor reaction forces acting on the feet of the legs of the robot but also the reaction forces acting from the chair onto the buttocks of the robot can be properly controlled so as to restore the posture of the robot to a proper posture when it rises from the chair or sits onto the chair.

Conceptually, if an object, such as a chair, which is fixedly set on a floor is considered as a part of a floor, then the aforesaid reaction forces may be said to be floor reaction forces in a broad sense.

With the view of the problems with the conventional system as described above, the first embodiment solves the aforesaid problems, and in a state wherein portions of a mobile robot, such as the knees, elbows, the trunk, and buttocks, other than the distal portions of legs or arms are in contact with a floor or an object considered as a material extended from the floor and subjected to reaction forces, it properly controls not only the reaction forces acting on the distal portions of the legs or arms of a robot but also the reaction forces acting on the portions other than the distal portions of the legs or arms, while using the control of the hierarchical compliance described above, thereby making it possible to keep the posture of the mobile robot stable.

The following will explain the first embodiment in more detail by taking the robot (bipedal mobile robot) 51 shown in FIG. 58 and FIG. 59 as an example.

First, the mechanical construction of the robot 51 will be explained. In the robot 51, two legs (link mechanisms) 52 (one leg being not shown) are extended from the bottom end of a body (base body) 53. Further, two arms (link mechanisms) 54 (one arm being not shown) are extended from upper part of the body 53. Each leg 52 is provided with a hip joint 55, a knee joint 56, and an ankle joint 57 at its proximal portion adjacent to the body 53 (the portion connected to the body 53), its middle portion, and its distal portion, respectively, which are operated by actuators, such as electric motors, and a foot 58 is connected to the distal portion of each leg 52 through the ankle joint 57. Similarly, each arm 54 is provided with a shoulder joint 59, an elbow joint 60, and a wrist joint 61 at its proximal portion adjacent to the body 53 (the portion connected to the body 53), its middle portion, and its distal portion, respectively, which are operated by actuators, such as electric motors, and a hand 62 is connected to the distal portion of each arm 54 through the wrist joint 61. In this example, the joints 55, 56, and 57 of each leg 2 are joints having, for example, 3 degrees of freedom, 1 degree of freedom, and 2 degrees of freedom, respectively, and the foot 58 has 6 degrees of freedom relative to the body 53. Further, the shoulder joint 59, the elbow joint 60, and the wrist joint 61 of each arm 54 are constructed such that their degrees of freedom allow the hand 62 to have a degree of freedom of 6 degrees or more with respect to the body 53.

Although not shown, the body 53 of the robot 51 is provided with a control system 50 similar to that of the aforesaid first embodiment. Further, a head 63 is provided at the upper end of the body 53.

In this robot 51, in the state wherein the robot 51 is kneeling (particular posture state), as shown in FIG. 58 and FIG. 59, the portions of the foot 58 and each knee joint 56 of each leg 52 (more specifically, the surface portion of a link (shank link) connecting the knee joint 56 and the ankle joint 57 at near the knee joint 56. Hereinafter referred to simply as the knee) and the hand 62 of each arm 54 are ground contact portions. And, in the present embodiment, as shown in FIG. 59, the knee, which is a ground contact portion, is provided with a floor reaction force sensor 90 (load sensor) as an external force detecting means. The floor reaction force sensor 90 is constructed of a main body (sensor part) 92 and a soft member (elastic member) 94, such as a sponge. The main body 92 is fixed to the knee (leg link), and the outside of the main body 92 is covered with a soft member (elastic member) 94. To enhance the accuracy of the compliance control in the knee, it is desirable to shape the surface (ground contact surface) of the soft member 94 into a round convex surface in addition to covering the knee with the soft member 94. This arrangement reduces the nonlinearity of the relationship between a corrective operation of a desired motion of the robot 51 and a floor reaction force, resulting in better control performance of the compliance control. Incidentally, although not shown, the foot 58 and the ankle joint 57 are connected through a floor reaction force sensor, such as a six-axis force sensor, and the compliance mechanism. Similarly, the hand 62 and the wrist joint 61 are connected through a floor reaction force sensor, such as a six-axis force sensor, and the compliance mechanism, which are not shown. The connecting constructions may be ones that are publicly known.

The floor reaction force sensor 90 of the ground contact portion of the knee joint may be any one of the following.

1) Sensor that detects only the translational force in the direction perpendicular to the surface of a ground contact portion that comes in contact with a floor (ground contact surface)
2) Sensor that detects not only the translational force in the direction perpendicular to the surface of a ground contact portion that comes in contact with a floor (ground contact surface) but also the translational force in a direction other than the direction perpendicular to the contact surface
3) Distributed pressure sensor
4) Sensor that detects moments in addition to translational forces (e.g., six-axis force sensor)

Alternatively, a displacement sensor for detecting the deformation (distortion) of the aforesaid soft member 94 may be used in place of one that directly detects a load.

In the present embodiment, as the floor reaction force sensor 90, the sensor of the above 2) will be used. To further enhance the accuracy of the compliance control, the sensor of the above 3) or 4) may be used as the floor reaction force sensor 90. Incidentally, as the structure of the knee, a floor reaction force sensor may be added to a protective pad provided with a spring (a pad for protecting the knee), as disclosed in Japanese Unexamined Patent Application Publication No. 2000-62760 previously proposed by the present applicant.

Furthermore, although not shown, the distal portions of the legs 52 and the arms 54 are provided with external force detecting means, such as six-axis force sensors.

In the present embodiment, the hierarchical structure as shown in FIG. 61 is set for the robot 51 kneeling as described above. Specifically, the right foot 58, the left foot 58, the right knee, the left knee, the right hand 62, and the left hand 62 as the ground contact portions are associated with a first node, a second node, a third node, a fourth node, a fifth node, and a sixth node, respectively, which are leaf nodes. Further, a 12th node having the first node and the second node as child nodes, a 34th node having the third node and the fourth node as child nodes, a 56th node having the fifth node and the sixth node as child nodes, and a 1234th node having the 12th node and the 34th node as child nodes have been set as intermediate nodes. Further, a 123456th node having the 1234th node and the 56th node as child nodes has been set as the root node. Further, according to the policy similar to that in the aforesaid first reference example and the like, a desired floor reaction force central point Qn (n=1, 2, 3, 4, 5, 6, 12, 34, 56, 1234, 123456) is associated with each node, as shown in the figure. Incidentally, the desired floor reaction force central point Q123456 of the 123456th node, which is the root node, is identical to a desired total floor reaction force central point P.

In the present embodiment, the control system 50 is supposed to have a functional construction similar to that shown in the aforesaid FIG. 2.

In this case, the desired ground contact portion trajectory of a desired motion in a desired gait output by a gait generating device 100 in the present embodiment is constructed of the desired position/posture trajectory of each hand 62, the desired position/posture trajectory of each foot 58, and the desired position trajectory of each knee. In this case, the gait generating device 100 preferentially determines desired foot positions/postures (desired first and second ground contact portion positions/postures), desired hand positions/postures (desired fifth and sixth ground contact portion positions/postures), and desired knee positions (desired third and fourth ground contact portion positions) so that the feet 58, the hands 62, and the knees come in contact with the ground on a supposed floor surface as required for the gait, then determines a desired ZMP (desired total floor reaction force central point) in a supporting polygon, which is a minimum convex polygon that includes the desired ground contact point (or a desired ground contact line or a desired ground contact surface) of each ground contact portion. Then, desired body position/posture are determined by using a dynamic model of the robot 51 such that the desired foot positions/postures, the desired hand positions/postures, the desired knee positions, and the desired ZMP are satisfied.

If the head 63 can be moved with respect to the body 53, then the desired position/posture trajectory of the head 63 is included in a desired motion.

In the present embodiment, the arithmetic processing of the robot geometric model (inverse kinematics calculator) 110 shown in FIG. 2 differs from that of the first to the third reference examples, as will be discussed later.

Figure 62:
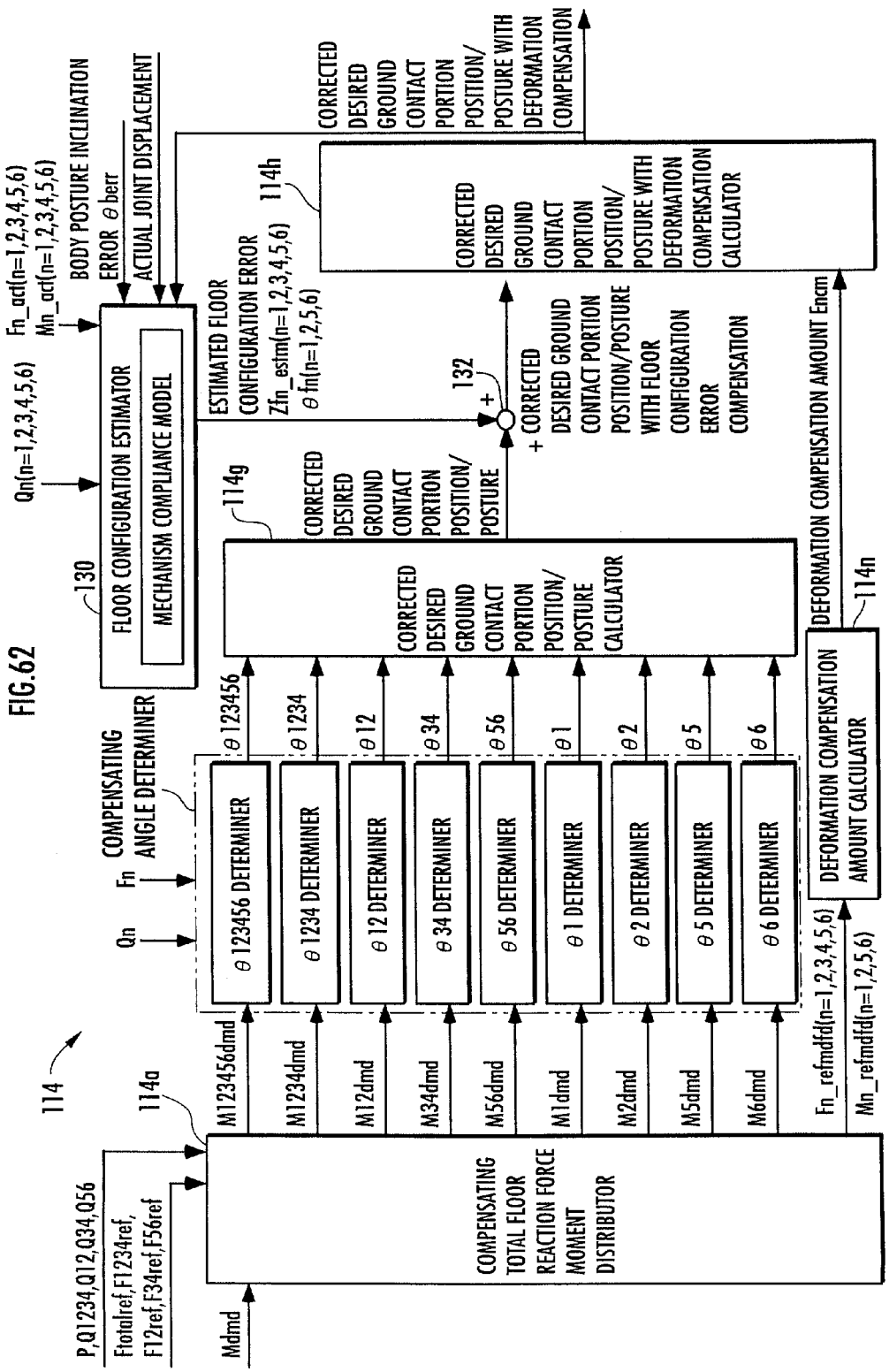
FIG. 62 is a block diagram showing the functional construction of a hierarchical compliance operation determiner in the first embodiment.

Further, in the present embodiment, a part of the processing technique of a hierarchical compliance operation determiner 114 differs from the one explained in the first to the third reference examples described above. FIG. 62 shows the functional construction of the hierarchical compliance operation determiner 114 of the present embodiment. In the processing of this functional construction, major aspects that are different from the first to the third reference examples will be explained. A compensating total floor reaction force moment distributor 114a determines and outputs not only the node compensating floor reaction force moments of the intermediate nodes and the root node, but also a node compensating floor reaction force moment Mn_dmd of an n-th node (n=1, 2, 5, 6) of the leaf nodes, that is, the required floor reaction force moment (the required moment for restoring the posture) about a desired n-th ground contact portion floor reaction force central point (n=1, 2, 5, 6). This is because, in the robot 51, moments can be generated about the desired floor reaction force central points of the feet 58 and the hands 62 as the ground contact portions. The technique for determining the node compensating floor reaction force moment Mn_dmd, including the required moments, may be the same technique explained in the first and the second reference examples described above. Further, in the present embodiment, the compensating total floor reaction force moment distributor 114a determines and outputs a corrected desired n-th ground contact portion floor reaction force moment Mn_refmdfd (n=1, 2, 5, 6) about a desired n-th ground contact portion floor reaction force central point (n=1, 2, 5, 6), which is corrected by generating a node compensating floor reaction force moment about the desired floor reaction force central point of each corresponding node, together with a translational force component Fn_refmdfd (n=1, 2, 3, 4, 5, 6) of a corrected desired ground contact portion floor reaction force. These are used by a deformation compensation amount calculator 114n to calculate a deformation compensation amount.

A compensating angle determiner (the part enclosed by the virtual line in FIG. 62) in the present embodiment determines and outputs not only the compensating angles of the intermediate nodes and the root node but also the node compensating angle θn of an n-th node (n=1, 2, 5, 6) among the leaf nodes. A θn determiner that determines these n-th node compensating angles θn (n=1, 2, 5, 6) determines an n-th node compensating angle θn (n=1, 2, 5, 6) by the same processing as that of the foot compensating angle determiner disclosed in Japanese Unexamined Patent Application Publication No. H10-277969. Incidentally, the technique for determining the compensating angles θn (n=12, 34, 56, 1234, 123456) of the intermediate nodes and the root node other than the above nodes may be the same as the technique explained in the first and the second reference examples described above.

Further, a corrected desired ground contact portion position/posture calculator 114g in the present embodiment combines node rotational manipulations on the basis of each n-th node compensating angle θn (n=12, 34, 56, 1234, 123456) by the technique explained in the first and the second reference examples described above so as to correct a desired ground contact portion position, and it further corrects the desired posture of an n-th ground contact portion (n=1, 2, 5, 6) on the basis of the n-th node compensating angle θn (n=1, 2, 5, 6), thereby determining the corrected desired ground contact portion position/posture of each ground contact portion.

Further, according to the present embodiment, a floor configuration estimator 130 determines an estimated n-th floor height error Zfn_estm (n=1, 2, 3, 4, 5, 6) by the same technique as the technique explained in the aforesaid third reference example and also estimates a ground contact portion floor inclination error of an n-th ground contact portion θfn (n=1, 2, 5, 6). The estimation of the ground contact portion floor inclination error θfn is performed by the same processing as the processing for estimating foot floor inclinations by the floor configuration estimator disclosed in Japanese Unexamined Patent Application Publication No. H10-277969.

The processing techniques of the functional construction of the hierarchical compliance operation determiner 114 of the present embodiment other than the ones described above are the same as that in the third reference example.

Except for the different aspects explained above, the arithmetic processing of the control system 50 in the present embodiment is the same as that in the first to the third reference examples.

Next, the processing of the aforesaid robot geometric model 110 in the present embodiment will be explained in detail.

In the robot 51 of the present embodiment, the number of the degrees of freedom of the joints from the body 53 to the knees is limited to three (only 3 degrees of freedom in the hip joints 55); therefore, it is impossible to change only the difference in height between the right and left knees while strictly maintaining body position/posture, foot position/posture, the horizontal positions of the right and left knees, and the sum of the heights of the right and left knees at their desired values. In other words, if an attempt is made to forcibly change only the height difference between the right and left knees, then twist or slippage would inconveniently take place between ground contact portions (namely, the knees and the feet) and a floor.

Similarly, it is impossible to change only the difference in height between the right and left feet while strictly maintaining the body position/posture, the positions of both knees, the horizontal positions of both feet, and the sum of the heights of the right and left feet at their desired values. In other words, if an attempt is made to forcibly change only the height difference between the right and left feet, then a twist or a slippage would inconveniently take place between ground contact portions (namely, the knees and the feet) and a floor.

Similarly, it is impossible to change only the sum of the heights of the right and left knees while strictly maintaining the body position/posture, foot positions/postures, the horizontal positions of the right and left knees, and the height difference between the right and left knees at their desired values. In other words, if an attempt is made to forcibly change only the sum of the heights of the right and left knees, then the body position would be dislocated from a desired position even though twist or slippage may not take place between ground contact portions (namely, the knees and the feet) and a floor. As a result, the position of the total center-of-gravity of the robot 51 and an inertial force will deviate from desired values, leading to deteriorated stability of the robot 51.

This means that, in any case, the corrected desired ground contact portion position/posture with deformation compensation and desired body position/posture that have been determined by the hierarchical compliance operation determiner 114 cannot be strictly satisfied at the same time, so that twist or slippage takes place between the feet 58 or the knees of the robot 51 and the floor or the position of the overall center-of-gravity of the robot 51 and an inertial force deviate from their desired values, possibly resulting in deterioration of the stability of the robot 51 when the robot 51 is in the posture state shown in FIG. 58 and FIG. 59. Incidentally, the hands 62 among the ground contact portions have a degree of freedom of 6 degrees or more of freedom with respect to the body 53; therefore, slippage such as twist will not occur between the hands 62 and the floor unless the robot 51 is made to take a posture in which it comes in contact with the floor at portions other than the hands 62 of the arms 54.

Hence, in the present embodiment, the posture or the position/posture of the body 53 are corrected on the basis mainly of a change in the height difference between the right and left knees while restraining, as much as possible, the occurrence of twist or slippage between the knees and the feet 58 among the ground contact portions of the robot 51 and the floor and also restraining, as much as possible, a change in the position of the center-of-gravity (especially the horizontal position) of the body 53.

Figure 63A:
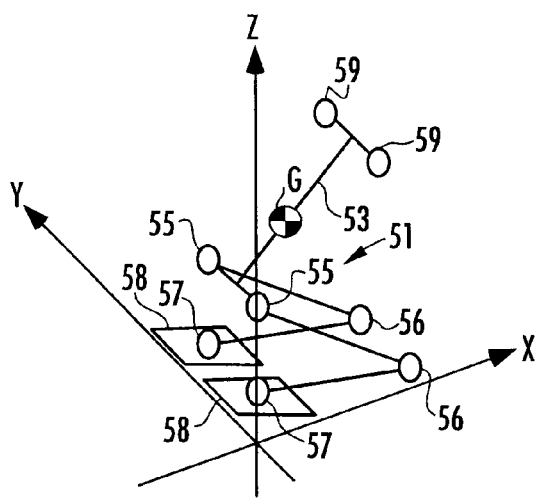
FIGS. 63(a) to (c) are diagrams for explaining a technique for correcting the posture of the body of the robot in the first embodiment.

FIGS. 63(a) and (b) show examples of the operations for correcting the posture of the body 53. FIG. 63(c) will be discussed later. These FIGS. 63(a), (b), and (c) omit showing the arms 54 and the head 63.

Figure 63B:
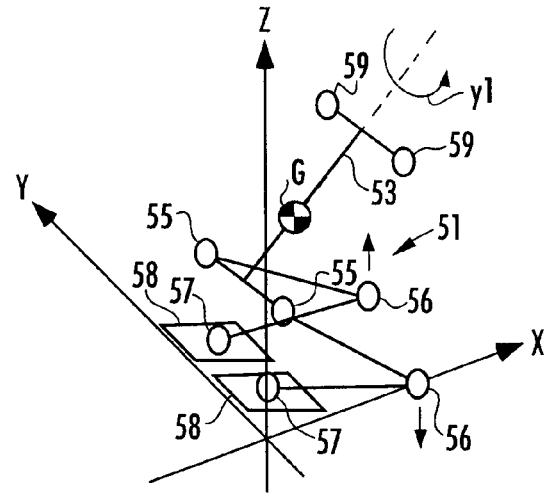
Figure 63C:
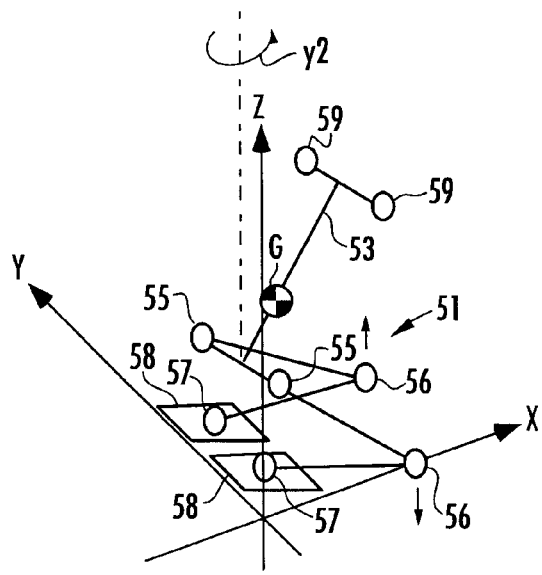

One of the operations for correcting the posture of the body 53 is the operation in which, from the state wherein the robot 51 is kneeling as shown in FIG. 63(a), the body 53 is rotated (rotated as indicated by an arrow y1) by using, as the axis of rotation, the trunk axis passing approximately the center-of-gravity G of the body 53, as shown in FIG. 63(b), on the basis of a change in the height difference between the right and left knees caused by compliance control.

Further, in the posture in which the robot 51 is kneeling, as shown in FIG. 63, a change in the height difference between the right and left feet 58 and 58 causes the height difference between the right and left knees to change by about half the change in the height difference between the right and left feet 58 and 58. Hence, the same operation as that of correcting the posture of the body 53 on the basis of a change in the height difference between the right and left knees is performed by only a half amount, as compared with the case of a change in the height difference between the right and left feet, on the basis of a change in the height difference between the right and left feet 58 and 58 caused by the compliance control.

Further, when correcting the posture of the body 53 as described above, the position and the posture of the body 53 are corrected on the basis of a change in the sum of the heights of the right and left knees caused by the compliance control while restraining the occurrence of twist or slippage between ground contact portions (the knees and the feet 58) and the floor as much as possible, and also restraining, as much as possible, a change in the position (especially the horizontal position) of the center-of-gravity G of the body 53 or in the inclination of a segment connecting the center-of-gravity G and a total floor reaction force central point.

Figure 64:
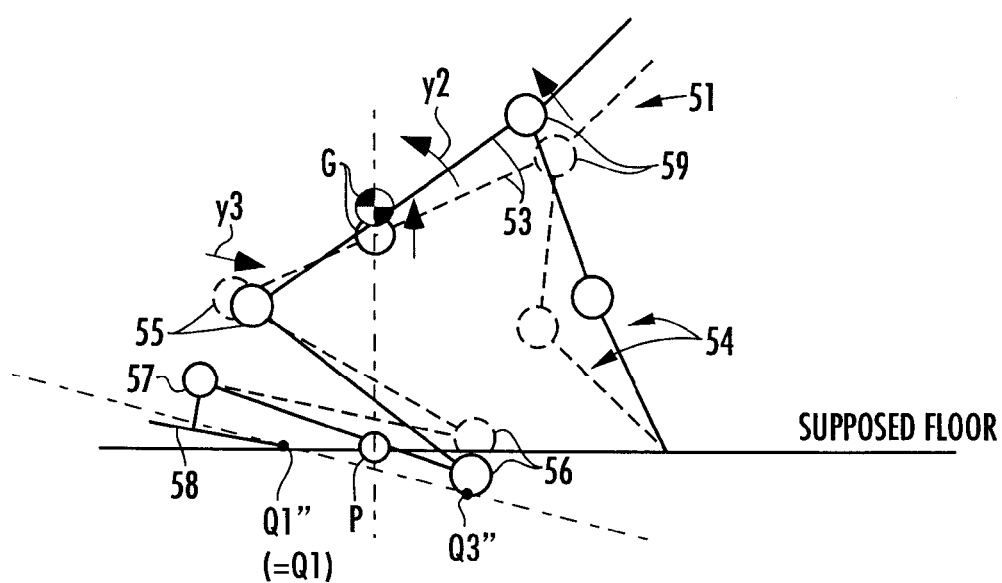
FIG. 64 is a diagram for explaining a technique for correcting the position/posture of the body of the robot in the first embodiment.

FIG. 64 visually shows an operation for correcting the position and the posture of the body 53 on the basis of changes in the sum of the heights of the right and left knees. Specifically, from the posture of the robot 51 indicated by the dashed lines, as both knees are operated to move down by the compliance control to the posture of the robot 51 indicated by the solid lines, the bottom end portion (or the waist) of the body 53 is shifted forward, as indicated by an arrow y3, and the inclination of the body 53 is shifted backward (in the direction in which the body 53 rises), as indicated by an arrow y2. In other words, the body 53 is tilted forward while maintaining the position of the center-of-gravity G of the body 53 (or the position of a predetermined representative point of the body 53), especially the horizontal position thereof. Alternatively, the body 53 is tilted backward while maintaining the inclination of the segment connecting the center-of-gravity G and the desired total floor reaction force central point P. Further, as an operation for raising both knees is performed by the compliance control, the bottom end portion (or the waist) of the body 53 is shifted backward, inversely from the above, to shift the inclination of the body toward the front. In other words, the body 53 is tilted forward while maintaining the position of the center-of-gravity G of the body (or the position of the predetermined representative point of the body), especially its horizontal position. Alternatively, the body 53 is tilted backward while maintaining the inclination of the segment connecting the center-of-gravity G and the desired total floor reaction force central point P. Incidentally, Q1" and Q3" in FIG. 64 denote the desired floor reaction force central point of the foot 58 and the desired floor reaction force central point of the knee, respectively, after the position/posture of the body 53 have been corrected as described above. In this example, Q1" is identical to a desired floor reaction force central point Q1 of the foot 58 before the correction.

The above is the overview of the operation for correcting the posture and the position of the body 53.

Figure 65:
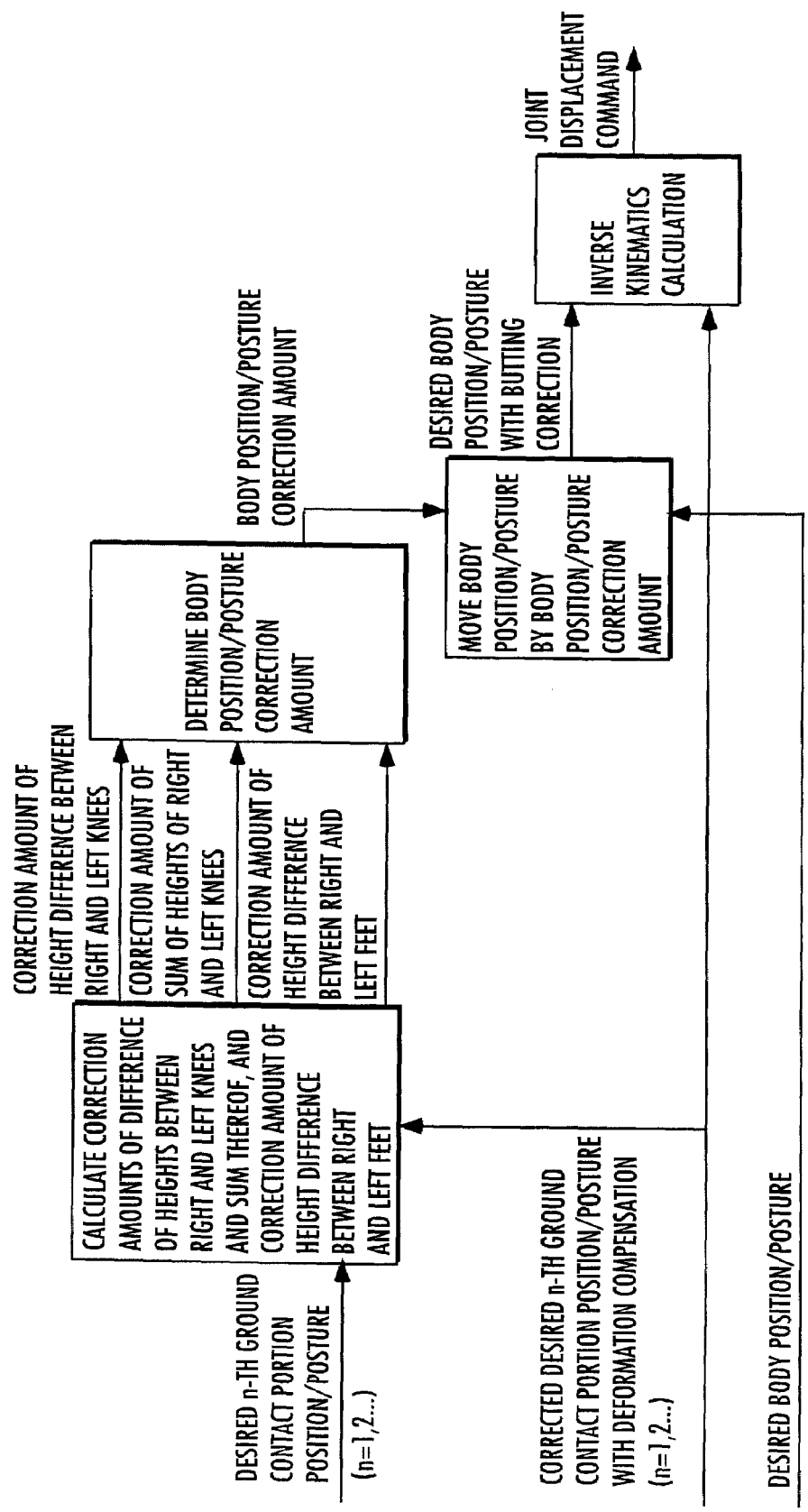
FIG. 65 is a block diagram showing the functions of an inverse kinematics calculator in the first embodiment.

The processing function of the robot geometric model (inverse kinematics calculator) 110 in the present embodiment is shown by the block diagram of FIG. 65.

In the inverse kinematics calculator 110, first, based on corrected desired n-th ground contact portion position/posture with deformation compensation (n=1, 2, ..., 6) and the desired ground contact portion positions/postures of the feet 58 and the knees determined by the gait generating device 100, the correction amount of the height difference between the right and left knees Zkneediffmdfd and the correction amount of the sum of the heights of the right and left knees Zkneesummdfd for the desired positions of the right and left knees determined by the gait generating device 100, and the correction amount of the height difference between the right and left feet 58 and 58 Zfootdiffmdfd for the desired positions of the right and left feet determined by the gait generating device 100 are determined.

Specifically, the correction amount of the height difference between the right and left knees Zkneediffmdfd, the correction amount of the sum of the heights of the right and left knees Zkneesummdfd, and the correction amount of the height difference between the right and left feet Zfootdiffmdfd are determined according to the following expressions 47, 48, and 49.

$$Zkneediffmdfd = \text{Expression 47}$$
Corrected desired fourth ground contact portion
  position with deformation compensation −
Desired fourth ground contact portion position −
Corrected desired third ground contact portion
  position with deformation compensation +
    Desired third ground contact portion position $$Zkneesummdfd = \text{Expression 48}$$
Corrected desired fourth ground contact portion
  position with deformation compensation −
Desired fourth ground contact portion position +
Corrected desired third ground contact portion
  position with deformation compensation −
    Desired third ground contact portion position $$Zfootdiffmdfd = \text{Expression 49}$$
Corrected desired second ground contact portion
  position with deformation compensation −
Desired second ground contact portion position −
Corrected desired first ground contact portion
  position with deformation compensation +
    Desired first ground contact portion position More precisely, "portion position" in expressions 47 to 49 is the height component (the component in the vertical direction) of the "portion position."

Subsequently, the body position/posture correction amount are determined on the basis of the correction amount of the height difference between the right and left knees Zkneediffmdfd, the correction amount of the sum of the heights of the right and left knees Zkneesummdfd, and the correction amount of the height difference between the right and left feet Zfootdiffmdfd.

The body position/posture correction amount is composed of a body position correction amount for knee height difference Xbkneediffmdfd, a body posture correction amount for knee height difference θbkneediffmdfd, a body position correction amount for knee height sum Xbkneesummdfd, a body posture correction amount for knee height sum θbkneesummdfd, a body position correction amount for foot height difference Xbfootdiffmdfd, and a body posture correction amount for foot height difference θbfootdiffmdfd. Specifically, these values are determined as follows.

First, based on the correction amount of the height difference between the right and left knees Zkneediffmdfd, the body position correction amount for knee height difference Xbkneediffmdfd and the body posture correction amount for knee height difference θbkneediffmdfd for preventing the correction amount of the height difference between the right and left knees Zkneediffmdfd from causing twist or slippage between ground contact portions (the knees and the feet 58) and a floor are determined by geometric calculation on the basis of the correction amount of the height difference between the right and left knees Zkneediffmdfd and the desired posture (desired motion) of the robot 51 at that instant (current time).

To be more specific, for example, Xbkneediffmdfd and θbkneediffmdfd are determined according to the following expression 50. Kxkneediff and Kthkneediff denote proportional coefficients based on desired postures of the robot 51.

$$Xbkneediffmdfd = Kxkneediff * Zkneediffmdfd$$

$$\theta bkneediffmdfd = Kthkneediff * Zkneediffmdfd \qquad \text{Expression 50}$$

As an alternative, the relationship between the correction amount of the height difference between the right and left knees (or a 34th node compensating angle θ34) and the correction amounts of the body position/posture may be determined beforehand for some representative desired postures of the robot 51, and it may be stored as a map or function so as to determine Xbkneediffmdfd and θbkneediffmdfd on the basis of the map or function and the correction amount of the height difference between the right and left knees Zkneediffmdfd. Incidentally, in the present embodiment, the body posture is corrected by rotating the body 53 about its trunk axis on the basis of the correction amount of the height difference between the right and left knees, so that the body position correction amount for knee height difference Xbkneediffmdfd may be zero.

Next, in the same manner as described above, based on the correction amount of the height difference between the right and left feet 58 and 58 Zfootdiffmdfd, the body position correction amount for foot height difference Xbfootdiffmdfd and the body posture correction amount for foot height difference θbfootdiffmdfd for preventing the correction amount of the height difference between the right and left feet 58 and 58 Zfootdiffmdfd from causing a twist or slippage between ground contact portions (the knees and the feet 58) and a floor are determined by geometric calculation on the basis of the correction amount of the height difference between the right and left feet Zfootdiffmdfd and the desired posture (desired motion) of the robot 51 at that instant (current time).

To be more specific, for example, Xbfootdiffmdfd and θbfootdiffmdfd are determined according to the following expression 51. Kxfootdiff and Kthfootdiff denote proportional coefficients based on desired postures of the robot 51. As described above, the influence of the height difference of the feet 58 is about half the influence of the height difference of the knees, so that Kxfootdiff and Kthfootdiff are one half of Kxkneediff and Kthkneediff.

$$Xbfootdiffmdfd = Kxfootdiff * Zfootdiffmdfd$$

$$\theta bfootdiffmdfd = Kthfootdiff * Zfootdiffmdfd \qquad \text{Expression 51}$$

Incidentally, in the present embodiment, the body posture is corrected by rotating the body 53 about its trunk axis on the basis of the correction amount of the height difference between the right and left feet 58 and 58, so that the body position correction amount for foot height difference Xbfootdiffmdfd may be zero.

Subsequently, in the same manner as described above, based on the correction amount of the sum of the heights of the right and left knees Zsummdfd, the body position correction amount for knee height sum Xbsummdfd and the body posture correction amount for knee height sum θbsummdfd for preventing the correction amount of the sum of the heights of the right and left knees Zsummdfd from causing a twist or slippage between ground contact portions (the knees and the feet) and a floor are determined by geometric calculation on the basis of the correction amount of the sum of the heights of the right and left knees Zsummdfd and the desired posture of the robot 51 at that instant (current time).

Alternatively, the relationship between the correction amount of the sum of the heights of the right and left knees and the correction amount of the body posture may be determined beforehand for some representative desired postures, and it may be stored as a map or function so as to determine Xbsummdfd and θbsummdfd on the basis of the map or function and the correction amount of the sum of the heights of the right and left knees Zsummdfd.

Alternatively, the correction amounts of body position/posture may be determined as follows. The height difference between the right and left knees is converted into the 34th node compensating angle θ34 that causes the difference, the sum of the heights of the right and left knees is converted into the 1234th node compensating angle θ1234, and the height difference between the right and left feet is converted into the 12th node compensating angle θ12 that causes the difference. Then, based on these converted compensating angles, the body position/posture correction amounts may be determined by geometric calculation. Alternatively, the relationship between the converted compensating angles and body position/posture correction amounts may be determined beforehand for some representative desired postures of the robot 51, and it may be stored as a map or function so as to determine body position/posture correction amounts on the basis of the map or function and the converted compensating angles.

Subsequently, the desired body position/posture are moved (rotational movement and parallel movement) by the body position/posture correction amounts to determine desired body position/posture with twist correction. Specifically, the desired body position/posture are rotationally moved about a trunk axis (or a predetermined axis of rotation (the axis of rotation substantially in a vertical plane)) by the sum of the body posture correction amount for knee height difference and the body posture correction amount for foot height difference (θbkneediffmdfd+θbfootdiffmdfd), and this is further rotationally moved about a lateral axis by the body posture correction amount for the sum of knee heights θbkneesummdfd, then this is further moved in parallel in the longitudinal direction of the robot 51 by the sum of the body position correction amount for knee height difference, the body position correction amount for the sum of knee heights, and the body position correction amount for foot height difference (Xbkneediffmdfd+Xbkneesummdfd+Xbfootdiffmdfd) thereby to determine desired body position/posture with twist correction.

Subsequently, based on the desired body position/posture with twist correction and desired n-th ground contact portion position/posture with deformation compensation (n=1, 2, . . . , 6), a joint displacement command of the robot 51 is determined.

Thus, the processing of the inverse kinematics calculator 110 is carried out as described above.

In other words, according to the first embodiment, if the degree of freedom is geometrically insufficient for the operation of correcting the ground contact portion positions/postures of the robot 51, then the hierarchical compliance operation corrects not only the desired ground contact portion positions/postures but also the desired body positions/postures such that a point of the body position (the representative point of the body) or the point (e.g., the overall center-of-gravity) of the weighted average position of a plurality of portions, including the body (the weight in this case is desirably the mass ratio of each portion), especially the horizontal position of the point, is maintained, or the angle of a line that connects the point and a desired total floor reaction force central point (desired ZMP) is maintained at the angle in a desired gait.

Further, in other words, the first embodiment is provided with a means that gives priority to the controllability of an actual floor reaction force moment generated about a desired total floor reaction force central point (desired ZMP) and determines at least one of a compensating height and a compensating angle as the manipulated variable of the relative height or the inclination angle of a predetermined ground contact portion A (a knee in this case) or the manipulated variable of the relative height or the inclination angle of a node having a predetermined ground contact portion A as a descendant node in order to enhance the stability of the entire posture control of the robot 51, a means for determining the correction amount of at least one of the posture and the position of the body while maintaining the position of the body or the aforesaid weighted average position of a plurality of portions, including the body, at approximately the position in a desired gait on the basis of at least one of the aforesaid compensating height and compensating angle, and an inverse kinematics calculating means for determining a joint displacement on the basis of at least one of the position and the posture of a predetermined ground contact portion B (foot in this case) except for the aforesaid predetermined ground contact portion A and the body position/posture corrected by the aforesaid correction amount.

Incidentally, in the first embodiment, instead of rotating a body posture about the trunk axis of the body 53 of the robot 51, the body 53 may be rotated using the vertical axis as the axis of rotation and using the waist (the bottom end portion of the body 53) of the robot 51 as the center, as shown in FIG. 64(*c*). In this case, however, the deviation of the center-of-gravity G of the body 53 in the lateral direction would increase. Alternatively, the body posture may be rotated using an axis located midway between the trunk axis of the body 53 and the vertical axis as the axis of rotation. Alternatively, the position and the posture of the body 53 may be simultaneously corrected on the basis of the correction amount of the height difference between the two knees or the correction amount of the height difference between both feet 58 and 58. Further, instead of maintaining the position of the center-of-gravity G of the body 53 unchanged, the position/posture of the body 53 may be corrected such that the position of the overall center-of-gravity of the robot 51 or the position of the representative point of the body 53 remains unchanged.

In any case, if the degree of freedom is geometrically insufficient in the operation for correcting the position/posture of a ground contact portion of the robot 51 by the compliance operation or the like, at least one of the position and the posture of the body 53 may be corrected from the position/posture of a desired gait so as to restrain the occurrence of a slippage, such as a twist, of a ground contact portion. Further, instead of correcting at least one of the position and the posture of the body 53, at least one of the position and the posture of a predetermined portion other than the body 53 may be corrected.

Second Embodiment

An explanation will now be given about a control system for a mobile robot according to a second embodiment of the present invention.

In the first embodiment, the position/posture of the body have been corrected in order to prevent a slippage, such as a twist, of a ground contact portion and to minimize the deviations of the position of the overall center-of-gravity of the robot 51 and an inertial force. In the present embodiment (the second embodiment), a slippage, such as a twist, of a ground contact portion has been allowed to a certain extent, and joint displacements (the displacements of a hip joint 55 and a knee joint 56) or the position/posture of a ground contact portion have been preferentially corrected so as to restrain the deviations of the position of the overall center-of-gravity of the robot 51 and an inertial force.

Figure 66:
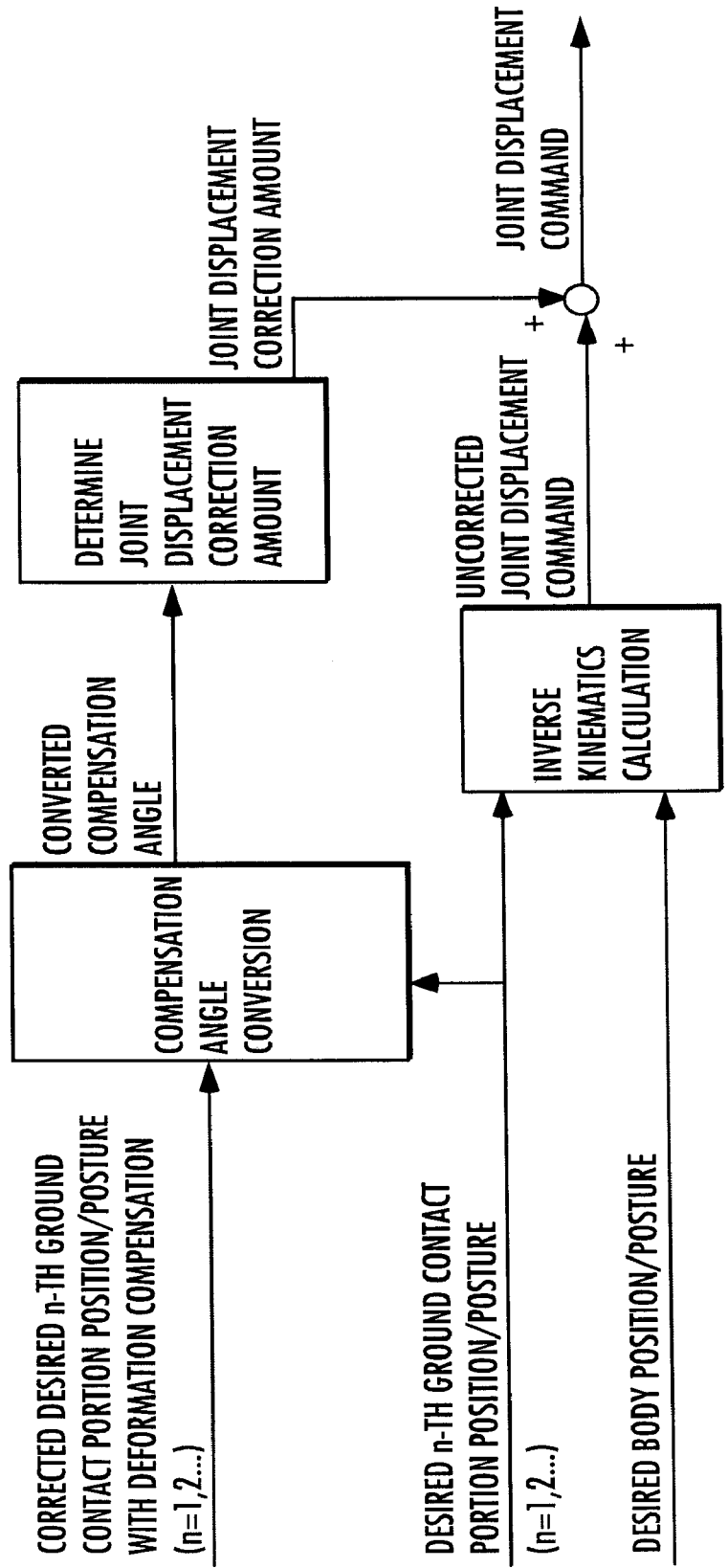
FIG. 66 is a block diagram showing the functions of an inverse kinematics calculator in a second embodiment.

More specifically, in the present embodiment, an inverse kinematics calculator 110 carries out the processing shown by the block diagram of FIG. 66 in place of the processing of FIG. 65 explained in the first embodiment. Except for this difference, the present embodiment is the same as the first embodiment.

The inverse kinematics calculator 110 of the present embodiment will be explained with reference to FIG. 66. First, based on corrected desired n-th ground contact portion position/posture with deformation compensation (n=1, 2, ..., 6) (specifically, the position out of the position/posture) and desired n-th ground contact portion position/posture (n=1, 2, ..., 6) (specifically, the position out of the position/posture), a correction amount of the height difference between the right and left knees Zkneediffmdfd, a correction amount of the sum of the heights of the right and left knees Zkneesummdfd, and a correction amount of the height difference between the right and left feet Zfootdiffmdfd are determined according to the aforesaid expression 47, expression 48, and expression 49, and further, the height difference between the right and left knees is converted into a 34th node compensating angle $\theta 34$ that causes the difference. Similarly, the sum of the heights of the right and left knees is converted into a 1234th node compensating angle $\theta 1234$ that causes the sum, and the height difference between the right and left feet is converted into a 12th node compensating angle $\theta 12$ that causes the difference.

Next, based on the converted node compensating angles, joint displacement correction amounts are determined. This is performed as follows. First, a case is assumed where a joint displacement is corrected while fixing the body position/posture of a desired gait and retaining the angle of a segment that connects a desired total floor reaction force central point (a desired 123456th node floor reaction force central point (point P in FIG. 61)) and the overall center-of-gravity of the robot 51 (or the center-of-gravity of the body or the centers of gravity of a plurality of portions, including the body 53) unchanged. In this case, a j-th joint displacement correction amount (j=1, 2, ..., total number of joints) for the inclination angle (compensating angle) of an n-th node (n=12, 34, 1234) corresponding to each of ground contact portions (a knee and a foot 58) to become a unit perturbation amount is determined, and this is defined as a sensitivity Ln_j of the j-th joint displacement relative to the n-th node compensating angle.

More generally, when a joint displacement of a desired gait has been corrected, the j-th joint displacement correction amount (j=1, 2, ..., total number of joints) for the relative angle between the segment connecting a desired total floor reaction force central point (a desired 123456th node floor reaction force central point) and an overall center-of-gravity of the robot 51 (or the center-of-gravity of the body or the centers of gravity of a plurality of portions, including the body 53) and the inclination angle of an n-th node (n=12, 34, 1234) corresponding to each of ground contact portions (a knee and the foot 58) to become a unit perturbation amount is determined, and this is defined as a sensitivity Ln_j of the j-th joint displacement relative to the n-th node compensating angle.

Specifically, if Ln_knee_r denotes the sensitivity of a right knee joint displacement relative to an n-th node compensating angle (n=12, 34, 1234), Ln_knee_l denotes the sensitivity of a left knee joint displacement relative to the n-th node compensating angle, Ln_hip_r denotes the sensitivity of a right hip pitch joint displacement relative to the n-th node compensating angle, and Ln_hip_l denotes the sensitivity of a left hip pitch joint displacement relative to the n-th node compensating angle, then each sensitivity is set according to the following expression 52 in the kneeling posture of the robot 51 shown in FIG. 58 and FIG. 59.

L1234_hip_r=0, L1234_hip_l=0, L1234_knee_r=1,

L1234_knee_l=1, L12_hip_r=0, L12_hip_l=0

L12_knee_r=a12, L12_knee_l=−a12, L34_hip_r=a34

L34 hip$_{13}$ l=−a34, L34 knee_r=0, L34 knee$_{13}$ l=0    Expression 52 where a12 and a34 denote predetermined constants.

Subsequently, joint displacement correction amounts are determined according to expressions 53 to 56 given below, where $\theta$knee_r denotes a right knee joint displacement correction amount, $\theta$knee_I denotes a left knee joint displacement correction amount, $\theta$hip_r denotes a right hip joint displacement correction amount (more specifically, the joint displacement correction amount in the pitch direction of the right hip joint), and $\theta$hip_I denotes a left hip joint displacement correction amount (more specifically, the joint displacement correction amount in the pitch direction of the left hip joint).

$\theta$knee_r = L1234_knee_r ∗ $\theta$1234 + L12_knee_r ∗ $\theta$12 + L34_knee_r ∗ $\theta$34    Expression 53

$\theta$knee_l = L1234_knee_l ∗ $\theta$1234 + L12_knee_l ∗ $\theta$12 + L34_knee_l ∗ $\theta$34    Expression 54

$\theta$hip_r = L1234_hip_r ∗ $\theta$1234 + L12_hip_r ∗ $\theta$12 + L34_hip_r ∗ $\theta$34    Expression 55

$\theta$hip_l = L1234_hip_l ∗ $\theta$1234 + L12_hip_l ∗ $\theta$12 + L34_hip_l ∗ $\theta$34    Expression 56

Other joint displacement correction amounts are determined in the same manner; however, they will be omitted to simplify the explanation.

Figure 67:
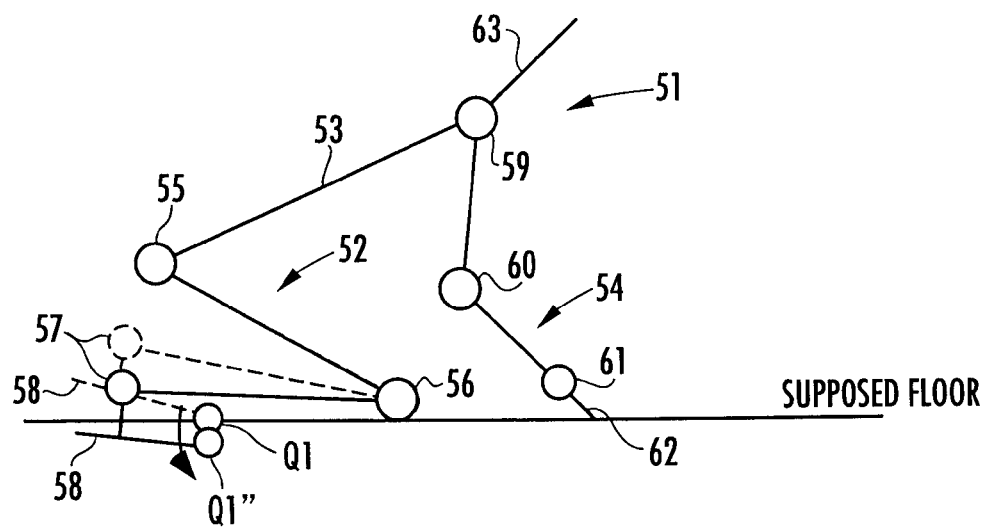
FIG. 67 and FIG. 68 are diagrams for explaining a technique for correcting the posture of a robot in the second embodiment.

For the 1234th compensating angle $\theta 1234$, the displacements (angles) of both knee joints 56 are corrected by the same amount as $\theta 1234$, as shown in FIG. 67. Further, for the 12th compensating angle $\theta 12$, the displacement (angle) of the right knee joint 56 is corrected in proportion to $\theta 12$ and also the displacement (angle) of the left knee joint 56 is corrected at the same time by the amount obtained by multiplying the correction amount of the displacement of the right knee joint

Figure 68:
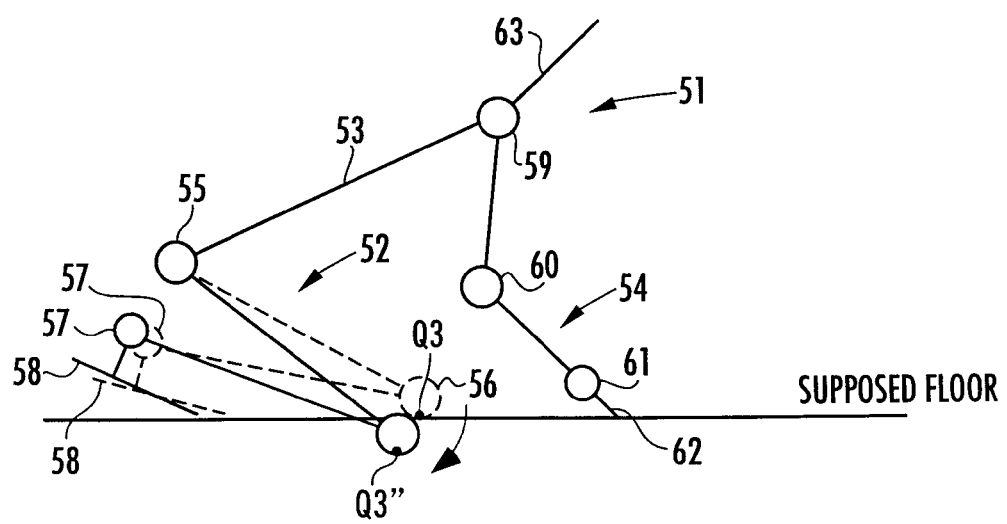

56 by −1. In other words, the displacement (angle) of the right knee joint 56 is corrected, as shown in FIG. 67, and the displacement (angle) of the left knee joint 56 is corrected in reverse therefrom. Further, for the 34th compensating angle θ34, the displacement (angle) of the right hip joint 55 in the pitch direction is corrected in proportion to θ34 and also the displacement (angle) of the left hip joint 55 in the pitch direction is corrected at the same time by the amount obtained by multiplying the correction amount of the displacement of the right hip joint 55 in the pitch direction by −1. In other words, the displacement (angle) of the right hip joint 55 in the pitch direction is corrected, as shown in FIG. 68, and the displacement (angle) of the left hip joint 55 in the pitch direction is corrected in reverse therefrom. Incidentally, Q1 and Q1" in FIG. 67 denote a desired floor reaction force central point of the foot 58 before the corrections of the joint displacements described above and a desired floor reaction force central point of the foot 58 after the corrections, respectively. Further, Q3 and Q3" in FIG. 68 denote a desired floor reaction force central point of a knee before the corrections of the joint displacements described above and a desired floor reaction force central point of the knee after the corrections, respectively.

By correcting joint displacements as described above, the relative angle between the segment connecting a desired total floor reaction force central point (a desired 123456th node floor reaction force central point) and the overall center-of-gravity of the robot 51 (or the center-of-gravity of the body or the center-of-gravity of a plurality of portions, including the body 53) and the inclination angle of an n-th node (n=12, 34, 1234) corresponding to ground contact portions (a knee and the foot 58) is changed by the aforesaid converted node compensating angle θ12, θ23, or θ1234. Thus, an actual floor reaction force is faithfully controlled, leading to improved posture stability and ground contact properties of the robot 51.

Instead of directly correcting joint displacement commands (desired joint displacements) as described above, preferentially corrected desired ground contact portion positions/postures, which are the corrected desired positions/postures of the ground contact portions (specifically, the feet 58 and the hands 62) whose positions/postures are to be preferentially corrected to cause approximately the same desired joint displacements, may be determined, and then, based on the determined preferentially corrected desired ground contact portion positions/postures, joint displacement commands may be determined by inverse kinematics calculation.

Because of insufficient degrees of freedom of joints, it is impossible to determine joint displacements by the inverse kinematics calculation such that desired body position/posture and all corrected desired ground contact portion positions/postures are satisfied; therefore, when carrying out the inverse kinematics calculation, some corrected desired ground contact portion positions/postures out of all corrected desired ground contact portion positions/postures are used. The some corrected desired ground contact portion positions/postures are referred to as the aforesaid preferentially corrected desired ground contact portion positions/postures.

For example, in the situation shown in FIG. 67, for the 1234th node compensating angle θ1234, the position obtained by rotationally moving a desired foot position about a knee may be determined as the preferentially corrected desired foot position.

Incidentally, in the first embodiment and the second embodiment, as an example, the compliance operation in the situation wherein the robot 51 is kneeling has been explained.

The following will describe the adaptation to a compliance operation in a situation wherein the robot is sitting on a chair. This will be explained as a third embodiment.

Third Embodiment

Figure 69:
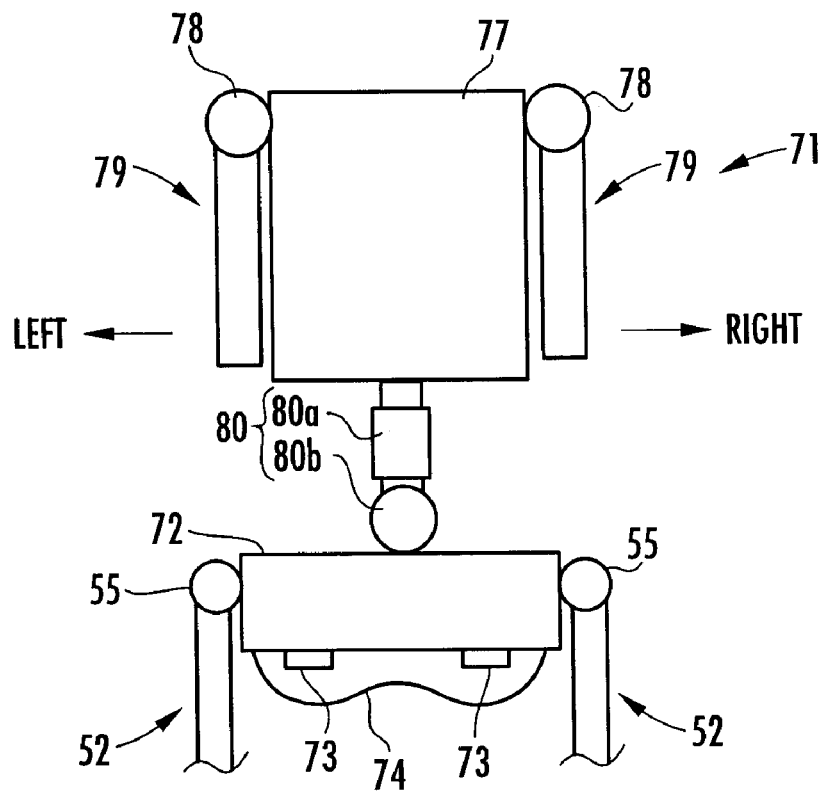
FIG. 69 is a diagram showing the construction of a robot in a third embodiment.

FIG. 69 shows the construction of an essential section of a robot according to the present embodiment. This robot 71 is provided with floor reaction force sensors 73 and 73 for detecting floor reaction forces (load sensors, such as six-axis force sensors) at the right and left, respectively, of the base end surface of buttocks 72. Instead of providing the floor reaction force sensors 73 and 73 at the right and left, a single floor reaction force sensor that detects the resultant force of the forces applied to the right and left of the base end surface of the buttocks 72 may be provided.

In this case, the outsides of the floor reaction force sensors 73 and 73 are covered with a soft member (elastic member) 74, such as a sponge, as illustrated. To enhance the accuracy of the compliance control in the ground contact portions of the buttocks 72, it is desirable to shape the surface (ground contact surface) of the soft member (elastic member) 74 into a round convex surface in addition to covering them with the soft member. It is desirable to provide the member 74 such that the horizontal positions of the detection positions of the floor reaction force sensors 73 and 73 (the positions of the sensor main bodies) are aligned with the horizontal position of the apex of the convex surface of the aforesaid member 74 especially when the robot 71 is sitting on a chair through the intermediary of its buttocks 72. This arrangement reduces the nonlinearity of the relationship between a corrective operation of the position/posture of a ground contact portion of the robot 71 and a floor reaction force, resulting in better control performance of the compliance control of the robot 71.

In the robot 71, legs (link mechanisms) 52 are provided extendedly from the right and left sides of the buttocks 72. The structures of the legs 52, including their joints, are the same as those of, for example, the aforesaid first embodiment. Hence, the same reference marks as those related to the legs 52 in the first embodiment will be used, and the explanations thereof will be omitted. However, In the present embodiment, the knees of the legs 52 may not be provided with floor reaction force sensors.

Further, as shown in the figure, a trunk (body) 77, which is the base body of the robot 71, is provided on the upper side of the buttocks 72, and arms 79 and 79 are provided extendedly from both sides of the upper portion of the trunk 77 through the intermediary of shoulder joints 78 and 78. Incidentally, the arms 79 may have the same structure as that in the robot 51 of the aforesaid second embodiment. Further, the trunk 77 is connected with the buttocks 72 through the intermediary of a joint child nodes have been set as intermediate nodes, and a 1234th node having the 12th node and the 34th node as child nodes has been set as a root node. Further, according to the policy similar to that in the aforesaid first embodiment and the like, the nodes are associated with desired floor reaction force central points Qn (n=1, 2, 3, 4, 12, 34, 1234), as illustrated. Incidentally, a desired floor reaction force central point Q1234 of the 1234th node, which is the root node, is identical to a desired total floor reaction force central point P.

In the present embodiment, the control system 50 is supposed to have a functional construction similar to that shown in the aforesaid FIG. 2.

In this case, a desired ground contact portion trajectory of a desired motion in a desired gait output by a gait generating device 100 in the present embodiment is constructed of the desired position/posture trajectory of each foot 58 and the desired position/posture trajectory of the buttocks 72. The body position/posture trajectory of the desired motion means the position/posture trajectory of the trunk 77. Incidentally, the desired motion includes the position/posture trajectory of the distal portion of each arm 79. Further, the desired total floor reaction force central point P is on a virtual plane in the air rather than on an actual floor surface.

Figure 70:
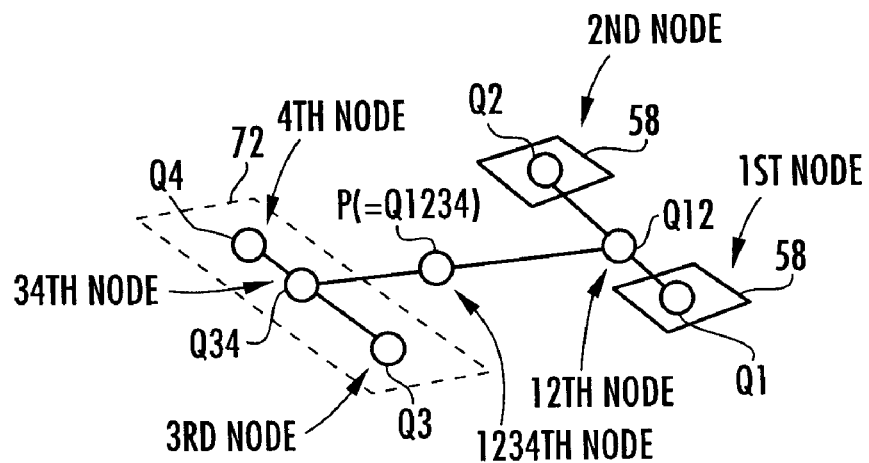
FIG. 70 is a diagram showing a hierarchical structure of nodes in the third embodiment.

In the present embodiment, a hierarchical compliance operation determiner 114 has the same functional components as those of the aforesaid second embodiment (refer to FIG. 62). However, in the present embodiment, a compensating total floor reaction force moment distributor determines and outputs the node compensating floor reaction force moments of the intermediate nodes and the root node In the hierarchical structure shown in FIG. 70 and the node compensating floor reaction force moments of the leaf nodes corresponding to the feet 58. Further, a compensating angle determiner determines and outputs the node compensating angles of the intermediate nodes and the root node in the hierarchical structure shown in FIG. 70 and the node compensating angles of the leaf nodes corresponding to the feet 58. In this case, the basic techniques for determining these node compensating floor reaction force moments and node compensating angles may be the same as the techniques explained in the first to the third reference examples or the first embodiment. Further, a floor configuration estimator determines estimated n-th floor height errors Zfn_estm(n=1, 2, 3, 4) by the same technique as the technique explained in the aforesaid third reference example, as in the case of the aforesaid first embodiment, and also estimates ground contact portion floor inclination errors θfn(n=1, 2) of the feet 58.

Further, a robot geometric model (inverse kinematics calculator), which is a functional component of the control system 50, corrects the positions/postures of the ground contact portions of the buttocks 72 and the feet 58 (ground contact portions) to restrain the occurrence of a slippage, such as a twist, of the ground contact portions and also corrects the position/posture of the body (trunk) 77 basically on the basis of the corrected desired ground contact portion positions/postures with deformation compensation and the desired body position/posture mentioned above by the same technique as that in the aforesaid first embodiment.

The processing of the control system 50 other than that explained above may be the same as that of the aforesaid second embodiment.

Several modifications related to the embodiments explained above will now be explained.

An actual node floor reaction force that cannot be directly detected by a floor reaction force sensor may be estimated by an observer by using another actual ground contact portion floor reaction force directly detected by a floor reaction force sensor, a detected value of an acceleration sensor, a detected value of a clinometer or the like, or it may be estimated by a simplified algebraic relationship. For instance, the hierarchical compliance operation is a rotational compliance operation in which a ground contact portion is rotated about a desired total floor reaction force central point; therefore, even when the compliance operation is performed, the vertical acceleration of the overall center-of-gravity of the robot (or an acceleration component in the direction of a segment that connects a desired total floor reaction force central point and the overall center-of-gravity) substantially agrees with the vertical acceleration of the overall center-of-gravity in a desired gait (desired motion) of the robot (or an acceleration component in the direction of a segment that connects a desired total floor reaction force central point and the overall center-of-gravity).

Hence, the sum of all actual ground contact portion floor reaction force vertical components substantially agrees with the value obtained by multiplying the sum of the vertical acceleration of the overall center-of-gravity in the desired gait (desired motion) of the robot and the gravitational acceleration by the total mass of the robot.

Thus, if an actual n-th node floor reaction force cannot be directly detected, then first, the sum (hereinafter referred to as the actual non-n-th node floor reaction force) of the actual floor reaction forces (actual ground contact portion floor reaction forces) of all leaf nodes that do not have an n-th node as their ancestor node and that are not the n-th node itself is determined.

Next, an estimated n-th node floor reaction force, which is an estimated value of an actual n-th node floor reaction force, is determined according to the following expression 57.

$$\text{Estimated } n\text{-th node floor reaction force} = \quad \text{Expression 57}$$
$$(\text{Overall center-of-gravity acceleration of desired}$$
$$\text{gait} + \text{Gravitational acceleration}) * \text{Total mass} -$$
$$\text{Actual non-}n\text{-th node floor reaction force}$$

If the body or the like is provided with an acceleration sensor, then the center-of-gravity acceleration of the entire robot (hereinafter referred to as an estimated overall center-of-gravity acceleration) may be estimated on the basis of a detected value of the acceleration sensor and at least one of a desired gait and an actual joint displacement, and an estimated n-th node floor reaction force, which is the estimated value of an actual n-th node floor reaction force, may be determined according to the following expression 58.

$$\text{Estimated } n\text{-th node floor reaction force} = \quad \text{Expression 58}$$
$$(\text{Estimated overall center-of-gravity acceleration} +$$
$$\text{Gravitational acceleration}) * \text{Total mass} -$$
$$\text{Actual non-}n\text{-th node floor reaction forces}$$

For example, in the aforesaid first embodiment, if no floor reaction force sensors for detecting knee floor reaction forces are provided or floor reaction force sensors for detecting knee floor reaction forces fail, then an estimated 34th node floor reaction force is determined according to the following expression 59.

$$\text{Estimated 34th node floor reaction force} = \quad \text{Expression 59}$$
$$(\text{Overall center-of-gravity acceleration of desired gait} +$$
$$\text{gravitational acceleration}) * \text{Total mass} -$$
$$\text{Actual non-34th node floor reaction forces} =$$
$$\text{Overall center-of-gravity acceleration}$$
$$\text{of desired gait} * \text{Total mass} -$$
$$(\text{Actual 12th node floor reaction force} +$$
$$\text{Actual 56th floor reaction force})$$

Further, the estimated 34th node floor reaction force is used in place of an actual 34th node floor reaction force to determine the 1234th node compensating angle θ1234 by the compliance operation processing, and an estimated 1234th node relative floor height error Z1234rel_estm is also estimated by floor configuration estimation processing.

In determining the 34th node compensating angle θ34, it is assumed that the floor is as expected, and an estimated third node floor reaction force, which is the estimated value of an actual third node floor reaction force, and an estimated fourth node floor reaction force, which is the estimated value of an actual fourth node floor reaction force, are determined on the basis of the corrected desired third ground contact portion position/posture with deformation compensation, the corrected desired fourth ground contact portion position/posture with deformation compensation, and an estimated 34th node floor reaction force.

Further, the estimated third node floor reaction force and the estimated fourth node floor reaction force are used in place of an actual third node floor reaction force and an actual fourth node floor reaction force to determine the 34th node compensating angle θ34 by the compliance operation processing.

Instead of determining the corrected desired node floor reaction force moment about a desired node floor reaction force central point on the basis of the required moment for restoring the posture of the robot (compensating total floor reaction force moment) so as to be equivalent to adding the required moment for restoration as described above, a corrected desired node floor reaction force central point obtained by correcting a desired node floor reaction force central point may be determined on the basis of the required moment for restoration (compensating total floor reaction force moment). In this case, a desired node floor reaction force moment about a desired node floor reaction force central point is not corrected, so that it remains to be zero.

Further, in order to compensate for a component that could not be controlled within an n-th node floor reaction force (an expected or detected control error component), the desired floor reaction force of the parent node of the n-th node may be corrected on the basis of the component. More specifically, the value of the difference between an actual n-th node floor reaction force and a desired n-th node floor reaction force in the last control cycle or the value obtained by passing the aforesaid difference through a low-pass filter may be added to the desired floor reaction force of the n-th node.

In the processing of estimating a floor configuration, a tree structure that is different from the tree structure for the compliance control may be set. The tree structure may have two layers composed of a root node and leaf nodes. Further, the weights of nodes may be set to be different from those for the compliance control. A node may be set to any weight as long as the weight of the node is zero in a period during which a node floor reaction force is zero (a period during which all ground contact portions belonging to the node or the ground contact portion corresponding to the node move or moves in the air).

Further, in the processing of estimating a floor configuration, each corrected node weight may be determined on the basis of the aforesaid corrected desired node floor reaction force central point, and a vector having the determined corrected node weight as an element may be used as the weight for estimating the floor configuration.

When determining an estimated relative floor height error of each point (each ground contact portion) in the processing of estimating a floor configuration, instead of using an actual floor reaction force, a mechanism compliance model, and the detected value of a posture sensor, a deformation amount detector for detecting the deformation amount of a compliance mechanism or the like may be provided so as to use a detected value of the deformation amount detector and a detected value of a posture sensor.

If a floor configuration is to be not only relatively estimated but globally estimated also (estimating a floor configuration on a global coordinate system), then the following may be carried out.

1) Estimating the global height of a floor in a case where the height of the body of a robot on the global coordinate system (hereinafter referred to as the global height) can be detected:

A detector that detects the global height of a predetermined portion, such as a body, of a robot (a body height estimator using an acceleration sensor (e.g., the estimator disclosed in PCT/JP03/05448 by the present applicant) or an external sensor, such as a visual sensor) is used. The value of an estimated floor height error on the global coordinate system is determined on the basis of the estimated body global height, a joint displacement (an actual joint displacement or a desired joint displacement), the detected value of an actual body posture inclination, and the detected value of an actual floor reaction force. Thus, the estimated floor height error of the root node will have a meaning as the weighted average value of the global estimated floor height error of every ground contact portion.

2) Estimating the global height of a floor in a situation wherein the global height of the body is unknown:

If the global value of a certain estimated n-th floor height error (the error in the global coordinate system rather than the relative value in a group) is known, then the global values of the estimated floor height errors of all points (ground contact portions) are determined on the basis of the above known global value and estimated relative floor height errors. If the global value of the estimated n-th floor height error at the start point of a travel of a robot is known, then the global value of the floor height error of a ground contact portion that newly comes in contact with the ground will be sequentially determined as the robot continues to travel; therefore, a map of floor heights on a travel trajectory of the robot can be created by storing the above sequentially determined global values.

Further, in the processing of estimating a floor configuration, each corrected node weight (obtained by correcting the value of the weight of each node) may be determined on the basis of the aforesaid corrected desired node floor reaction force central point, and the determined corrected node weight may be used as the weight for defining an actual n-th node relative floor height or the like in estimating the floor configuration. Further, in estimating a floor configuration, the weight used to define the actual n-th node relative floor height or the like does not necessarily have to be the same as the aforesaid weight determined by the desired floor reaction force distributor.

Supplementally, the weight for defining the actual n-th node relative floor height or the like does not necessarily have to agree with the weight determined by the desired floor reaction force distributor; however, if they are to agree with each other (in this case, the desired floor reaction force central point of the root node will automatically agree with a desired total floor reaction force central point), then the influence of a floor configuration error can be canceled simply by adding an n-th node estimated floor inclination error to an n-th node compensating angle (n=1, 2, ... ) for the compliance operation, thus making it possible to reduce the calculation volume for canceling the influence of the floor configuration error.

Furthermore, estimated floor configuration errors may be stored as the map information of a floor configuration, and a desired gait may be generated on the basis of the stored map information of the floor configuration when a robot walks in the same place next time.

Incidentally, the arithmetic processing sequences in the block diagrams or the flowcharts showing the arithmetic processing functions in the embodiments described above may be subjected to equivalent modifications.

INDUSTRIAL APPLICABILITY

As described above, the present invention is useful as the one that makes it possible to provide a legged mobile robot that permits highly stable, smooth operations to be achieved by properly controlling floor reaction forces even in a situation wherein a portion other than the distal portions of the legs of the legged mobile robot are brought into contact with the ground.

The invention claimed is:

1. A control system for a legged mobile robot comprising a base body, a plurality of link mechanisms that are connected to the base body to move the base body and that come in contact with externals, and a plurality of joints provided between the base body and the distal portions of the link mechanisms to make the distal portions of the link mechanisms movable with respect to the base body, the legged mobile robot being able to be operated to a specific motion posture in which the robot is in contact with an external at a first predetermined portion or portions between the distal portion or portions of one or more specific link mechanisms among the plurality of link mechanisms and the base body, wherein at least one or more of the plurality of joints are provided between the first predetermined portion or portions and the distal portion or portions of the link mechanism, the control system, comprising:

an external force detecting means for detecting or estimating an external force acting on the first predetermined portion in the specific motion posture;

a desired external force determining means for determining a desired external force, which is a desired value of the external force on the first predetermined portion in the specific motion posture; and a joint controlling means for controlling the displacement of at least a joint existing between the first predetermined portion and the base body such that the detected or estimated external force approximates the desired external force.

2. The control system for a mobile robot according to claim 1, wherein the specific link mechanisms are leg bodies.

3. The control system for a mobile robot according to claim 1, wherein the specific link mechanisms are leg bodies extended from buttocks connected to the base body through the intermediary of joints, and the first predetermined portion is the buttocks.

4. The control system for a mobile robot according to claim 1, comprising an actual posture detecting means for detecting the actual posture of a second predetermined portion, such as the base body, of the mobile robot, and a desired motion determining means for determining a desired posture of the second predetermined portion, wherein the desired external force determining means determines the desired external force on the basis of at least the difference between the actual posture and the desired posture of the second predetermined portion.

5. The control system for a mobile robot according to claim 1, comprising an actual posture detecting means for detecting an actual posture of a second predetermined portion, such as the base body, of the mobile robot, and a desired motion determining means for determining the desired posture of the second predetermined portion, wherein the joint controlling means comprises a means for determining the manipulated variable of an external force on the basis of the difference between the actual posture and the desired posture of the second predetermined portion, and the displacement of the joint is controlled such that the detected or estimated external force approximates the resultant force of the desired external force and the manipulated variable of the external force.

6. A legged mobile robot comprising:
a base body;
a plurality of link mechanisms connected to the base body, each of the plurality of link mechanisms having:
   a distal portion;
   a predetermined portion located between the base body and the distal portion; and
   at least one joint located between the predetermined portion and the distal portion; and
a control system including:
   an external force detecting means for detecting or estimating an external force acting on the predetermined portion when the mobile robot is in a specific posture;
   a desired external force determining means for determining a desired external force, which is a desired value of the external force on the predetermined portion in the specific posture; and
   a joint controlling means for controlling the displacement of the at least joint such that the detected or estimated external force approximates the desired external force,
   wherein when the mobile robot is in a motion position the distal portion of at least one of the plurality of link mechanisms contacts an external surface, wherein when the mobile robot is in a specific posture position the predetermined portion of at least one of the plurality of link mechanisms contacts the external surface, and
   wherein the control system operates the robot from the motion position to the specific posture position and from the specific posture position to the motion position.

7. The legged mobile robot of claim 6, wherein the predetermined portion is selected form the group consisting of a knee, an elbow and a buttocks.

* * * * *